(12) United States Patent
Li et al.

(10) Patent No.: US 12,521,476 B2
(45) Date of Patent: Jan. 13, 2026

(54) ARTERIAL AIR CAPTURE CHAMBER

(71) Applicant: MOZARC MEDICAL US LLC, Minneapolis, MN (US)

(72) Inventors: Zhigang Li, Shanghai (CN); Mark Daniels, Lino Lakes, MN (US); Thomas E. Meyer, Stillwater, MN (US); Huande Liu, Hangzhou (CN)

(73) Assignee: MOZARC MEDICAL US LLC, Minneapolis, MN (US)

( * ) Notice: Subject to any disclaimer, the term of this patent is extended or adjusted under 35 U.S.C. 154(b) by 326 days.

(21) Appl. No.: 16/308,611

(22) PCT Filed: Jun. 23, 2016

(86) PCT No.: PCT/CN2016/086843
§ 371 (c)(1),
(2) Date: Dec. 10, 2018

(87) PCT Pub. No.: WO2017/219310
PCT Pub. Date: Dec. 28, 2017

(65) Prior Publication Data
US 2019/0151528 A1     May 23, 2019

(51) Int. Cl.
*A61M 1/36*     (2006.01)
*A61M 1/14*     (2006.01)
*A61M 1/16*     (2006.01)

(52) U.S. Cl.
CPC ............ *A61M 1/3627* (2013.01); *A61M 1/14* (2013.01); *A61M 1/1654* (2013.01); *A61M 1/36* (2013.01);
(Continued)

(58) Field of Classification Search
CPC .... A61M 1/14; A61M 1/1654; A61M 1/1658; A61M 1/3627; A61M 1/36;
(Continued)

(56) References Cited

U.S. PATENT DOCUMENTS

| 4,102,655 A | 7/1978 | Jeffery et al. |
| 4,368,118 A | 1/1983 | Siposs |

(Continued)

FOREIGN PATENT DOCUMENTS

| CN | 202154892 U | 3/2012 |
| CN | 203342108 U | 12/2013 |

(Continued)

OTHER PUBLICATIONS

Japanese Office Action for App. No. 2018-566313, dated Apr. 22, 2020.
(Continued)

*Primary Examiner* — Patrick Orme

(57) ABSTRACT

An arterial air capture chamber (101) is used in dialysis. The arterial air capture chamber (101) includes an upwardly extending fluid inlet (102) terminating in a fluid inlet port (105) positioned at about a 90° turn relative to a fluid flow of a fluid inlet tube (107). The arterial air capture chamber (101) includes a draw tube (104) with an opposedly positioned beveled opening (306) at about 180° relative to the fluid inlet port (105). The arterial air capture chamber (101) provides improved fluid dynamics, reducing both stagnant flow and turbulence. The arterial air capture chamber (101) also provides for bidirectional flow of fluid through the arterial air capture chamber (101).

20 Claims, 108 Drawing Sheets

(52) U.S. Cl.
CPC ........ *A61M 1/3638* (2014.02); *A61M 1/3644* (2014.02); *A61M 2205/3334* (2013.01); *A61M 2206/10* (2013.01); *A61M 2206/12* (2013.01)

(58) Field of Classification Search
CPC .............. A61M 1/3638; A61M 1/3644; A61M 2205/3334; A61M 2206/10; A61M 2206/12
See application file for complete search history.

(56) References Cited

U.S. PATENT DOCUMENTS

| | | | |
|---|---|---|---|
| 4,681,606 A | | 7/1987 | Swan, Jr. et al. |
| 4,919,802 A | * | 4/1990 | Katsura ................ B01D 29/925 |
| | | | 210/512.1 |
| 5,837,905 A | * | 11/1998 | Strauss ............... A61M 1/3663 |
| | | | 73/861.63 |
| 5,849,065 A | | 12/1998 | Wojke |
| 6,051,134 A | * | 4/2000 | Schnell ............... A61M 1/3627 |
| | | | 210/188 |
| 6,053,967 A | * | 4/2000 | Heilmann ........... A61M 1/3627 |
| | | | 210/188 |
| 6,117,342 A | * | 9/2000 | Schnell ............... A61M 1/3627 |
| | | | 210/801 |
| 6,478,962 B1 | | 11/2002 | Brockhoff |
| 2014/0217027 A1 | | 8/2014 | Meyer |

FOREIGN PATENT DOCUMENTS

| | | |
|---|---|---|
| EP | 2540328 A1 | 1/2013 |
| GB | 1544810 | 4/1979 |
| JP | 2002-512553 | 4/2002 |
| WO | WO 2005/044339 | 5/2005 |
| WO | WO 2008-053261 | 5/2008 |

OTHER PUBLICATIONS

Brazilian Office Action for App. No. BR112018076718-2, mailed Jun. 10, 2020.
Office Action for Japanese Application No. 2018-566313, dated Nov. 27, 2020.
European Search Report for App. No. 16905852.6, dated Jan. 20, 2020.
Japanese Office Action for App. No. 2018-566314, dated May 8, 2020.
European Search Report for App. No. 16905852.6, dated May 12, 2020.
International Search Report for PCT/CN2016/086843 date of completion is Feb. 25, 2017 (3 pages).

* cited by examiner

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Y Velocity (mixture) (m/s)

Velocity Vectors Colored By Y Velocity (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Y Velocity (mixture) (m/s)

Velocity Vectors Colored By Y Velocity (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Y Velocity (mixture) (m/s)

Contours of Strain Rate (mixture) (1/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Velocity Vectors Colored By Velocity Magnitude (mixture) (m/s)

Contours of Strain Rate (mixture) (1/s)

ARTERIAL AIR CAPTURE CHAMBER

CROSS-REFERENCE TO RELATED APPLICATIONS

This application is a National Stage Application of PCT/CN2016/086843 filed Jun. 23, 2016, and the disclosure of the above-identified application is hereby incorporated by reference in its entirety.

FIELD OF THE INVENTION

The invention relates to an arterial air capture chamber for use in dialysis. The arterial air capture chamber reduces both stagnant flow and turbulence, and provides improved capture of air bubbles from liquid flowing through the chamber. The arterial air capture chamber further provides for bidirectional flow to automate aspects of system priming.

BACKGROUND

Arterial air capture chambers are used in dialysis to separate entrained air bubbles from the blood before the blood enters a dialyzer. Conventional arterial air capture chambers suffer from both areas of stagnant flow within the chamber and from areas of mixing between blood and air resulting in an increased tendency to coagulation in the extracorporeal circuit. Often, the blood surface is in contact with air so that air is further entrained into the blood which promotes dissolution of the air into the blood resulting in thrombosis activation and oxidation. The problem is aggravated when blood flows at an increased rate into the air capture chamber. Moreover, red blood cells can be damaged due to the high shear stresses. As such, conventional chambers fail to inhibit blood coagulation and/or undesirably activate blood thrombosis.

Conventional priming of a dialysis system is a complex process which requires training and monitoring. Automated priming is not used in conventional arterial air capture chambers because fluid can only flow in one direction. Dialyzer priming removes air from the dialyzer prior to use. In general, the dialyzer must be inverted or "flipped" during priming to facilitate air removal from the dialyzer compartment. Then, with the dialyzer inverted, a physiologically compatible saline solution is introduced from the bottom of the dialyzer to drive air out the top of the vertically positioned dialyzer and replaced with saline. If air is not removed from the dialyzer, the air can cause clotting leading to blockages in the hollow fibers of the dialyzer membrane which reduces the efficiency of the dialyzer during the treatment. Air trapped in the dialyzer can reduce dialyzer clearance by preventing diffusion between the blood and dialysate compartments. Additionally, clots in the returned blood to the patient can lead to increased risk of thrombosis. Finally, technicians can introduce error and inconsistently perform the steps for priming.

Hence, there is a need for an arterial air capture chamber that can effectively separate air bubbles from blood without causing coagulation, or causing hemolysis. There is a need for an arterial air capture chamber capable of bidirectional flow, allowing a simplified priming process that avoids the need to invert or "flip" a dialyzer during a priming step. The systems and methods should simplify and automate priming and improve usability. There is also a need for a bidirectional drip chamber that automates system priming and minimizes the risk of wet fibers trapping air.

SUMMARY OF THE INVENTION

The first aspect of the invention relates to an arterial air capture chamber. In any embodiment of the first aspect of the invention, the arterial air capture chamber comprises a chamber body comprising a top portion and a bottom portion; a fluid inlet positioned on the bottom portion of the chamber body, the fluid inlet upwardly extending from the bottom portion to form a fluid inlet tube terminating in a fluid inlet port disposed on an inner wall of the chamber body, the fluid inlet port positioned at about a 90° turn relative to a fluid flow of the tube and disposed tangential to a circle plane formed by a center axis of the chamber body; and; a fluid outlet positioned on the top portion of the chamber body, the fluid outlet downwardly extending to form a draw tube extending from a top portion of the chamber body to the bottom portion of the chamber body; the draw tube terminating in a beveled opening, said beveled opening opposedly positioned on the draw tube at about 180° relative to the fluid inlet port.

In any embodiment of the first aspect of the invention, a spiral flow-inducing shelf is formed from the removal of a portion of the fluid inlet port, said spiral-flow inducing shelf disposed on the inner wall of the chamber on the circumference of the circle plane formed by the center axis of the chamber body and the fluid inlet port, and the shelf downwardly extending to the bottom of the chamber body.

In any embodiment of the first aspect of the invention, the spiral flow-inducing shelf extends along the inner wall of the chamber on the circumference of the circle plane formed by the center axis of the chamber body.

In any embodiment of the first aspect of the invention, an opposing shelf is positioned at about 180° relative to the fluid inlet port and downwardly extending to the bottom portion of the chamber body.

In any embodiment of the first aspect of the invention, the arterial air capture chamber comprises a curved surface extending from the bottom portion of the chamber body along the inner surface of the chamber parallel to the fluid inlet tube, said curved surface terminating in a surface planar to a top portion of the fluid inlet port.

In any embodiment of the first aspect of the invention, the opening of the fluid inlet port is positioned higher relative to the beveled opening of the draw tube.

In any embodiment of the first aspect of the invention, an inner surface of the bottom portion of the chamber body is a curved surface.

In any embodiment of the first aspect of the invention, the arterial air capture chamber has an inner diameter of between 18 and 30 mm.

In any embodiment of the first aspect of the invention, a distance between a center axis of the draw tube and the center axis of the chamber body is between 0.04 inches and 0.20 inches.

In any embodiment of the first aspect of the invention, the chamber body is constructed from a PVC material.

In any embodiment of the first aspect of the invention, the chamber body is constructed from a Polycarbonate material.

In any embodiment of the first aspect of the invention, the arterial air capture chamber comprises a cap; wherein the cap contains at least one port for fluid to enter or exit the chamber.

In any embodiment of the first aspect of the invention, the draw tube extends to a height of between 0.1 and 0.5 cm above the bottom inner surface of the chamber body.

Any of the features disclosed as being part of the first aspect of the invention can be included in the first aspect of the invention, either alone or in combination.

The second aspect of the invention is drawn to an extracorporeal flow path comprising a dialyzer comprising a blood side of the dialyzer and a dialysate side of the dialyzer; a blood inlet fluidly connected to the blood side of the dialyzer and a blood outlet fluidly connectable to the blood side of the dialyzer; a blood pump; and the arterial air capture chamber of the first aspect of the invention; wherein the arterial air capture chamber is positioned in an arterial blood line fluidly connectable to a patient and to the dialyzer.

In any embodiment of the second aspect of the invention, the arterial air capture chamber is positioned between the blood pump and the dialyzer.

In any embodiment of the second aspect of the invention, the arterial air capture chamber is positioned upstream of the blood pump.

In any embodiment of the second aspect of the invention, the extracorporeal flow path comprises a venous air capture chamber positioned in a venous blood line fluidly connectable to a patient and to the dialyzer.

Any of the features disclosed as being part of the second aspect of the invention can be included in the second aspect of the invention, either alone or in combination.

The third aspect of the invention is drawn to a method of performing hemodialysis comprising the steps of pumping blood through the extracorporeal flow path of the second aspect of the invention; and pumping dialysate through the dialysate side of the dialyzer, wherein the step of pumping blood through the extracorporeal flow path comprises controlling the blood pump to pump the blood at a blood flow rate of between 50 mL/min and 500 mL/min.

In any embodiment of the third aspect of the invention, the step of filling the arterial air capture chamber to a specified filling level; wherein the specified filling level is based on the blood flow rate.

In any embodiment of the third aspect of the invention, the specified filling level is between 20% to 40% when the blood flow rate is between 50 mL/min and 100 mL/min; the specified filling level is between 30% and 60% when the blood flow rate is between 50 mL/min and 200 mL/min; the specified filling level is between 30% to 60% when the blood flow rate is between 100 mL/min and 275 mL/min; the specified filling level is between 50% and 80% when the blood flow rate is between 200 mL/min and 500 mL/min; the specified filling level is between 40% to 90% when the blood flow rate is between 275 mL/min and 500 mL/min; and the specified filling level is between 50% to 90% when the blood flow rate is 500 mL/min or greater.

In any embodiment of the third aspect of the invention, the blood flow rate is between 100 mL/min and 500 mL/min, and wherein the specified filling level is at least 40%.

Any of the features disclosed as being part of the third aspect of the invention can be included in the third aspect of the invention, either alone or in combination.

The fourth aspect of the invention is drawn to a method for priming a dialyzer, including pumping physiologically compatible saline through the extracorporeal flow path of the second aspect of the invention and pumping physiologically compatible saline through the dialysate side of the dialyzer.

Any of the features disclosed as being part of the fourth aspect of the invention can be included in any other aspect of the invention, either alone or in combination.

DETAILED DESCRIPTION OF THE INVENTION

Figure 1:
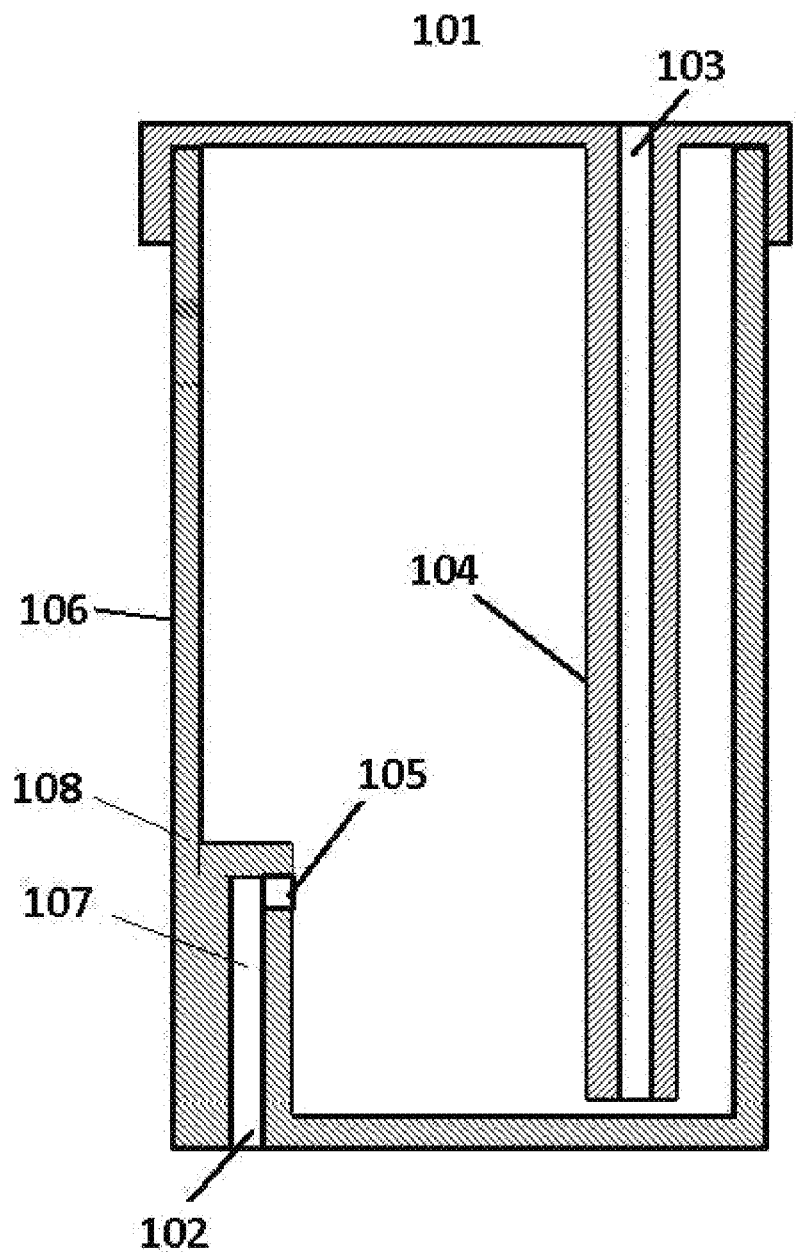
FIG. 1 shows a generalized picture of an arterial air capture chamber.

Unless defined otherwise, all technical and scientific terms used herein generally have the same meaning as commonly understood by one of ordinary skill in the relevant art.

The articles "a" and "an" are used herein to refer to one or to more than one (i.e., to at least one) of the grammatical object of the article. By way of example, "an element" means one element or more than one element.

The term "about a 90° turn" refers to an angle defined by three points, wherein the angle is 90° or close to 90°.

The term "about 180°" refers to an angle defined by three points, wherein the angle is 180° or close to 180°

An "arterial air capture chamber" is a device placed in the arterial line of an extracorporeal flow path that separates and captures air mixed with the blood.

The term "arterial blood line" refers to a fluid line in an extracorporeal flow path that conveys blood from a patient to the dialyzer.

A "beveled opening" is an opening in a component having a slope from the otherwise horizontal or vertical face of the component.

The term "blood flow rate" refers to the velocity of blood moving in a fluid line.

The term "blood outlet port" refers to an opening through which blood can exit a component.

The term "blood pump" refers to a pump located in an extracorporeal flow path for pumping blood from a patient, to a dialyzer, and back to the patient.

The term "blood side of the dialyzer" refers to the portion of the dialyzer through which blood will travel during dialysis.

The terms "bottom portion" and "bottom section" refer to the portion of a component at a height lower than the center of a component when positioned for normal use.

A "cap" is a component that fits on top of a second component.

A "center axis" is an imaginary line through the center of a component from the top to the bottom of the component.

The term "chamber body" refers to the interior space of an air capture chamber.

The term "circle plane" refers to a horizontal plane that is substantially circularly shaped.

The term "circumference of the circle plane" refers to the portion of a circle plane where the circle plane meets a wall of a component.

The term "comprising" includes, but is not limited to, whatever follows the word "comprising." Thus, use of the term indicates that the listed elements are required or mandatory but that other elements are optional and may or may not be present.

The term "consisting of" includes and is limited to whatever follows the phrase "consisting of" Thus, the phrase indicates that the limited elements are required or mandatory and that no other elements may be present.

The term "consisting essentially of" includes whatever follows the term "consisting essentially of" and additional elements, structures, acts or features that do not affect the basic operation of the apparatus, structure or method described.

The term "controlling the blood pump" or to "control the blood pump" refers to setting a pump rate for a blood pump.

The term "curved surface" refers to any surface that is not substantially flat.

The term "dialysate side of the dialyzer" refers to the portion of the dialyzer through which dialysate will travel during dialysis.

The term "dialyzer" refers to a cartridge or container with two flow paths separated by semi-permeable membranes. One flow path is for blood and one flow path is for dialysate. The membranes can be in the form of hollow fibers, flat sheets, or spiral wound or other conventional forms known to those of skill in the art. Membranes can be selected from the following materials of polysulfone, polyethersulfone, poly(methyl methacrylate), modified cellulose, or other materials known to those skilled in the art.

The term "disposed" refers to a first components placement on a second component.

The term "downwardly extending" refers to a configuration of a component wherein, during normal operation, the component is positioned from a top portion towards a bottom portion of a second component.

A "draw tube" is a fluid connector extending into an interior space of a component.

The term "extracorporeal flow path" is the path through which blood will travel during dialysis.

The term "filling" or to "fill" refers to adding a fluid to a component or container.

The term "filling level" refers to the level of a fluid within a component.

The terms "fluidly connected," "fluidly connectable," and "fluid connection" refer to the ability of providing for the passage of fluid or gas from one point to another point. The two points can be within or between any one or more of compartments, modules, systems, components, and rechargers, all of any type.

A "fluid inlet" is a fluid connection through which a fluid can enter a component.

A "fluid inlet port" is an opening in a fluid inlet through which fluid enters a component.

A "fluid inlet tube" is a fluid connector through which a fluid can enter a component or container.

A "fluid outlet" is a fluid connection through which a fluid can exit a component.

The term "flush" refers to a position of a first component or structure having a surface that is on a common plane or even relative to a second component or structure, wherein the first component or structure is in contact with the second component or structure.

The term "inner diameter" refers to the distance from the wall of a component, through the center of the component, and to the wall on the opposite side.

The term "inner wall" refers to the surface of a component or container that is inside the component or container.

The term "opening" refers to a space through which fluid or gas can pass.

The term "opposedly positioned" refers to the relative positions of two components wherein the two components are facing in substantially opposite directions.

An "opposing shelf" is a substantially horizontal structure on an opposite side to a first shelf A "patient" or "subject" is a member of any animal species, preferably a mammalian species, optionally a human. The subject can be an apparently healthy individual, an individual suffering from a disease, or an individual being treated for a disease.

The term "planar" refers to a surface that is substantially flat.

The term "polycarbonate material" refers to a polymer with linkages through carbonate groups.

The term "positioned higher" refers to the relative positions of two components wherein the component that is "positioned higher" is at a higher elevation when the system is in normal use.

"Priming" refers to preparing a system or component for use. In any embodiment, the term "priming" can refer to the process of pumping a liquid into a system, fluid lines, or other components to fill the system, fluid lines, or other components with the fluid.

The term "priming step" refers to a discrete action taken in order to prime a system.

The terms "pumping," "pumped," or to "pump" refers to moving a fluid, gas, or combination thereof, with a pump.

"PVC" refers poly vinyl chloride.

A "spiral flow-inducing shelf" refers to a shelf that causes fluid inside of the larger structure to move in a spiral flow path.

The term "specified filling level" refers to a level of fluid within a component, such as a percentage of the component filled with fluid and is a predetermined level dependent upon other system parameters.

The term "tangential" refers to a position of a first component on a second component, wherein the first component occupies a space within a horizontal plane of the second component.

The term "terminating" refers to a distal end of a component or structure.

The term "top portion" refers to the portion of a component at a height higher than the center of a component when positioned for normal use.

The term "upwardly extending" refers to a configuration of a component wherein, during normal operation, the component is positioned from a bottom portion towards a top portion of the component.

A "venous air capture chamber" is a device placed in the venous line of an extracorporeal flow path that separates and captures air mixed with the blood.

The term "venous blood line" refers to a fluid line in an extracorporeal flow path that conveys blood from a dialyzer to the patient.

Arterial Air Capture Chamber

The invention relates to an arterial air capture chamber for hemodialysis and a method for performing dialysis that minimizes contact and mixing between the blood and air. The air capture chamber can be adapted for disposable or non-disposable sets and provides for bidirectional flow during priming and blood return functions. Bidirectional flow during priming can be implemented in a compact portable hemodialysis system that does not require the dialyzer to be manually inverted during the priming process. The structural features of the arterial air capture chamber minimize high shear stresses to inhibit blood coagulation or activation of thrombosis.

FIG. 1 illustrates an arterial air capture chamber in accordance with the present invention. In any embodiment of the first, second, third, or fourth aspects of the invention, the arterial air capture chamber 101 can comprise a chamber body 106, a fluid inlet 102, and a fluid outlet 103. During use, blood can enter the arterial air capture chamber 101 through the fluid inlet 102, and exit the arterial air capture chamber 101 through the fluid outlet 103. In any embodiment of the first, second, third, or fourth aspects of the invention, the fluid inlet 102 can be upwardly extending from the bottom portion of the arterial air capture chamber body 106 towards the top of the arterial air capture chamber body 106. As illustrated in FIG. 1, the upwardly extending fluid inlet 102 forms a fluid inlet tube 107 disposed on an inner wall 108 of the arterial air capture chamber body 106.

In any embodiment of the first, second, third, or fourth aspects of the invention, the fluid outlet 103 can be positioned at a top portion of the arterial air capture chamber body 106. In any embodiment of the first, second, third, or fourth aspects of the invention, the fluid outlet can downwardly extend from the top portion towards the bottom portion of the chamber body 106 of the arterial air capture chamber 101 to form a draw tube 104. In any embodiment of the first, second, third, or fourth aspects of the invention, the fluid inlet 102 can comprise a fluid inlet port 105. Blood can enter the chamber body 106 through the fluid inlet port 105, travel to the draw tube 104, and exit the arterial air capture chamber 101 through the fluid outlet 103.

Figure 2A:
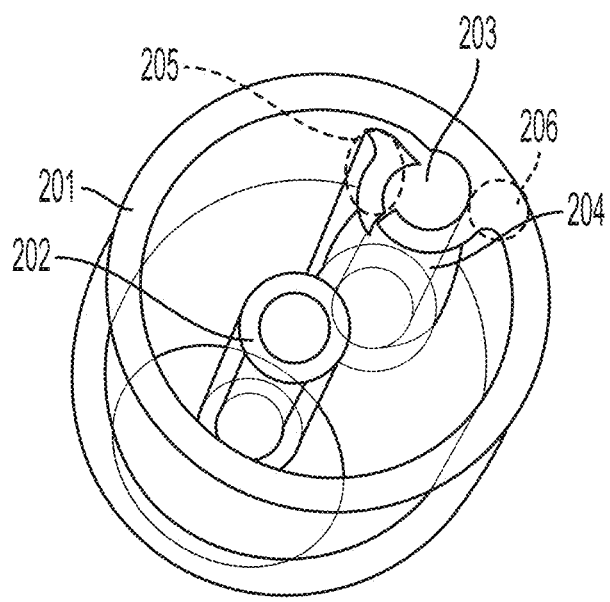
FIGS. 2a-2b are detailed diagrams of inlet port configurations.
Figure 2B:
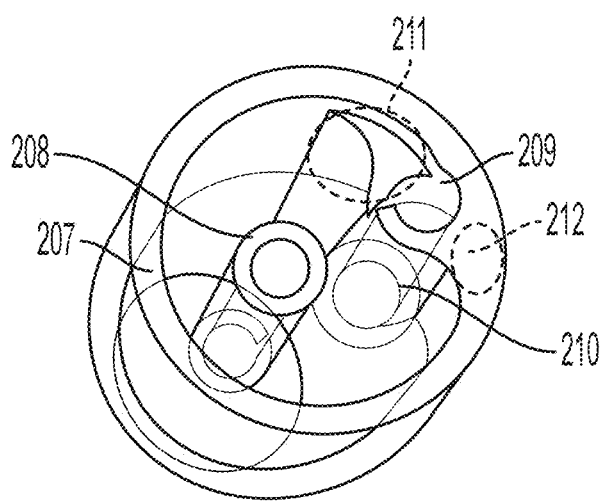

FIGS. 2a and 2b are cross sections of air capture chambers, comprising a chamber body 201, a draw tube 202 for fluid outlet, and fluid inlet port 203 on the fluid inlet 204. As shown in FIG. 2a, the fluid inlet port 203 is positioned at about a 90° turn relative to a direction of fluid flow into the tube or the vertical axis. The fluid inlet port 203 is disposed on the inner wall of the chamber body 201, and tangential to a circle plane around the central axis of the chamber body 201. The bottom section of the fluid inlet port 203 includes a spiral flow-inducing shelf 205 that is flush to the bottom section of the fluid inlet port 203 and disposed on an inner wall of the chamber body 201 on the circumference of the circle plane around the central axis of the chamber body 201. The spiral flow-inducing shelf 205 extends downwardly to the bottom of the chamber body 201 and is parallel to the draw tube 202. Opposite the fluid inlet port 203 and spiral flow inducing shelf 205 is an opposing shelf 206 downwardly extending to the bottom chamber body 201. The opposing shelf 206 is positioned flush to the chamber wall on the opposite side of the fluid inlet 204 as the fluid inlet port 203. The opposing shelf 206 can be a surface planar to a top portion of the fluid inlet port 203 and transition from an edge into a curved surface that extends downwardly to the bottom portion of the chamber body 201 along the inner surface of the chamber body 201 parallel to the fluid inlet port 203. The opposing shelf 206 can have varying thickness from a small to a large radius to reduce stagnant flow.

FIG. 2a shows an embodiment of the arterial air capture chamber with a small radius of the spiral flow-inducing shelf 205 and a "small radius" opposing shelf 206. FIG. 2b shows a similar air capture chamber comprising a chamber body 207, a draw tube 208 and a fluid inlet 210 with fluid port 209. The arterial air capture chamber of FIG. 2b has a large outside radius of the spiral flow-inducing shelf 211 and a "large radius" opposing shelf 212. The spiral flow-inducing shelf 205 of FIG. 2a and "small radius" opposing shelf 206 are features that can smooth a vortex that is formed between the intersection of the outside wall of the fluid inlet port 203 and the inner wall of the chamber body 201. In FIG. 2b, the spiral flow-inducing shelf 201 and "large radius" opposing shelf 212 provide improved smoothing of a vortex that is formed between the intersection of the outside wall of the fluid inlet port 210 and the inner wall of the chamber body 207. Blood flows into the chamber body 207 from the fluid inlet port 209 and out through the draw tube 208 wherein the fluid inlet port 209 and spiral flow-inducing shelf 211 guides blood to flow into the chamber body 207 along the chamber's wall to form a downward spiral flow and then out through the draw tube 208. The spiral flow minimizes turbulence on a blood surface to avoid mixing so that air is not entrained into the blood. The spiral flow formed by the fluid inlet port 209 and spiral flow-inducing shelf 211 provides buoyancy to air bubbles so that air bubbles can overcome the fluid flow into draw tube 208 and migrate toward the blood surface and be captured at the top of the chamber body 207. Without the spiral flow-inducing shelf 211 and opposing shelf 212, areas of stagnant flow may exist near the fluid inlet port 209. The chamber body 207 is designed to minimize or prevent stagnant flow areas and to reduce residence time and thereby prevent blood clots from forming. The chamber body 207 also provides low shear stresses using the spiral flow-inducing shelf 211 and opposing shelf 212 help to eliminate the stagnant flow areas.

Figure 3:
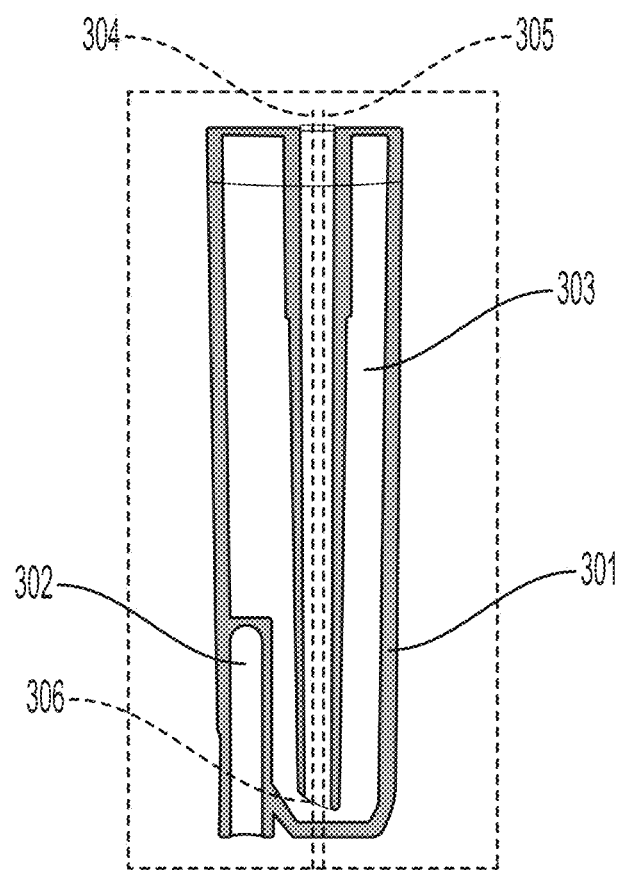
FIG. 3 is a diagram of an arterial air capture chamber.

FIG. 3 illustrates an arterial air capture chamber comprising a chamber body 301, a fluid inlet 302 and a draw tube 303 for exiting fluid. One of skill in the art will understand that the chamber body can have a center axis 304 extending from the top portion of the chamber body 301 to the bottom portion of the chamber body 301. The draw tube 303 can also have a center axis 305 extending from the top portion of the draw tube 303 to the bottom portion of the draw tube 303. The draw tube 303 can comprise a beveled opening 306. As described, the geometry of the beveled opening 306 can affect fluid flow through the arterial air capture chamber body 201 of FIG. 2b. In any embodiment of the first, second, third, or fourth aspects of the invention, the beveled opening 306 can be opposedly positioned on the draw tube 303 at about 180° relative to the inlet port. As described, the opposedly positioned beveled opening 306 creates a longer flow path for fluid moving through the chamber body 301 relative to a beveled opening that is not opposedly positioned relative to the inlet port beneficial for flow dynamics. Fluid spirals around the bottom portion of the chamber body 301 and is received by the beveled opening 306 opposedly positioned on the draw tube 303.

Figure 4A:
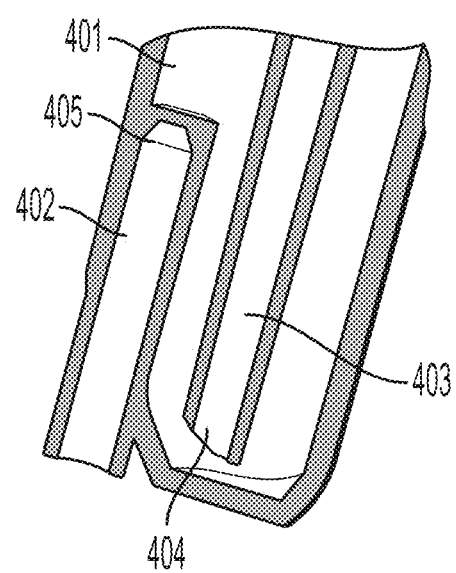
FIGS. 4a-4c show detailed arrangements of the draw tube.
Figure 4B:
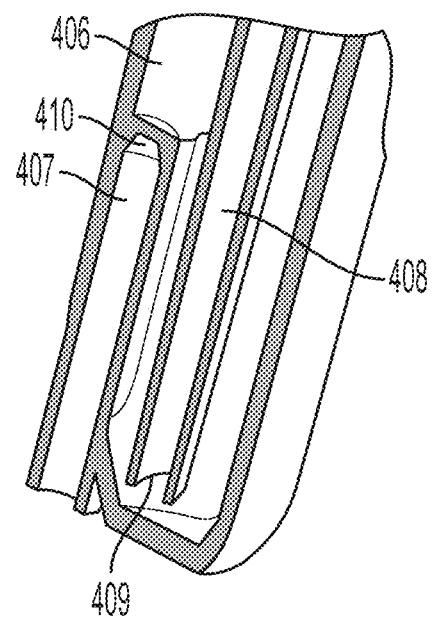
Figure 4C:
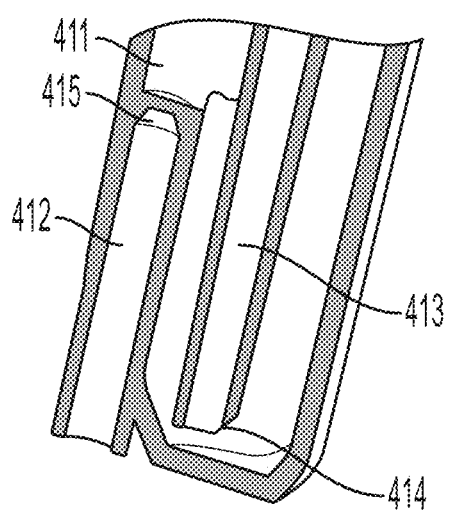

FIGS. 4a-c illustrate the possible configurations for the beveled opening of the draw tube. FIG. 4a illustrates an air capture chamber with a chamber body 401, a fluid inlet 402 with a fluid inlet port 405, a draw tube 403 and a bevel opening 404. FIG. 4b illustrates an air capture chamber with a chamber body 406, a fluid inlet 407 with a fluid inlet port 410, a draw tube 408 and a beveled opening 409. FIG. 4c illustrates an air capture chamber with a chamber body 411, a fluid inlet 412 with a fluid inlet port 415, a draw tube 413 and a beveled opening 414. In each of FIGS. 4a-c, the fluid inlet port 405, 410 and 415, respectively, is disposed on an inner wall of the chamber body 401, 406, and 411, respectively, and positioned at about a 90° turn relative to a fluid flow of the tube tangential to a circle plane formed by the central axis of the chamber body, such that fluid exiting the fluid inlet port would be moving out of the plane of the drawing. In FIG. 4a, the beveled opening 404 is disposed at 270° relative to the fluid inlet port 405. In FIG. 4b, the beveled opening 409 is opposedly disposed at an angel of 180° relative to the fluid inlet port 410. In FIG. 4c, the beveled opening 414 is disposed at an angle of 90° relative to the fluid inlet port 415. As described, desirable flow through the chamber body 406 can be achieved by the beveled opening 409 opposedly positioned on the draw tube 408 at 180° relative to the fluid inlet port 410, as illustrated in FIG. 4b. As shown in FIG. 4a, the fluid inlet port 405 is positioned higher than the beveled opening 404 on the draw tube 403. The same arrangements are also shown in FIGS. 4b and 4c.

Figure 5A:
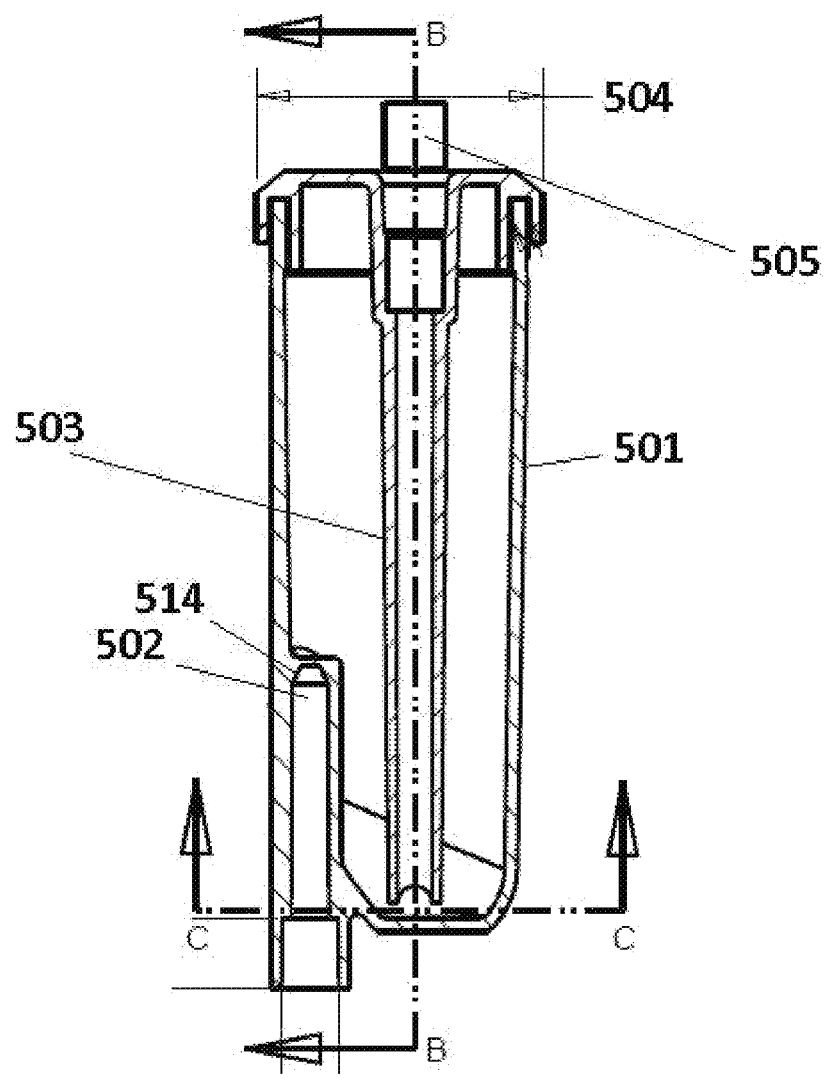
FIGS. 5a-5c show schematics of the arterial air capture chamber.
Figure 5B:
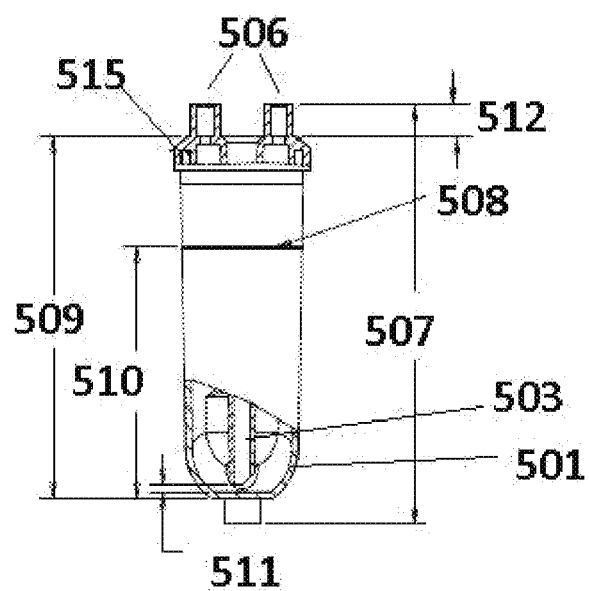
Figure 5C:
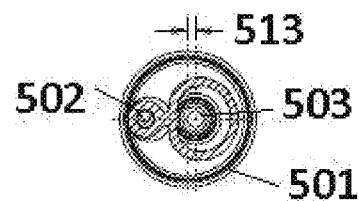

Based on computational flow monitoring examples described herein, an arterial air capture chamber was constructed comprising a chamber body, an upwardly extending fluid inlet terminating in a fluid inlet port disposed on an inner wall of the chamber body at about a 90° turn relative to a fluid flow of the tube and disposed tangential to a circle plane formed by the central axis of the chamber body, a downwardly extending fluid outlet forming a draw tube, the draw tube comprising a beveled opening opposedly positioned at about 180° relative to the fluid inlet port. FIGS. 5a-c show schematics of a non-limiting embodiment of the arterial air capture chamber of the invention.

As shown in FIG. 5a, the arterial air capture chamber can, in any embodiment of the first, second, third, or fourth aspects of the invention, comprise a chamber body 501, an upwardly extending fluid inlet 502, and a downwardly extending fluid outlet 505 forming a draw tube 503. In any embodiment of the first, second, third, or fourth aspects of the invention, the diameter of the arterial air capture chamber, denoted as line 504 can be set at any diameter. In any embodiment of the first, second, third, or fourth aspects of the invention, the diameter of the arterial air capture chamber can be set at any size between 2.5 cm and 3.8 cm. In any embodiment of the first, second, third, or fourth aspects of the invention, the fluid inlet 502 can terminate in inlet port 514 disposed on an inner wall of the chamber body 501.

FIG. 5b shows a view of the arterial air capture chamber along the B-B axis as depicted in FIG. 5a. As described, in any embodiment of the first, second, third, or fourth aspects of the invention, the arterial air capture chamber can comprise a cap 515, which can comprise port 506 for adding or removing fluid, or measuring pressure. As shown in FIG. 5b, total height of the air capture chamber, denoted as 507 can be any height between 6 and 12 cm. The height of the cap 515 with the outlet tubing 506 can be between any of 0.6 and 1.2 cm, denoted as height 512. As such, the height of the chamber body, denoted as 509 can be between 6.8 cm and 11.4 cm. In FIG. 5b, line 508 denotes a possible filling level, and is set as 60% as denoted by height 510. However, as described, the filling level can vary. In any embodiment of the first, second, third, or fourth aspects of the invention, the draw tube 503 can be placed at a distance above the bottom of the chamber of between 0.1 and 0.5 cm, as denoted by 511. As shown in FIGS. 5a and 5b, in any embodiment of the first, second, third, or fourth aspects of the invention, the chamber body 501 can have a curved surface on the bottom portion extending and terminating in a surface planar to a top portion of the fluid inlet port 514.

FIG. 5c depicts a cross-sectional view of the arterial air capture chamber, denoted as view c-c in FIG. 5a. As shown in FIG. 5c, the centerline of the draw tube 503 can offset from the centerline of the body 501 by between any of 0.1 and 0.5 cm, denoted by distance 513.

Figure 6A:
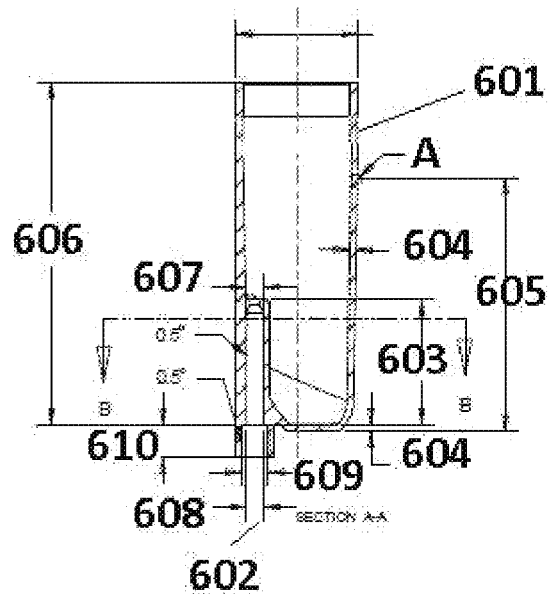
FIGS. 6a-6d show detailed schematics of the chamber body.

FIG. 6a is a non-limiting schematic of a different view of the arterial air capture chamber. The arterial air capture chamber can comprise a chamber body 601 and fluid inlet 602. In any embodiment of the first, second, third, or fourth aspects of the invention, the fluid inlet 602 can extend upwardly into the chamber body 601 to a height of between 2.0 and 4.0 cm, denoted as height 603. The walls of the chamber body can have a thickness of between 0.1 and 0.3 cm, depicted as 604 in FIG. 6a. As noted, the chamber body can have a height of between 6.0 and 11.4 cm, denoted as 606 in FIG. 6a. As shown in FIG. 6a, the fluid inlet can have a diameter of between 0.2 and 0.6 cm near the fluid inlet port, denoted as 607. Outside of the chamber body, the fluid inlet can have the same or slightly larger diameter, denoted as 608, of between 0.3 and 0.7 cm. The chamber body at the fluid inlet, denoted as 609 can have a diameter of between 0.4 and 0.9 cm, and can extend outwardly to a distance of between 0.5 and 1.0 cm, denoted as distance 610.

Figure 6B:
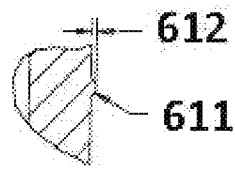

As noted as feature A in FIG. 6a, the chamber wall can have a feature at a height of between 3 and 8 cm, denoted as 605. FIG. 6b shows a detailed view of the area marked A in FIG. 6a. The feature 611 can be a protuberance in the chamber wall, extending to a distance of between 0.01 and 0.02 cm.

Figure 6C:
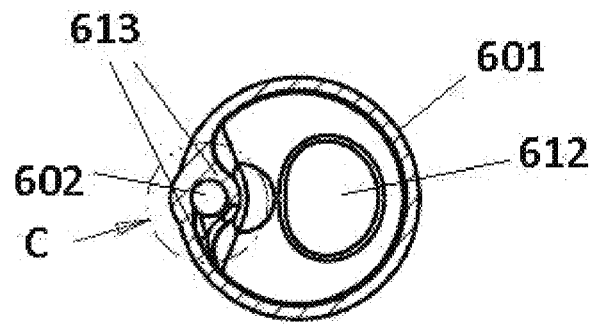
Figure 6D:
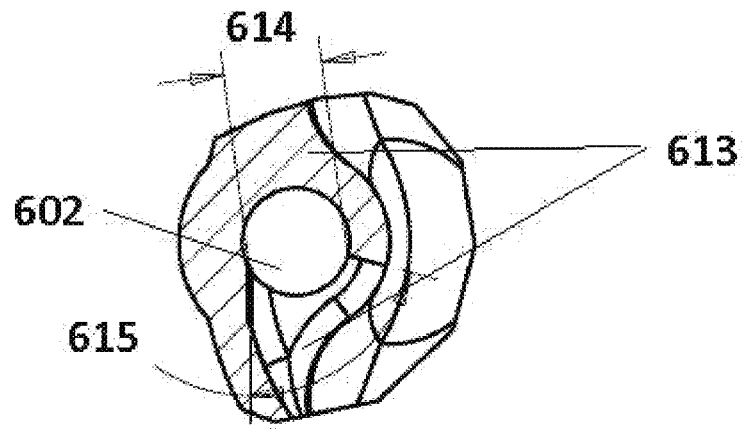

FIG. 6c is a cross sectional view of the arterial air blood capture chamber along the axis of B-B as denoted in FIG. 6a. As noted, the arterial air blood capture chamber can comprise a chamber body 601, a fluid inlet 602 and a bottom inner surface 612. In any embodiment of the first, second, third, or fourth aspects of the invention, the fluid inlet 602 can also comprise a spiral flow-inducing shelf 613. The shelf 613 is a feature that can act to smooth a vortex that is formed between the intersection of the outside wall of the fluid inlet port and the inside diameter of the main chamber body 601. The shelf 613 can transition from an edge of the shelf into a curved surface that serves as the inner chamber wall parallel to the fluid inlet tube 602. The curved surface can extend down to the bottom portion of the chamber body along the inner surface of the chamber. As noted herein, without the shelf, areas of stagnant flow may exist near the fluid inlet port. The spiral flow-inducing shelf 613 helps to eliminate the stagnant flow areas. A detailed view of the fluid inlet port, denoted in circle C of FIG. 6c is provided in FIG. 6d. As shown in FIG. 6c, the aperture width of fluid inlet port can be between 0.2 and 0.6 cm, shown as distance 614. The fluid inlet port angle 615 can be an opening of between 65° and 85°.

Figure 7:
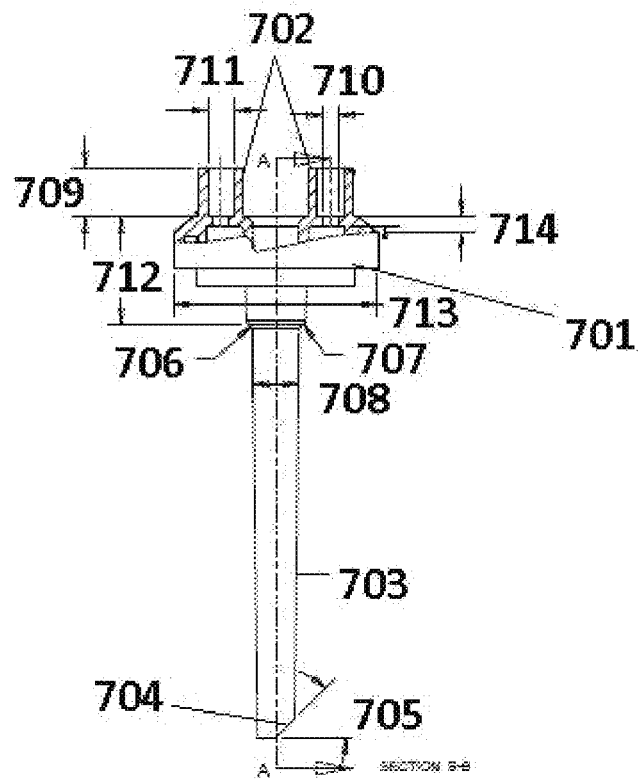
FIG. 7 shows a detailed schematic of the cap of the arterial air capture chamber.

FIG. 7 is a schematic of the cap and draw tube of the arterial air capture chambers. As shown in FIG. 7, the cap 701 can comprise ports 702. The ports 702 can extend to a height 709 of between 0.5 and 1.0 cm above the cap 701. The ports 702 can have an inner diameter 710 of between 0.2 and 0.3 cm, and an outer diameter 711 of between 0.35 and 0.5 cm. The cap 701 can extend over the chamber body (not shown) to a distance 712 of between 1.5 and 2.0 cm. The walls of the chamber body can have a thickness 714 of between 0.1 and 0.2 cm. The outer diameter of the cap at its base 713 can be between 2.7 and 3.5 cm. In any embodiment of the first, second, third, or fourth aspects of the invention, the cap can converge through rings 706 and 707 on draw tube 703. The draw tube 703 can have a diameter 708 of between 0.5 and 0.8 cm. As noted, in any embodiment of the first, second, third, or fourth aspects of the invention, the draw tube 703 can comprise a beveled opening 704. In any embodiment of the first, second, third, or fourth aspects of the invention, the beveled opening can have an angle 705 of between 35° and 55°.

One of skill in the art will understand that the specific dimensions depicted in FIGS. 4-7 can be altered within the scope of the invention. Additionally, certain components or arrangements of components can be changed or omitted without going beyond the scope of the invention.

Figure 8:
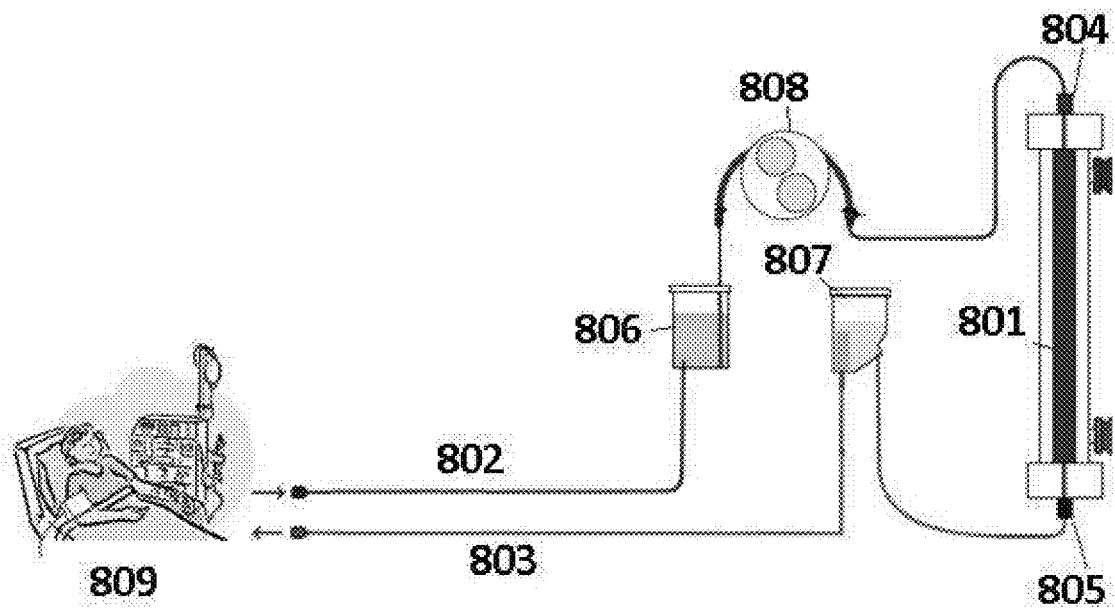
FIG. 8 is a diagram of an extracorporeal flow path.

In any embodiment of the first, second, third, or fourth aspects of the invention, as shown in FIG. 8, the arterial air capture chambers can be used in an extracorporeal flow path for hemodialysis. The extracorporeal flow path can comprise a dialyzer 801. Blood from a patient 809 can be pumped through an arterial blood line 802, fluidly connected to dialyzer 801, and enter the dialyzer 801 through blood inlet 804. Blood can exit the dialyzer 801 through blood outlet 805, which is fluidly connected to venous blood line 803, and be pumped back to the patient 809. One of skill in the art will understand that the extracorporeal flow path depicted in FIG. 8 is for illustrative purposes only, and that additional components, sensors, lines and pumps can be included. Blood pump 808 can be used to pump the blood through the extracorporeal circuit. Blood in the arterial blood line 802 can be pumped through arterial air capture chamber 806 as described herein. The arterial air capture chamber 806 can be placed at any location in the arterial line 802, including either upstream or downstream of blood pump 808. The venous blood line 803 can also comprise a venous air capture chamber 807. The blood, upon entering the dialyzer 801 can enter a blood side of the dialyzer 801. The dialyzer 801 can also comprise a dialysate side of the dialyzer 801 separated from the blood side by a semi-permeable membrane. Solutes in the blood can pass through the semi-permeable membrane and enter the dialysate where the solutes can be removed or the dialysate discarded. One of skill in the art will understand that the fluid flow rates in relation to the experiments described herein are equivalent to blood flow rates through the extracorporeal flow path. In use, a user can control the blood pump 808 to achieve a combination of blood flow rate and filling level as described to allow the arterial air capture chamber 806 to capture air while avoiding stagnant flow or overly high shear stress.

In addition to the advantageous results with respect to residence time, shear stress, and air capture described herein, the arterial air capture chambers described herein advantageously allow for bidirectional fluid flow through the chamber body. The bidirectional fluid flow functionality allows for a simplified priming process, without the need to flip the dialyzer for priming of the fluid lines. Contrary to conventional arterial air capture chambers having flow in a single direction, the arterial air capture chamber of the present invention provides for directional flow wherein a first flow direction used during a dialysis session can be reversed in a second flow direction during priming steps without allowing air to pass out of the chamber. Dialysis machines having the capability to reserve flow in either direction are contemplated by the invention. Bi-directional flows advantageously avoids the need to invert or "flip" a dialyzer, for example, during a priming step in which the fluid introduced at a bottom of a vertically positioned dialyzer forces air bubbles out of a top of the dialyzer. The arterial air capture chambers described herein can be constructed from any material known in the art, including but not limited to polyvinyl chloride (PVC) or a polycarbonate material (PC).

Figure 55A:
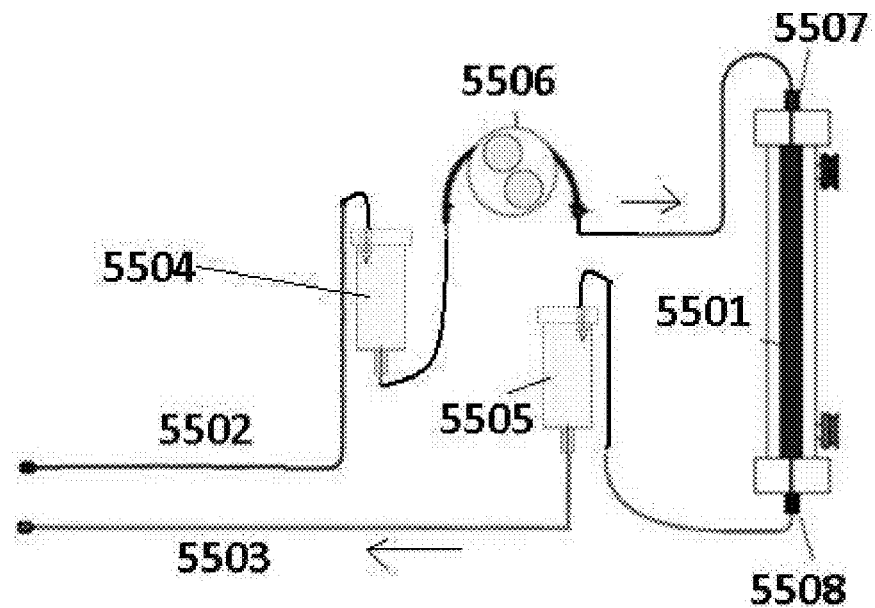
FIGS. 55a-55c show extracorporeal flow paths set up for dialysis and priming using both conventional and bi-directional air capture chambers.

FIG. 55a shows a traditional extracorporeal flow path configured for use in dialysis. Blood from a patient travels to a dialyzer 5501 through arterial blood line 5502, entering at blood inlet 5507, as shown by the arrow on the arterial blood line 5502 in FIG. 55a. Blood from the dialyzer 5501 exits through blood outlet 5508, and travels back to the patient through venous blood line 5503, as shown by the arrow on the venous blood line 5503. An arterial air capture chamber 5504 is placed in the arterial blood line 5502 in order to remove air from the blood before reaching the dialyzer 5501. The conventional arterial air capture chamber 5504 only provide for unidirectional flow. A venous air capture chamber 5505 is placed in the venous blood line 5502 in order to remove air from the blood before being returned to the patient. Similarly, the venous air capture chamber 5505 can only provide unidirectional flow from the top to the bottom of the chamber. Blood pump 5506 provides the driving force to move blood through the extracorporeal flow path.

Figure 55B:
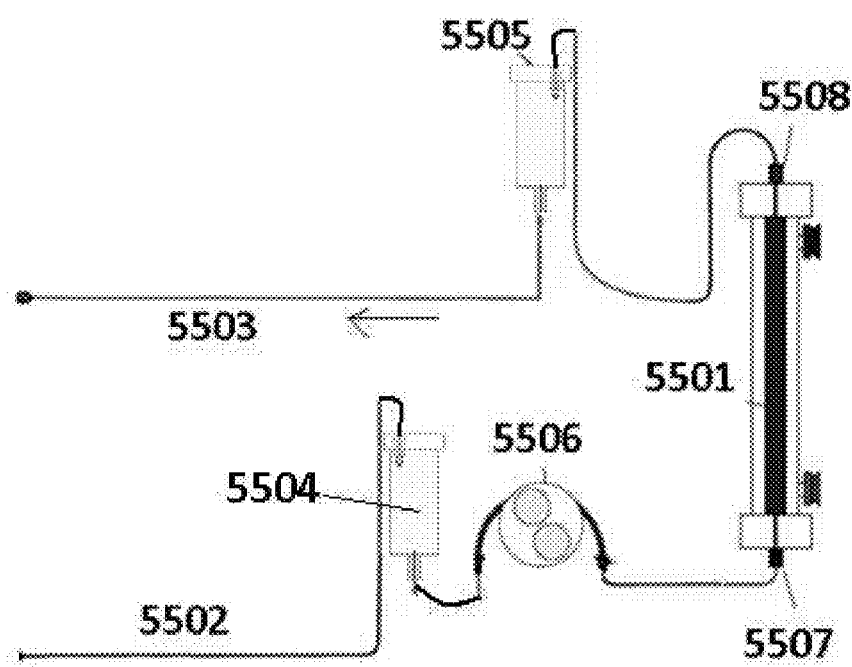

FIG. 55b shows an extracorporeal flow path set up for priming of the system. Due to gravity, in order to prime the dialyzer 5501 and extracorporeal flow path, saline must be pumped through the dialyzer 5501 from the bottom of the dialyzer 5501 to the top of the dialyzer 5501 in order to push air out of the dialyzer 5501 from the top. Because conventional arterial air capture chambers do not allow for bidirectional fluid flow, the direction of fluid flow through the extracorporeal flow path cannot be simply reversed. Instead, the entire dialyzer and extracorporeal flow path must be flipped in order to allow fluid and air to move from the top of the dialyzer 5801, through the blood outlet 5808 and into the venous line 5503 through the venous air capture chamber 5505, which after being flipped is connected to the top of the dialyzer 5501, as shown by the arrow on venous line 5503 in FIG. 55b.

Figure 55C:
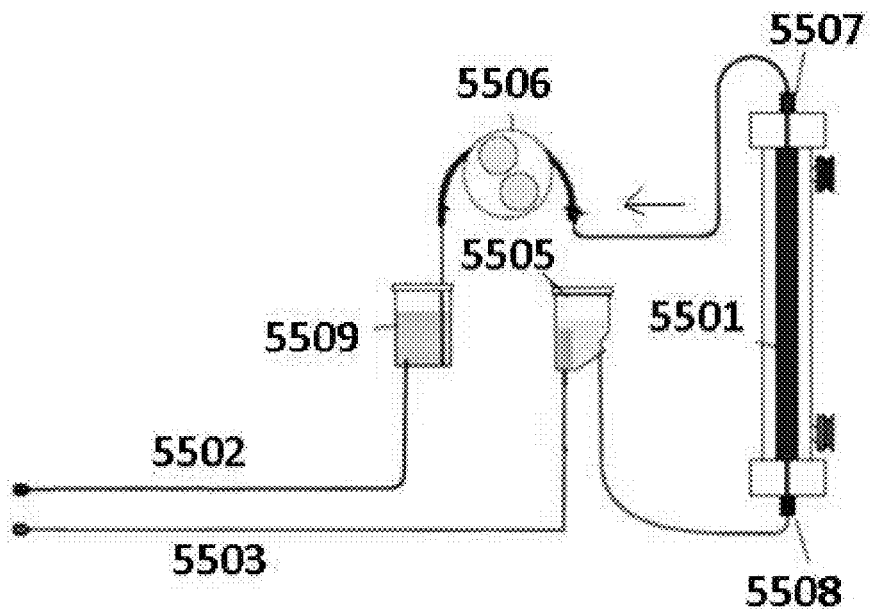

FIG. 55c shows an extracorporeal flow path using the bidirectional arterial air capture chamber of the present invention. Advantageously, the system can be primed without the need to flip the dialyzer 5501 because the arterial air capture chamber 5509 of the present invention allows for bidirectional flow. Because fluid can flow in through the fluid outlet of the arterial air capture chamber 5509, and can flow out of the fluid inlet of arterial air capture chamber 5509, fluid and air can be removed from the top of the dialyzer 5501 through the arterial blood line 5502 and arterial air capture chamber 5509, by changing the direction of blood pump 5506, as shown by the arrow on arterial blood line 5502 in FIG. 55c. In any embodiment of the first, second, or third aspects of the invention, the venous air capture chamber 5505 can also provide for bi-directional flow, thus further simplifying the priming process.

Figure 56:
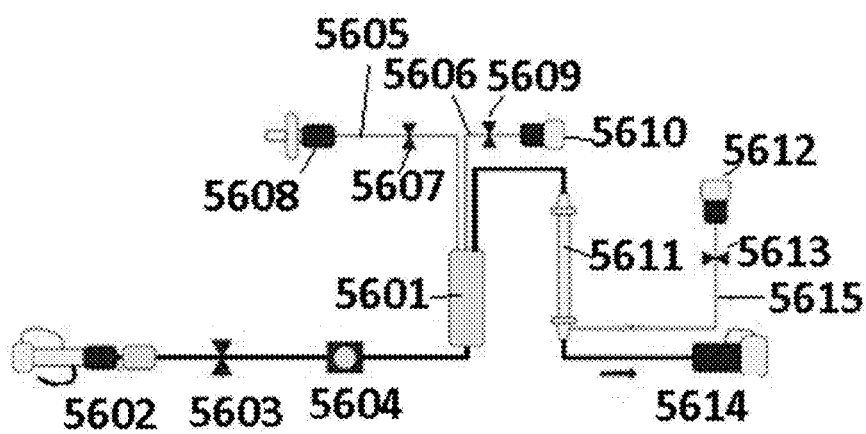
FIG. 56 shows a detailed view of an arterial blood line.

FIG. 56 is a detailed view of a non-limiting arterial blood line set up that can be used with the arterial air capture chambers described herein. The arterial blood line can comprise an arterial air capture chamber 5601 as described herein. The arterial blood line can be connected to a patient through luer connector 5602, and can be connected to a dialyzer through dialyzer connector 5614. In any embodiment of the first, second, or third aspects of the invention, the luer connector 5602 can optionally include a recirculation connector, which allows recirculation of fluid through the entire extracorporeal flow path. Line clamp 5603 can be used to restrict or stop blood flow if necessary through the arterial blood line. A sample port 5604 can be included in the arterial blood line for blood sampling. As described, the arterial air capture chamber 5601 can comprise a cap with line 5605 and line 5606 for measuring pressure and for adding or removing air or liquid. Each of the lines 5605 and 5606 can terminate in luer connectors 5608 and 5610, respectively. Line clamp 5607 in line 5605 and line clamp 5609 in line 5606 can be used to control the movement of air or liquid through the lines. Pump segment 5611 is the portion of the blood pump through which blood travels during operation and provides the driving force to move blood through the arterial blood line. In any embodiment of the first, second, or third aspects of the invention, heparin line 5615 can be used to add heparin or other anticoagulants to the blood in the arterial blood line to prevent clotting. Heparin can be added through the heparin line 5615 through luer connector 5612. Line clamp 5613 can be used to control the movement of heparin or other materials through heparin line 5615.

Figure 9A:
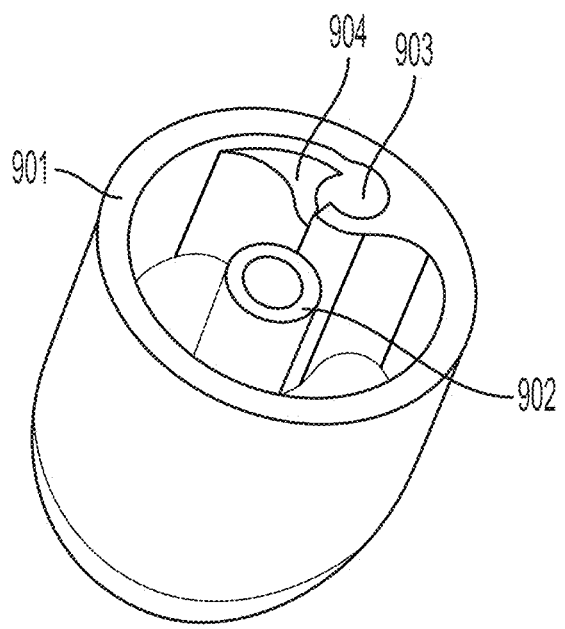
FIGS. 9a-9b show detailed geometries for the inlet ports and draw tubes
Figure 9B:
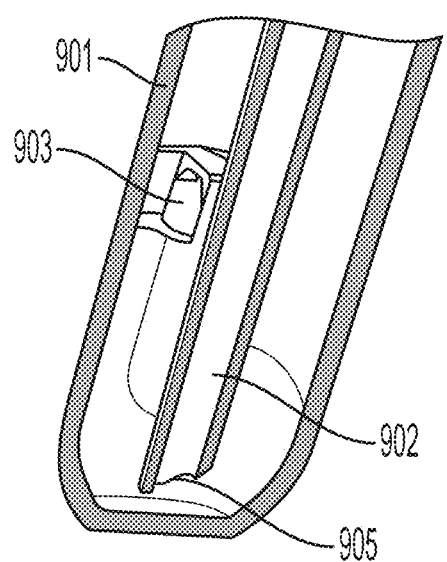

The arterial air capture chamber illustrated in FIGS. 5-8 is also illustrated in FIGS. 9a and 9b. FIG. 9a shows a detailed view of the fluid inlet design. The arterial air capture chamber comprises a chamber body 901, a downwardly extending draw tube 902 and an upwardly extending fluid inlet with a fluid inlet port 903, the fluid inlet port positioned at a 90° turn relative to a fluid flow of the tube and disposed tangential to a circle plane formed by the central axis of the chamber. The arterial air capture chamber also comprises a spiral flow-inducing shelf 904. FIG. 9b shows a detailed view of the draw tube for fluid outlet. The draw tube 902 comprises a beveled opening 905. The beveled opening 905 is opposedly positioned at about 180° relative to the fluid inlet port 903.

Figure 10:
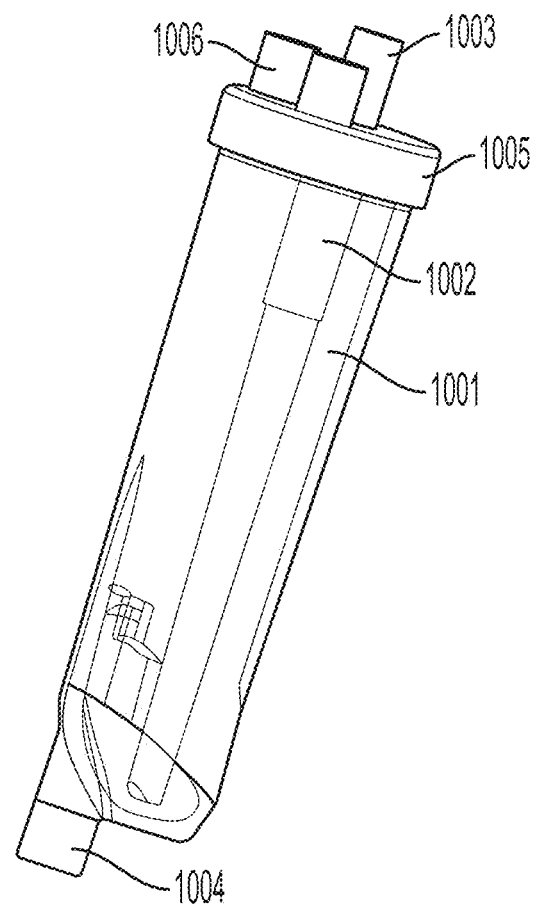
FIG. 10 shows a picture of an arterial air capture chamber.

FIG. 10 is an arterial air capture chamber. The arterial air capture chamber comprises a chamber body 1001, an upwardly extending fluid inlet 1004, and a downwardly extending fluid outlet 1003, forming a draw tube 1002. In any embodiment of the first, second, third, or fourth aspects of the invention, the arterial air capture chamber can comprise a cap 1005, including blood outlet port 1006.

In order to determine the effects of each of the disclosed features of the arterial air capture chamber on the flow of fluid through the arterial air capture chamber, computational flow dynamic (CFD) analysis was conducted on several configurations of an arterial air capture chamber as outlined herein. The CFD analysis simulated several configurations of the arterial air capture chambers in order to optimize for geometry and filling levels. In order to carry out the CFD analysis, computer aided design models of the arterial air capture chambers were created, similar to the model shown in FIG. 9. The CFD analysis was conducted with the assumption of Multi-phases (air and blood) and viscous laminar flow. The blood analogue used had a density 1044 kg/m$^3$ and viscosity 0.00271 PaS. Flow domain was based on the chamber inner surfaces, and inlet and outlet ports were created through ANSYS Fluent. The initial and boundary conditions used were steady, and chamber filling was not considered. The inlet velocity was calculated based on flow rate and inlet tubing section area (ID 4.5 mm and area 15.89 mm$^2$) and specified for the inlet port. The inlet velocities used in the experiments described herein were 0.104 m/s (100 ml/min), 0.288 m/s (275 ml/min), and 0.52 m/s (500 ml/min). The chamber volume was specified as the filling level of fluid by using ANSYS's region adaption/patch tools. The original figures for the CFD analysis were in color. In order to better distinguish the diagrams, certain portions are shown with lead lines indicating the colors and relative velocities from the original figures.

Experiment 1

In any embodiment of the first, second, third, or fourth aspects of the invention, the chamber body can have a curved surface on the bottom potion as opposed to a flat bottom. As explained, an advantage of the arterial air blood chamber of the present invention is elimination of stagnant flow areas within the chamber body of the arterial air capture chamber. The CFD analysis described was carried out on arterial air capture chambers having a curved surface on the bottom portion and flat bottom portion in order to determine the effect of flow on the geometry of the bottom portion of the chamber body.

Figure 11A:
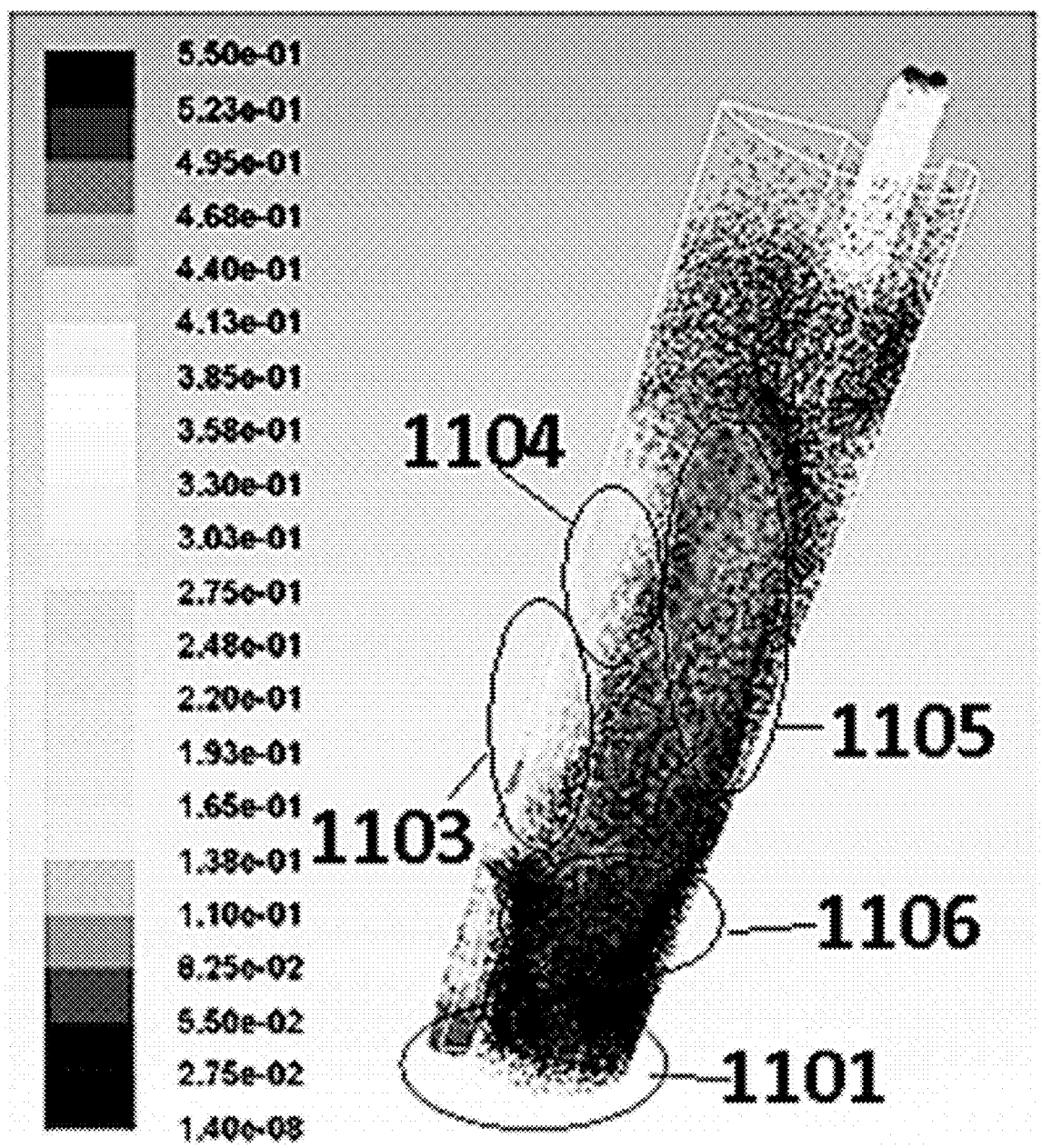
FIGS. 11a-11b show velocity distribution vector diagrams for air capture chambers with differing bottom shapes.
Figure 11B:
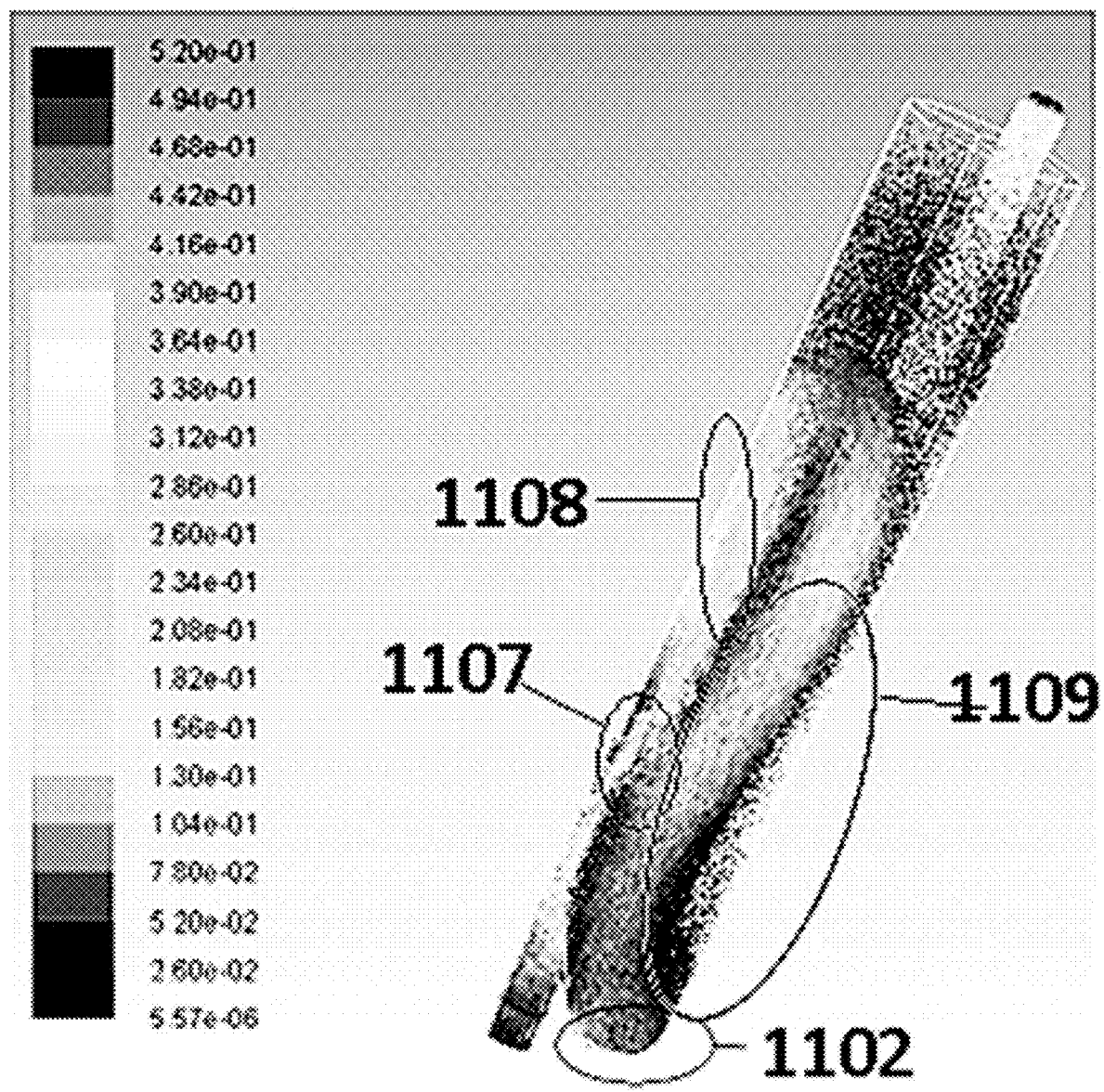

FIGS. 11a and 11b illustrate the effect of a curved surface bottom design to the chamber body. FIGS. 11a and 11b show velocity distribution of flow through the arterial air capture chamber. FIG. 11a shows the velocity distribution for a chamber having a flat bottom design, while FIG. 11b shows the velocity distribution for a chamber having a curved surface on the bottom portion of the chamber body. The legend for FIGS. 11a and 11b transitions from a high velocity flow in red, to orange, to yellow, to green, to light blue, and then to blue. The same color transition applies for each flow diagram of the present invention. For example, the legend for FIG. 11a transitions from a high velocity flow in red at 5.50e−01 m/s, orange at 4.54e−01 m/s, yellow at 3.68e−01, green at 2.65e−01 m/s to light blue at 1.52e−01 m/s to a low velocity flow shown in blue at 1.40e−08. The legend for FIG. 11b transitions from a high velocity flow in red at 5.20e−01, orange at 4.03e−01 m/s, yellow at 3.51e−01 m/s, green at 2.34e−01 m/s, to light blue at 1.30e−01 m/s to a low velocity flow shown in blue at 5.57e−08 m/s.

Fluid enters the arterial air capture chamber at a high velocity through yellow portion 1103. The fluid slows down in green portion 1104 and further in light blue portion 1105. Dark blue portion 1106 indicates a low velocity area at the bottom of the chamber body in circle 1101. The area is a non-uniform velocity distribution where a stagnant flow may exist. In contrast, as shown in FIG. 11b, fluid enters at a high velocity through yellow portion 1106, and then slows down in green portion 1107 and light blue portion 1108. Because light blue portion 1108 extends to the bottom of the arterial air capture chamber, there is no discernible low velocity area at the curved surface bottom potion of the chamber body in circle 1102.

The configurations shown in FIGS. 11a and 11b, comprise a flat fluid inlet port. As shown in FIGS. 11a and 11b, the flat fluid inlet port results in fluid that flows straightly upward out of the fluid inlet port, forms a strong flow jet, and causes the fluid-air interface unstable and a possible turbulence flow in the interface. The height which the flow jet can reach is dependent on the flow rate, which makes maintaining a stable fluid-air interface without turbulence flow near the fluid-air interface difficult.

Experiment 2

Figure 12A:
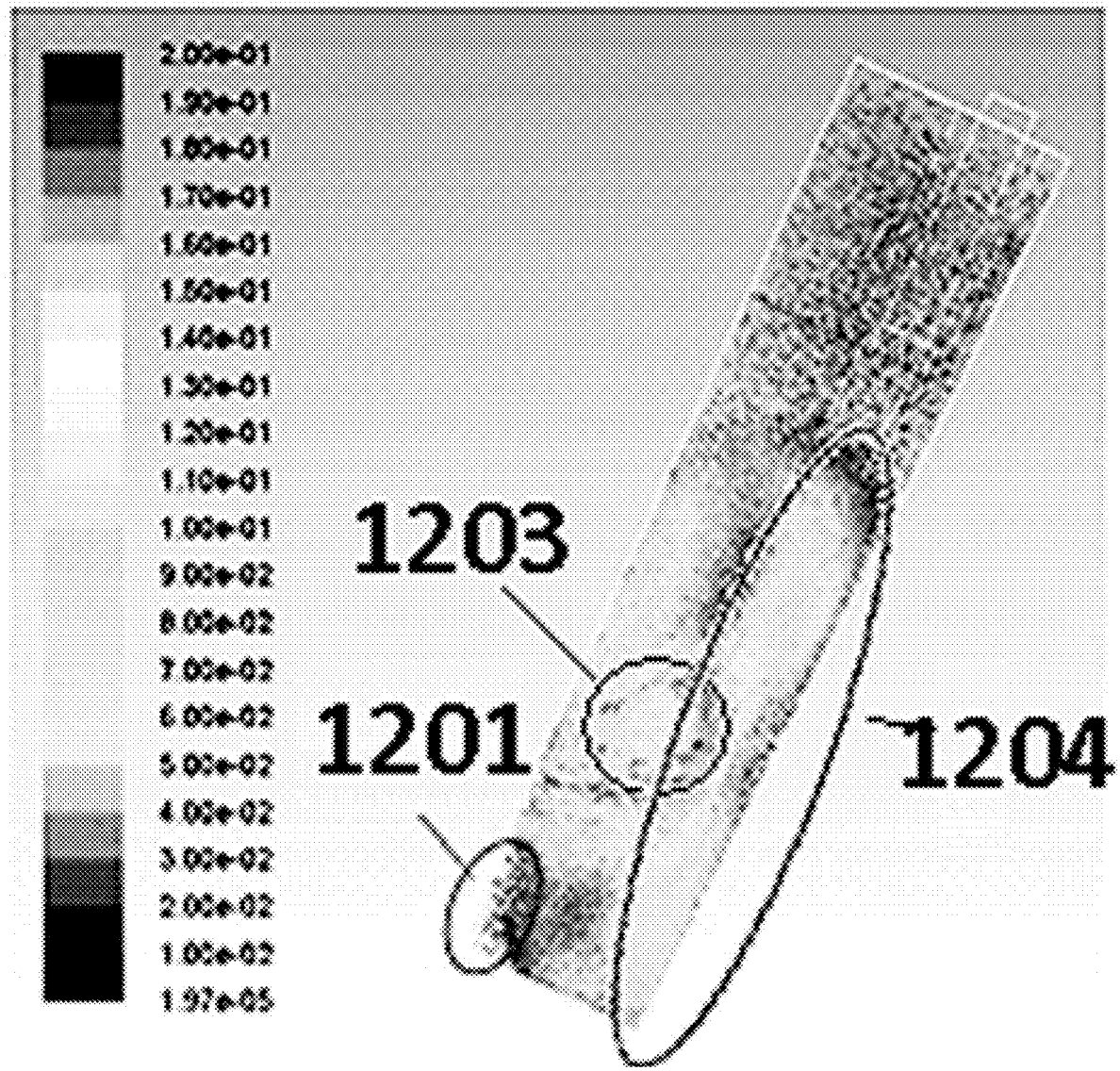
FIGS. 12a-12b show velocity distribution vector diagrams for air capture chambers having a split inlet port.
Figure 12B:
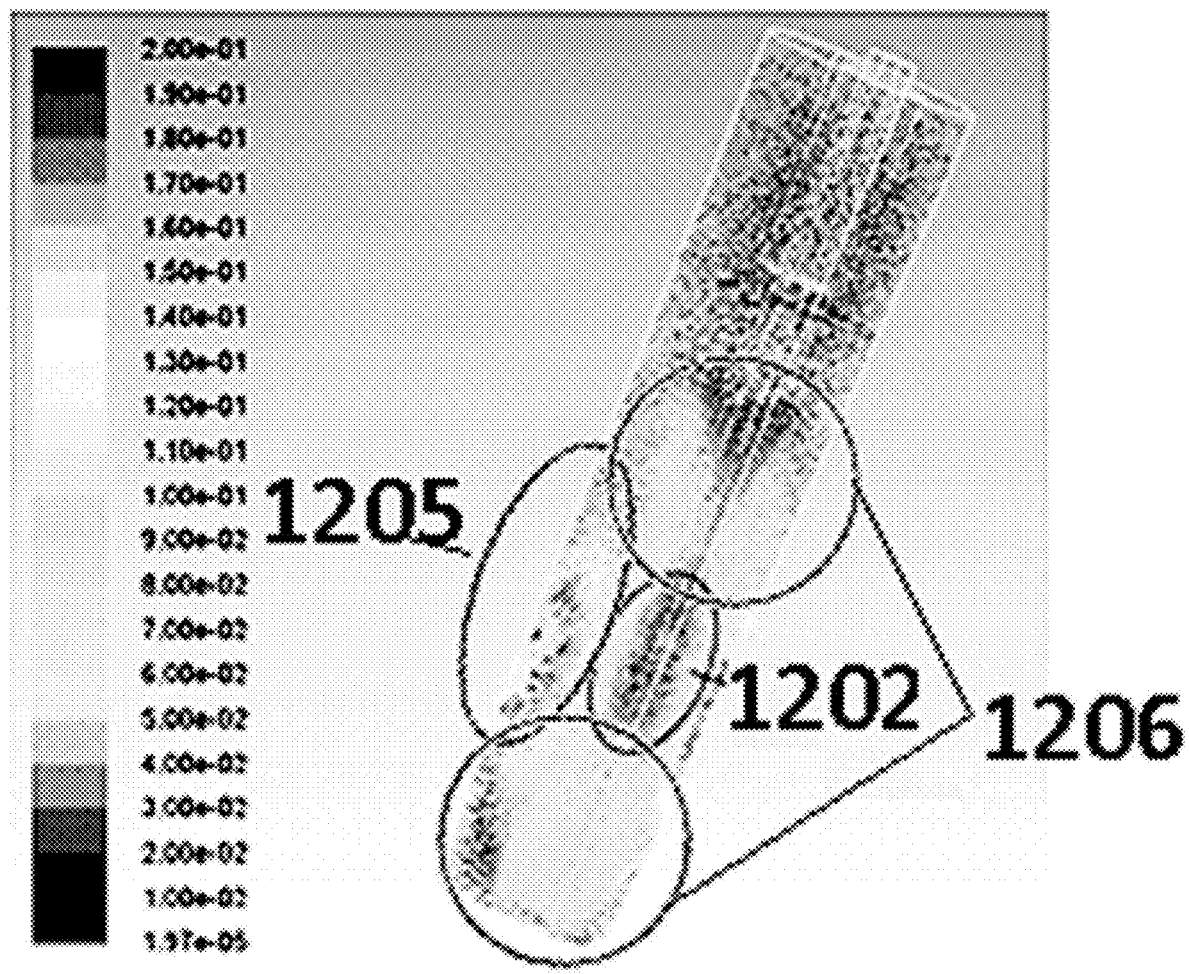

FIGS. 12a and 12b illustrate similar flow velocity distributions as illustrated in FIGS. 11a and 11b for an embodiment of the air capture chamber having a split fluid inlet port. In the chamber illustrated in FIGS. 12a and 12b, the fluid inlet comprises two fluid inlet ports, with each of the two fluid inlet ports positioned tangentially on the inlet, and opposedly positioned 180° away from each other on the fluid inlet. The arterial air capture chamber in FIGS. 12a and 12b has a fluid outlet forming a flat draw tube. The legend for FIGS. 12a and 12b transitions from a high velocity flow in red at 2.00e−01 m/s, orange at 1.55e−01 m/s, yellow at 1.35e−01, green at 9.00e−02 m/s to light blue at 5.50e−01 m/s to a low velocity flow shown in blue at 1.97e−05 m/s.

As illustrated in FIG. 12a, fluid enters the chamber at a high velocity through red portion 1203, and then slows down in green portion 1204. A low velocity area in the chamber body, shown in blue portion 1201, exists, which may result in stagnant fluid flow. As illustrated with regards to FIGS. 11a and 11b, the low velocity area may be due to the flat bottom design of the chamber illustrated in FIG. 12a. As illustrated in FIG. 12b, the fluid enters in red portion 1205, and then slows down in green portions 1206. A low velocity area also exists in the chamber, as illustrated in FIG. 12b, shown blue portion 1202. The low velocity area is formed where the two flow jets, exiting each fluid inlet port, meet in the center of the chamber body. As shown in FIG. 12a, two flow jets are formed from the two opposedly positioned split fluid inlet ports, with one flow jet flowing upwardly and the other flow jet flowing downwardly. The upwardly flowing flow jet causes an unstable fluid-air interface.

Experiment 3

Figure 13A:
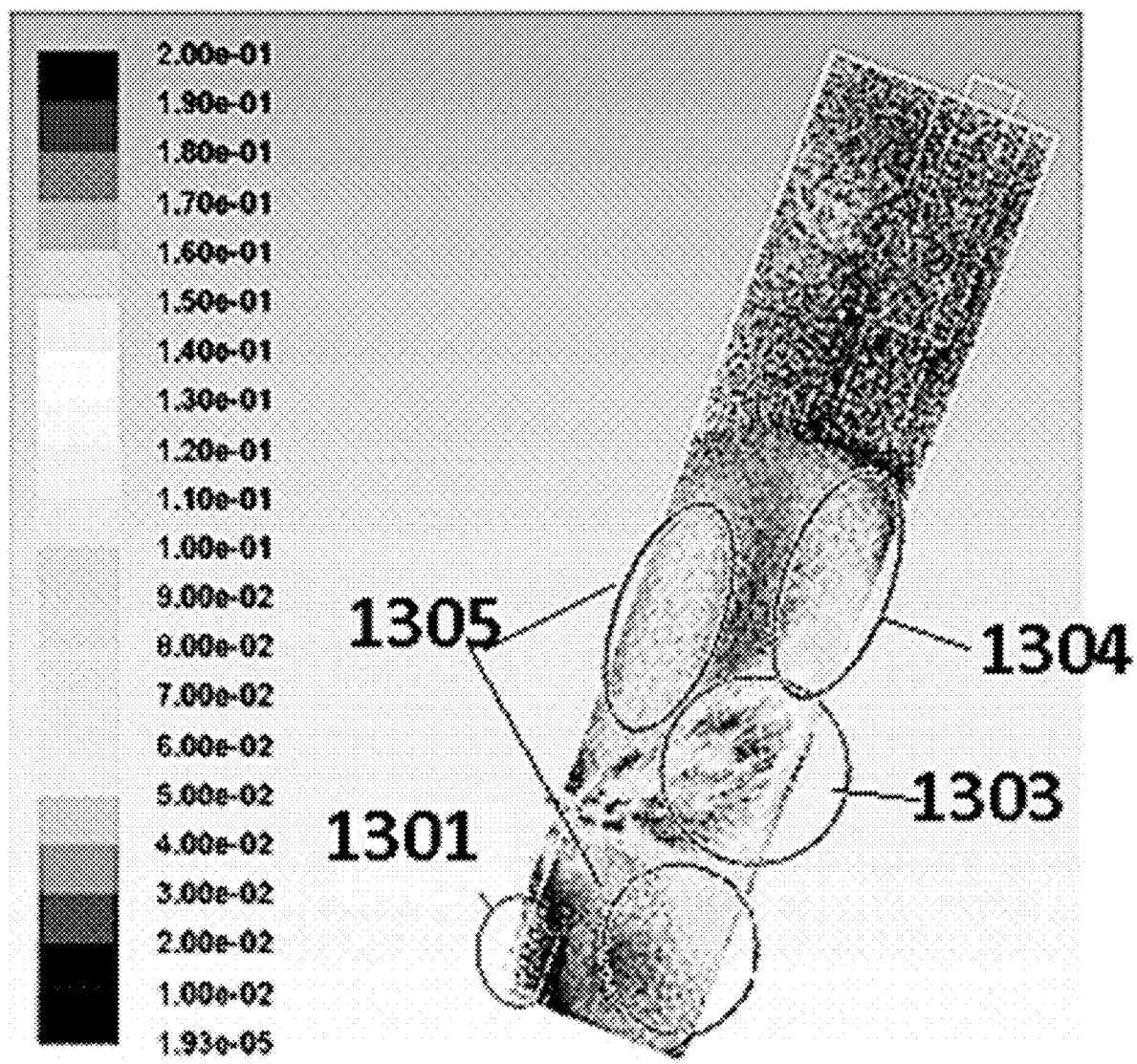
FIGS. 13a-13b show velocity distribution vector diagrams for air capture chambers having a split inlet port with a draw tube comprising a bevel positioned at 180° away from the inlet ports.
Figure 13B:
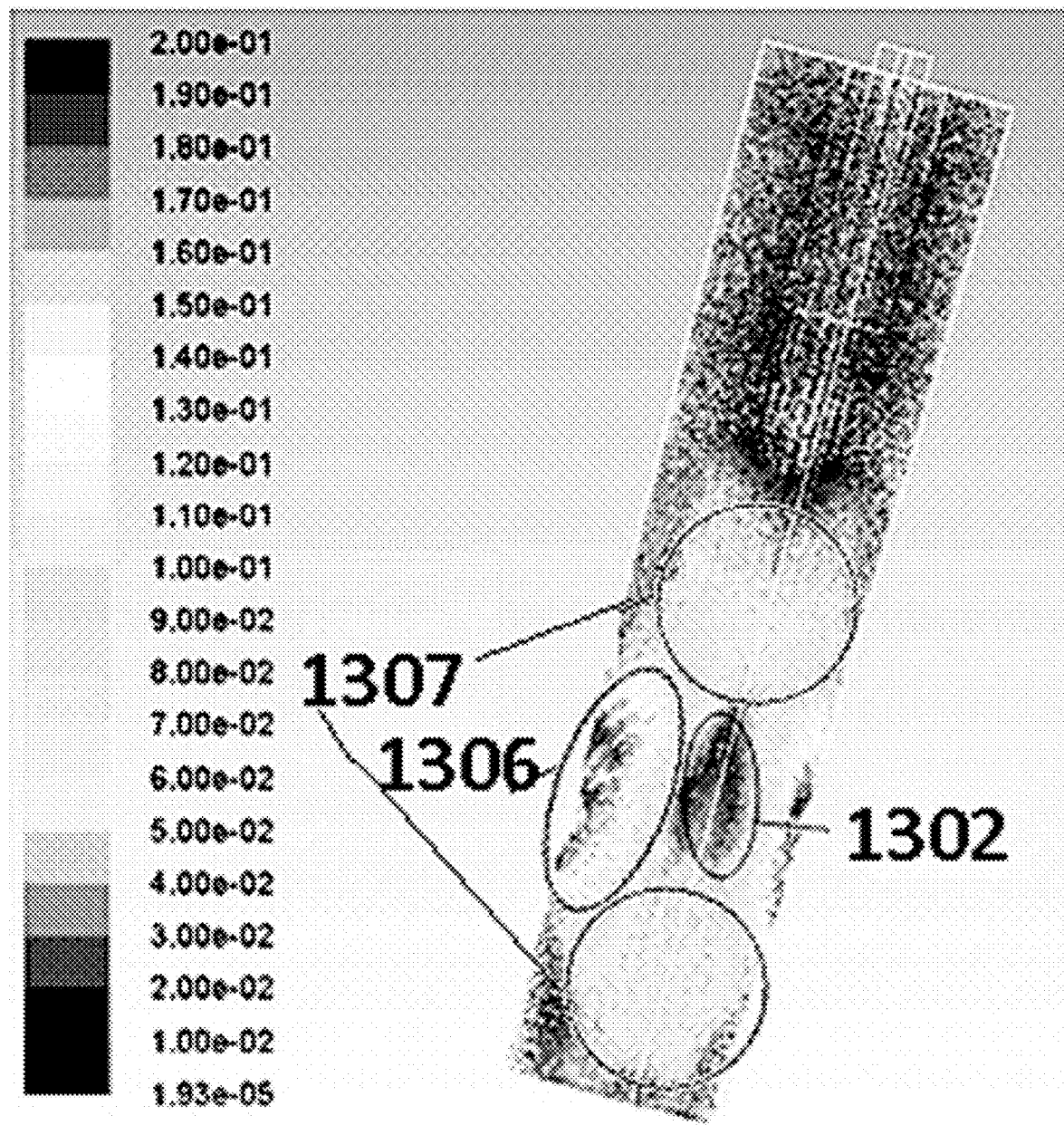

FIGS. 13a and 13b illustrate flow velocity distributions for an embodiment of the air capture chamber having a split fluid inlet port comprising two opposedly positioned fluid inlet ports, as with the chambers illustrated in FIGS. 12a and 12b. The chamber illustrated in FIGS. 13a and 13b also have a downwardly extending fluid outlet forming a draw tube. The legend for FIGS. 13a and 13b transitions from a high velocity flow in red at 2.00e−01 m/s, orange at 1.55e−01 m/s, yellow at 1.35e−01, green at 9.00e−02 m/s to light blue at 5.50e−01 m/s to a low velocity flow shown in blue at 1.92e−05 m/s.

The difference in the chambers shown in FIGS. 12 and 13 is that the chamber in FIGS. 13a and 13b has a beveled opening on the draw tube, with the beveled opening opposedly positioned on the draw tube at 180° away from the fluid inlet ports. As shown in FIG. 13a, fluid enters the chamber in red portion 1303, and then slows down in green portion 1304 and light blue portions 1305. A low velocity area exists near the bottom of the chamber, shown in dark blue portion 1301. As shown in FIG. 13b, fluid enters the chamber in red portion 1306 and slows down in green portions 1307, splitting into two flow jets. A low velocity area exists in the middle of the chamber, where the two flow jets meet, shown dark blue portion 1302. In comparing the chambers shown in FIGS. 12a and 12b with the chambers shown in FIGS. 13a and 13b, no significant difference in flow pattern is created by using an opposedly positioned beveled opening on the draw tube where a 180° tangentially split fluid inlet port is used.

Experiment 4

Figure 14A:
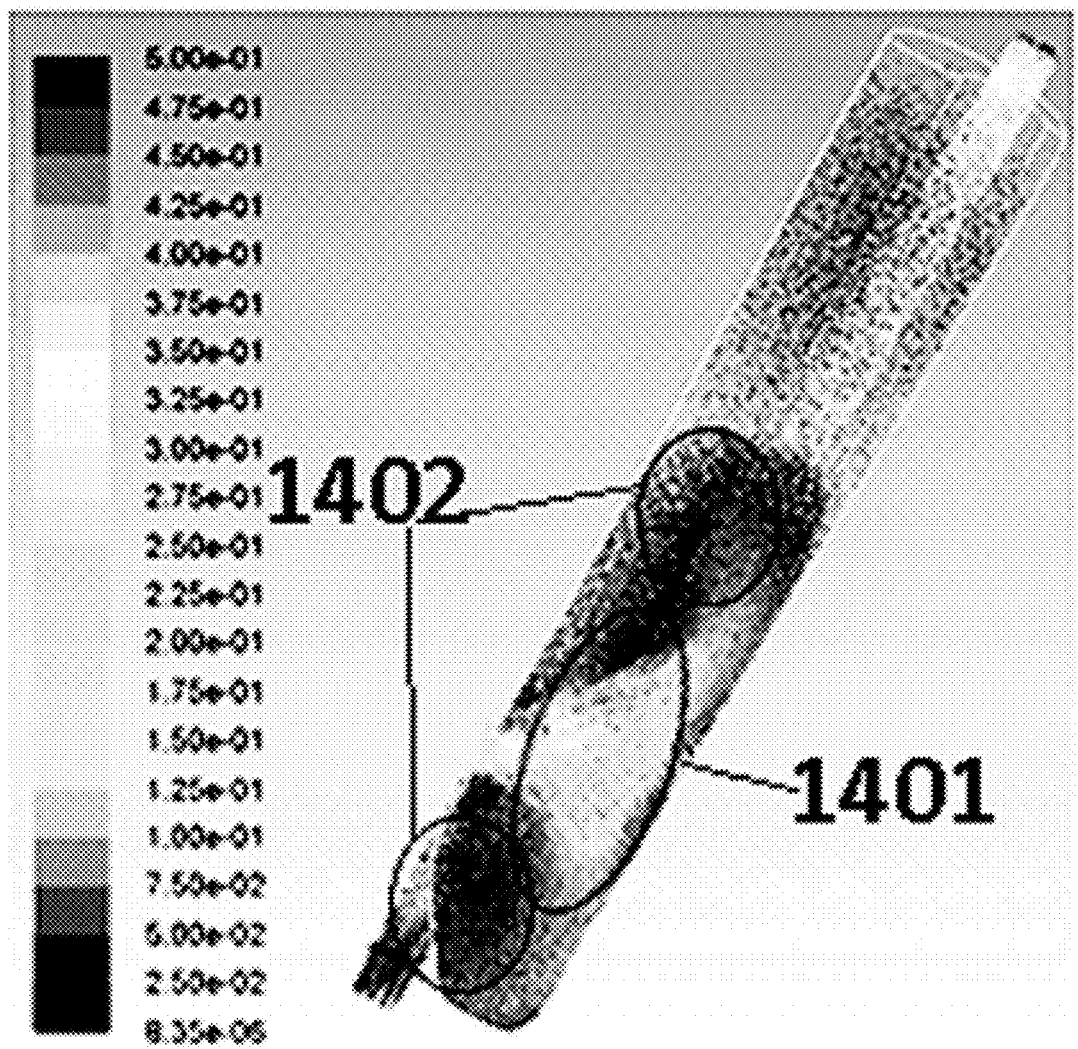
FIGS. 14a-14b show velocity distribution vector diagrams for air capture chambers having a split inlet port with a draw tube comprising a bevel positioned at 180° away from the inlet ports and a curved bottom.
Figure 14B:
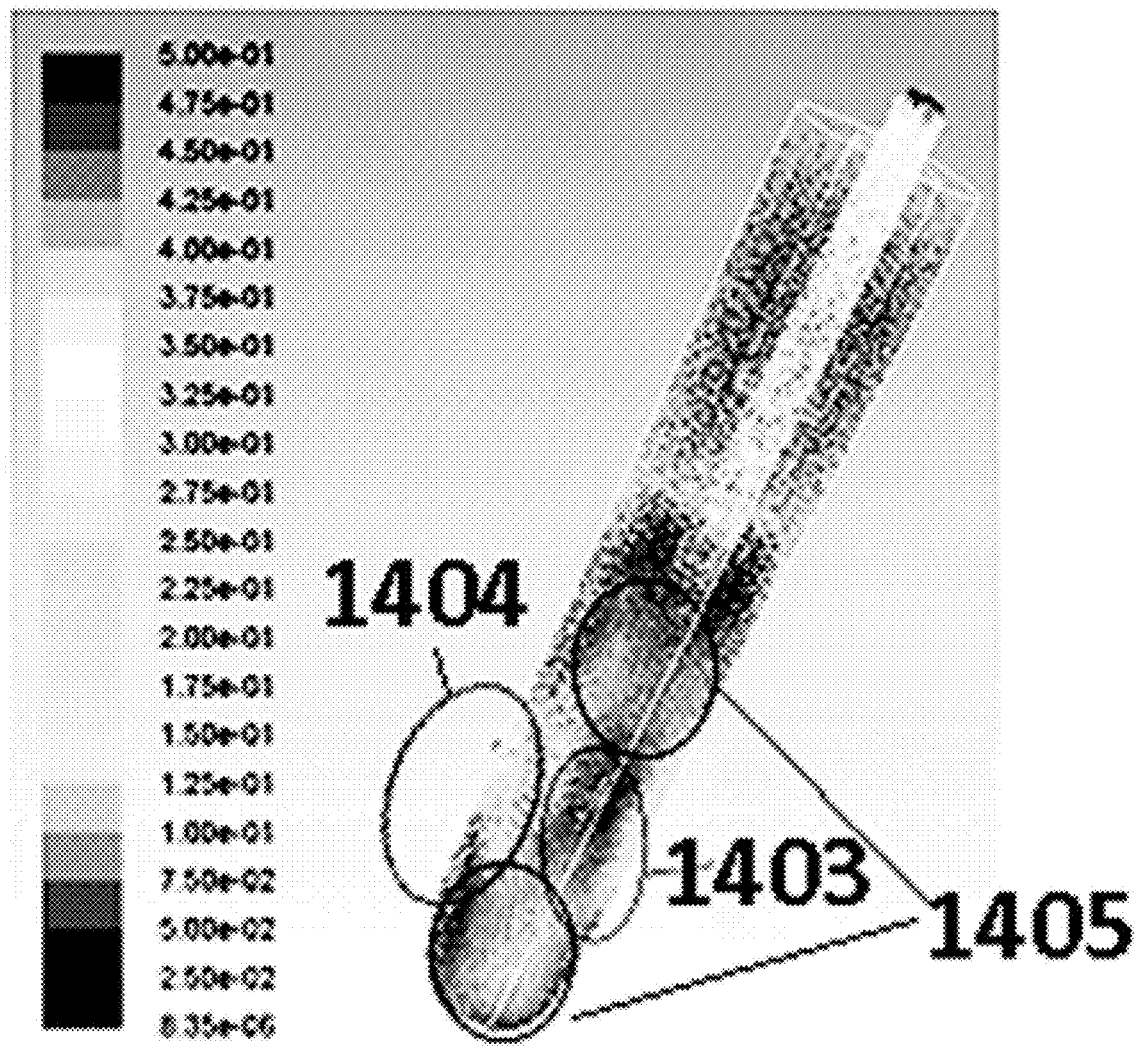

FIGS. 14a and 14b illustrate flow velocity distributions for an embodiment of the arterial air capture chamber having a split fluid inlet port, and a draw tube with a beveled opening opposedly positioned on the draw tube at 180° away from the fluid inlet port. The difference between the chambers illustrated in FIGS. 13a and 13b and the chamber illustrated in FIGS. 14a and 14b is that the chamber illustrated in FIGS. 14a and 14b have a curved surface on the bottom portion of the chamber. The legend for FIGS. 14a and 14b transitions from a high velocity flow in red at 5.00e−01 m/s, orange at 3.83e−01 m/s, yellow at 3.38e−01 m/s, green at 2.38e−01 m/s to light blue at 1.38e−01 m/s to a low velocity flow shown in blue at 8.35e−06.

As shown in FIGS. 14a and 14b, the curved surface of the chamber can result in a more uniform velocity distribution, compared to a flat bottom design. In FIG. 14a, fluid enters the chamber in high velocity green area 1401 and slows down in lower velocity light blue areas 1402. As shown in FIG. 14b, the fluid enters the chamber in high velocity green area 1404, and slows down in lower velocity light blue areas 1405, forming two flow jets. The tangentially split fluid inlet port results in a low velocity area in the center of the chamber where the two flow jets meet low velocity blue area 1403, similar to the low velocity area shown in FIGS. 13a and 13b.

Experiment 5

Figure 15A:
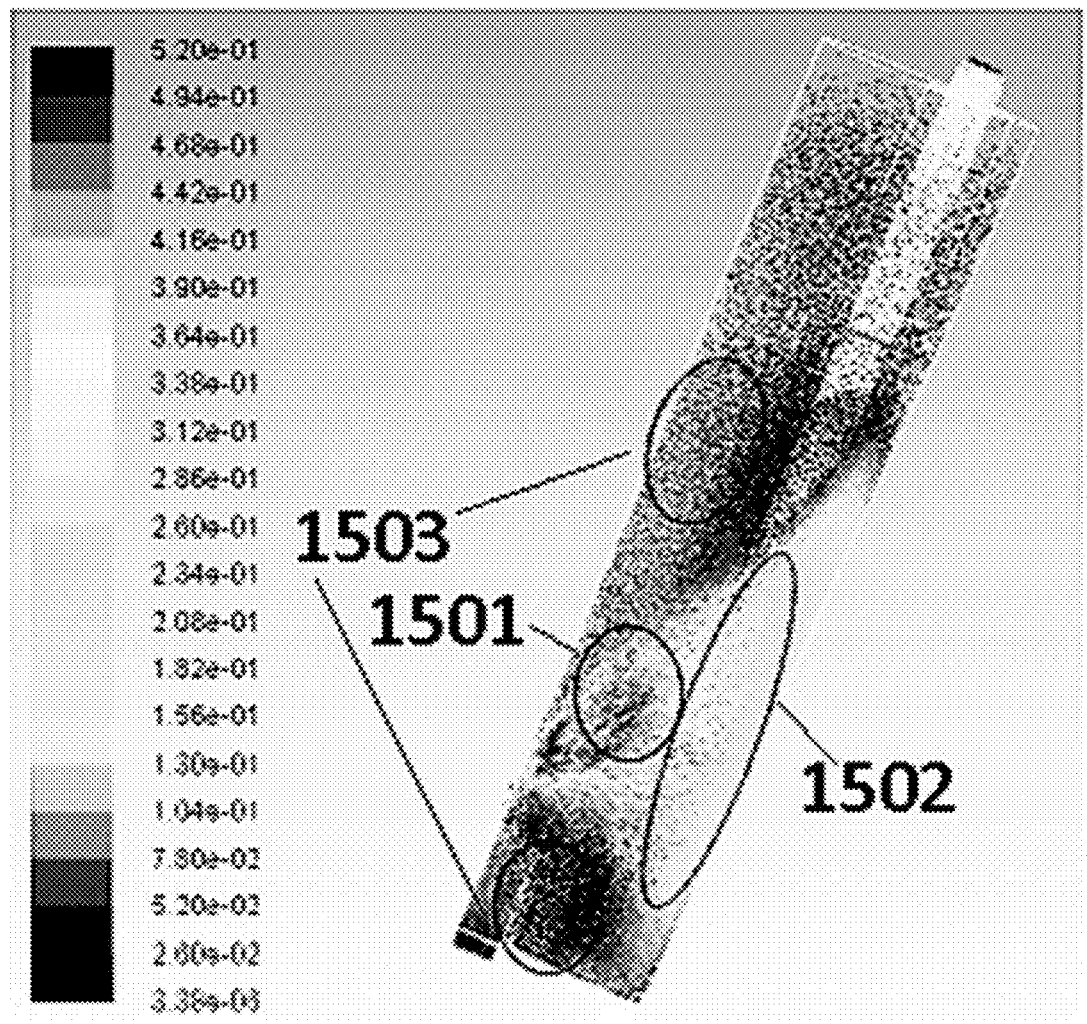
FIGS. 15a-15b show velocity distribution vector diagrams for air capture chambers having a fluid inlet with a single inlet port tangentially disposed on the fluid inlet at an angle of 90° to the draw tube.
Figure 15B:
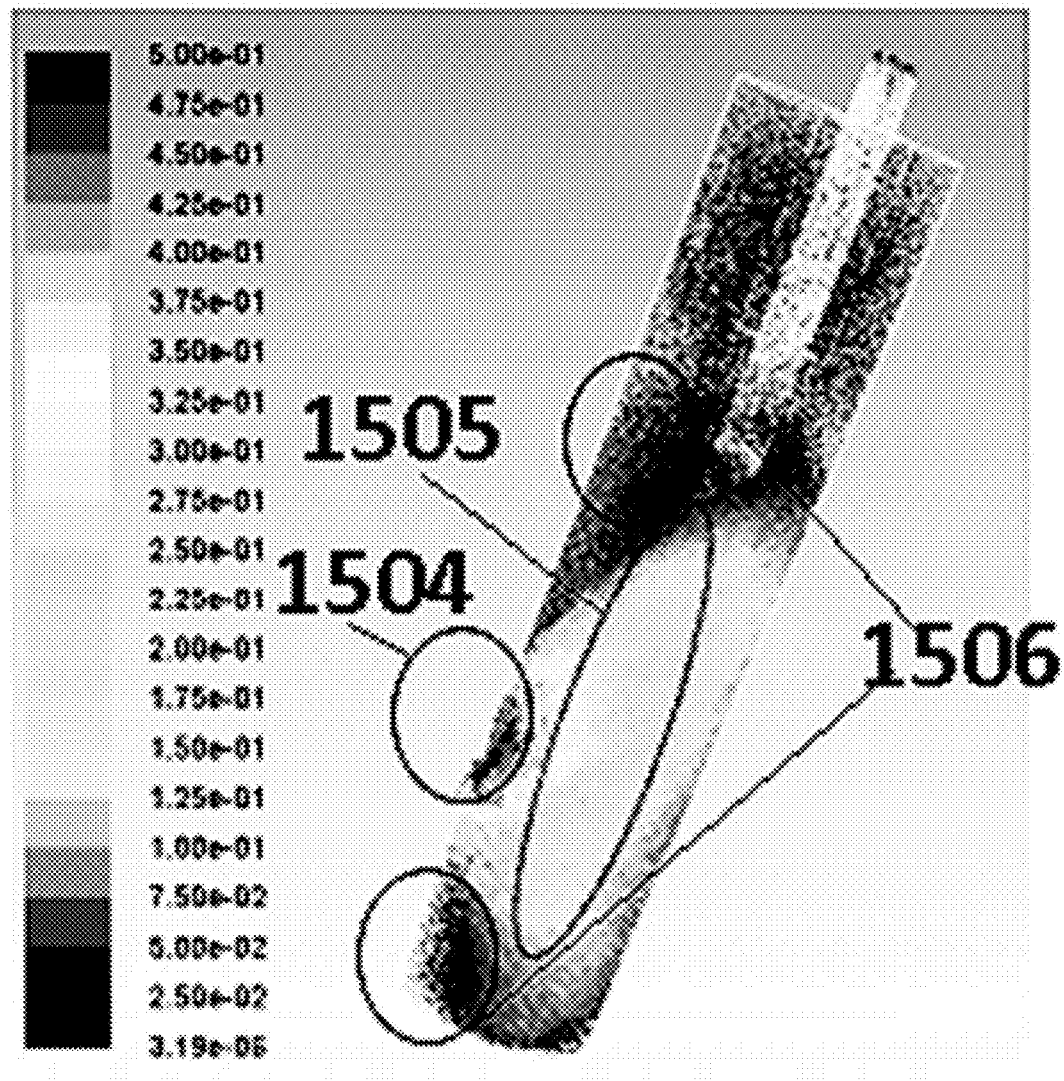

FIGS. 15a and 15b illustrate flow velocity distributions for an embodiment of the air capture chamber having a fluid inlet with a single fluid inlet port disposed on an inner wall of the chamber body, the fluid inlet port positioned at about a 90° turn relative to a fluid flow of the tube and disposed tangential to a circle plane formed by the central axis of the chamber body. The legend for FIG. 15a transitions from a high velocity flow in red at 5.20e−01 m/s, orange at 4.03e−01 m/s, yellow at 3.51e−01 m/s, green at 2.47e−01 m/s to light blue at 1.43e−01 m/s to a low velocity flow shown in blue at 3.38e−06 m/s. The legend for FIG. 15b transitions from a high velocity flow in red at 5.00e−01 m/s, orange at 3.83e−01 m/s, yellow at 3.38e−01 m/s, green at 2.38e−01 m/s, to light blue at 1.38e−01 m/s to a low velocity flow shown in blue at 3.19e−06 m/s.

As shown in FIG. 15a, the fluid inlet port at a 90° turn relative to the fluid flow of the tube results in a fluid flow pattern that enters in red portion 1501, travels tangent to chamber wall and around the draw tube in green area 1502, and then travels downward to outlet port in blue areas 1503, which forms a spiral flow pattern within the chamber body. The same spiral flow patter is illustrated in FIG. 15b, where fluid enters through red portion 1504, travels around the draw tube in green area 1505, and downward to the outlet port in blue areas 1506. The spiral flow of the fluid resulting from the fluid inlet port at 90° turn relative to the fluid flow of the tube provides air bubbles buoyancy to overcome the flow which would otherwise bring the bubbles into drawtube, and allows bubbles to float toward to the blood surface allowing better bubble capture. Further, because the flow is tangential to the chamber wall, there is no flow jet moving towards the fluid-air interface to disturb the fluid-air interface directly, resulting in less mixing of fluid and air.

As is illustrated in Experiments 1-5, a fluid inlet port disposed on an inner wall of the chamber body, the fluid inlet port positioned at a 90° turn relative to a fluid flow of the tube and disposed tangential to a circle plane formed by the central axis of the chamber body provides improved flow characteristics through the arterial air capture chamber. In order to optimize the inner geometry of the chamber body, the effects on flow of the radius of a spiral flow-inducing shelf disposed on the inner wall of the chamber on the circumference of the circle plane formed by the central axis of the chamber body were investigated.

Experiment 6

As illustrated in FIGS. 2a and 2b, the arterial air capture chambers can have a spiral flow-inducing shelf with a small radius on the outside of the fluid inlet port, shown in circle 205 and an opposing shelf with a small radius shown in circle 206 of FIG. 2a, or a spiral flow-inducing shelf with a large radius, shown in circle 211, and an opposing shelf with a large radius shown in circle 212 of FIG. 2b.

Figure 16A:
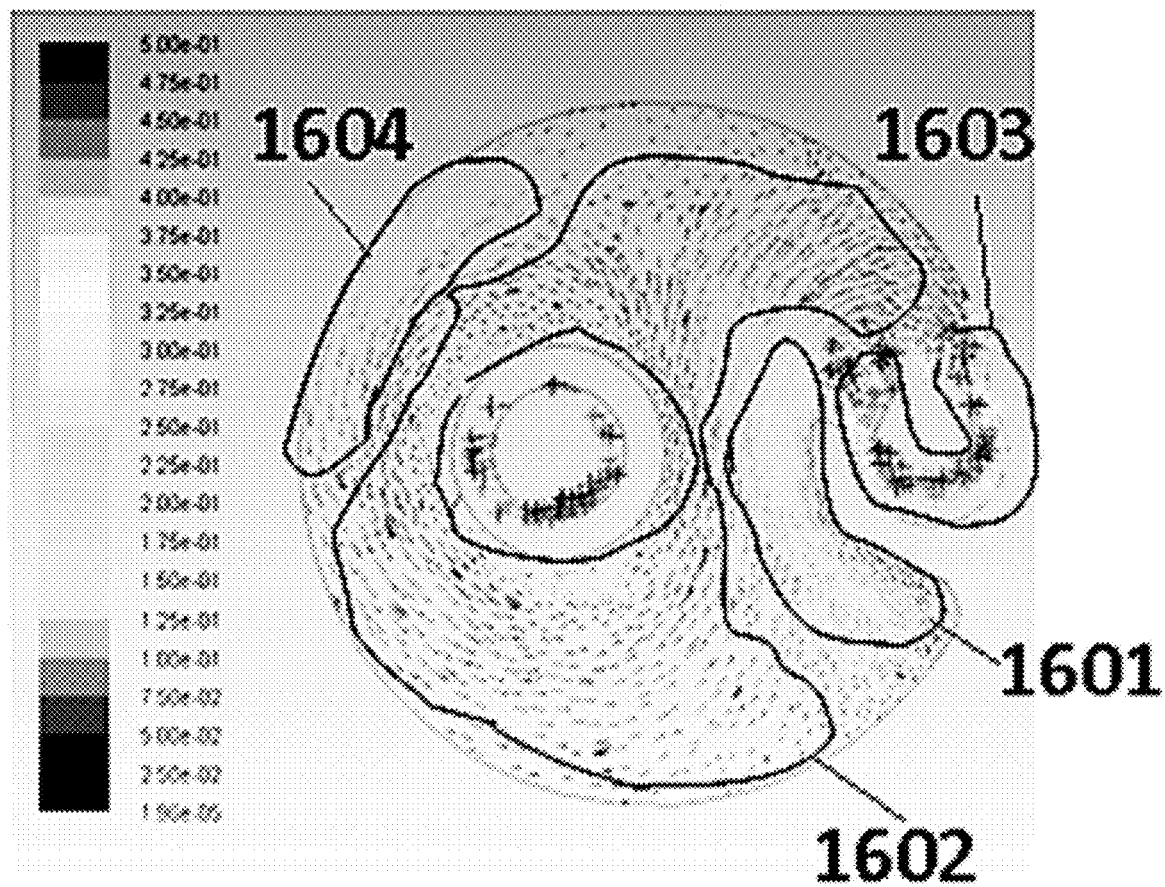
FIGS. 16a-16b show velocity distribution vector diagrams for air capture chambers having a small radius inlet port.
Figure 16B:
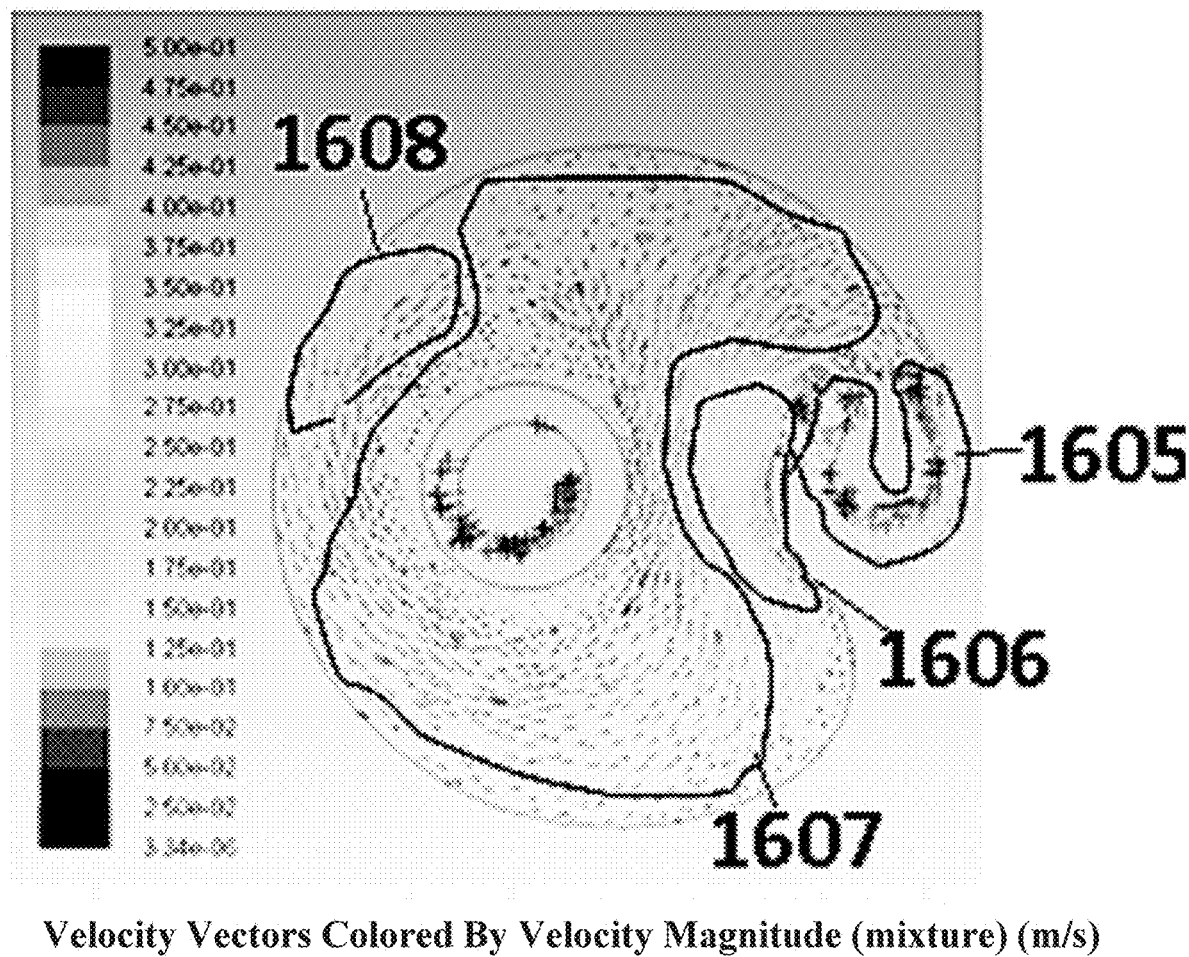
Figure 17A:
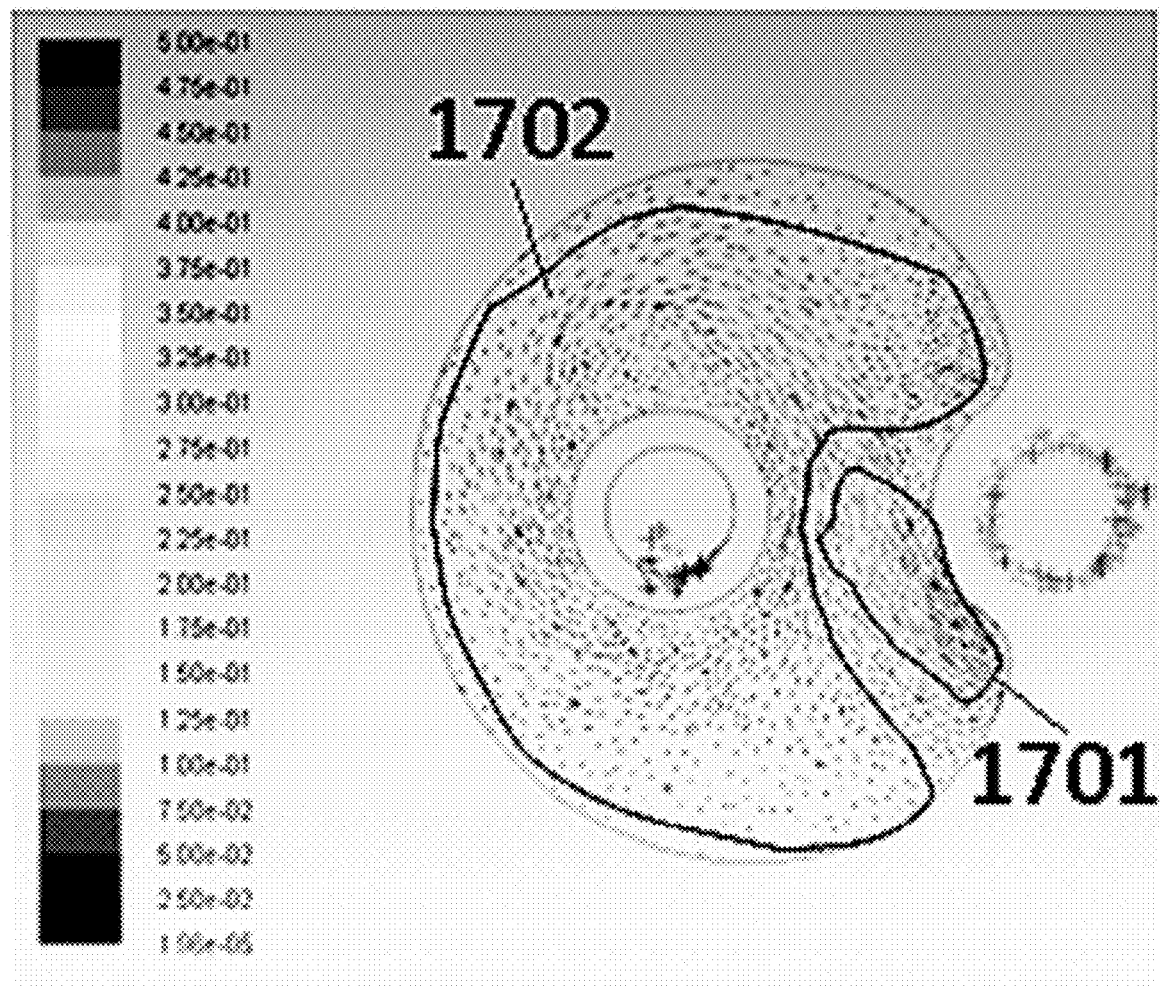
FIGS. 17a-17b show velocity distribution vector diagrams for air capture chambers having a large radius inlet port.
Figure 17B:
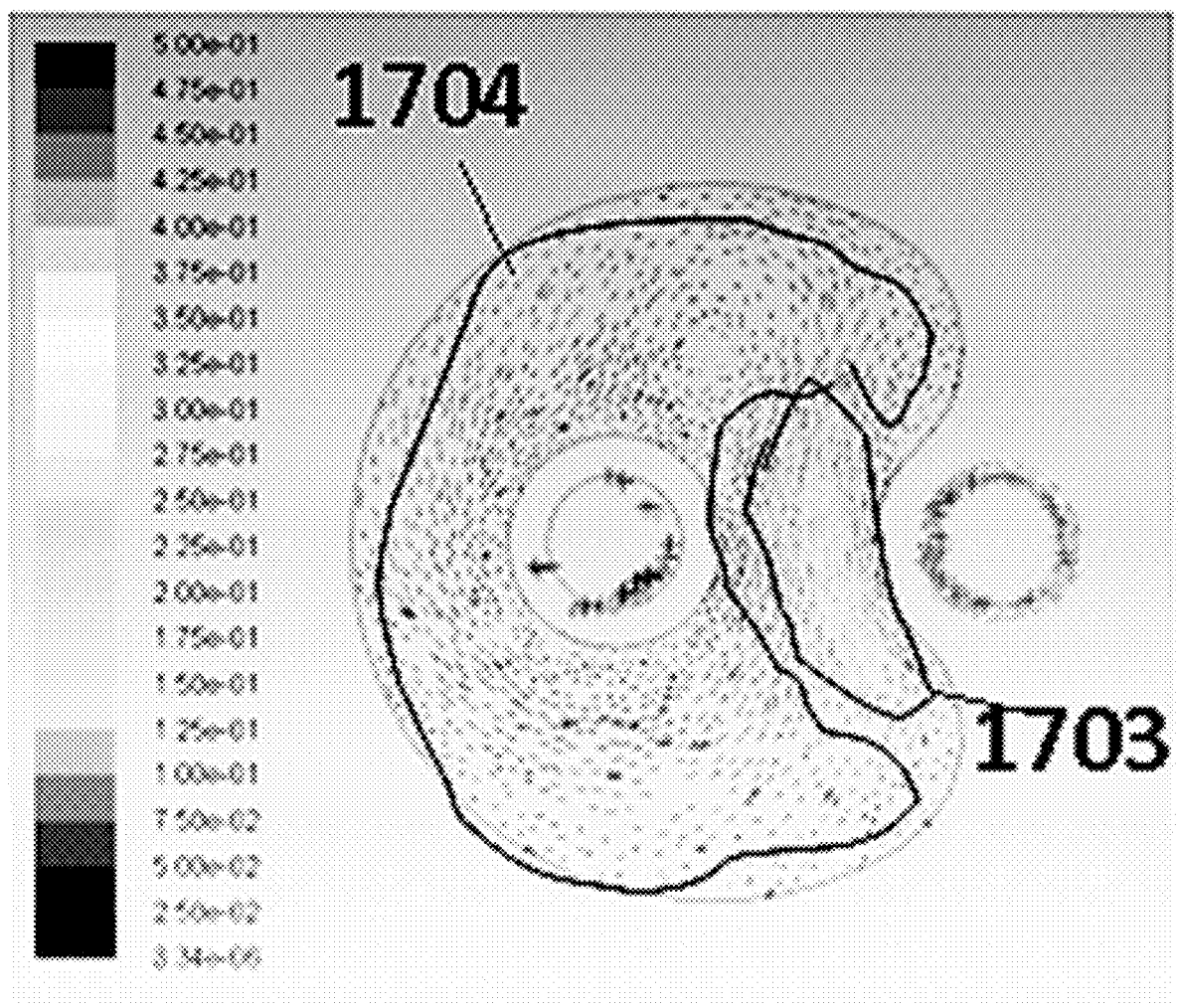

FIG. 16a illustrates velocity distributions in the chamber body at a height of 0.025 m in the small radius spiral flow-inducing shelf design of FIG. 2a, while FIG. 16b illustrates velocity distributions in the chamber body at a height of 0.025 m in the large radius spiral flow-inducing shelf design of FIG. 2b. FIG. 17a illustrates velocity distributions in the chamber body at a height of 0.02 m in the small radius spiral flow-inducing shelf design of FIG. 2a, while FIG. 17b illustrates velocity distributions in the chamber body at a height of 0.02 m in the "large radius" spiral flow-inducing shelf design of FIG. 2b. In particular, the arterial air capture chamber as described in FIG. 2b has a large outside radius of the spiral flow-inducing shelf 211 and a "large radius" opposing shelf 212. The legend for FIGS. 16a and 17a transitions from a high velocity flow in red at 5.00e–01 m/s, orange at 3.87e–01 m/s, yellow at 3.38e–01 m/s, green at 2.38e–01 m/s to light blue at 1.38e–01 m/s to a low velocity flow shown in blue at 1.96e–05 m/s. The legend for FIGS. 16b and 17b transitions from a high velocity flow in red at 5.00e–01 m/s, orange at 3.83e–01 m/s, yellow at 3.38e–01 m/s, green at 2.38e–01 m/s, to light blue at 1.38e–01 m/s to a low velocity flow shown in blue at 3.34e–06 m/s.

In FIG. 16a, the fluid has a high velocity near the inlet in red area 1603, a lower velocity in light blue areas 1601 and 1604, and a lower velocity in blue area 1602. In FIG. 16b, the fluid has a high velocity near the inlet in area 1605, a lower velocity in light blue areas 1606 and 1608, and a low velocity in blue area 1607. In FIG. 17a, the fluid has a higher velocity in light blue area 1701, and a lower velocity in blue area 1702. In FIG. 17b, the fluid has a higher velocity in light blue area 1703 and a lower velocity in blue area 1704. As illustrated in FIGS. 16a and 17a, the fluid flow around the spiral flow-inducing shelf area is restricted, resulting in low velocity and potentially stagnant flow, whereas the large radius spiral flow-inducing shelf design of FIG. 2b provides flow with a more gradual geometric change allowing for a smoother flow as shown in FIGS. 16b and 17b.

Experiment 7

Figure 18A:
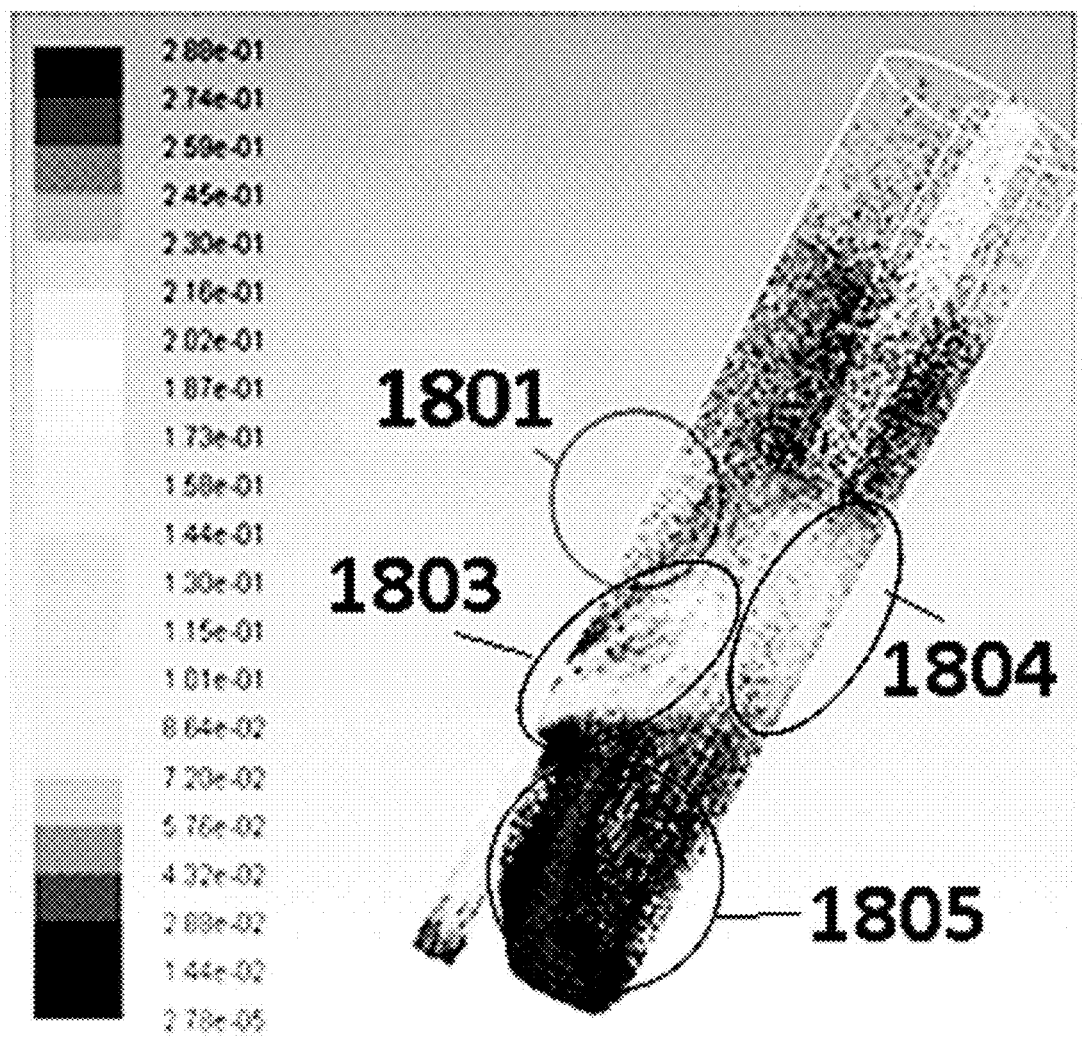
FIGS. 18a-18b show velocity distribution vector diagrams for air capture chambers based on the distance between a center axis of the chamber body and the draw tube.
Figure 18B:
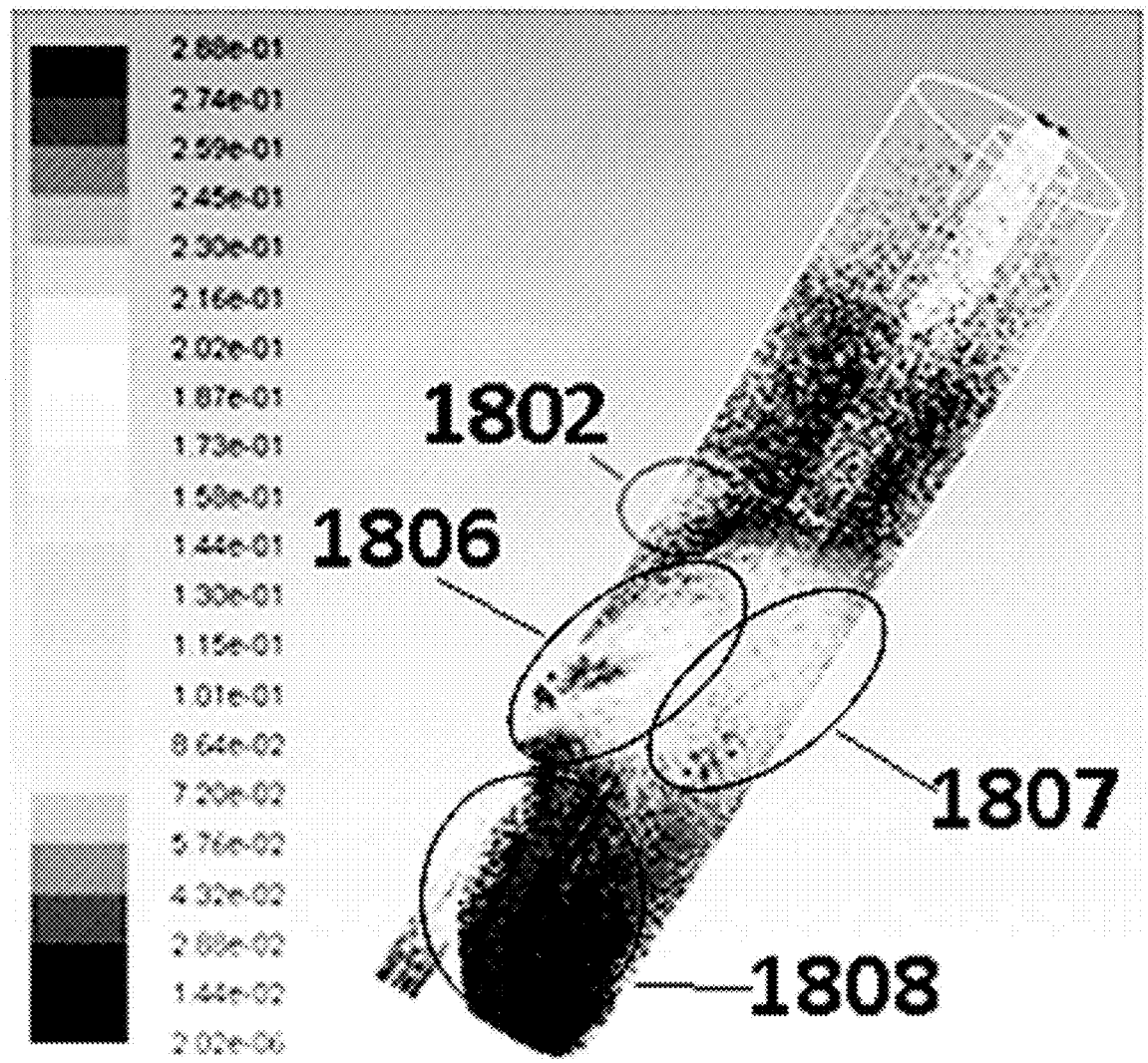

As illustrated in FIG. 3, the chamber body can have a center axis 304 extending from the top portion of the chamber body 301 to the bottom portion of the chamber body 301. The draw tube can also have a center axis 305 extending from the top portion of the draw tube 303 to the bottom portion of the draw tube 303. In optimizing the inner geometry of the air capture chamber, the distance between the chamber body center axis 304 and the draw tube center axis 305 was investigated. FIGS. 18a and 18b illustrate velocity flow distributions for air capture chambers having a distance between the chamber body center axis 304 and draw tube center axis 305 of 0.11 inches and 0.07 inches respectively. The legend for FIG. 18a transitions from a high velocity flow in red at 2.88 e–01 m/s, orange at 2.23e–01 m/s, yellow at 1.95e–01 m/s, green at 1.58e–01 m/s to light blue at 5.78e–02 m/s to a low velocity flow shown in blue at 2.78 e–05 m/s. The legend for FIG. 18b transitions from a high velocity flow in red at 2.88 e–01 m/s, orange at 2.23e–01 m/s, yellow at 1.95e–01 m/s, green at 1.37e–01 m/s to light blue at 5.48e–02 m/s to a low velocity flow shown in blue at 2.02e–06 m/s.

As illustrated in FIG. 18a, fluid enters the air capture chamber in high velocity red area 1803, slows down in green area 1804 and further slows in blue area 1805. A low velocity area exists in circle 1801. As illustrated in FIG. 18b, fluid enters the air capture chamber in high velocity red area 1806, slows down in green area 1807 and further slows in blue area 1808. Compared to the air capture chamber illustrated in FIG. 18a, the smaller distance between the chamber body center axis and draw tube center axis in the air capture chamber of FIG. 18b provides for more uniform flow, as illustrated in circle 1802.

Experiment 8

Figure 19A:
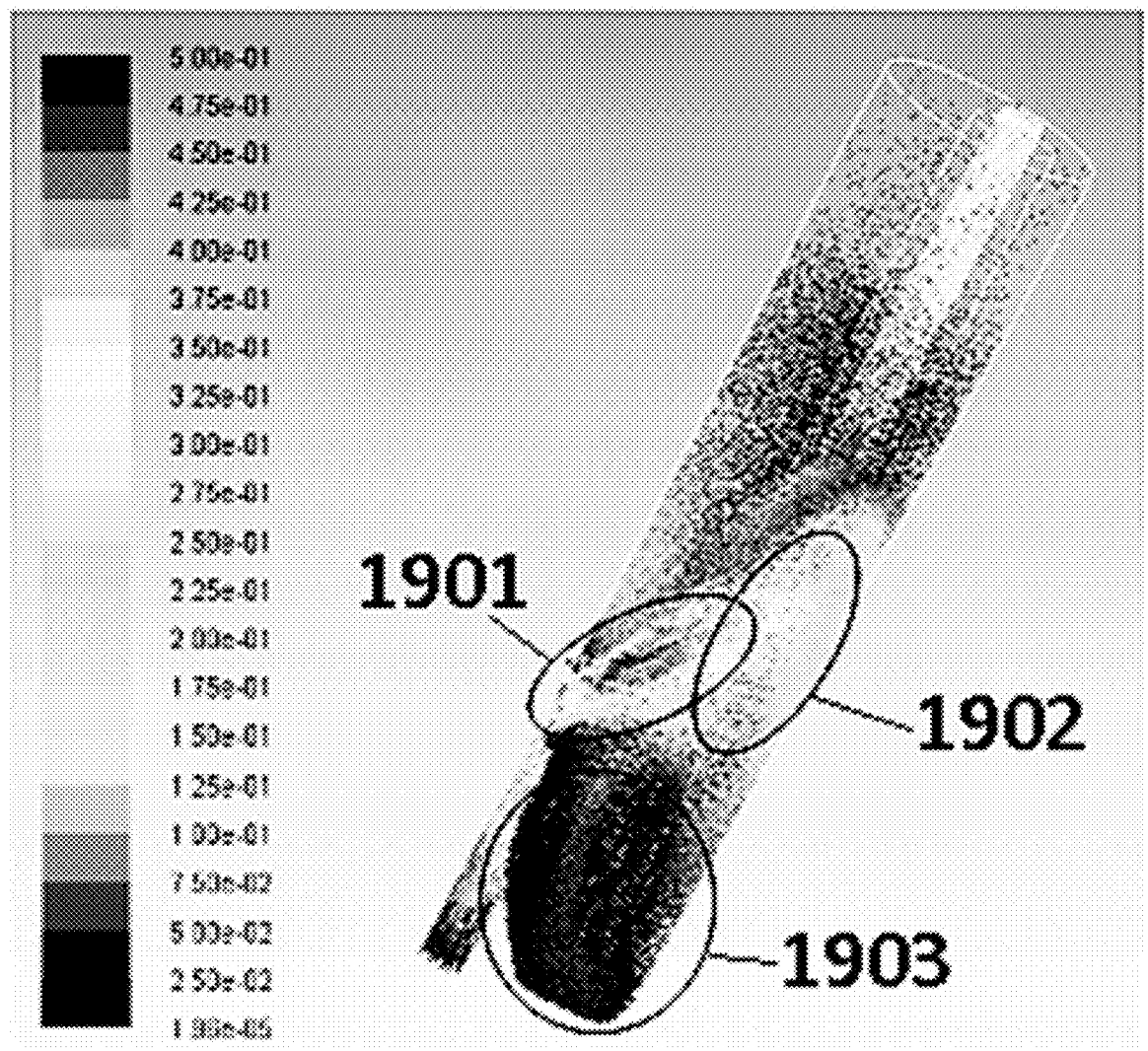
FIGS. 19a-19b show velocity distribution vector diagrams for air capture chambers based on the inner diameter of the chamber body.
Figure 19B:
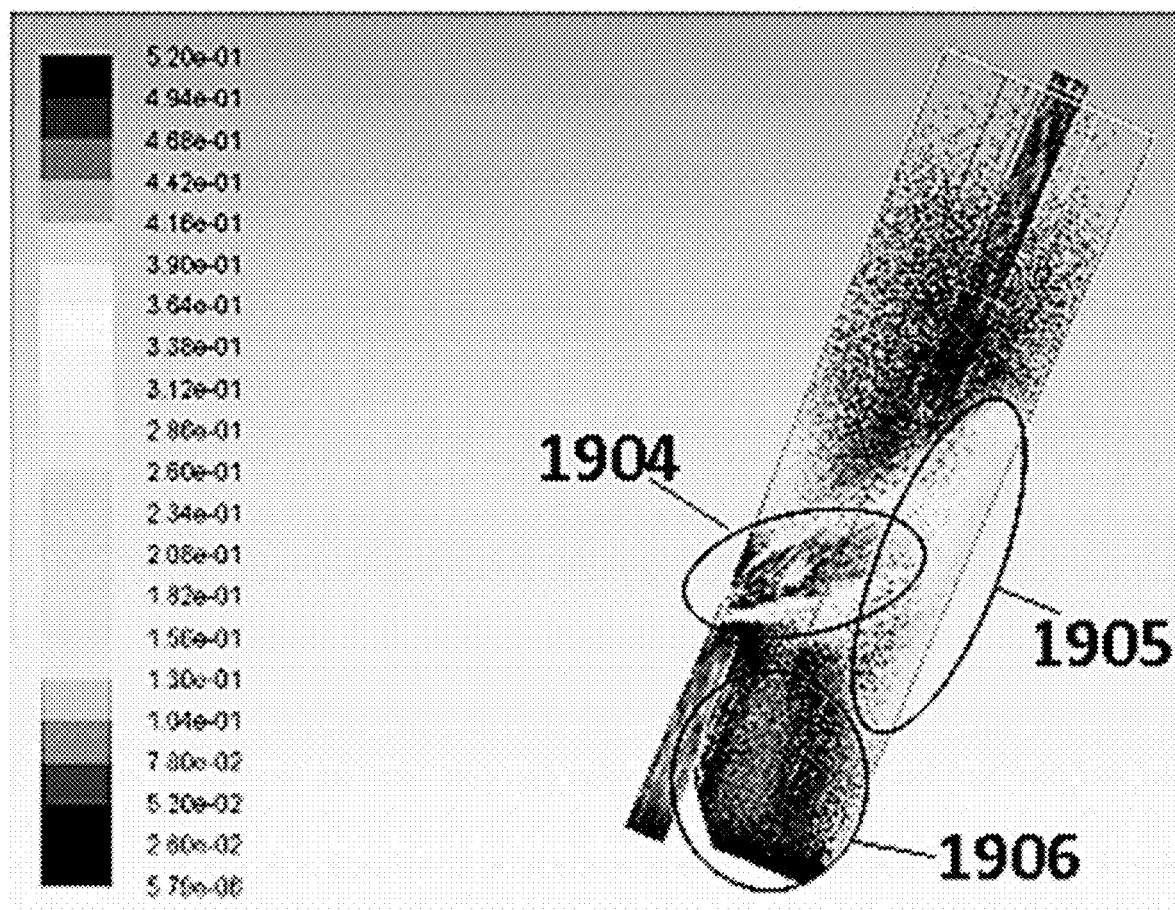

The inner diameter of the chamber body of the arterial air capture chamber was also investigated. FIG. 19a shows velocity flow distributions for a chamber with an inner diameter of 20 mm, while FIG. 19b shows velocity flow distributions for a chamber with an inner diameter of 24 mm. The legend for FIG. 19a transitions from a high velocity flow in red at 5.00 e–01 m/s, orange at 3.87e–01 m/s, yellow at 3.38e–01 m/s, green at 2.12e–01 m/s to light blue at 1.38e–01 m/s to a low velocity flow shown in blue at 1.95e–05 m/s. The legend for FIG. 19b transitions from a high velocity flow in red at 5.20 e–01 m/s, orange at 3.77e–01 m/s, yellow at 3.51e–01 m/s, green at 2.22e–01 m/s to light blue at 1.43e–01 m/s to a low velocity flow shown in blue at 5.79e–06 m/s.

In FIG. 19a, fluid enters the air capture chamber in high velocity red area 1901, slows down in green area 1902, and further slows in blue area 1903. In FIG. 19b, fluid enters the air capture chamber in high velocity red area 1904, slows down in green area 1905, and further slows in blue area 1906. As shown in FIGS. 19a and 19b, velocity distribution at the top of the fluid is more uniform in the chamber with a 24 mm inner diameter of FIG 19b than the chamber with a 20 mm inner diameter of 19a.

Figure 20A:
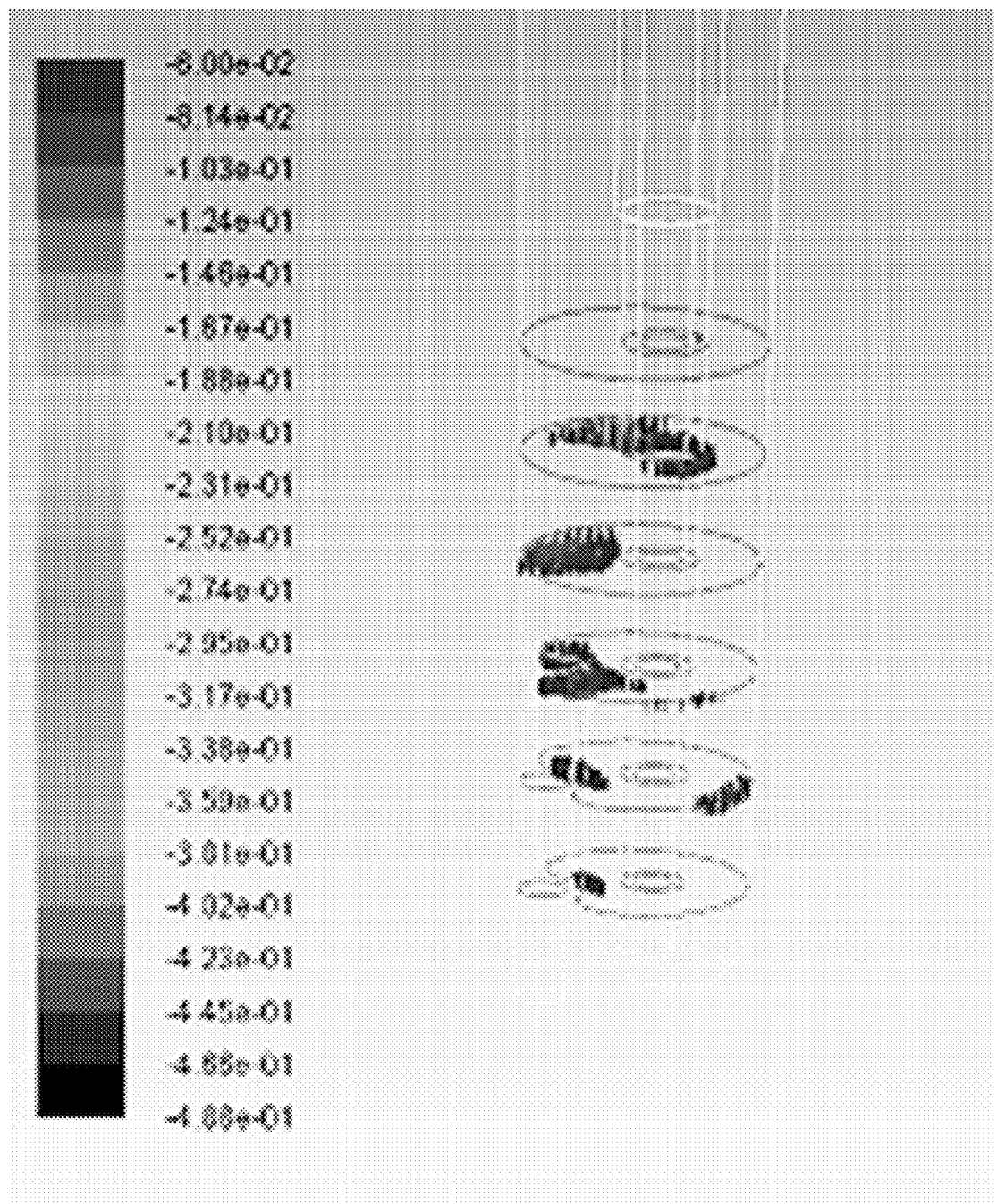
FIGS. 20a-20b show velocity distributions in the y-direction based on the inner diameter of the chamber body.
Figure 20B:
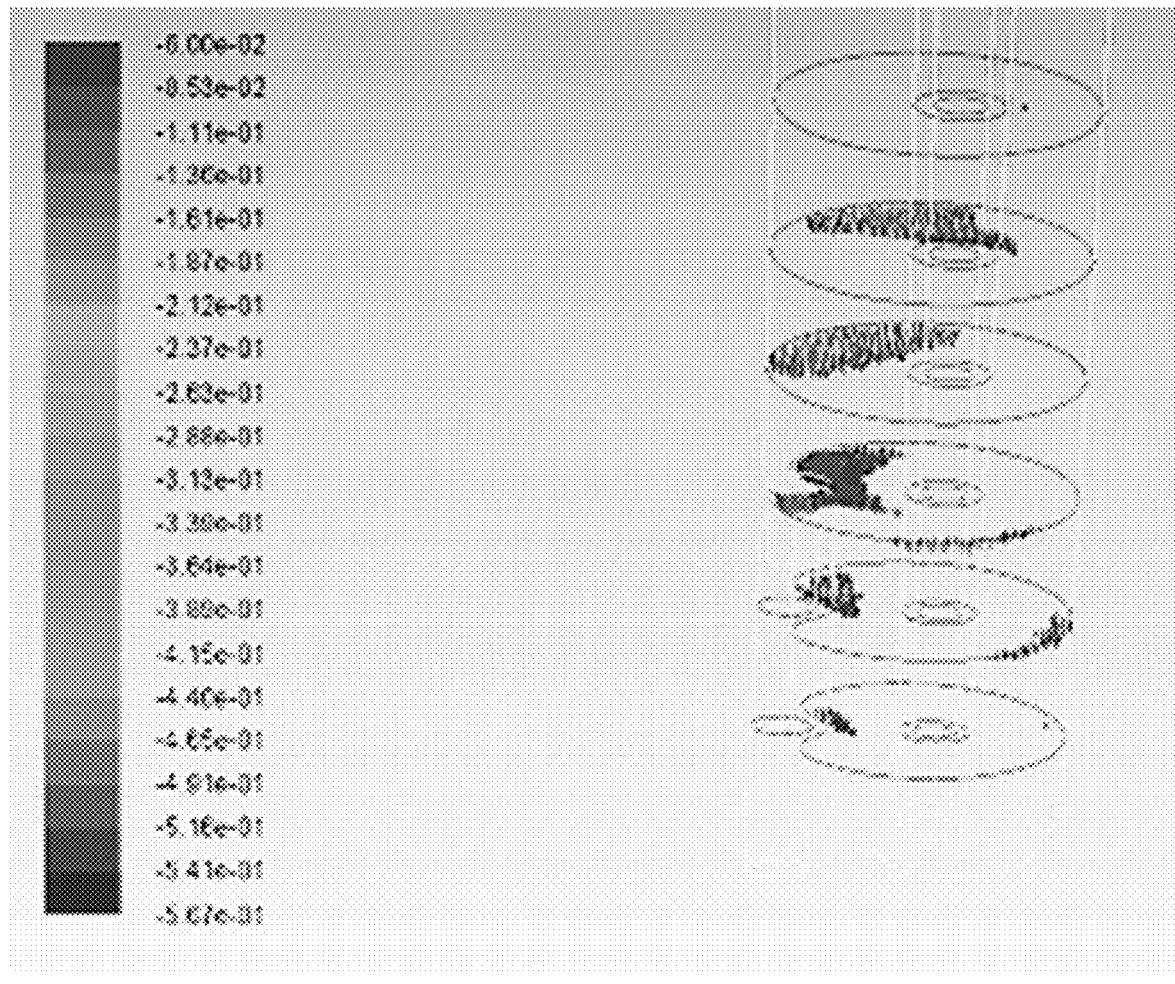

Velocity of the fluid from the top to the bottom of the chamber body, in a "Y direction" is also important. If the velocity in Y direction is larger than 0.06 m/s, the chance of bubbles passing through the outlet tubing increases. FIGS. 20a and 20b show velocity distributions in the Y direction for a chamber body with a 20 mm inner diameter and a 24 mm inner diameter respectively. The legend for FIG. 20a transitions from a low velocity flow in red at –6.00 e–02 m/s, orange at –1.56e–01 m/s, yellow at –3.38e–01 m/s, green at –3.06e–01 m/s to light blue at –3.70e–01 m/s to a high velocity flow shown in blue at –4.88e–01 m/s. The legend for FIG. 20b transitions from a low velocity flow in red at –6.00 e–02 m/s, orange at –1.72e–01 m/s, yellow at –2.25e–01 m/s, green at –3.26e–01 m/s to light blue at –4.27e–01 m/s to a high velocity flow shown in blue at –5.67e–01 m/s.

As shown in FIGS. 20a and 20b, there is no significant difference in velocity in Y direction between the two designs. The only velocity vectors shown in FIGS. 20a and 20b are in red. The similarity in velocity distribution in the Y direction as shown in FIGS. 20a and 20b may be because the inner diameter change is small so that the change in velocity is not obvious.

Experiment 9

Figure 21A:
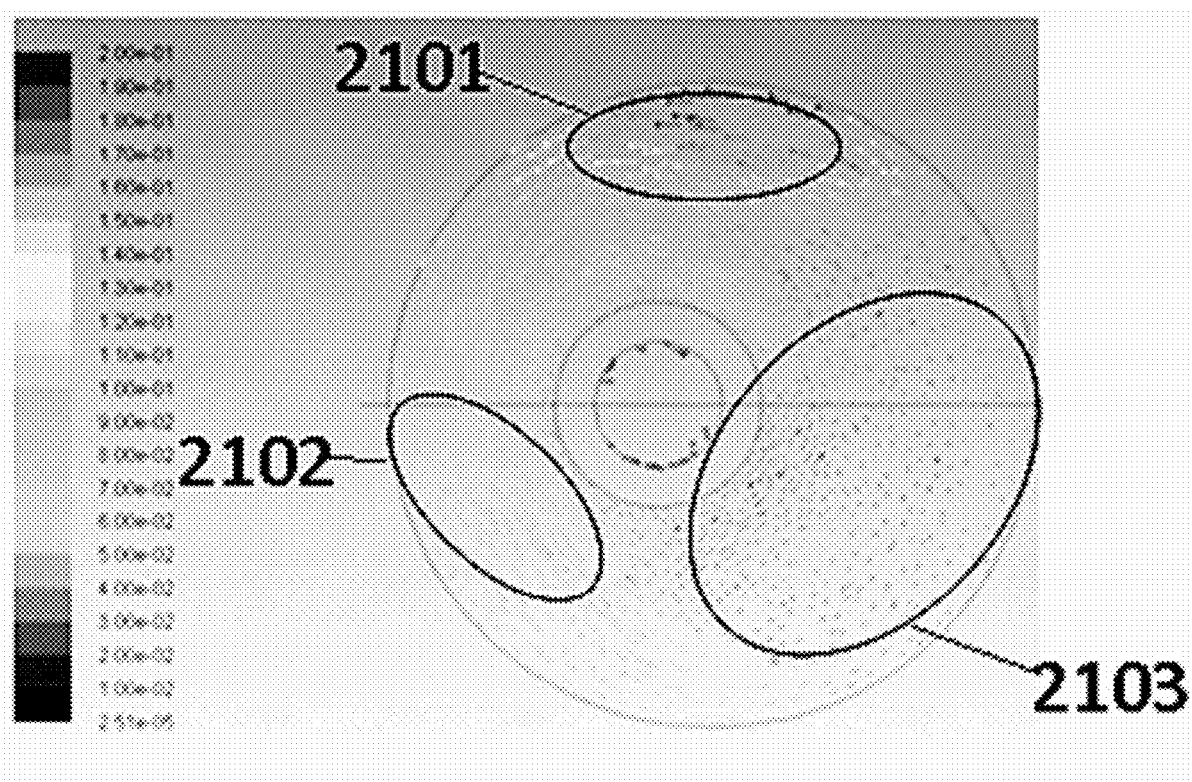
FIGS. 21a-21c show Y-section velocity distributions based on the geometry of the draw tube.
Figure 21B:
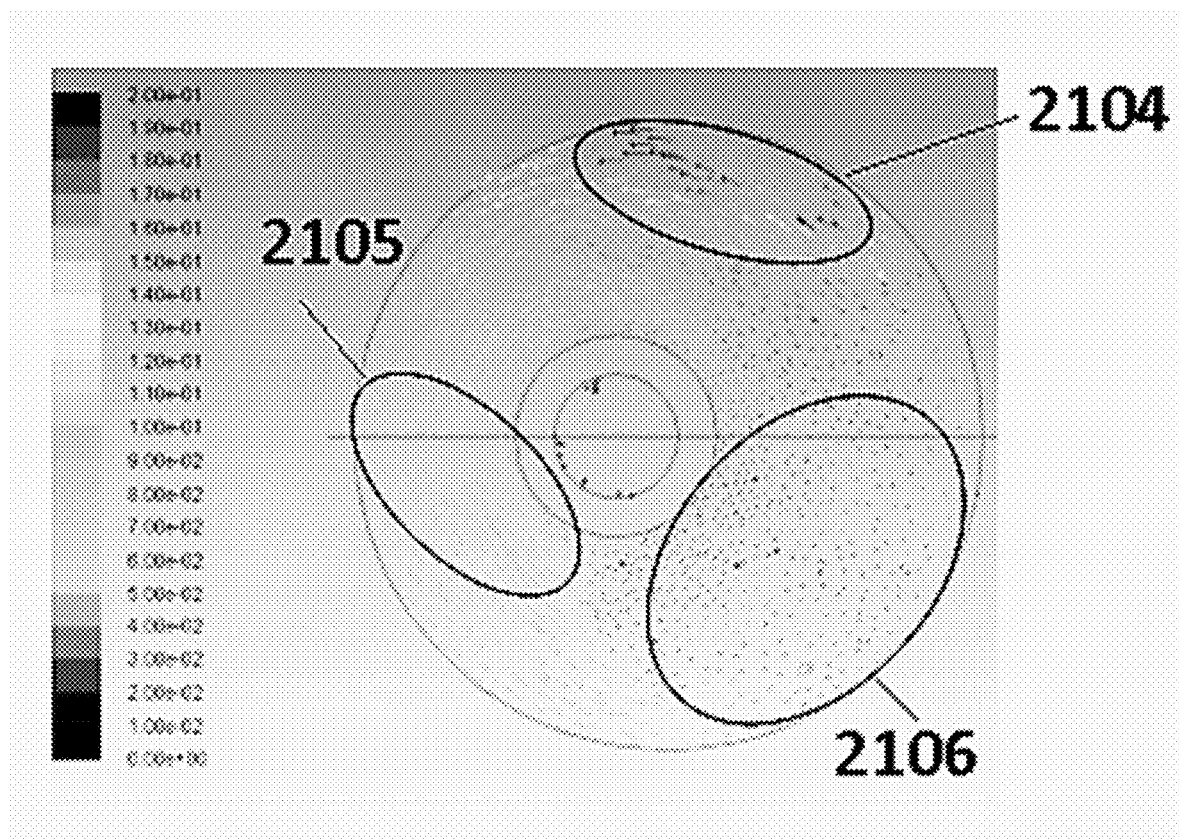
Figure 21C:
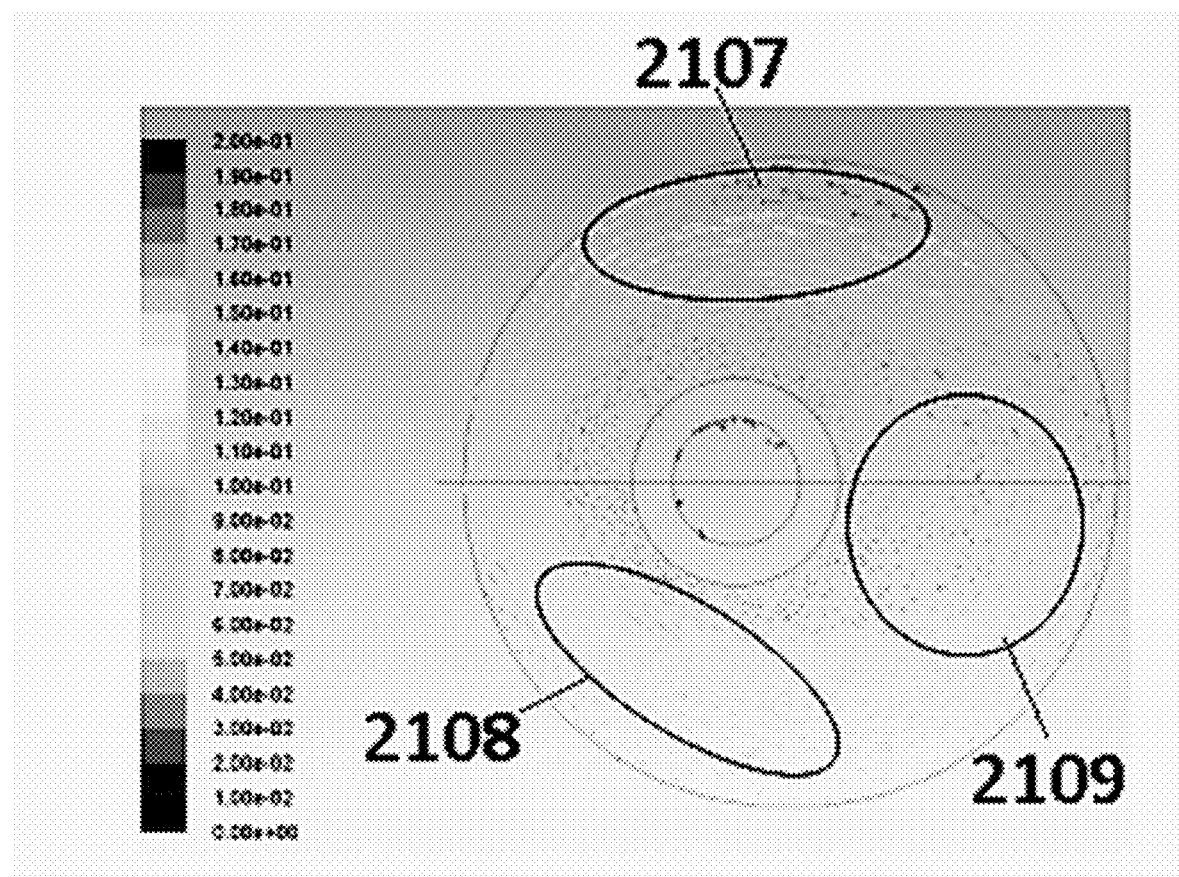

The effects on fluid flow of the geometry of the beveled opening, as illustrated in FIGS. 4a-c were also investigated. The legend for FIG. 21a transitions from a high velocity flow in red at 2.00 e–01 m/s, orange at 1.55e–01 m/s, yellow at 1.35e–01 m/s, green at 8.50e–02 m/s to light blue at 4.50e–02 m/s to a low velocity flow shown in blue at 2.51e–05 m/s. The legend for FIGS. 21b and c transitions from a high velocity flow in red at 2.00 e–01 m/s, orange at 1.70e–01 m/s, yellow at 1.30e–01 m/s, green at 8.50e–02 m/s to light blue at 3.0e–02 m/s to a low velocity flow shown in blue at 0.00e–00 m/s. FIG. 21a illustrates a Y-section velocity distribution for the chamber with a beveled opening disposed at an angle 270° relative to the inlet port, as illustrated in FIG. 4a. The fluid has a high velocity in red area 2101, slows down in green area 2102, and has a lower velocity in blue area 2103. FIG. 21b shows a velocity distribution for the chamber with a beveled opening opposedly positioned at about 180° to the fluid inlet port as illustrated in FIG. 4b. The fluid has a high velocity in red area 2104, slows down in green area 2105, and has a lower velocity in blue area 2106. FIG. 21c shows a velocity distribution for a chamber with a beveled opening disposed at 90° relative to the fluid inlet port, as illustrated in FIG. 4c. The fluid has a high velocity in red area 2107, slows down in green area 2108, and has a lower velocity in blue area 2109. For beveled opening at 270° relative to the fluid inlet port illustrated in FIG. 21*a* and the oppposedly positioned beveled opening at 180° to the inlet port illustrated in FIG. 21*b*, the velocity distributions look nearly the same. The design with the beveled opening at 90° to the fluid inlet port shows strong and uniform circular flow, circulated around the draw tube, as shown in FIG. 21*c*.

Figure 22A:
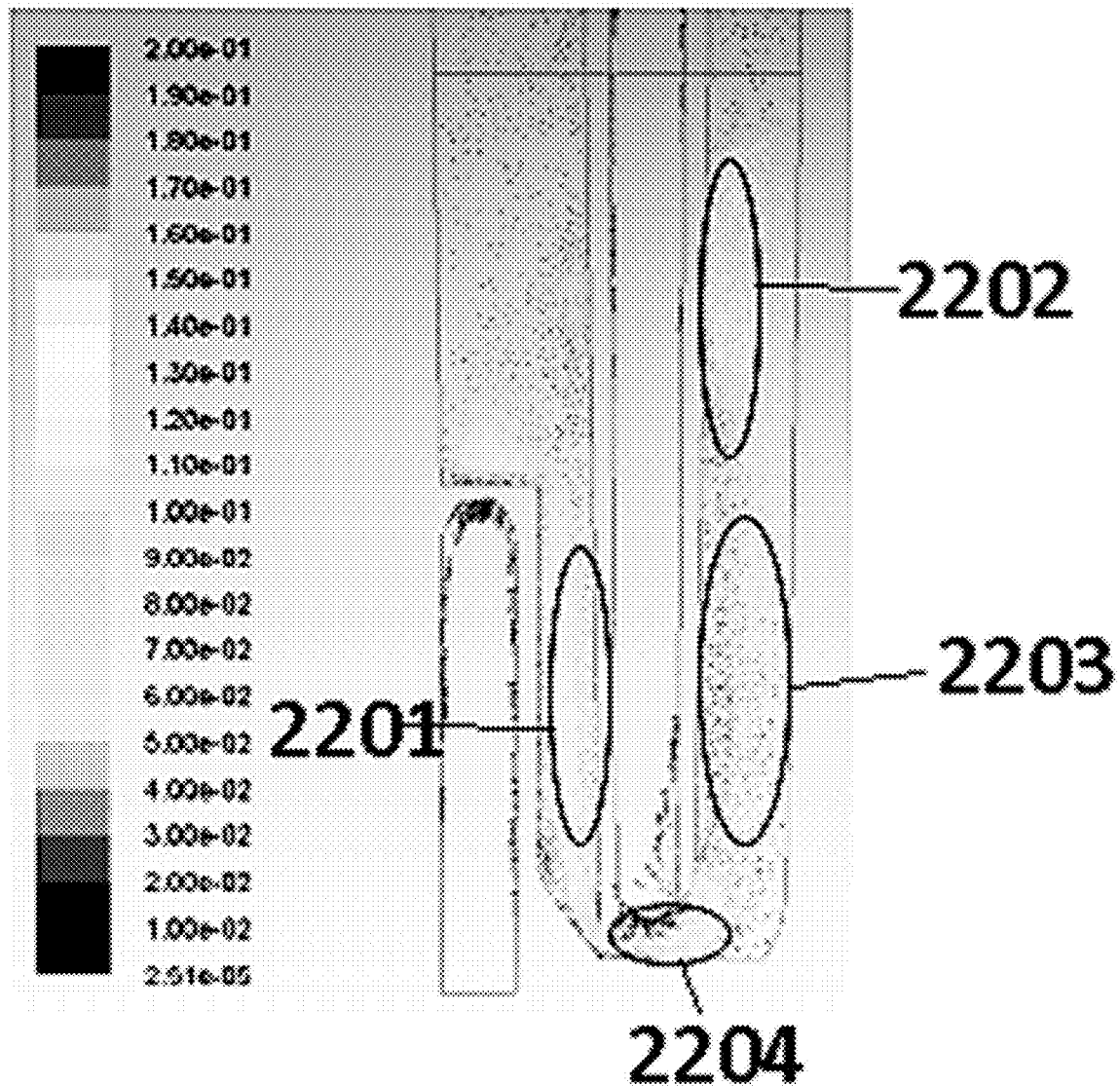
FIGS. 22a-22c show Z-section velocity distributions based on the geometry of the draw tube.
Figure 22B:
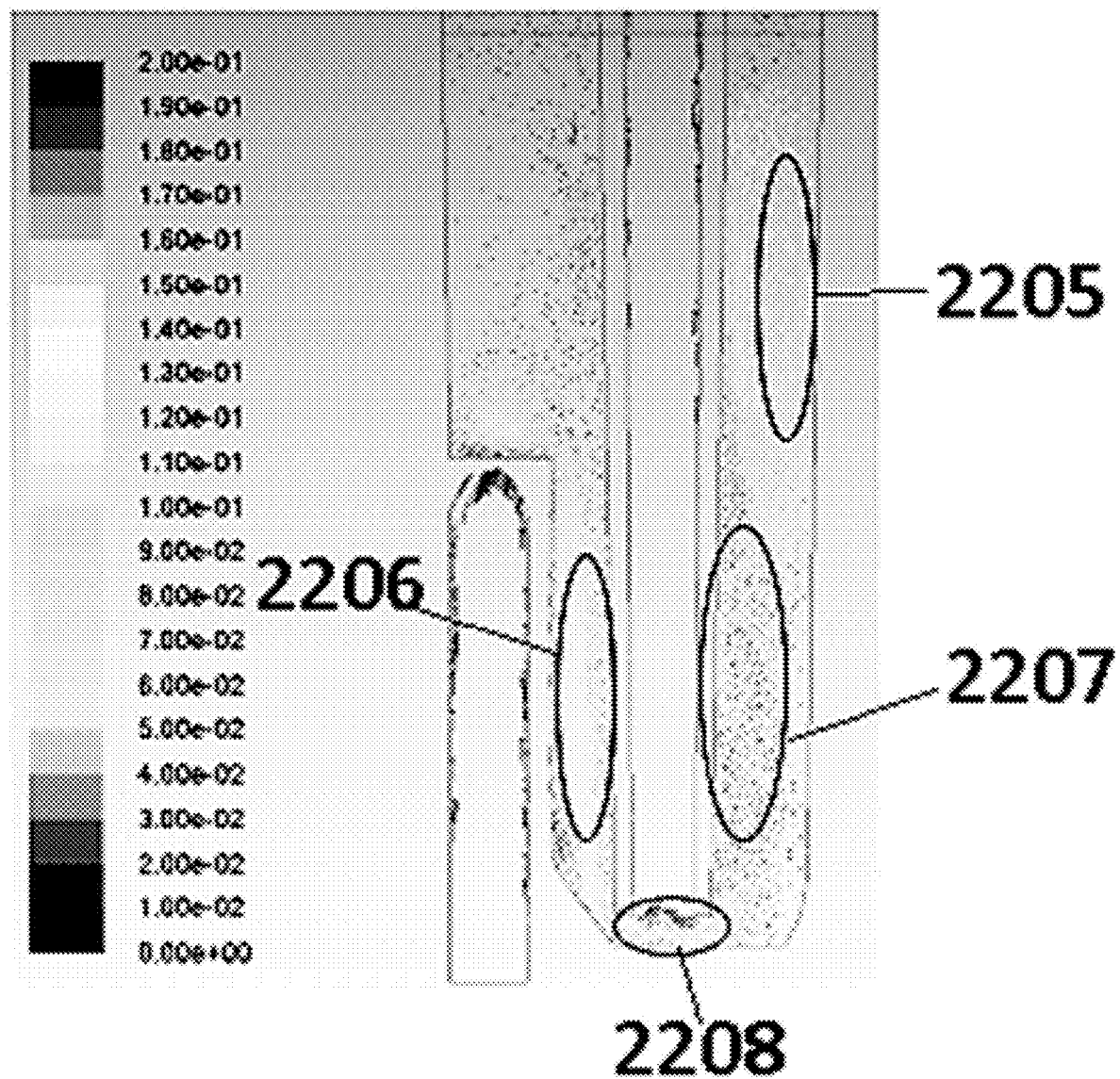
Figure 22C:
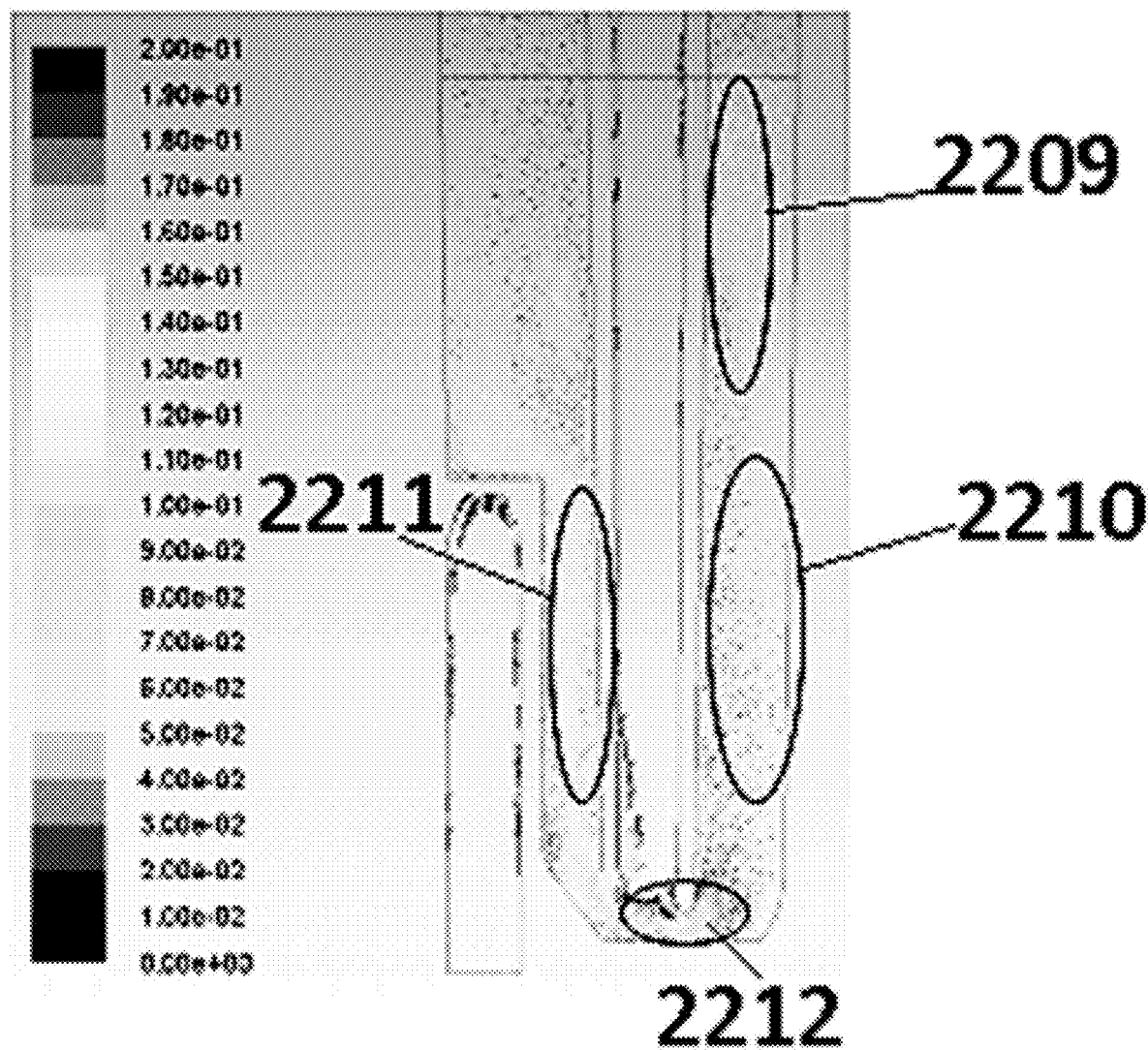

FIG. 22*a* illustrates a Z-section velocity distribution for the chamber with a beveled opening at 270° relative to the fluid inlet port, FIG. 22*b* shows a velocity distribution for the chamber with a opposedly positioned beveled opening at 180° to the inlet port, and FIG. 22*c* shows a velocity distribution for a chamber with a beveled opening at 90° to the fluid inlet port. The legend for FIG. 22*a* transitions from a high velocity flow in red at 2.00 e−01 m/s, orange at 1.55e−01 m/s, yellow at 1.35e−01 m/s, green at 8.50e−02 m/s to light blue at 4.50e−02 m/s to a low velocity flow shown in dark blue at 2.51e−05 m/s.

In FIG. 22*a*, the fluid has a moderate velocity in green area 2202, then slows as the fluid moves down the air capture chamber in blue areas 2203 and 2201, before speeding up as the fluid enters the draw tube in red area 2204. In FIG. 22*b*, the fluid has a moderate velocity in green area 2205, then slows as the fluid moves down the air capture chamber in blue areas 2206 and 2207, before speeding up as the fluid enters the draw tube in red area 2208. In FIG. 22*c*, the fluid has a moderate velocity in green area 2209, then slows as the fluid moves down the air capture chamber in blue areas 2210 and 2211, before speeding up as the fluid enters the draw tube in red area 2212. As shown in FIGS. 22*a-c*, there is no significant difference among three designs, based on the section views. However, the longest flow path is the design with the beveled opening opposedly positioned at 180° relative to the fluid inlet port, which may be advantageous.

Experiment 10

Based on the computational flow analysis described in Experiments 1-9, an arterial air capture chamber with a single fluid inlet port disposed on an inner wall of the chamber body, the fluid inlet port positioned at about a 90° turn relative to a fluid flow of the tube and disposed tangential to a circle plane formed by the central axis of the chamber body, along with a fluid outlet forming a draw tube with a beveled opening opposedly positioned on the draw tube at and angle of about 180° relative to the fluid inlet port, as illustrated in FIG. 9 was used for further analysis. The legend for FIGS. 23*a-d* transitions from a high velocity flow in red at 1.04 e−01 m/s, orange at 8.83e−02 m/s, yellow at 7.01e−2 m/s, green at 4.95e−02 m/s to light blue at 1.82−02 m/s to a low velocity flow shown in blue at 7.03e−6 m/s.

Figure 23A:
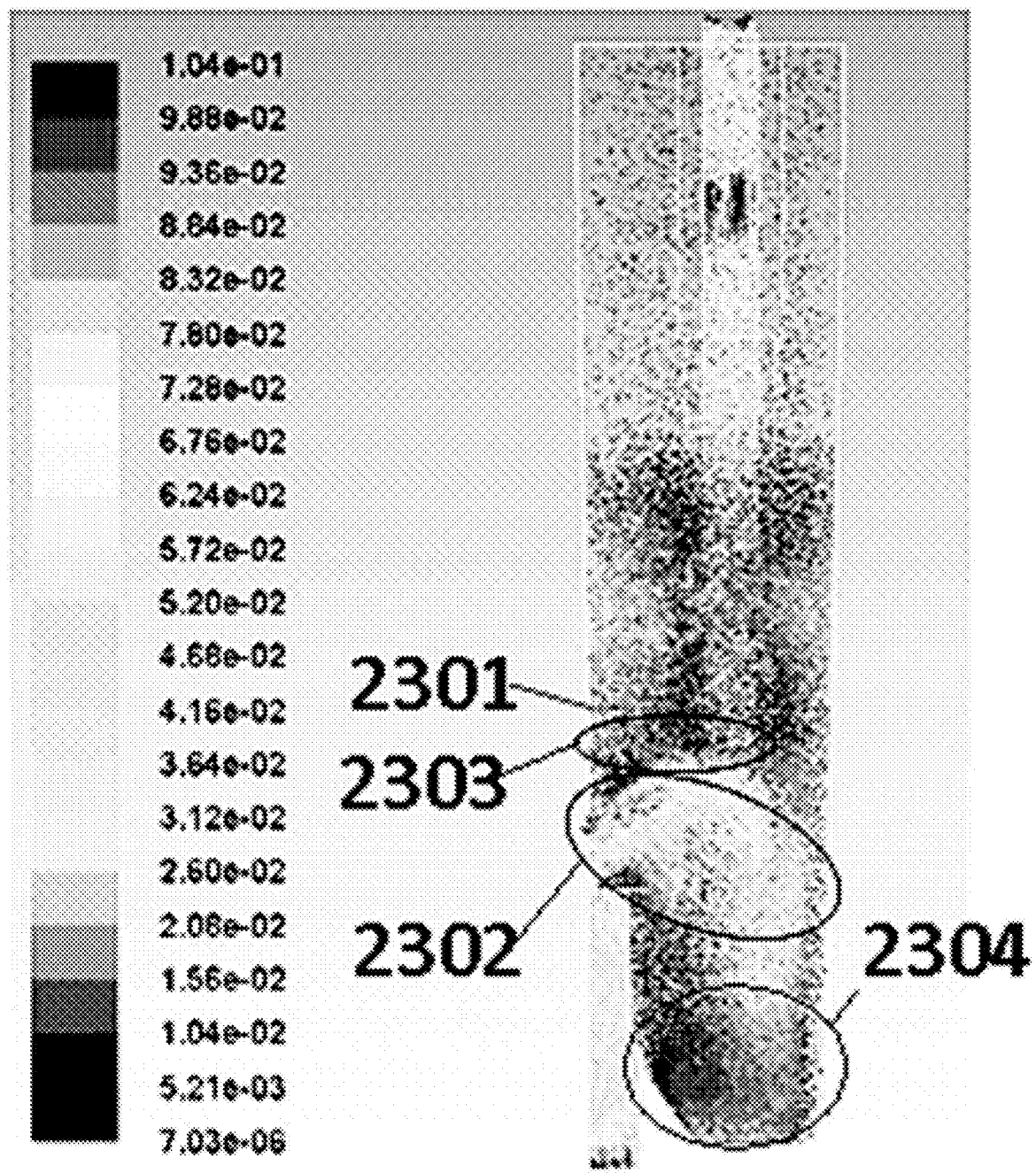
FIGS. 23a-23d show velocity distribution vectors with a 40% filling level and an inlet velocity of 0.104 m/s.
Figure 23B:
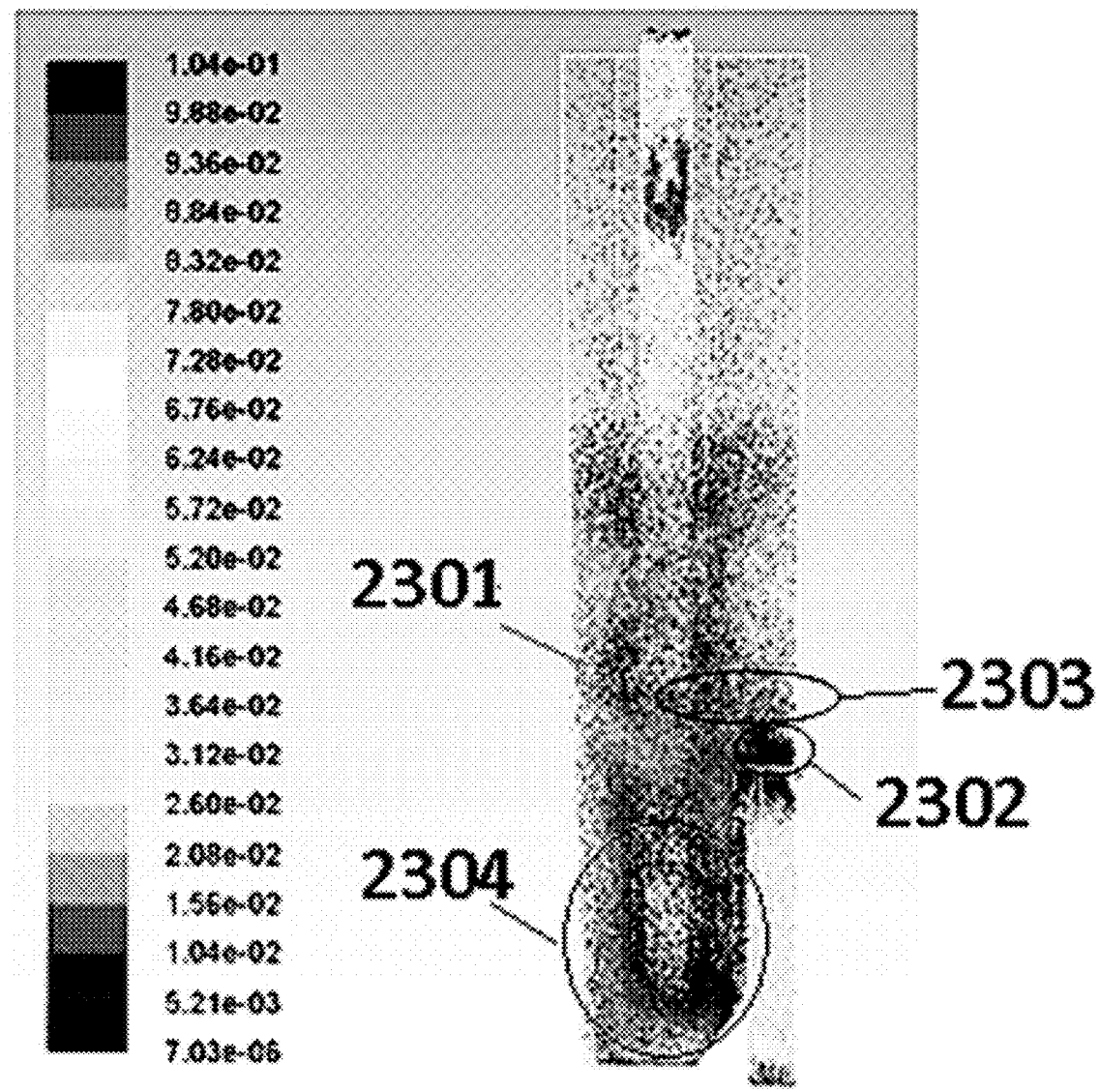
Figure 23C:
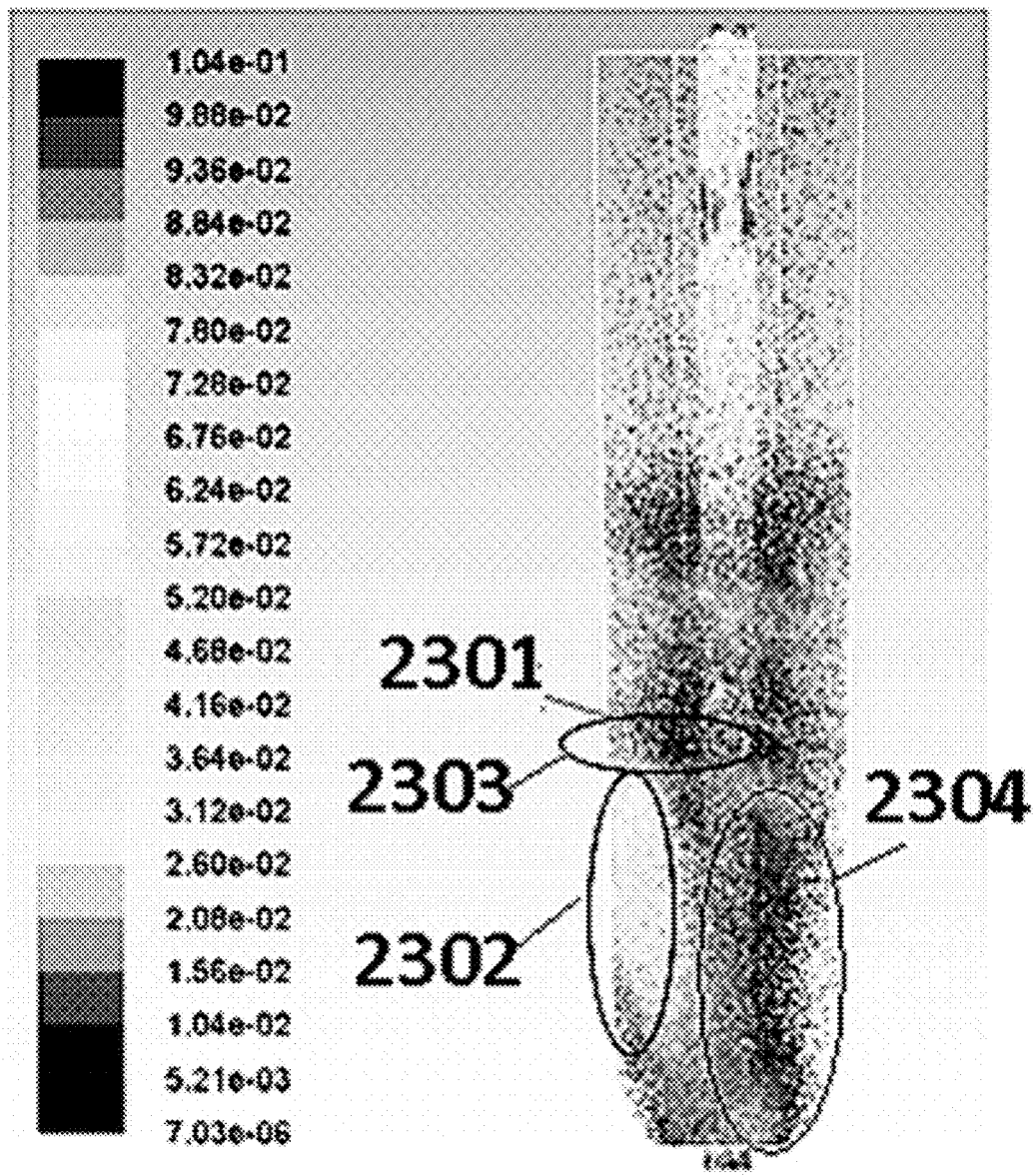
Figure 23D:
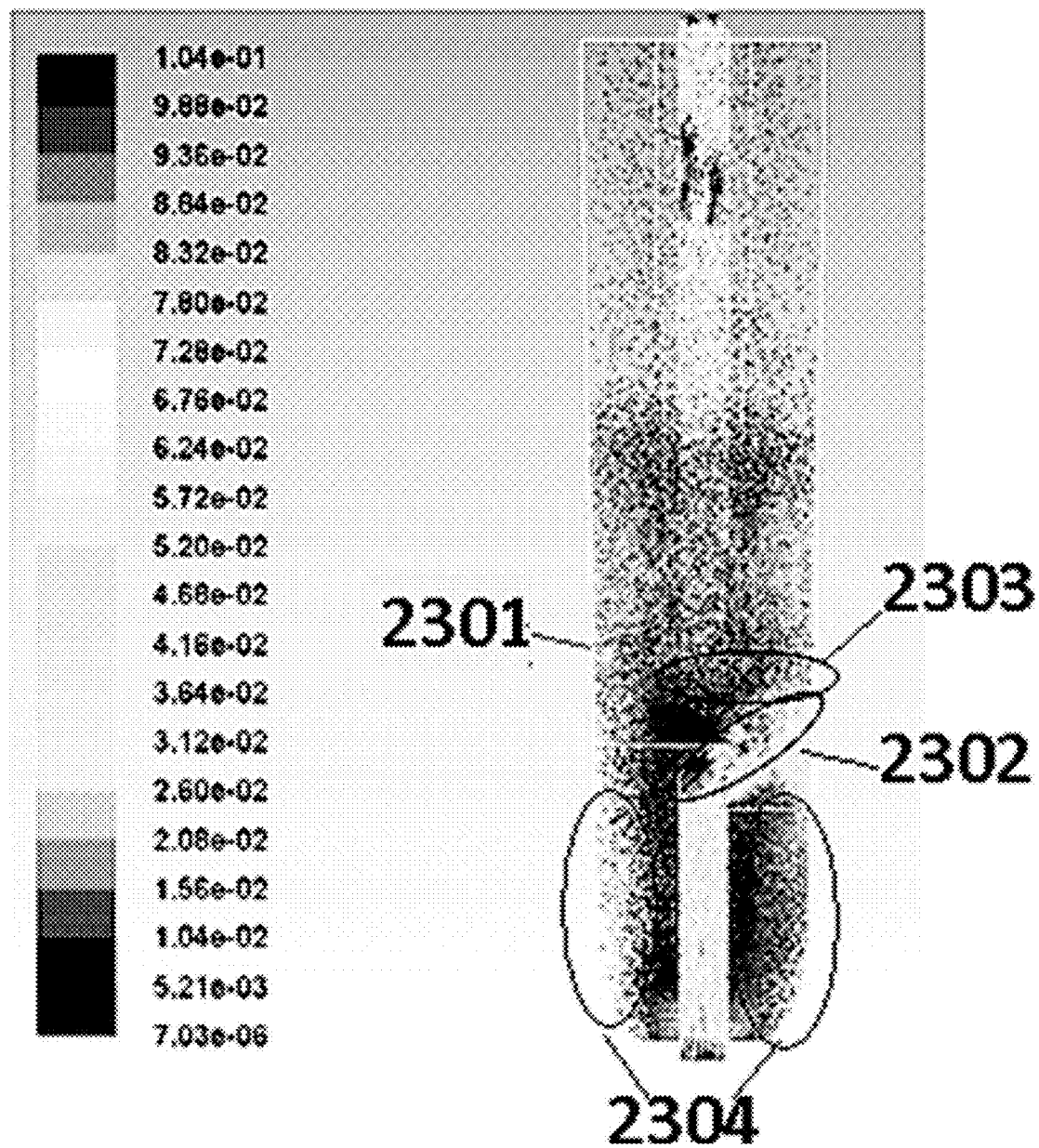

FIG. 23*a* is a font view of velocity distribution vectors of the arterial air capture chamber shown in FIG. 23 with a 40% filling level and an inlet velocity of 0.104 m/s. FIG. 23*b* is a back view of the same chamber with the same filling level and inlet velocity. FIG. 23*c* is a right view of the chamber, and FIG. 23*d* is a left view of the chamber with the same filling level and inlet velocity. The line labeled as 2301 in each of FIGS. 23*a-d* is the filling level used in the computational flow diagrams. In FIGS. 23*a-d*, the fluid enters the air capture chamber in green high velocity massive flow area 2302. As illustrated in FIGS. 23*a-d*, there is a lower velocity blue transit area 2303 between the massive flow area 2302 at the outlet of the fluid inlet port and the fluid-air interface. In the transit area 2303, the velocity is low relative to the massive flow at the outlet of the fluid inlet port. In each of FIGS. 23 and 25-31, the filling level is set at 40% and the flow rate set at 0.104 m/s, or 100 mL/min. A lower velocity area also exists in blue area 2304 at the bottom of the air capture chamber.

Figure 24:
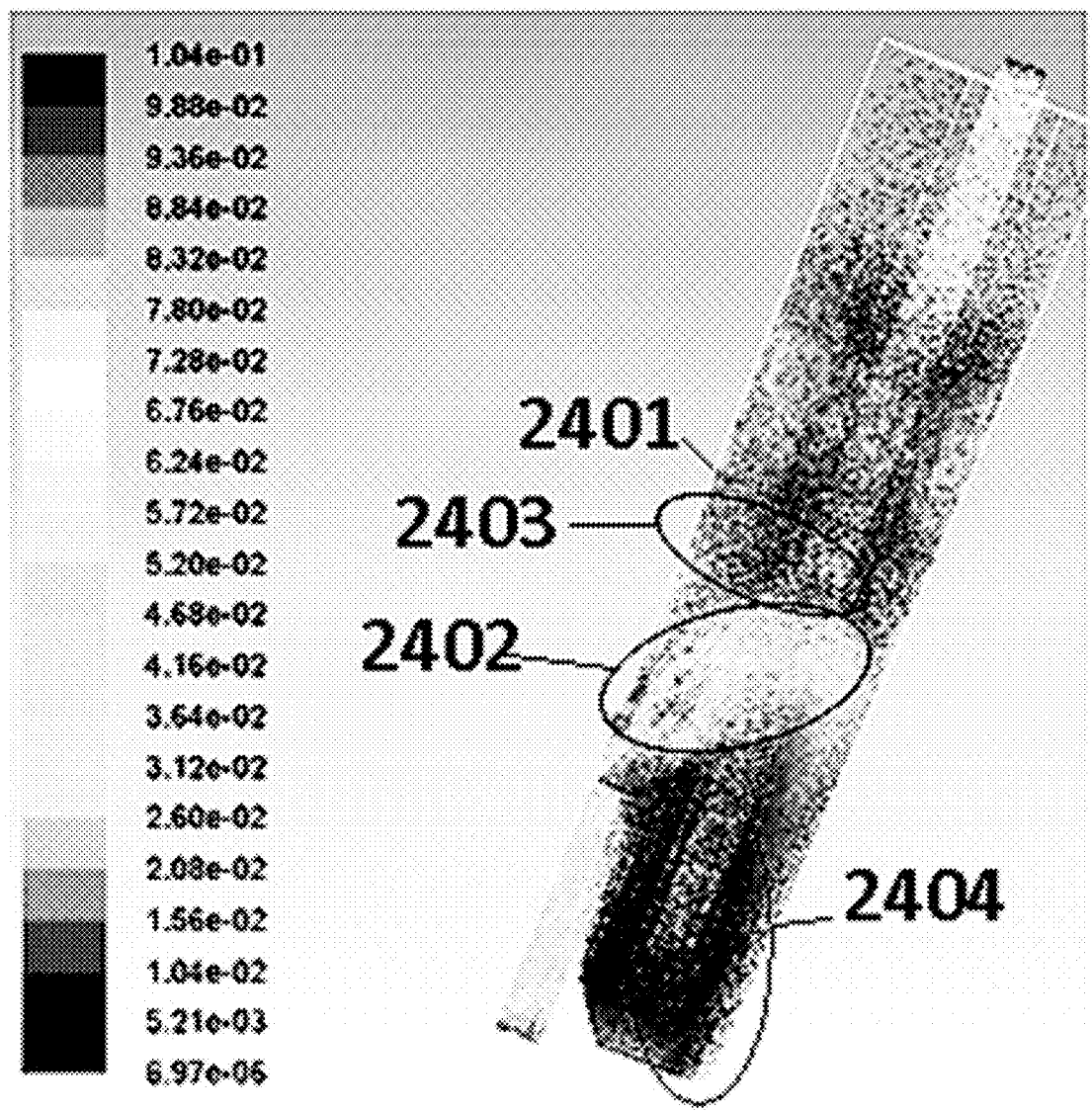
FIG. 24 shows a front view of the velocity distribution vectors with a 40% filling level and an inlet velocity of 0.104 m/s.

FIG. 24 shows a front view of the same arterial air capture chamber shown in FIG. 23, but with a 50% filling level. The legend for FIG. 24 transitions from a high velocity flow in red at 1.04 e−01 m/s, orange at 8.06e−02 m/s, yellow at 7.01e−2 m/s, green at 4.95e−02 m/s to light blue at 1.82−02 m/s to a low velocity flow shown in blue at 6.97e−6 m/s. The line labeled as 2401 is the fluid air interface. The fluid enters the air capture chamber in high velocity green massive flow area 2402. A blue transit area 2403 exists between the massive flow area 2402 and the fluid air interface at level 2401. A lower velocity also exists in blue area 2404 at the bottom of the air capture chamber. As illustrated in a comparison of FIGS. 23*a* and 24, the transit area 2403 in FIG. 24 is larger. The larger transit area 2403 in FIG. 24 suggests that the size of the transit area can be reduced by using a lower filling level when the inlet velocity is set to a low rate. The comparison suggests that a filling level of no more than 40% should be used when the inlet velocity is under 0.1 m/s, or 100 mL/min.

Figure 25A:
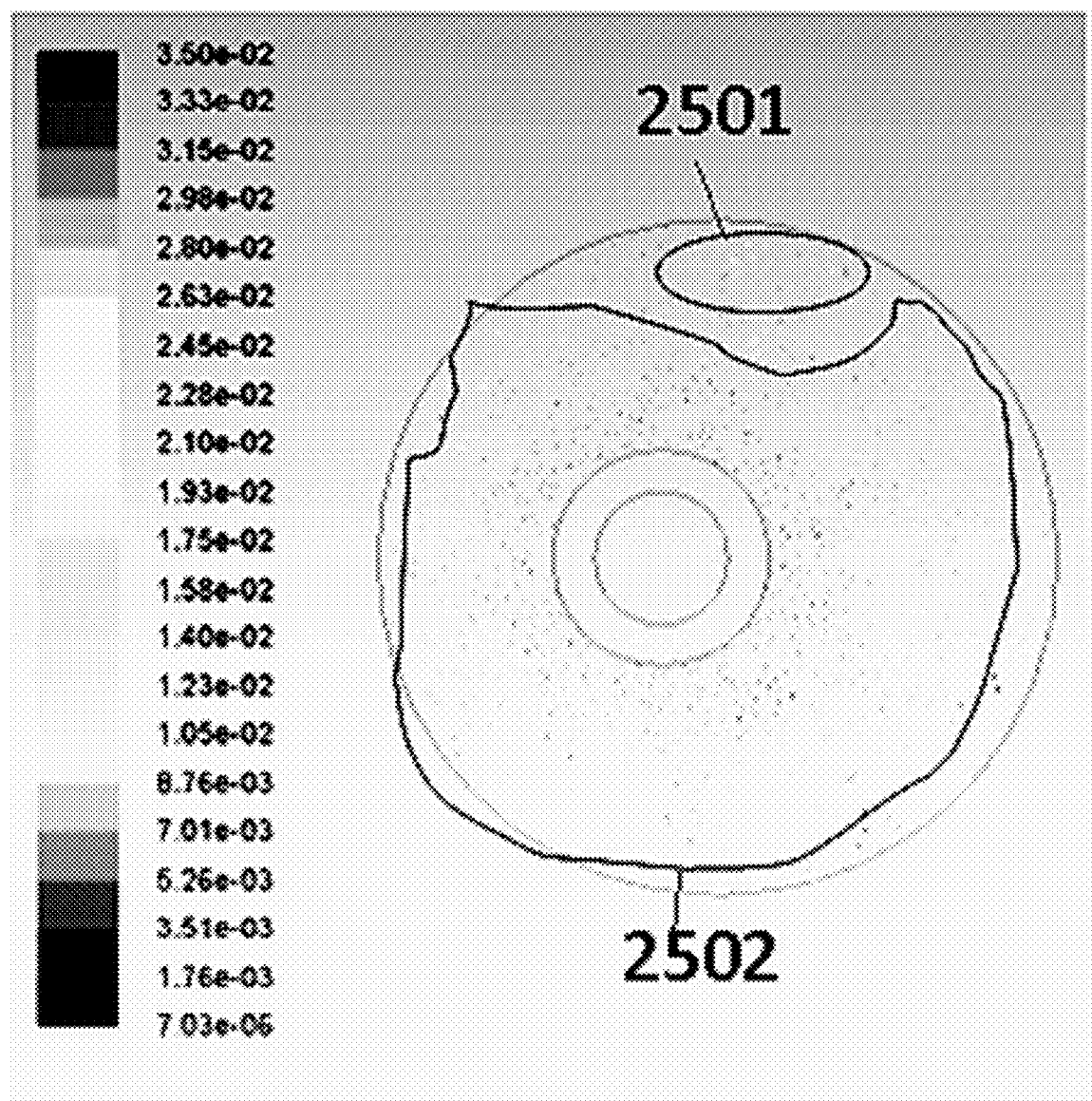
FIGS. 25a-25c show y-section views the velocity distribution vectors with a 40% filling level and an inlet velocity of 0.104 m/s.
Figure 25B:
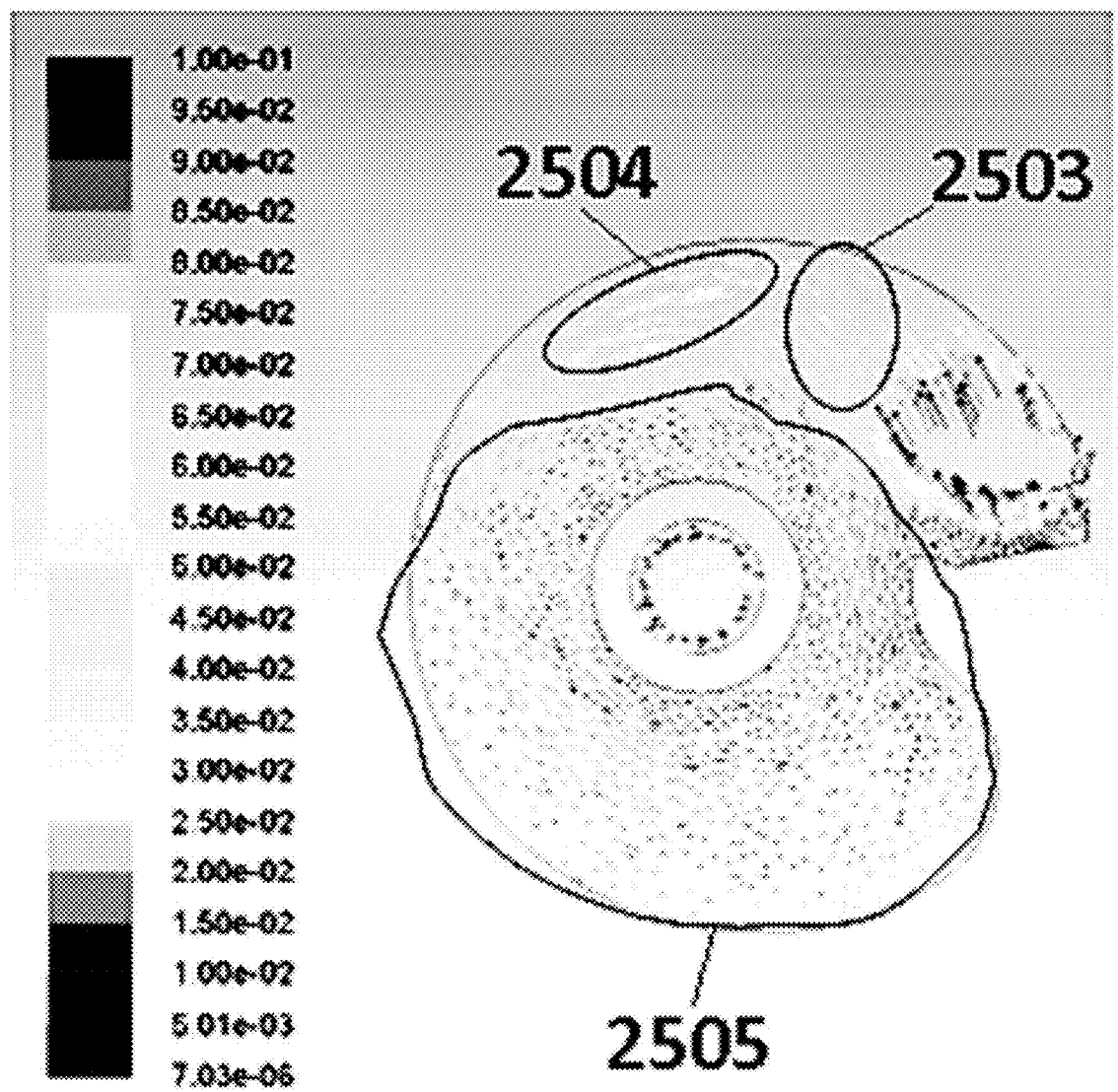
Figure 25C:
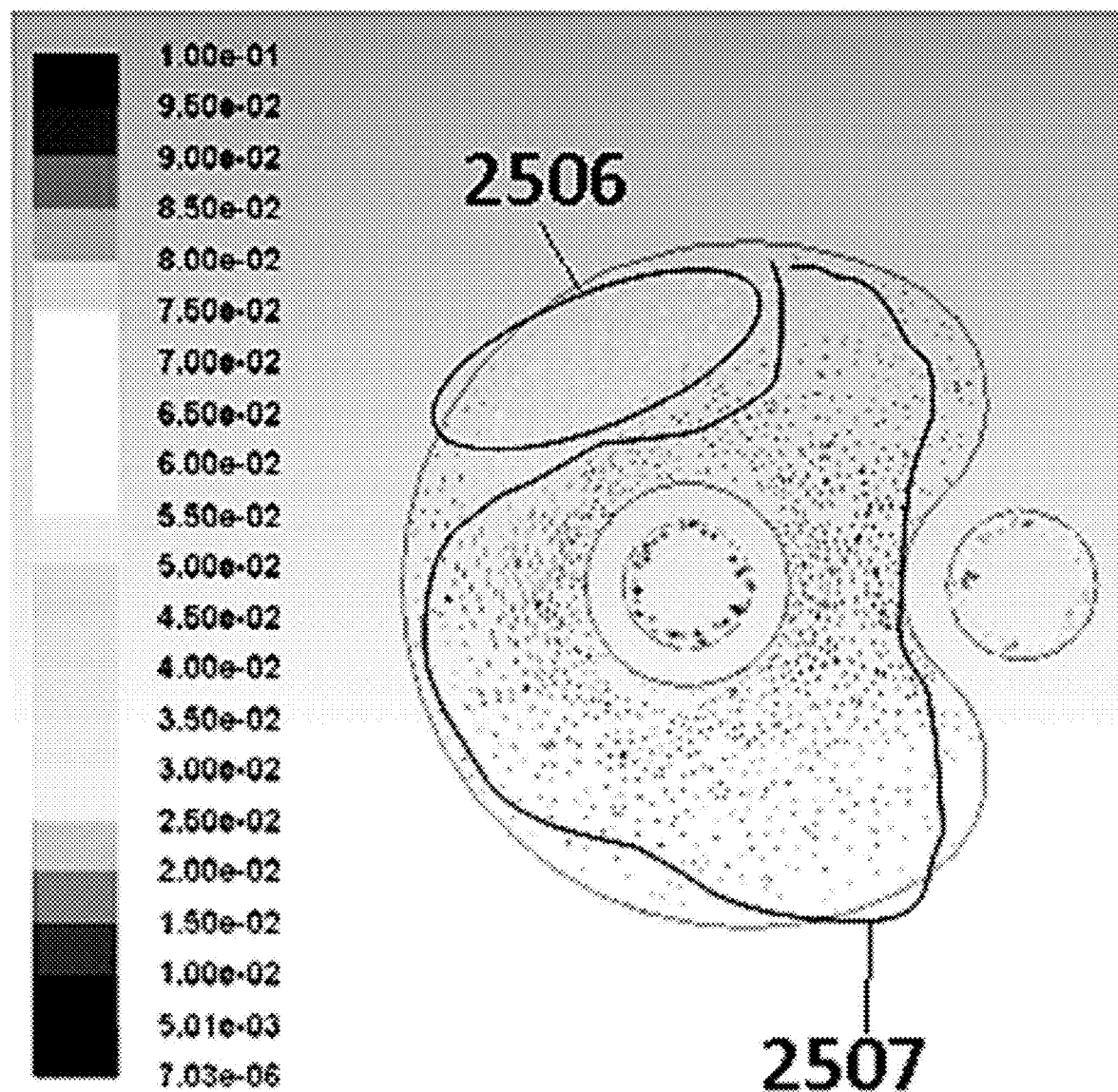

FIGS. 25*a-c* show velocity distribution vectors at cross sections of the chamber in the y direction. The filling level used for FIGS. 25*a-c* is 40%, or 0.04 m in a 0.1 m chamber. FIG. 25*a* is the velocity distribution vectors at a height of y=0.04 m, or the fluid-air interface. FIG. 25*b* is the velocity distribution vectors at a height of 0.03 m, and FIG. 25*c* is the velocity distribution vectors at a height of 0.02 m. The legend for FIG. 25*a* transitions from a high velocity flow in red at 3.50 e−02 m/s, orange at 2.89e−02 m/s, yellow at 2.36e−2 m/s, green at 1.67e−02 m/s to light blue at 9.63−03 m/s to a low velocity flow shown in blue at 7.03e−6 m/s. The legend for FIGS. 25*b-c* transitions from a high velocity flow in red at 1.00 e−01 m/s, orange at 8.25e−02 m/s, yellow at 6.75e−2 m/s, green at 4.75e−02 m/s to light blue at 2.75−02 m/s to a low velocity flow shown in blue at 7.03e−6 m/s. As shown in FIG. 25*a*, the velocity of the fluid is maintained even within the fluid-air interface area. The fluid has a higher velocity in green area 2501 and a lower velocity in blue area 2502. In FIG. 25*b*, the fluid has a high velocity in yellow area 2504, a lower velocity in green area 2503, and a lower velocity in blue area 2505. In FIG. 25*c*, the fluid has a higher velocity in green area 2506, and a lower velocity in blue area 2507. As shown in each of FIGS. 25*a-c*, there are no observable stagnant flow areas at any height.

Figure 26A:
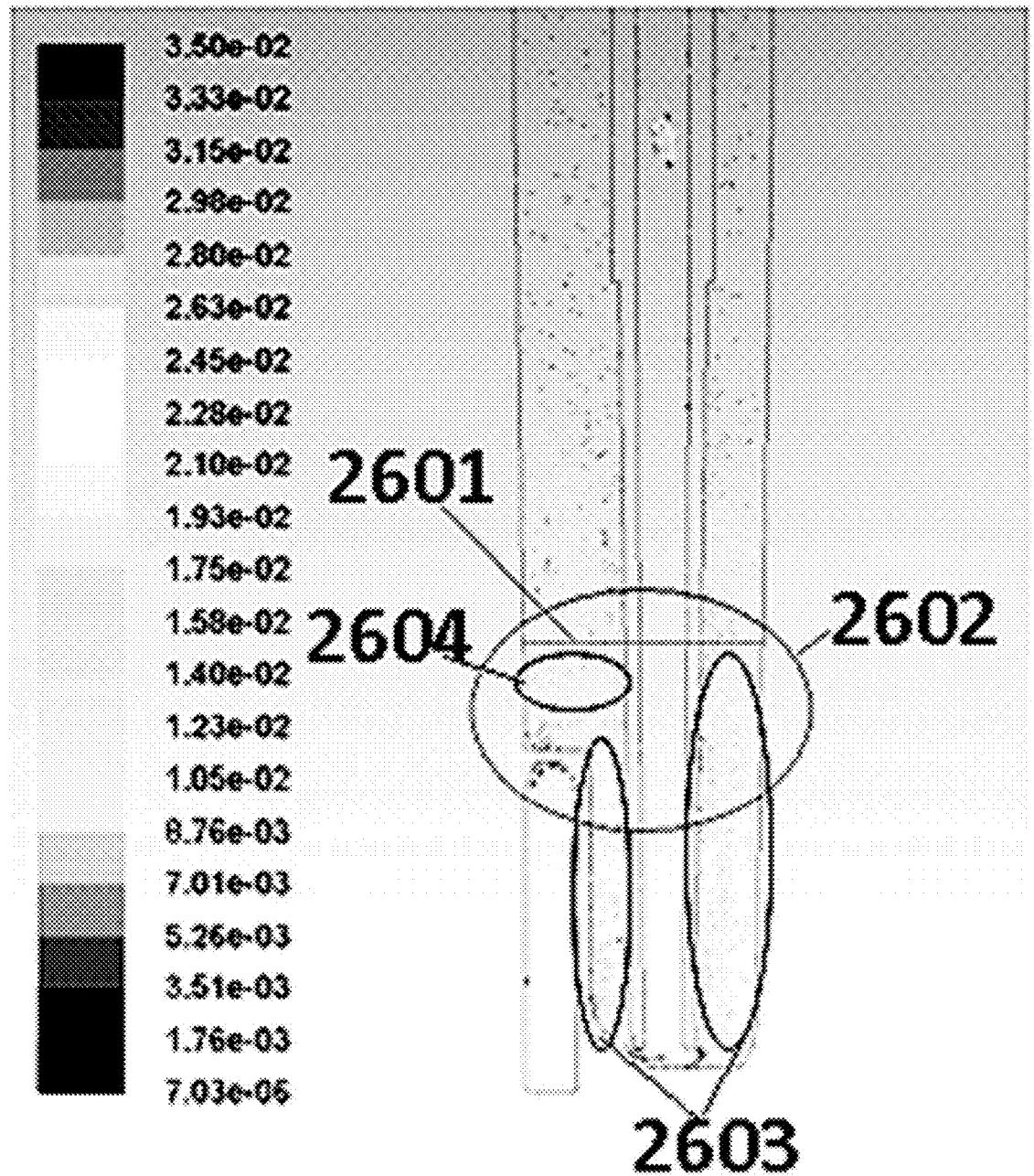
FIGS. 26a-26b show z-section views the velocity distribution vectors with a 40% filling level and an inlet velocity of 0.104 m/s.
Figure 26B:
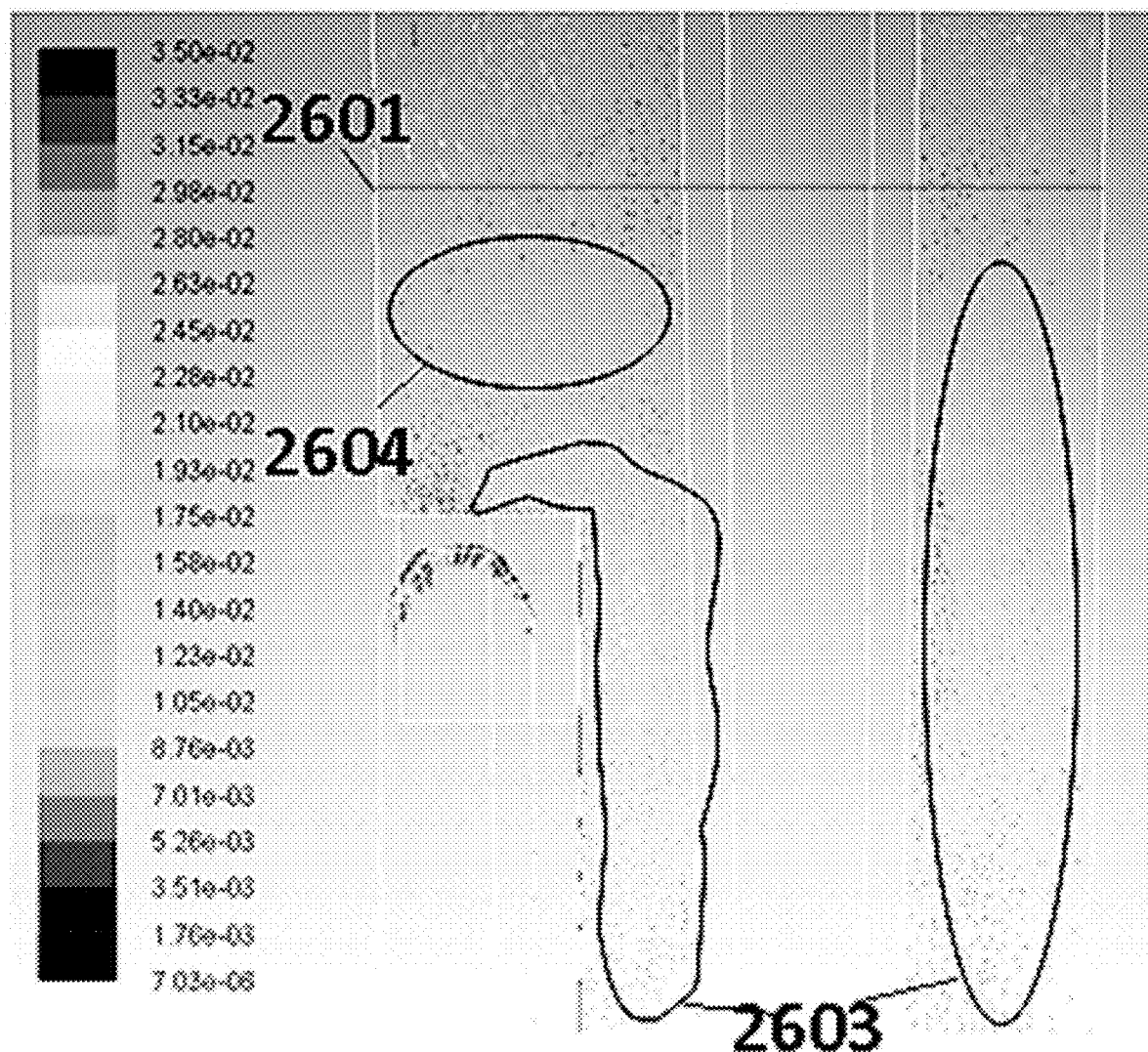

FIG. 26*a* illustrates velocity distribution vectors in a z-cross section of the chamber within a plane at z=0, or a symmetry plane. The line denoted 2601 is the filling level used in the diagram, and set at 40%. FIG. 26*b* is a close-up view of the area labeled 2602 in FIG. 22*a*. The legend for FIGS. 26*a-b* transitions from a high velocity flow in red at 3.50 e−02 m/s, orange at 2.71e−02 m/s, yellow at 2.36e−2 m/s, green at 1.66e−02 m/s to light blue at 7.89−03 m/s to a low velocity flow shown in blue at 7.03e−6 m/s. As illustrated in FIGS. 26*a-b*, fluid enters the air capture chamber and travels downward to the draw tube in green area 2603. The fluid has a lower velocity in blue area 2604. There are no observable stagnant flow areas in the section views.

Figure 27A:
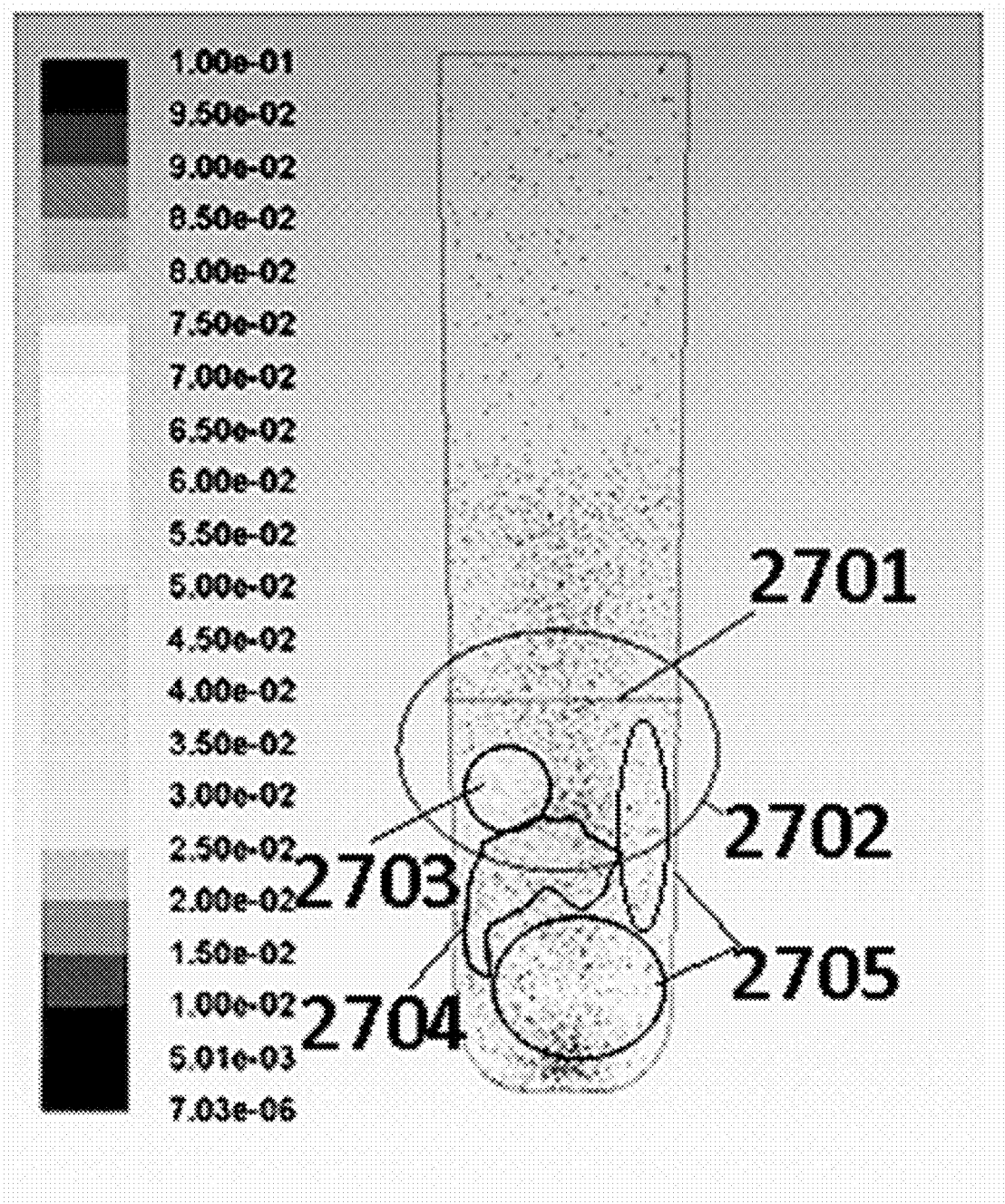
FIGS. 27a-27b show x-section views the velocity distribution vectors with a 40% filling level and an inlet velocity of 0.104 m/s.
Figure 27B:
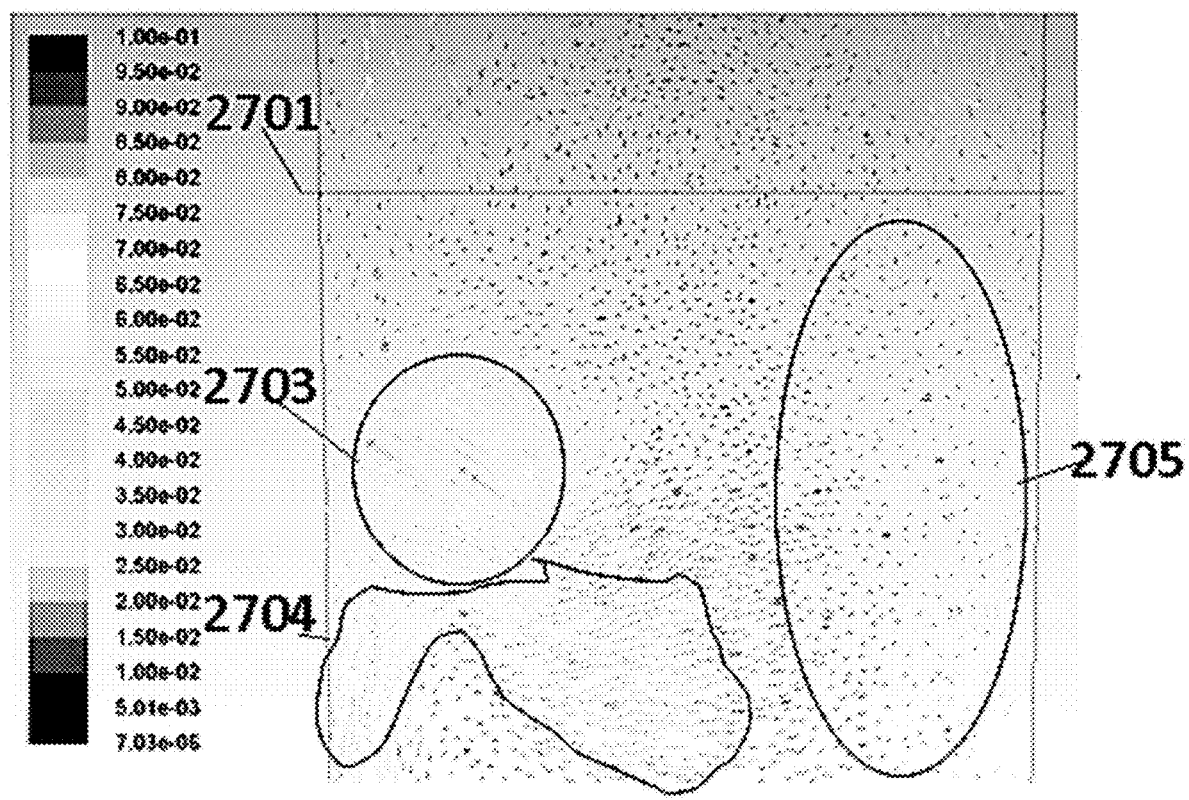

FIG. 27*a* shows velocity distribution vectors in a cross section of the chamber in the x-direction at x=0. The filling level in FIG. 27 is shown as line 2701. FIG. 27*b* is a close up view of the area in the circle 2702 of FIG. 27*a*. The legend for FIGS. 27*a-b* transitions from a high velocity flow in red at 1.00 e–01 m/s, orange at 7.75e–02 m/s, yellow at 6.75e–2 m/s, green at 4.25e–02 m/s to light blue at 1.75–02 m/s to a low velocity flow shown in blue at 7.03e–6 m/s. The fluid has a high velocity in red area 2703, a lower velocity in light blue area 2704, and a lower velocity in blue area 2705. As illustrated in FIGS. 27*a-b,* there are no observable stagnant flow areas in the section views.

Figure 28A:
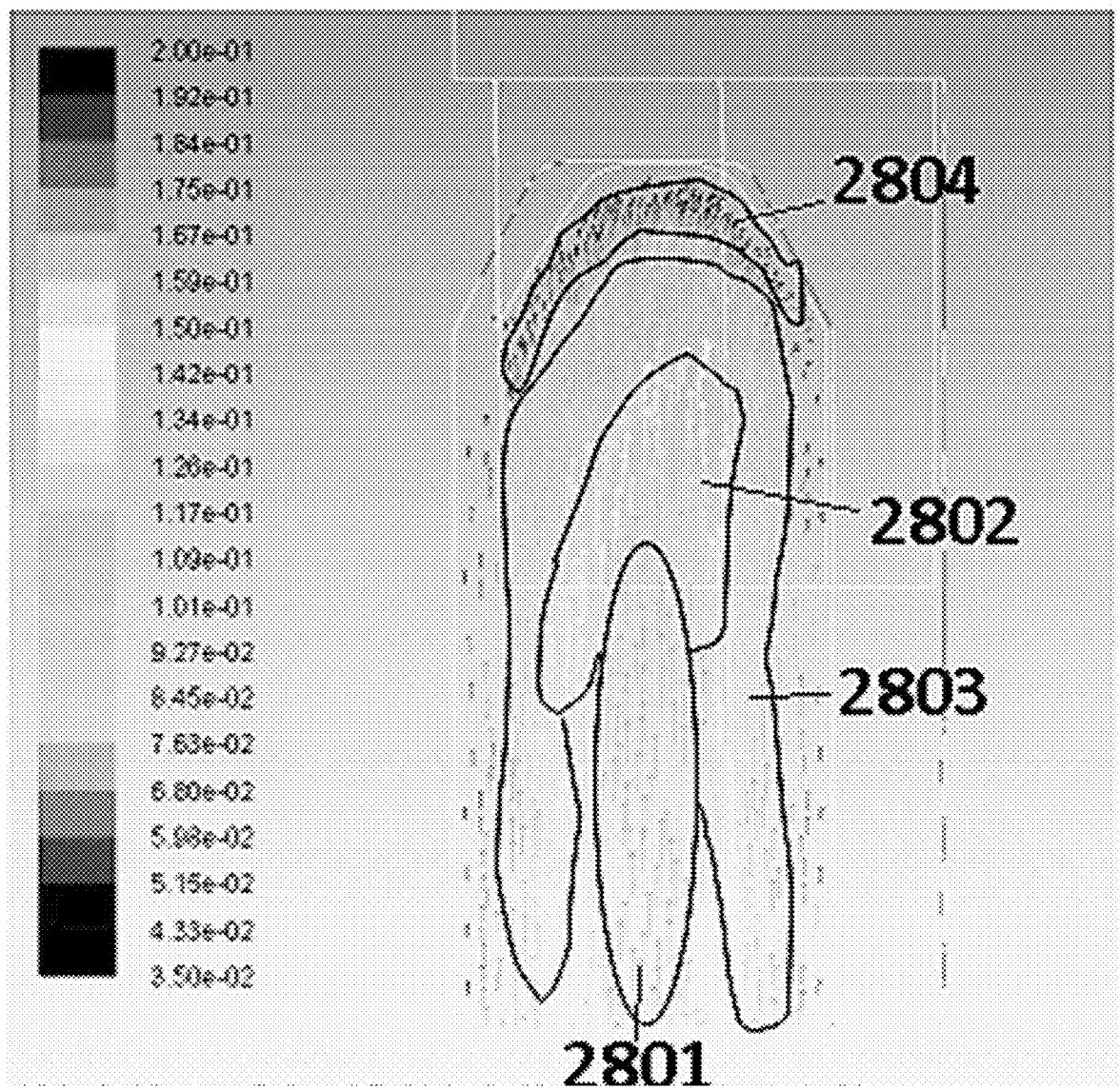
FIGS. 28a-28b show velocity distribution vectors near the inlet and outlet ports with a 40% filling level and an inlet velocity of 0.104 m/s.
Figure 28B:
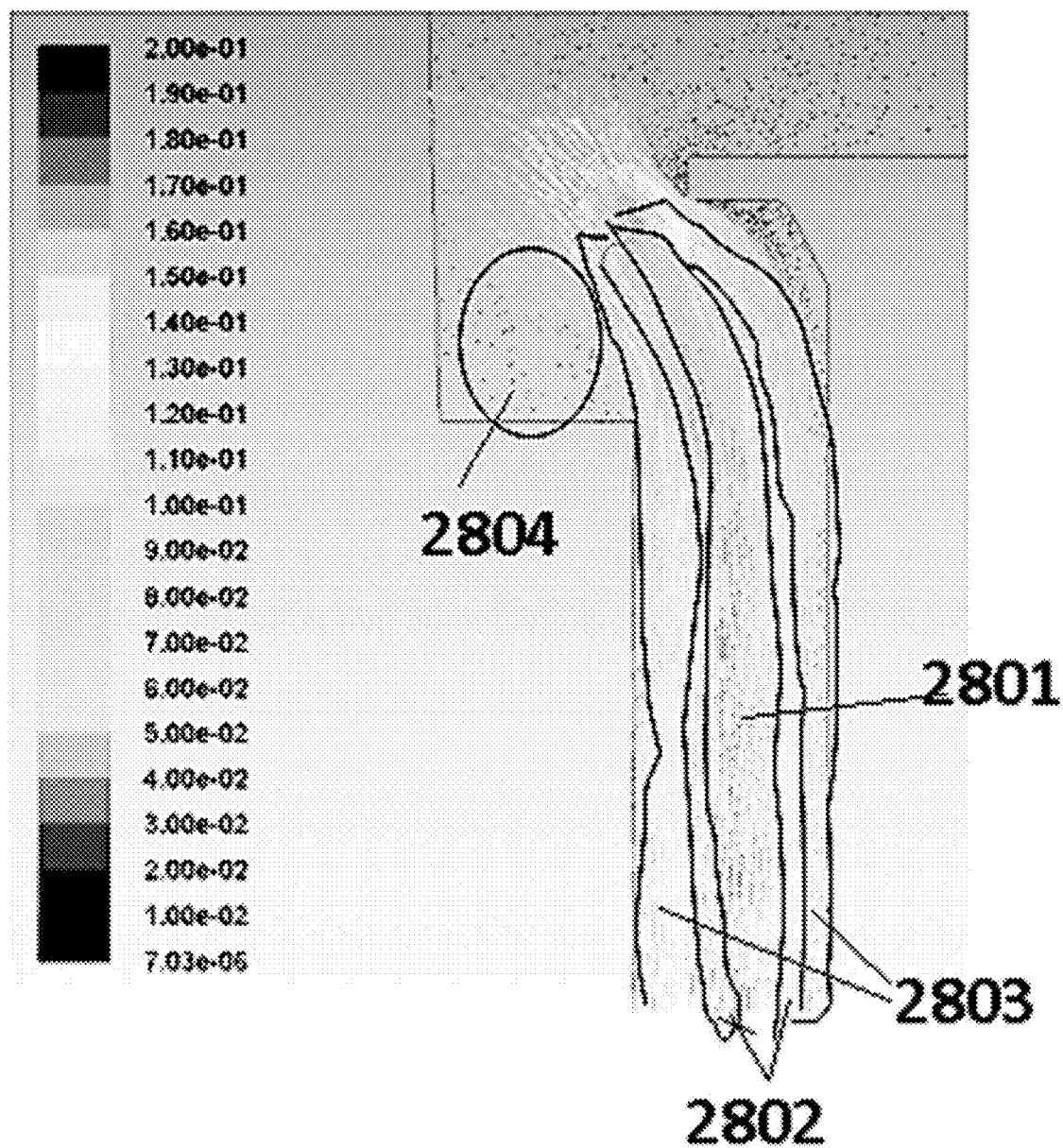

FIG. 28*a* shows velocity distribution vectors at the fluid inlet from a left-side view, while FIG. 28*b* shows velocity distribution vectors at the fluid inlet from a right side view. The legend for FIG. 28*a* transitions from a high velocity flow in red at 2.00 e–01 m/s, orange at 1.72e–01 m/s, yellow at 1.46e–01 m/s, green at 1.13e–01 m/s to light blue at 7.22–02 m/s to a low velocity flow shown in blue at 3.50e–2 m/s. The legend for FIG. 28*b* transitions from a high velocity flow in red at 2.00 e–01 m/s, orange at 1.65e–01 m/s, yellow at 1.35e–01 m/s, green at 9.50e–02 m/s to light blue at 4.50–02 m/s to a low velocity flow shown in blue at 7.03e–6 m/s. The fluid has a high velocity in red area 2801, lower velocity in yellow area 2802, still lower velocity in green area 2803, and a low velocity in blue area 2804. As illustrated in FIGS. 28*a-b,* there are no observable stagnant flow areas at the fluid inlet.

Figure 29A:
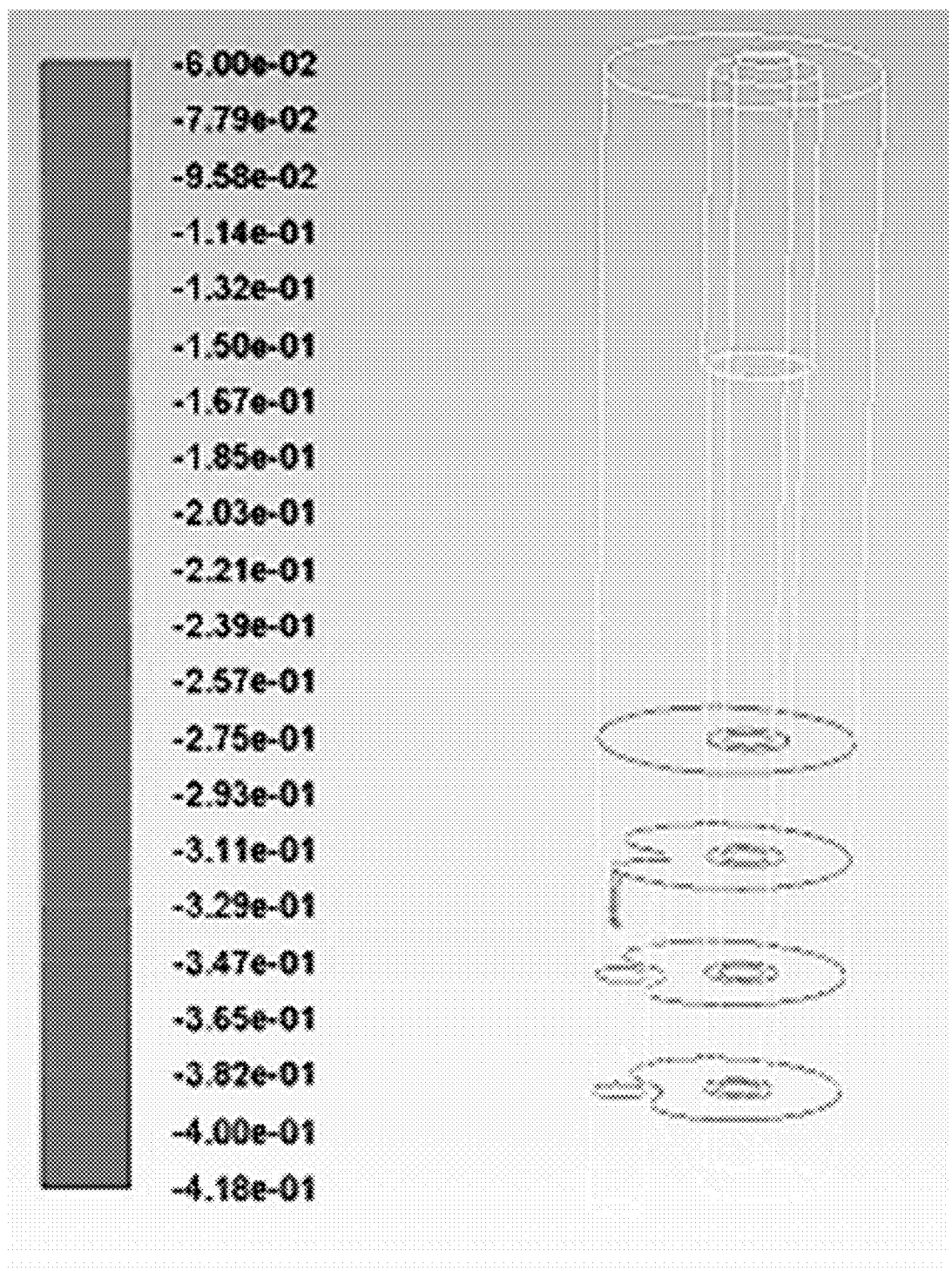
FIGS. 29a-29b show shows velocity distribution vectors in the y-direction with a 40% filling level and an inlet velocity of 0.104 m/s.
Figure 29B:
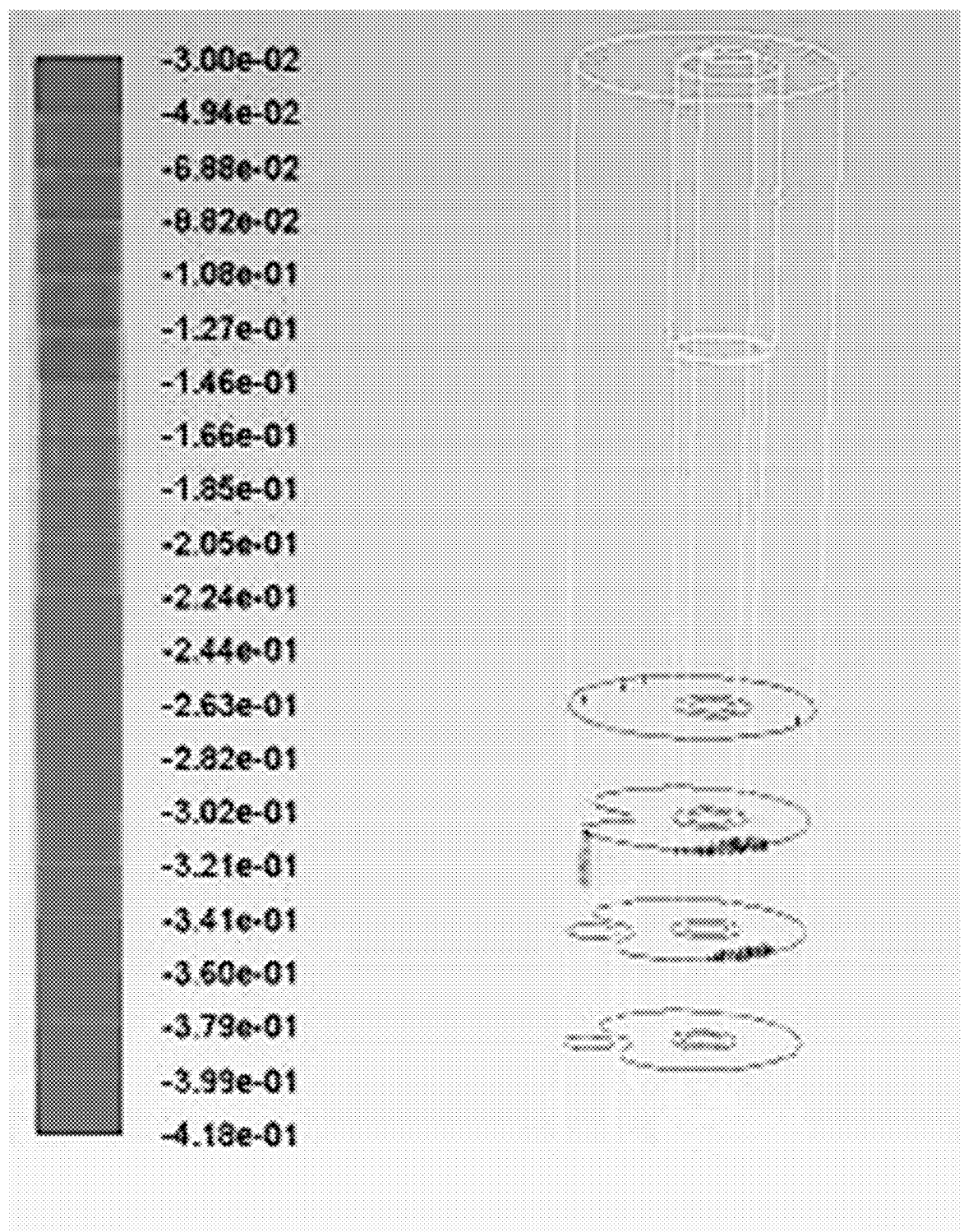

As explained, an important function of the arterial air capture chamber is the ability to capture air bubbles which flow into the chamber. In order to capture air bubbles, the y-direction velocity of the fluid must be maintained at less than 0.06 m/s. FIG. 29*a* shows velocity distribution vectors in the y-direction within multiple section planes with a max velocity scale set at 0.06 m/s. The legend for FIG. 29*a* transitions from a low velocity flow in red at –6.00 e–02 m/s, orange at –1.23e–01 m/s, yellow at –1.76e–01 m/s, green at –2.48e–01 m/s to light blue at –3.38e–01 m/s to a high velocity flow shown in blue at –4.18e–01 m/s. The legend for FIG. 29*b* transitions from a low velocity flow in red at –3.00 e–02 m/s, orange at –9.81e–02 m/s, yellow at –1.56e–01 m/s, green at –2.34e–01 m/s to light blue at –3.09e–01 m/s to a high velocity flow shown in blue at –4.18e–01 m/s. As illustrated in FIG. 29*a,* no velocity vectors within the chamber body are shown, which means that the velocity in y direction is no more than 0.06 m/s. FIG. 29*b* shows the same planes with the max velocity scale set at 0.03 m/s. As shown in FIG. 29*b,* velocities in excess of 0.03 m/s do exist within the chamber. All velocity vectors shown in FIG. 29*b* are in red.

Figure 30A:
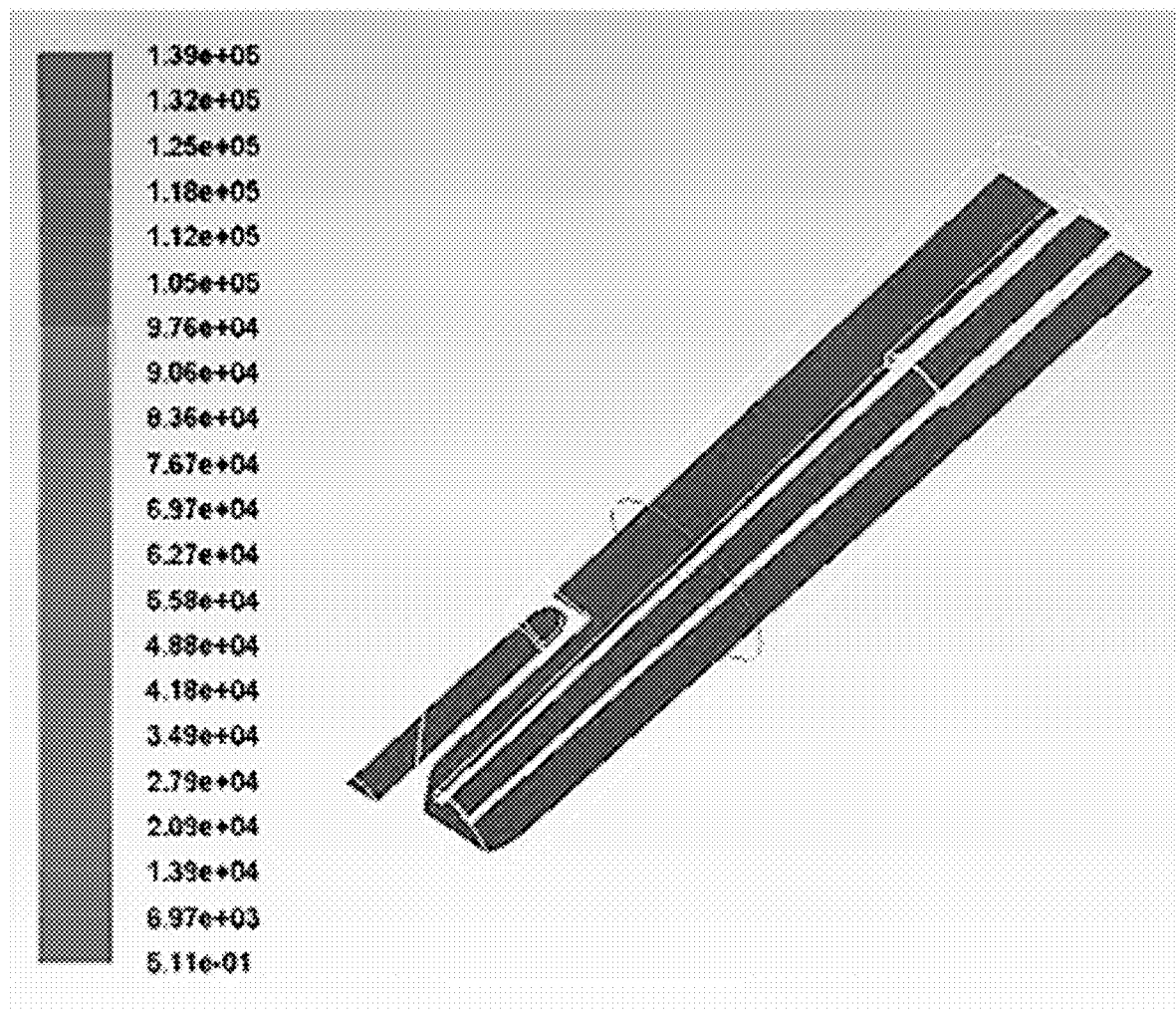
FIGS. 30a-30c show the max shear rate with a 40% filling level and an inlet velocity of 0.104 m/s.
Figure 30B:
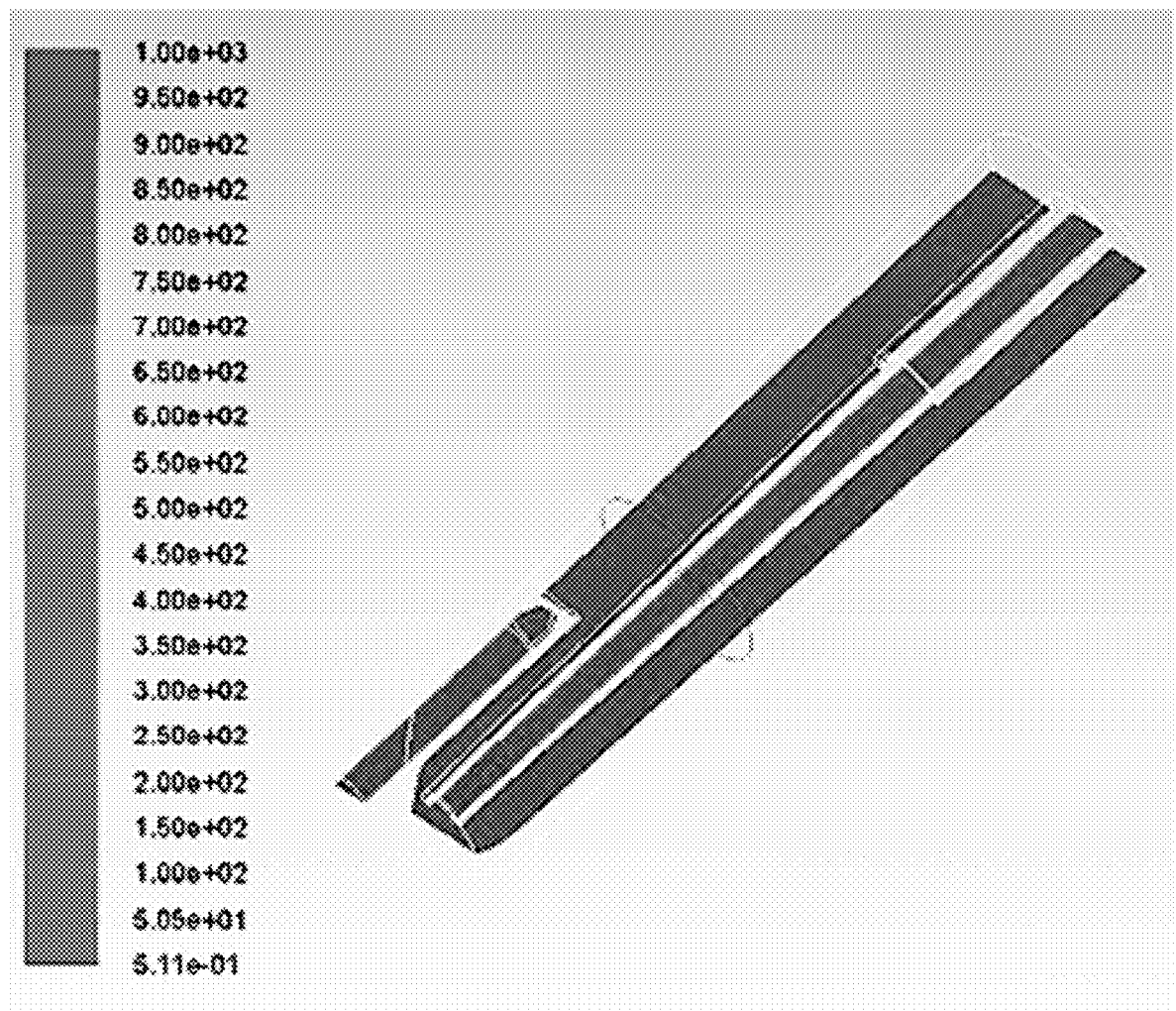
Figure 30C:
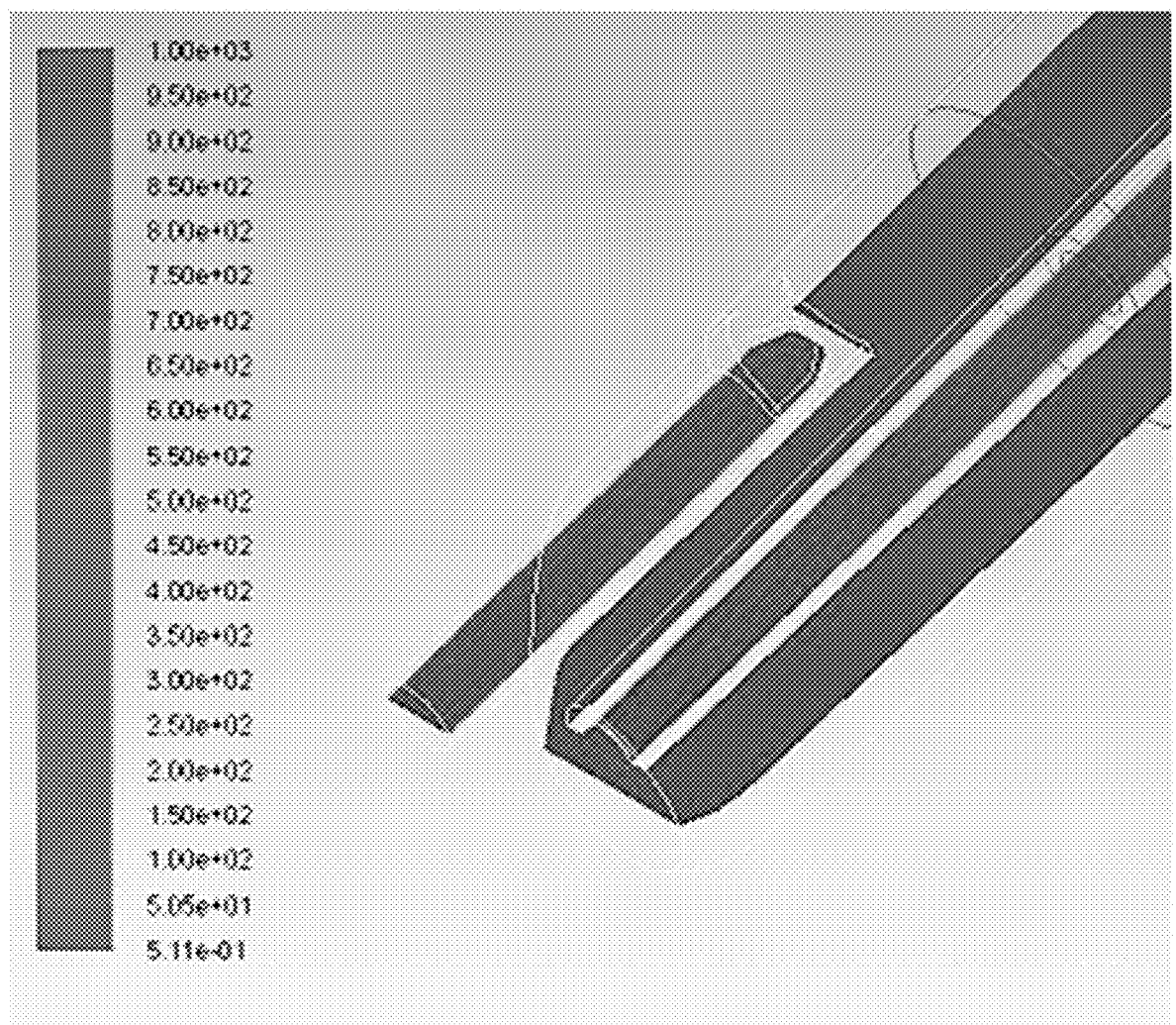

Improper flow conditions, such as high shear stress, can result in dangerous levels of hemolysis. It is important that the air capture chambers used in hemodialysis do not cause dangerously high levels of shear stress. As recommended (ref Kidney Int, Paul et al, 2003), the shear stress thresholds for RBC damage are 4000 dynes/cm$^2$ (400 Pa) short term exposure and 2000 dynes/cm$^2$ (200 Pa) long term exposure. FIG. 30*a-c* illustrate the max shear rate at a plane of z=0 for the air capture chambers illustrated in FIGS. 9*a-b.* In FIG. 30*a,* the threshold shear rate is set at 139,000 1/s or a max shear stress (considering a viscosity of 0.00271 PaS) of 376.7 Pa, less than the threshold in a short term exposure. The legend for FIG. 30*a* transitions from a shear stress in red at 1.39 e+05 1/s, orange at 1.25e+05 1/s, yellow at 9.41e+04 1/s, green at 6.62e+04 1/s to light blue at 3.84e+04 1/s to a low shear stress shown in blue at 5.11e–1 1/s. The legend for FIGS. 30*b-c* transitions from a shear stress in red at 1.00 e+03 1/s, orange at 8.25e+02 1/s, yellow at 6.75e+02 1/s, green at 4.25e+02 1/s to light blue at 2.25e+02 1/s to a low shear stress shown in blue at 5.11e–1 1/s. As shown in FIG. 30*a,* there are no areas with a shear stress of greater than the 400 Pa for short term exposure. FIG. 30*b* shows the same chamber with the max shear stress of 100,000 1/s. As shown in FIG. 30*b,* the only areas with a shear stress of greater than 100,000 1/s are near the inlet and outlet ports, shown in green. FIG. 30*c* is a close up of the inlet and outlet areas in FIG. 30*b.* As noted, that max shear stress concentrates in the fluid inlet port and outlet port area. In the fluid inlet port and outlet port areas, blood exposure time is short due to high flow existing. As such, the chambers depicted are safe for blood health in term of the impact of shear stress when used with a 40% filling level and a flow rate of 100 mL/min.

Figure 31:
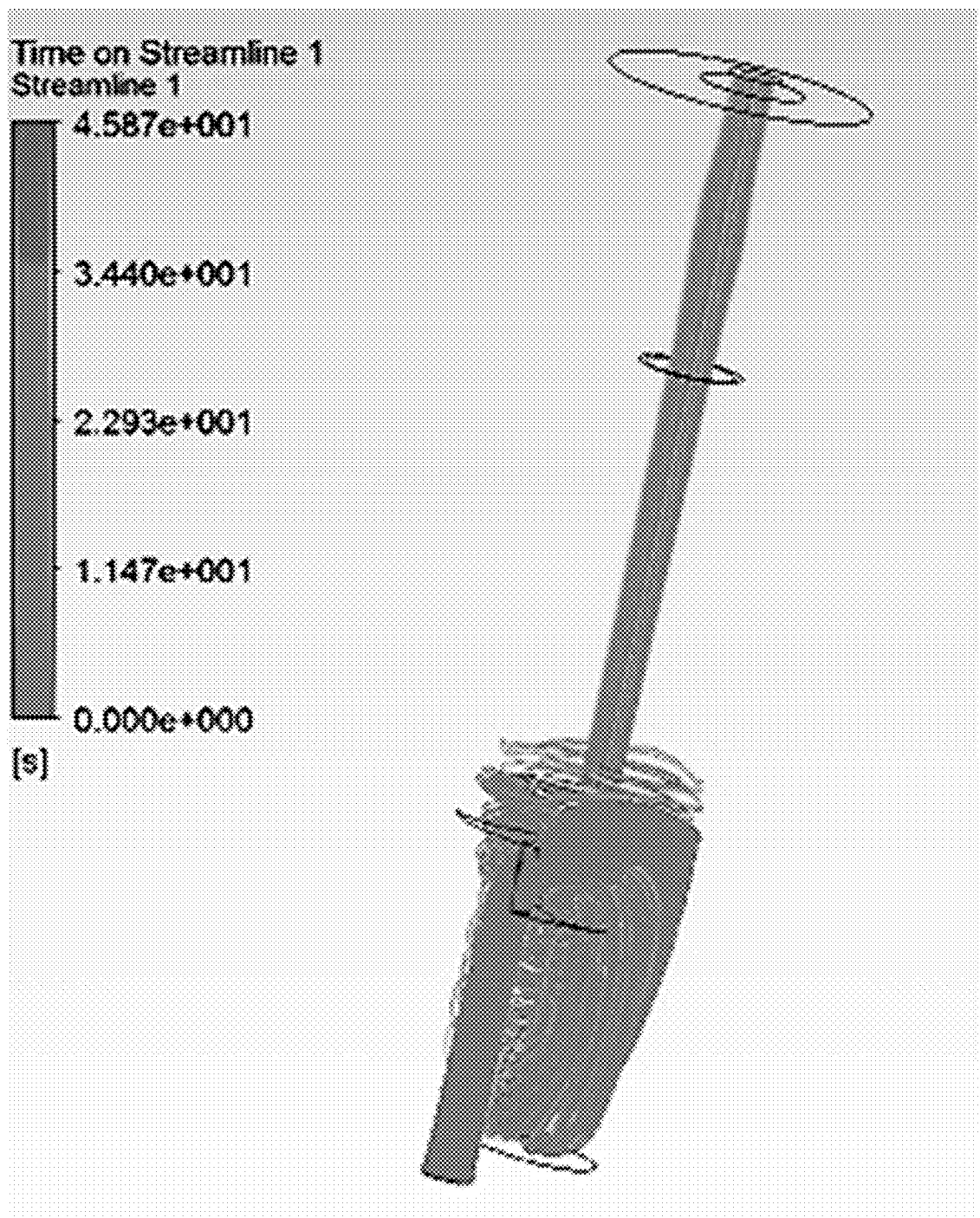
FIG. 31 shows residence time distributions with a 40% filling level and an inlet velocity of 0.104 m/s.

FIG. 31 illustrates residence time distributions at a flow rate of 100 mL/min and a filling level of 40%. As shown in FIG. 31, the maximum residence time for fluid is about 46 seconds.

Experiment 11

Figure 32A:
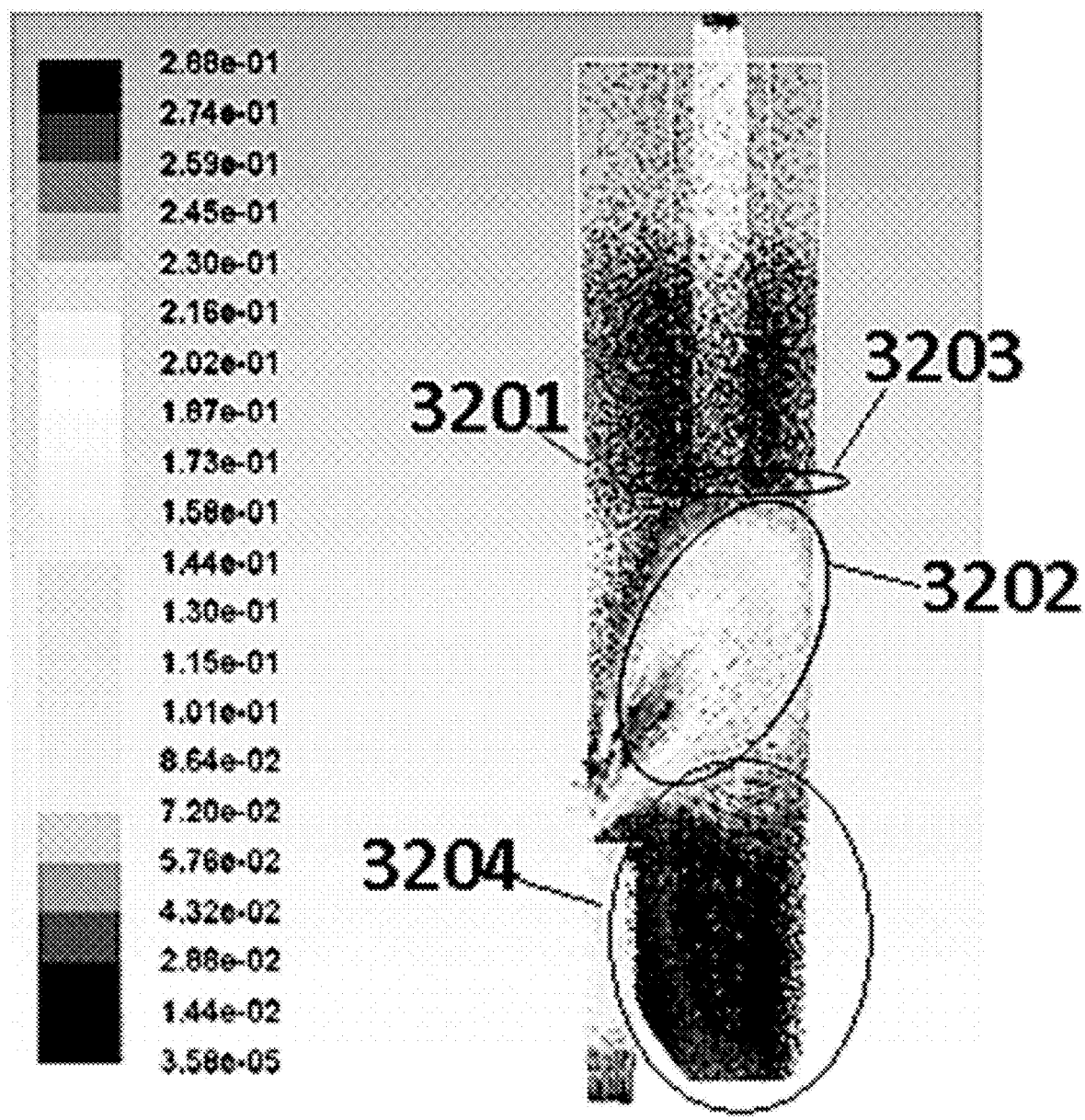
FIGS. 32a-32d show velocity distribution vectors with a 60% filling level and an inlet velocity of 0.288 m/s.
Figure 32B:
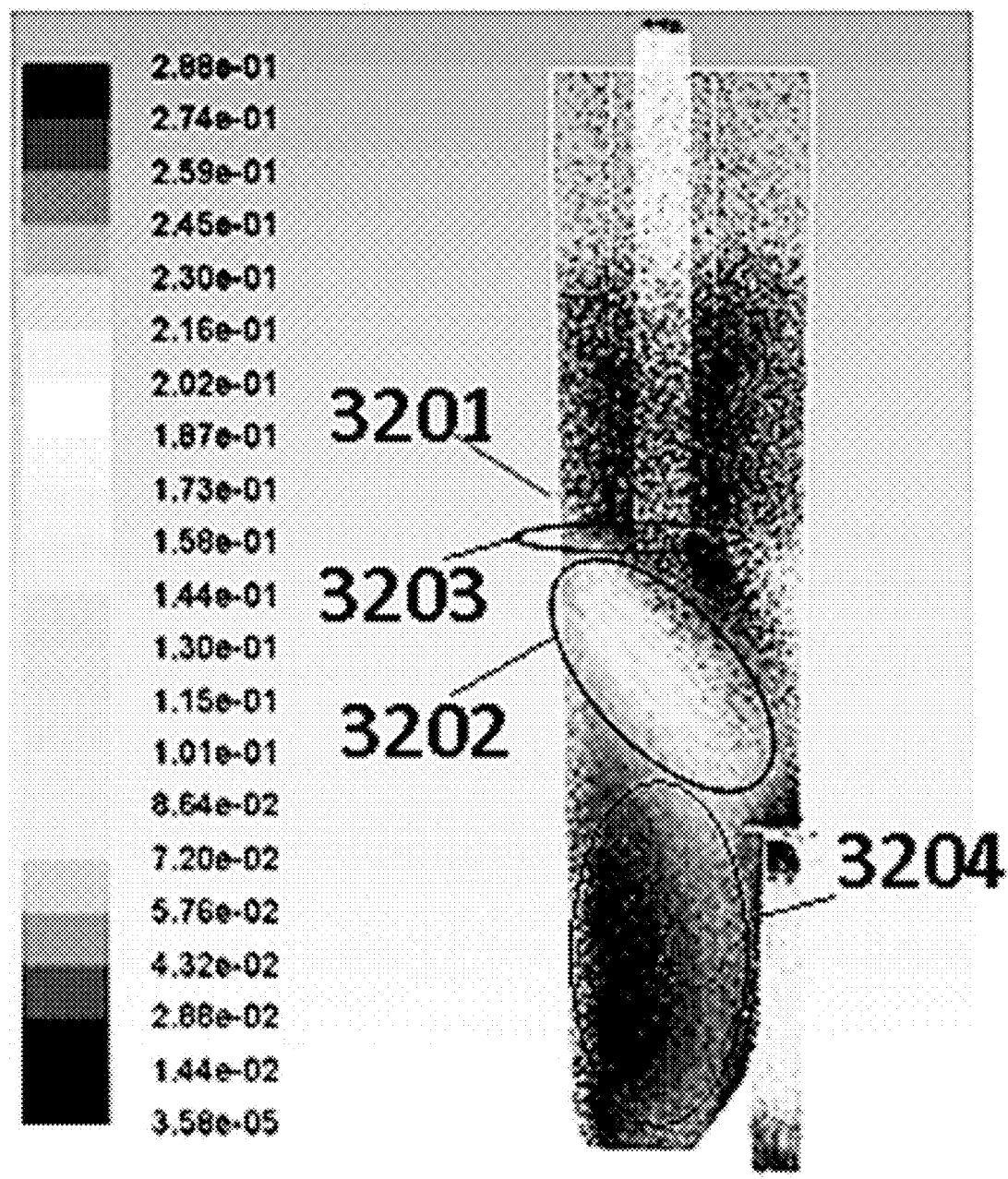
Figure 32C:
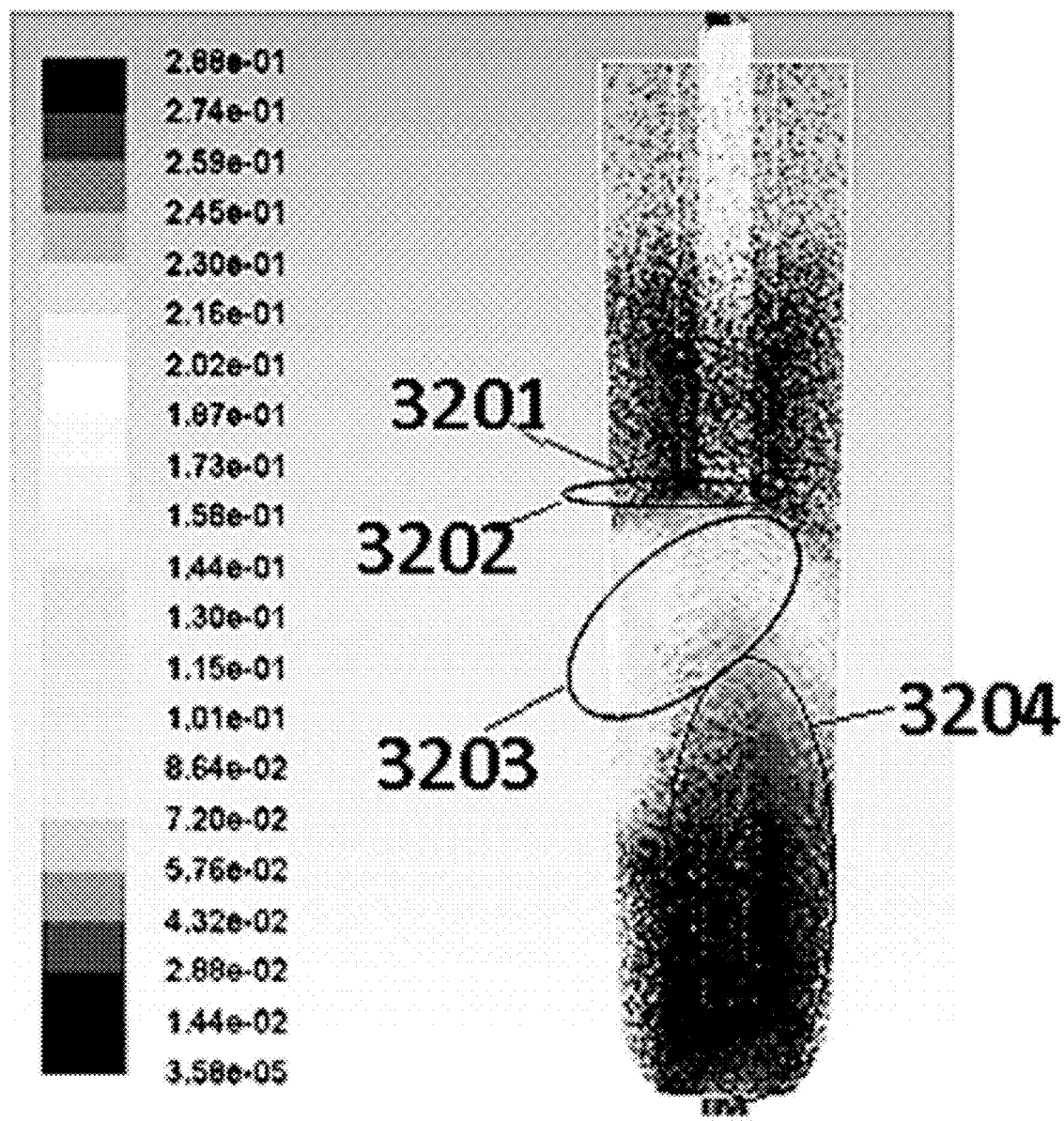
Figure 32D:
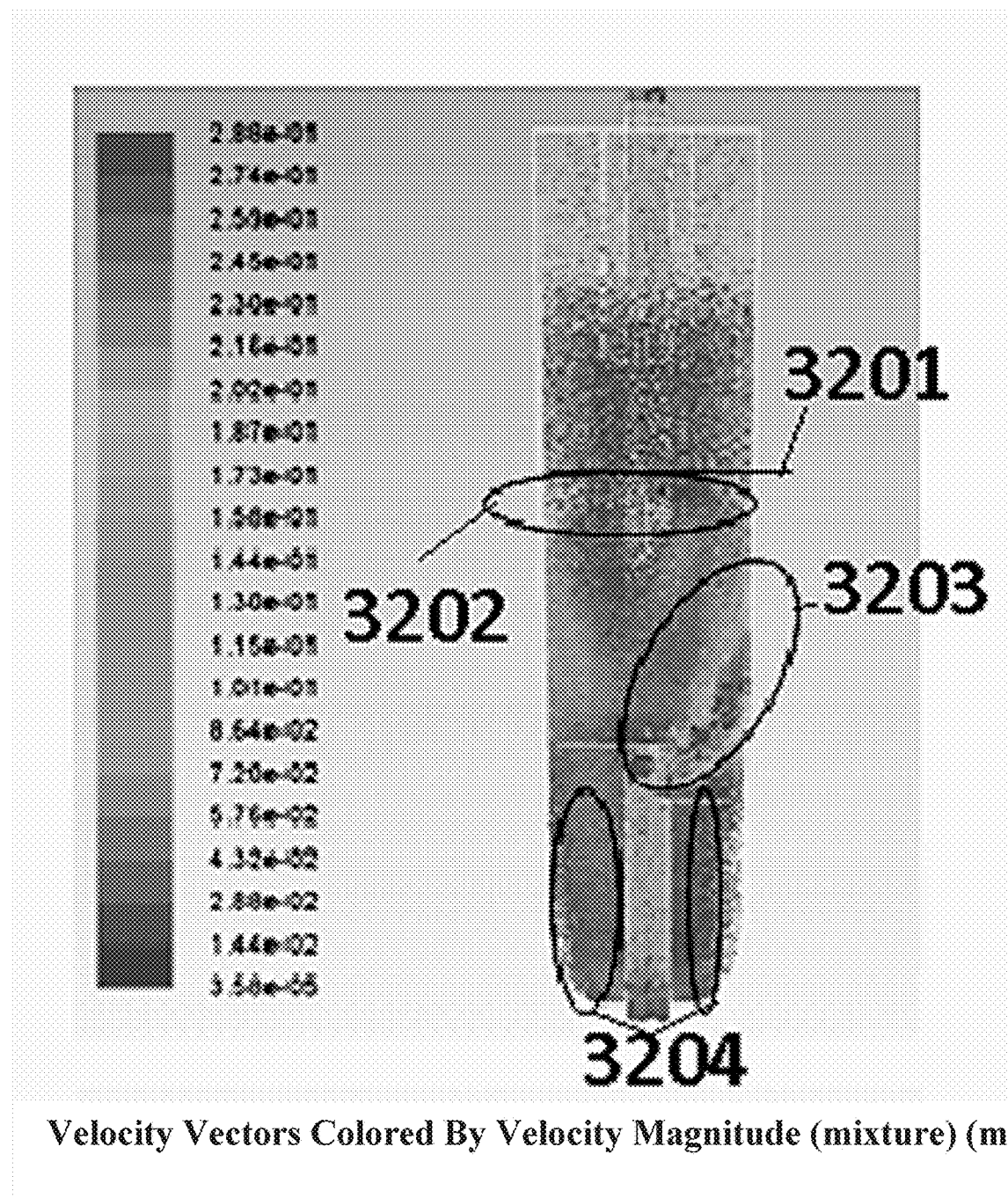

FIG. 32*a* is a font view of velocity distribution vectors of the arterial air capture chamber shown in FIG. 9 with a 60% filling level and an inlet velocity of 0.288 m/s, or 275 mL/min. FIG. 32*b* is a back view of the same chamber with the same filling level and inlet velocity. FIG. 32*c* is a right view of the chamber, and FIG. 32*d* is a left view of the chamber with the same filling level and inlet velocity. The line labeled as 3201 in each of FIGS. 32*a-d* is the filling level used in the computational flow diagrams. The legend for FIGS. 32*a-d* transitions from a high velocity flow in red at 2.88 e–01 m/s, orange at 2.37e–01 m/s, yellow at 1.95e–01 m/s, green at 1.38e–01 m/s to light blue at 7.92–02 m/s to a low velocity flow shown in blue at 3.58e–05 m/s.

The fluid enters the air capture chamber in high velocity massive flow area 3202, shown in red in FIGS. 32*a* and 32*d,* and shown in light blue in FIGS. 32*b* and 32*c.* A blue transit area 3203 exists between the massive flow area 3202 and the fluid air interface at level 3201. A lower velocity area also exists near the bottom of the air capture chamber in blue area 3204. As illustrated in FIGS. 32*a-d,* there is a transit area 3203 between the massive flow area 3202 at the outlet of the fluid inlet port and the fluid-air interface, however the transit area is very small. In the transit area 3203, the velocity is low relative to the massive flow at the outlet of the fluid inlet port. In the transit area 3203, the velocity is strong, but low relative to the massive flow area 3202. As such, blood in the transit area can be brought down into the outlet tubing very quickly.

Figure 33A:
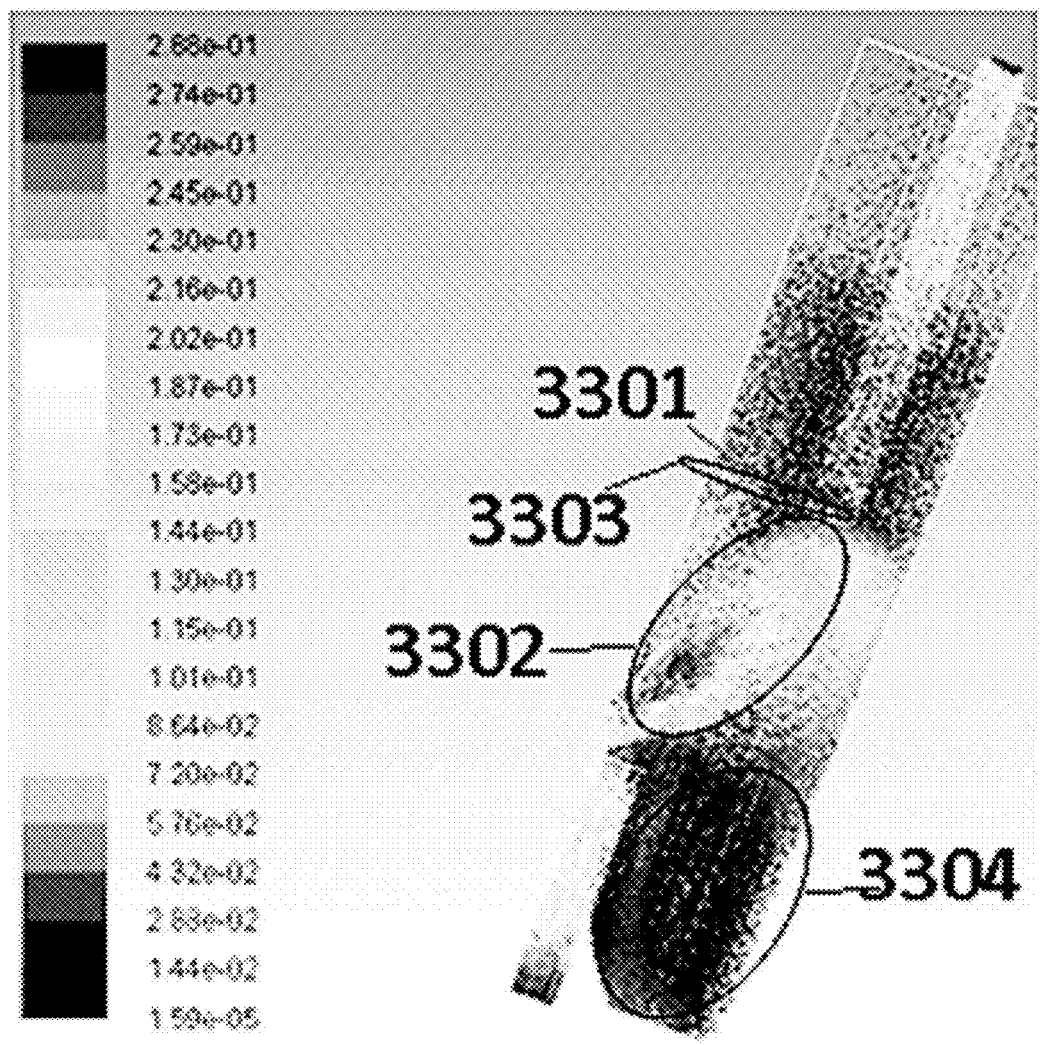
FIGS. 33a-33b show velocity distribution vectors with a 55% filling level and an inlet velocity of 0.288 m/s.
Figure 33B:
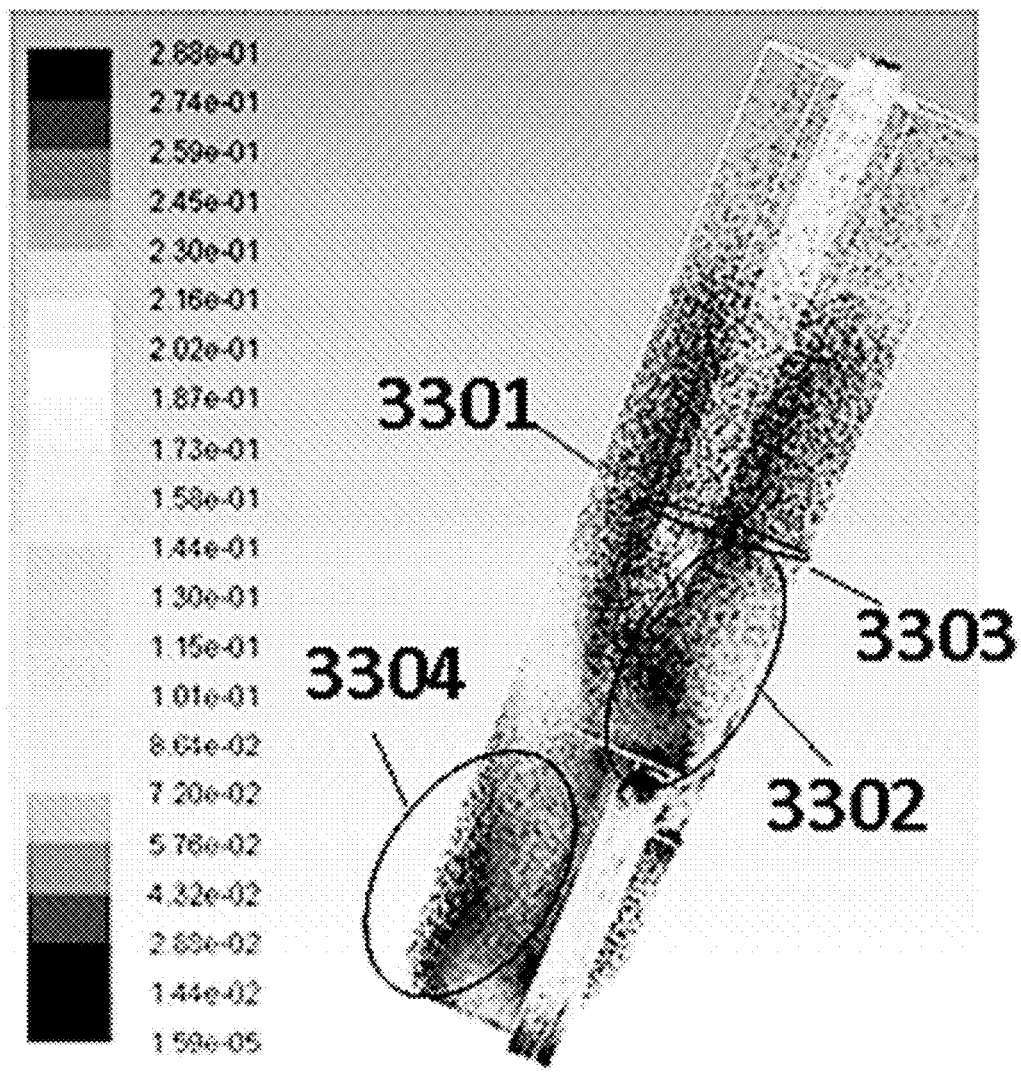

FIGS. 33*a* and 33*b* show velocity distribution vectors for the same 275 mL/min inlet flow rate, but with a 55% filling level. The fluid-air interface is shown as line 3301. The legend for FIGS. 33*a-b* transitions from a high velocity flow in red at 2.88 e–01 m/s, orange at 2.37e–01 m/s, yellow at 1.95e–01 m/s, green at 1.38e–01 m/s to light blue at 7.92–02 m/s to a low velocity flow shown in blue at 1.59e–05 m/s. A blue transit area 3303 exits between red massive flow area 3302 and the fluid air interface 3301. A low velocity blue area 3304 exists at the bottom of the air capture chamber. With a 55% filling level, the transit area that exists between the fluid inlet port and the interface is very small. As such, a filling level of between about 55-60% with a flow rate of 275 mL/min is recommended. In each of FIGS. 34-40, a filling level of 60% and an inlet flow rate of 275 mL/min are used.

Figure 34A:
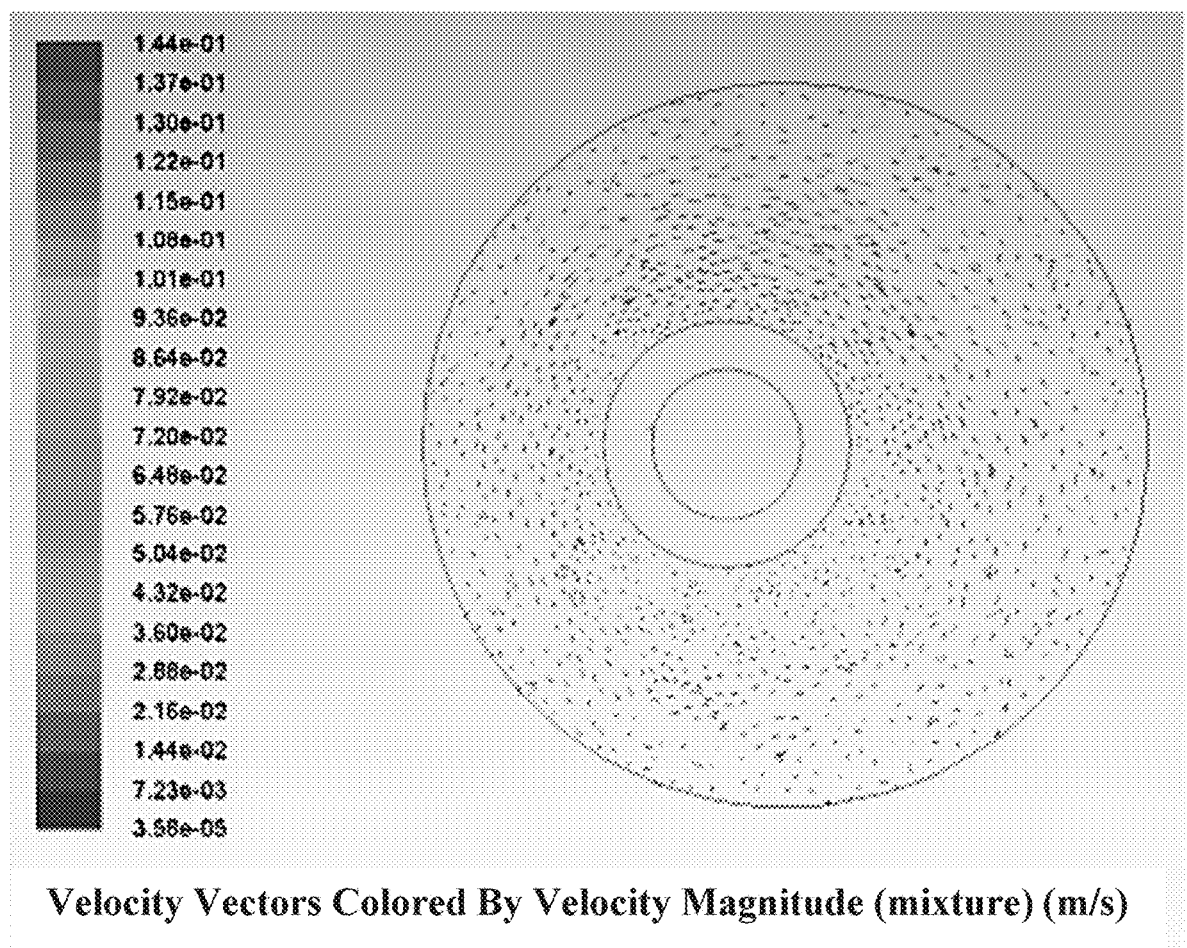
FIGS. 34a-34c show y-section views the velocity distribution vectors with a 60% filling level and an inlet velocity of 0.288 m/s.
Figure 34B:
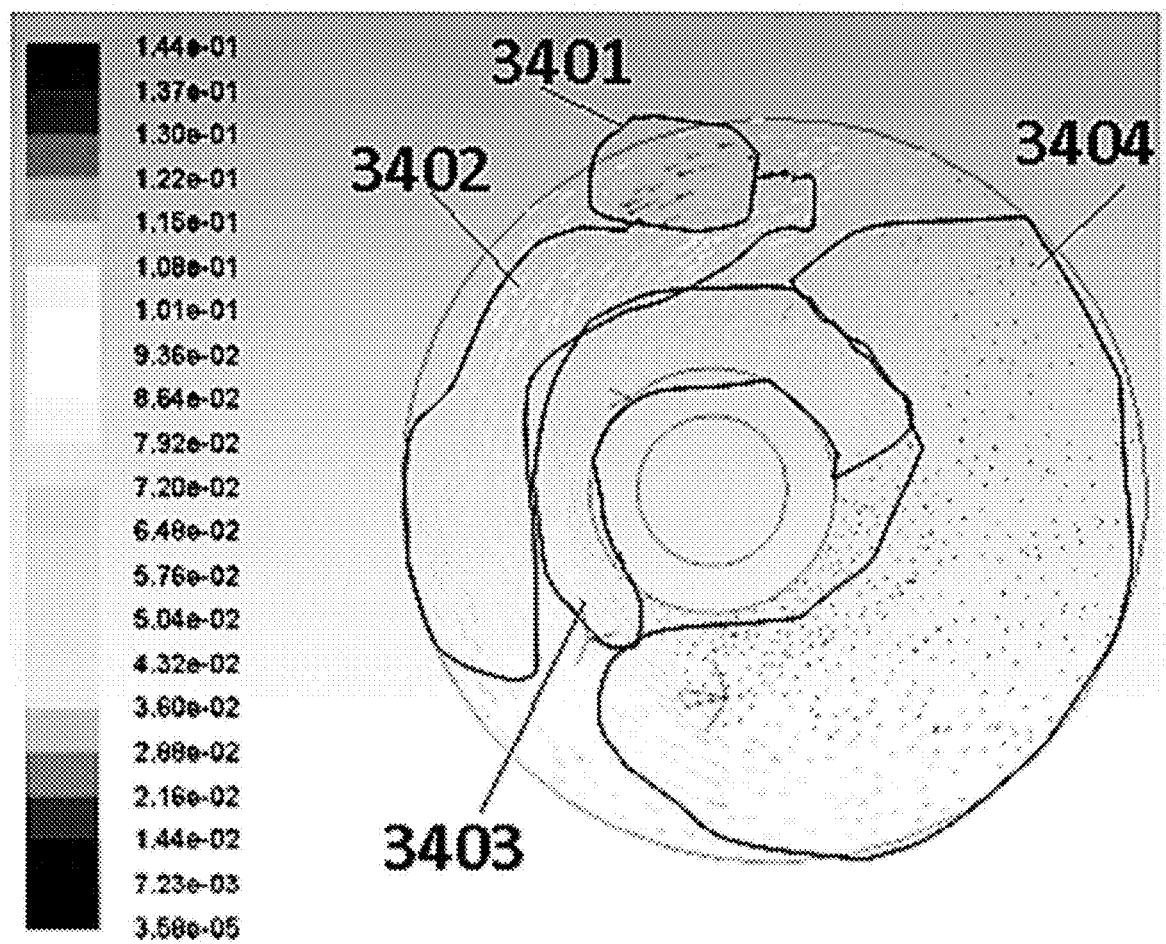
Figure 34C:
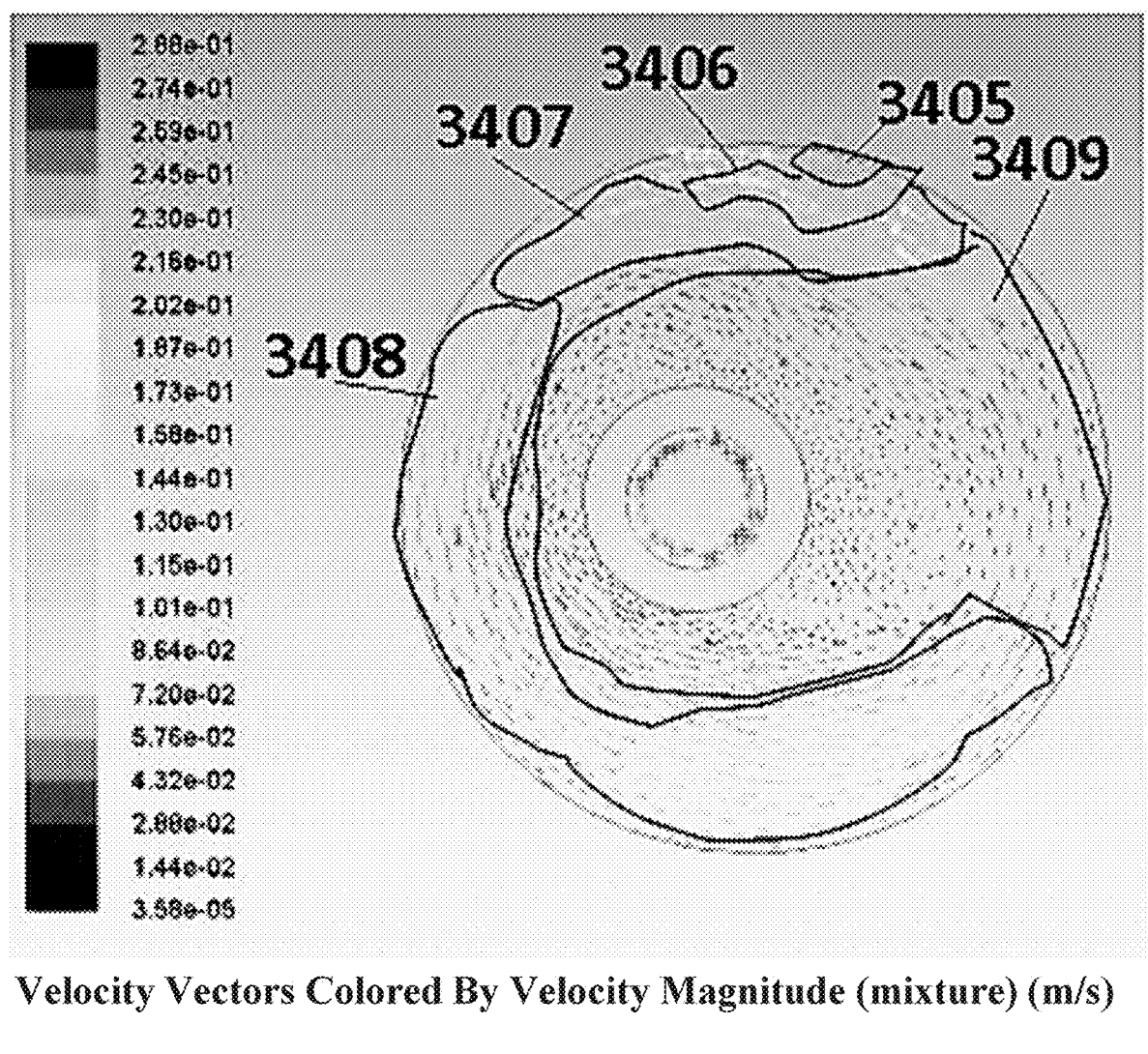

FIGS. 34*a-c* show velocity distribution vectors at cross sections of the chamber in the y direction. The filling level used for FIGS. 34*a-c* is 60%, or 0.06 m in a 0.1 m chamber. FIG. 34*a* is the velocity distribution vectors at a height of y=0.06 m, or the fluid-air interface. FIG. 34*b* is the velocity distribution vectors at a height of 0.05 m, and FIG. 34*c* is the velocity distribution vectors at a height of 0.04 m. The legend for FIGS. 34a-b transitions from a high velocity flow in red at 1.44 e−01 m/s, orange at 1.18e−01 m/s, yellow at 9.68e−02 m/s, green at 6.84e−02 m/s to light blue at 3.96e−02 m/s to a low velocity flow shown in blue at 3.58e−05 m/s. The legend for FIG. 34c transitions from a high velocity flow in red at 2.88 e−01 m/s, orange at 2.37e−01 m/s, yellow at 1.95e−01 m/s, green at 1.22e−01 m/s to light blue at 6.48e−02 m/s to a low velocity flow shown in blue at 3.58e−05 m/s. As shown in FIG. 34a, the velocity of the fluid is maintained even within the fluid-air interface area, with the entire velocity vector diagram shown in blue. In FIG. 34b, the fluid has a high velocity in red area 3401, lower velocity in orange area 3402, still lower velocity in green area 3403, and a low velocity in blue area 3404. In FIG. 34c, the fluid has a high velocity in red area 3405, lower velocity in yellow area 3406, still lower velocity in green area 3407, and light blue area 3408, and a low velocity in blue area 3409. As shown in each of FIGS. 34a-c, there are no observable stagnant flow areas at any height.

Figure 35A:
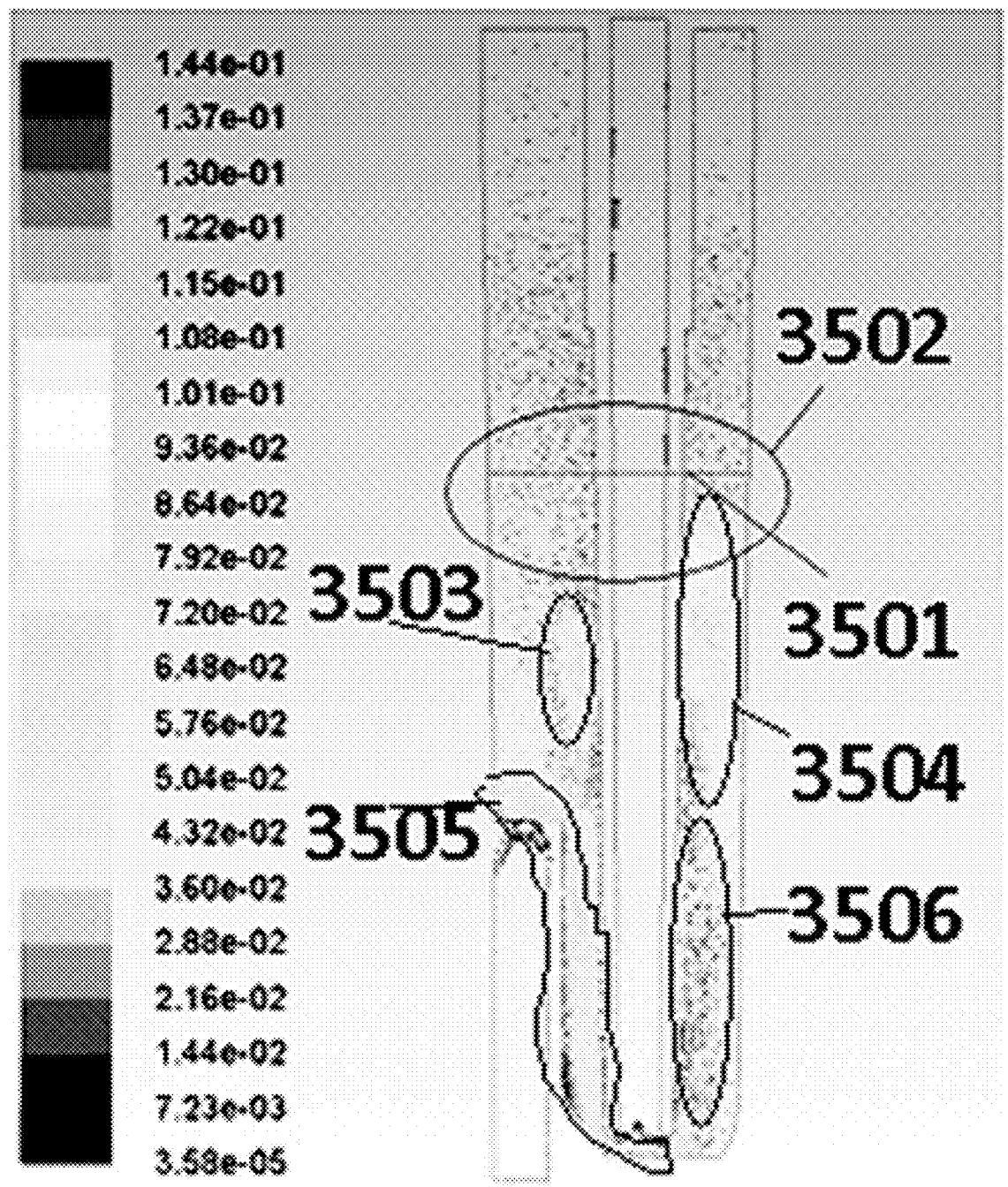
FIGS. 35a-35b show z-section views the velocity distribution vectors with a 60% filling level and an inlet velocity of 0.288 m/s.
Figure 35B:
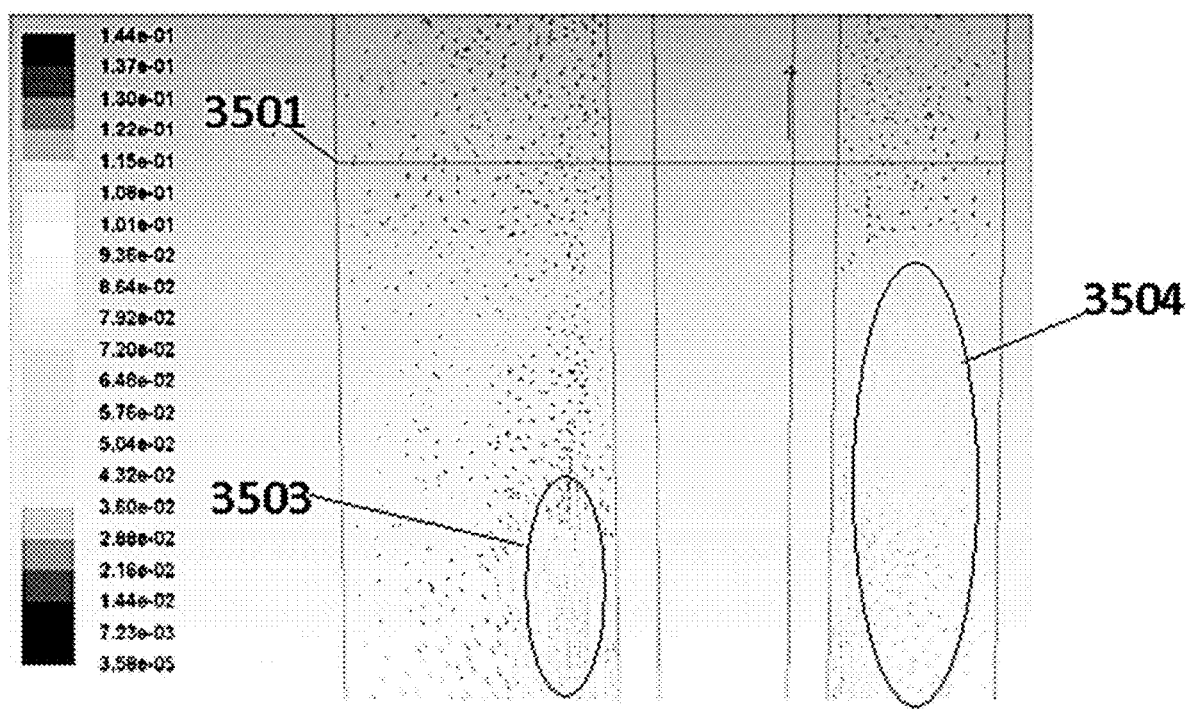

FIG. 35a illustrates velocity distribution vectors in a z-cross section of the chamber within a plane at z=0, or a symmetry plane. The line denoted 3501 is the filling level used in the diagram, and set at 60%. FIG. 35b is a close-up view of the area labeled 3502 in FIG. 35a. The legend for FIGS. 35a-b transitions from a high velocity flow in red at 1.44 e−01 m/s, orange at 1.18e−01 m/s, yellow at 9.68e−02 m/s, green at 6.84e−02 m/s to light blue at 3.96e−02 m/s to a low velocity flow shown in blue at 3.58e−05 m/s. The fluid has a higher velocity in green areas 3403, 3404, and 3405, and a lower velocity in blue area 3506. As illustrated in FIGS. 35a-b, there are no observable stagnant flow areas in the section views.

Figure 36A:
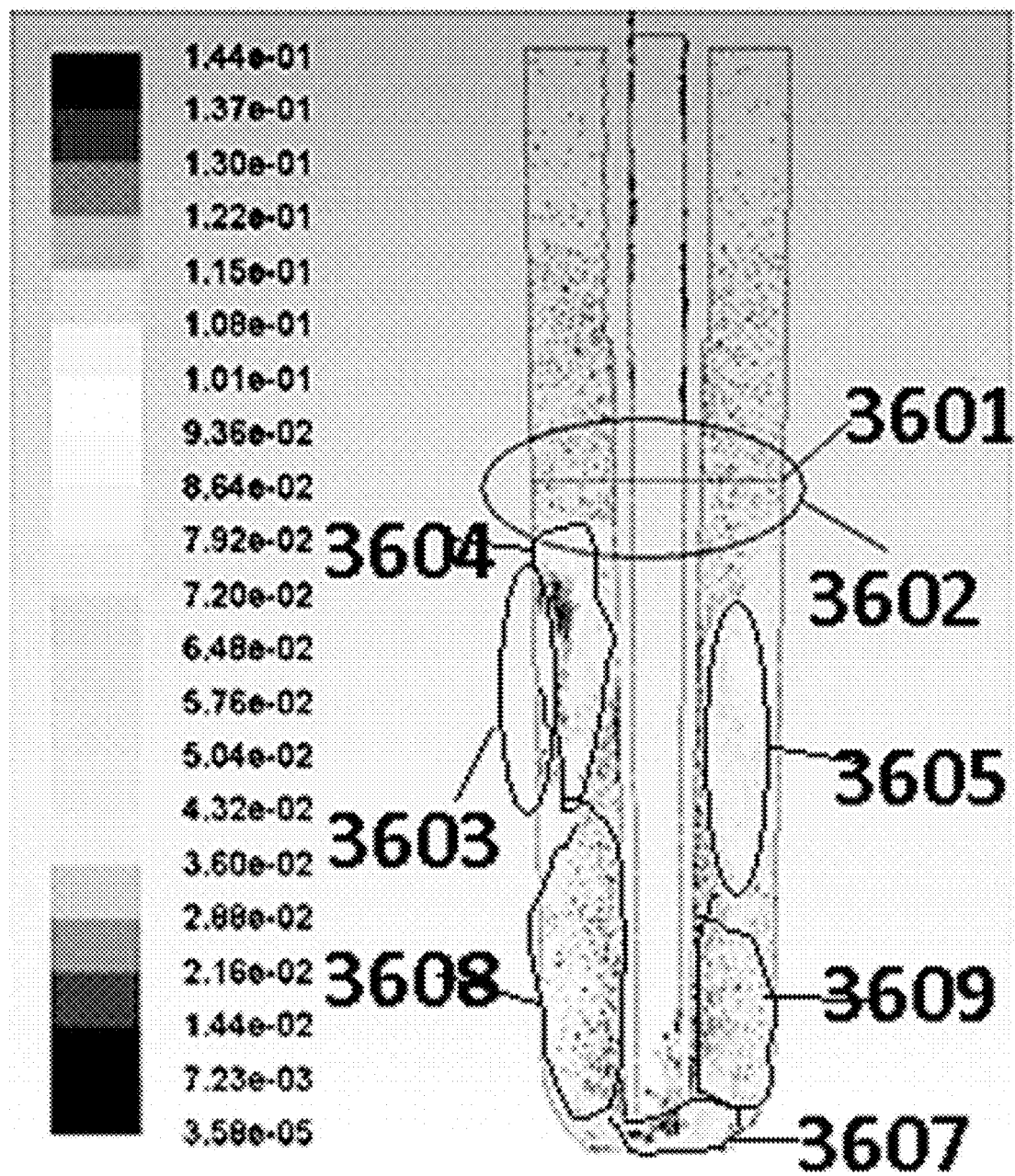
FIGS. 36a-36b show x-section views the velocity distribution vectors with a 60% filling level and an inlet velocity of 0.288 m/s.
Figure 36B:
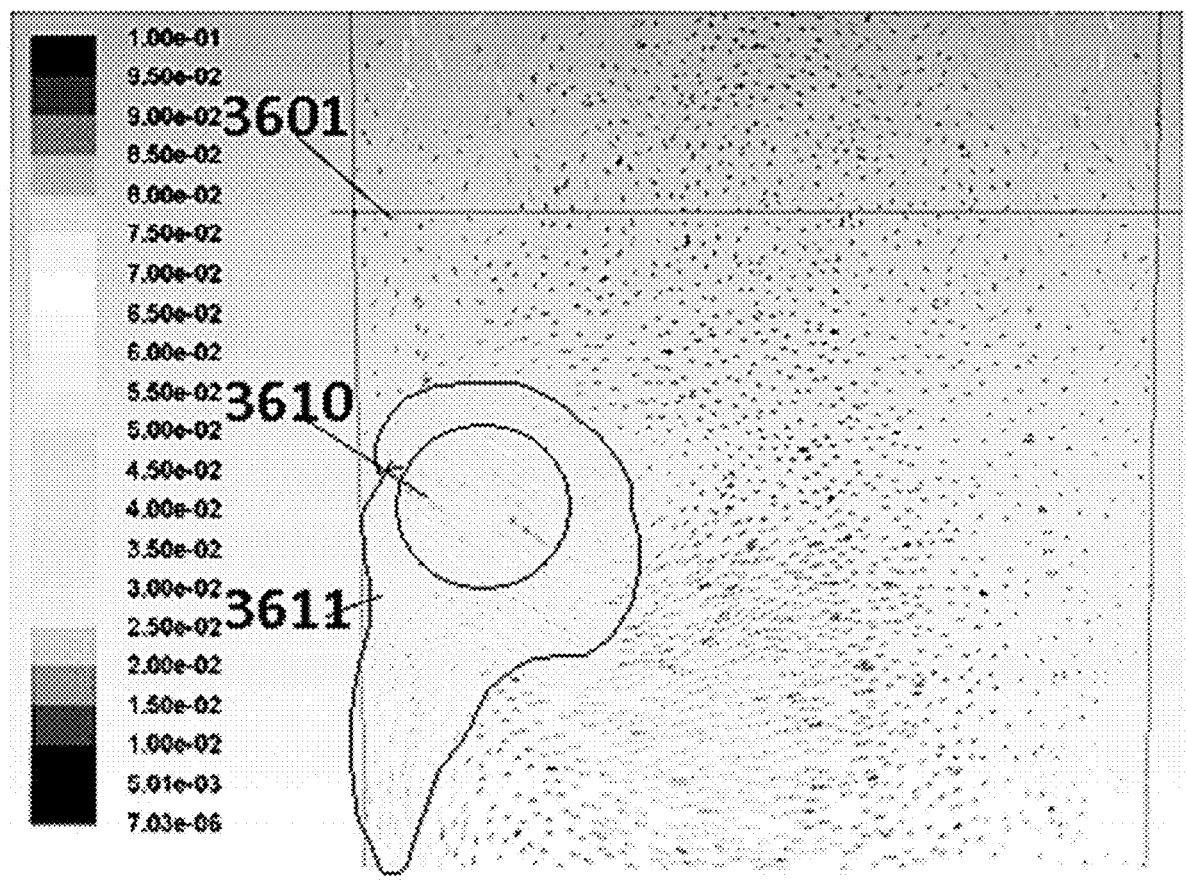

FIG. 36a shows velocity distribution vectors in a cross section of the chamber in the x-direction at x=0. The filling level in FIG. 36 is shown as line 3601. FIG. 36b is a close up view of the area in the circle 3602 of FIG. 36a. The legend for FIG. 36a transitions from a high velocity flow in red at 1.44 e−01 m/s, orange at 1.18e−01 m/s, yellow at 9.68e−02 m/s, green at 6.84e−02 m/s to light blue at 3.96e−02 m/s to a low velocity flow shown in blue at 3.58e−05 m/s. The legend for FIG. 36b transitions from a high velocity flow in red at 1.00 e−01 m/s, orange at 8.25e−02 m/s, yellow at 6.75e−02 m/s, green at 4.75e−02 m/s to light blue at 2.75e−02 m/s to a low velocity flow shown in blue at 7.03e−06 m/s. In FIG. 36a, the fluid has a high velocity in red area 3603, and a lower velocity in green areas 3604, 3605, and 3607. Low velocity blue areas exist in 3608 and 3609. In FIG. 36b, the fluid has a high velocity in red area 3610, and a lower velocity in green area 3611. As illustrated in FIGS. 36a-b, there are no observable stagnant flow areas in the section views.

Figure 37A:
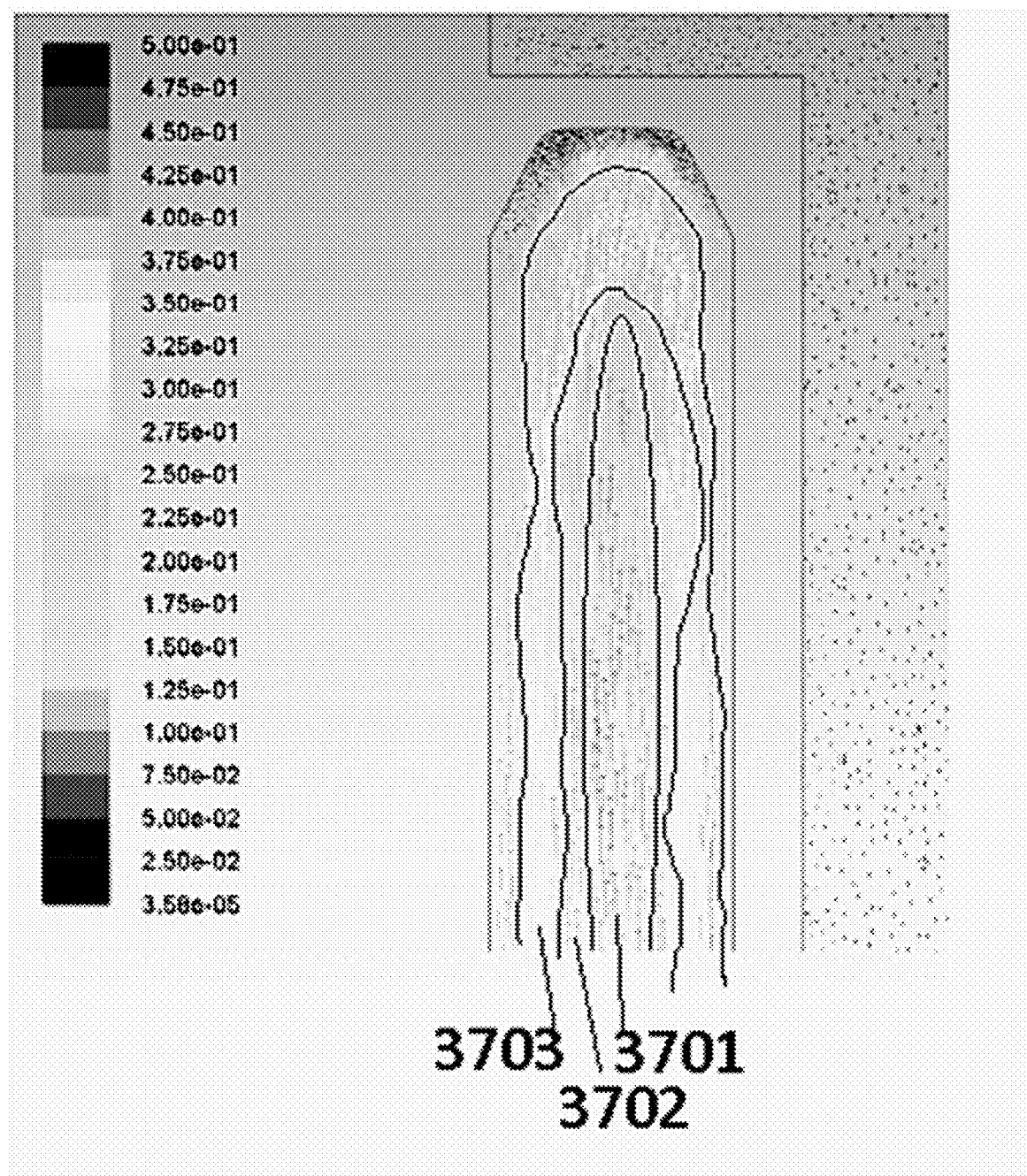
FIGS. 37a-37b show velocity distribution vectors near the inlet and outlet ports with a 60% filling level and an inlet velocity of 0.288 m/s.
Figure 37B:
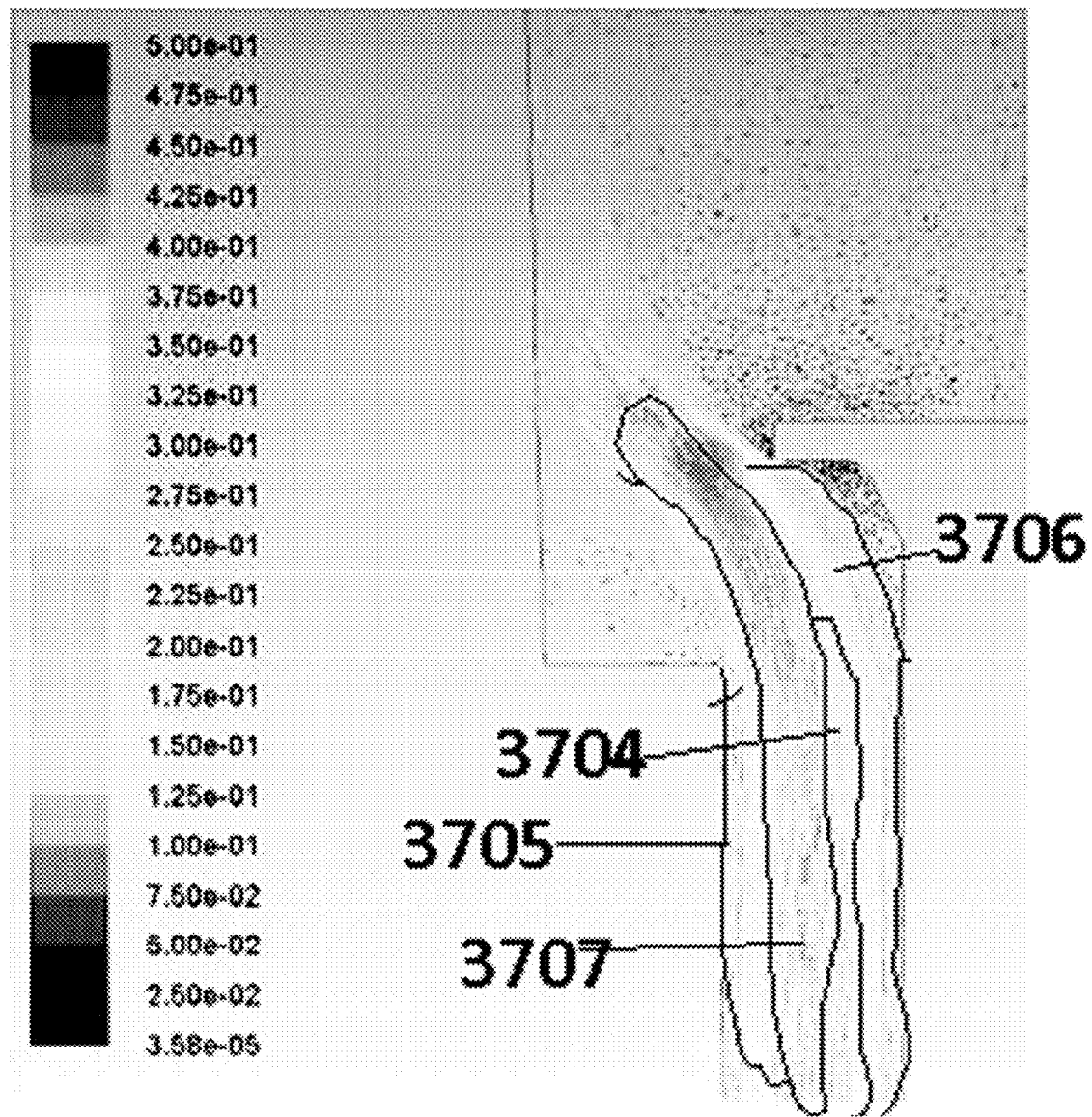

FIG. 37a shows velocity distribution vectors at the fluid inlet from a left-side view, while FIG. 37b shows velocity distribution vectors at the fluid inlet from a right side view. The legend for FIGS. 37a-b transitions from a high velocity flow in red at 5.00 e−01 m/s, orange at 3.87e−01 m/s, yellow at 3.37e−01 m/s, green at 2.37e−01 m/s to light blue at 1.37e−01 m/s to a low velocity flow shown in blue at 3.58e−05 m/s. In FIG. 37a, the fluid has a high velocity in red area 3701, a lower velocity in yellow area 3702, and a still lower velocity in green area 3703. In FIG. 37b, the fluid has a high velocity in red area 3707, a lower velocity in yellow area 3704, and a lower velocity in green areas 3705 and 3706. As illustrated in FIGS. 37a-b, there are no observable stagnant flow areas at the fluid inlet.

Figure 38A:
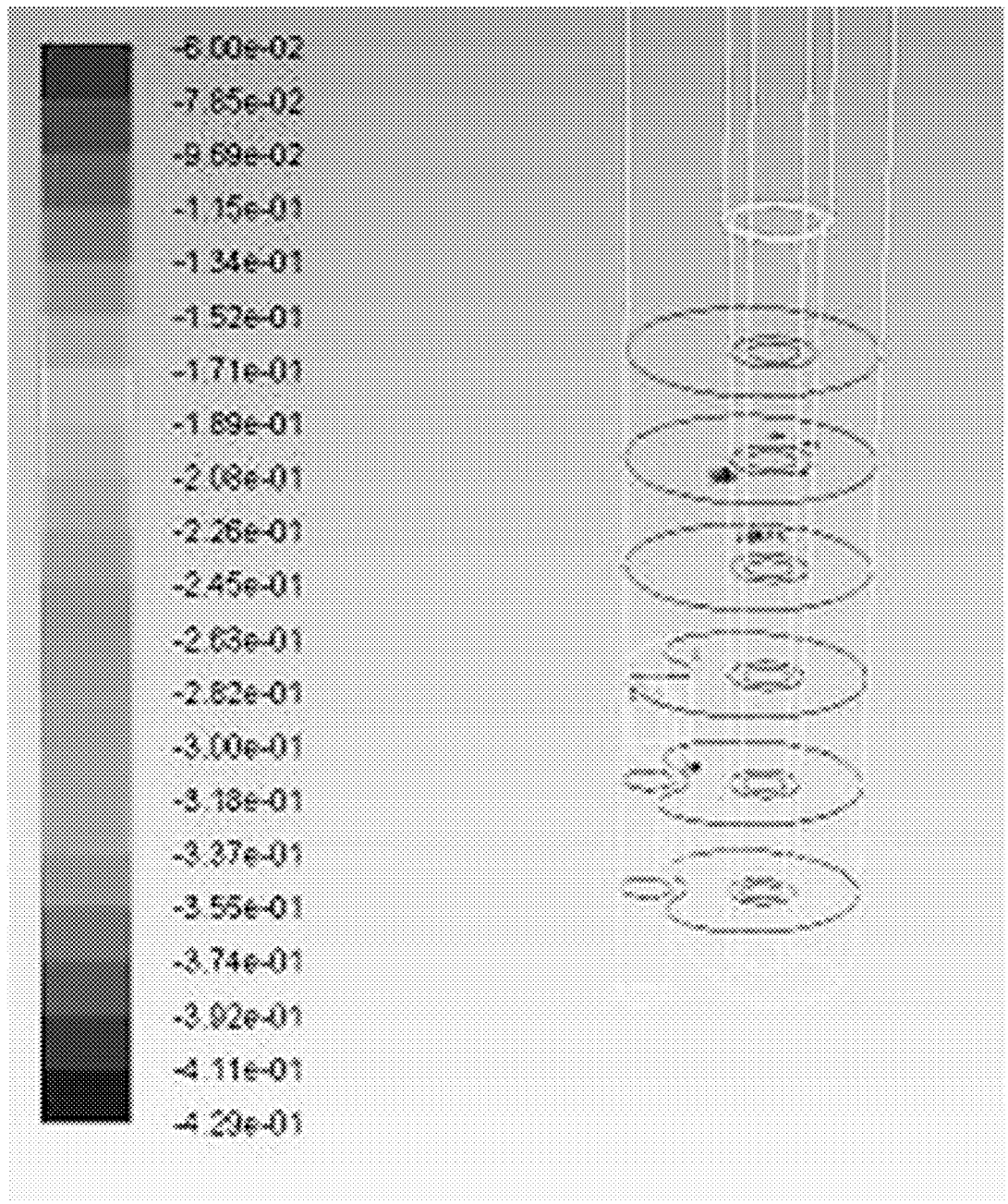
FIGS. 38a-38b show shows velocity distribution vectors in the y-direction with a 60% filling level and an inlet velocity of 0.288 m/s.
Figure 38B:
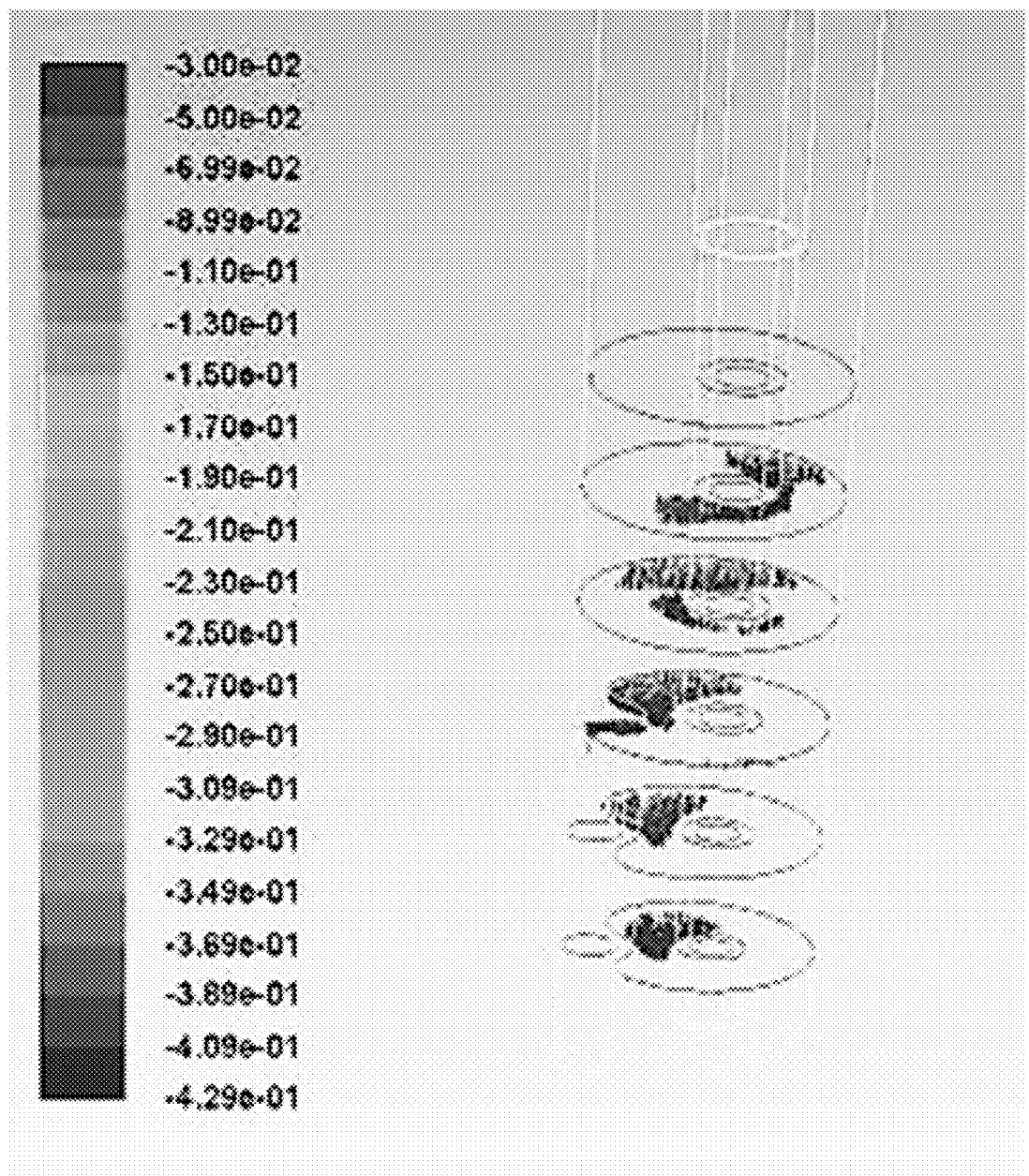

FIG. 38a shows velocity distribution vectors in the y-direction within multiple section planes with a max velocity scale set at 0.06 m/s. The legend for FIG. 38a transitions from a low velocity flow in red at −6.00 e−02 m/s, orange at −1.23e−01 m/s, yellow at −1.76e−01 m/s, green at −2.48e−01 m/s to light blue at −3.38e−01 m/s to a high velocity flow shown in blue at −4.29e−01 m/s. The legend for FIG. 38b transitions from a low velocity flow in red at −3.00 e−02 m/s, orange at −9.81e−02 m/s, yellow at −1.60e−01 m/s, green at −2.40e−01 m/s to light blue at −3.20e−01 m/s to a high velocity flow shown in blue at −4.29e−01 m/s. All velocity vectors visible in FIGS. 38a-b are in red. As illustrated in FIG. 38a, only a very few velocity vectors within the chamber body are shown, which means that the velocity in y direction is no more than 0.06 m/s, with the exception of a very few areas. As shown in FIG. 38b, velocities in excess of 0.03 m/s do exist within the chamber. The y-direction velocity of less than 0.06 m/s for the vast majority of the chambers as depicted in FIG. 38 allow for the adequate capture of any air bubbles.

Figure 39A:
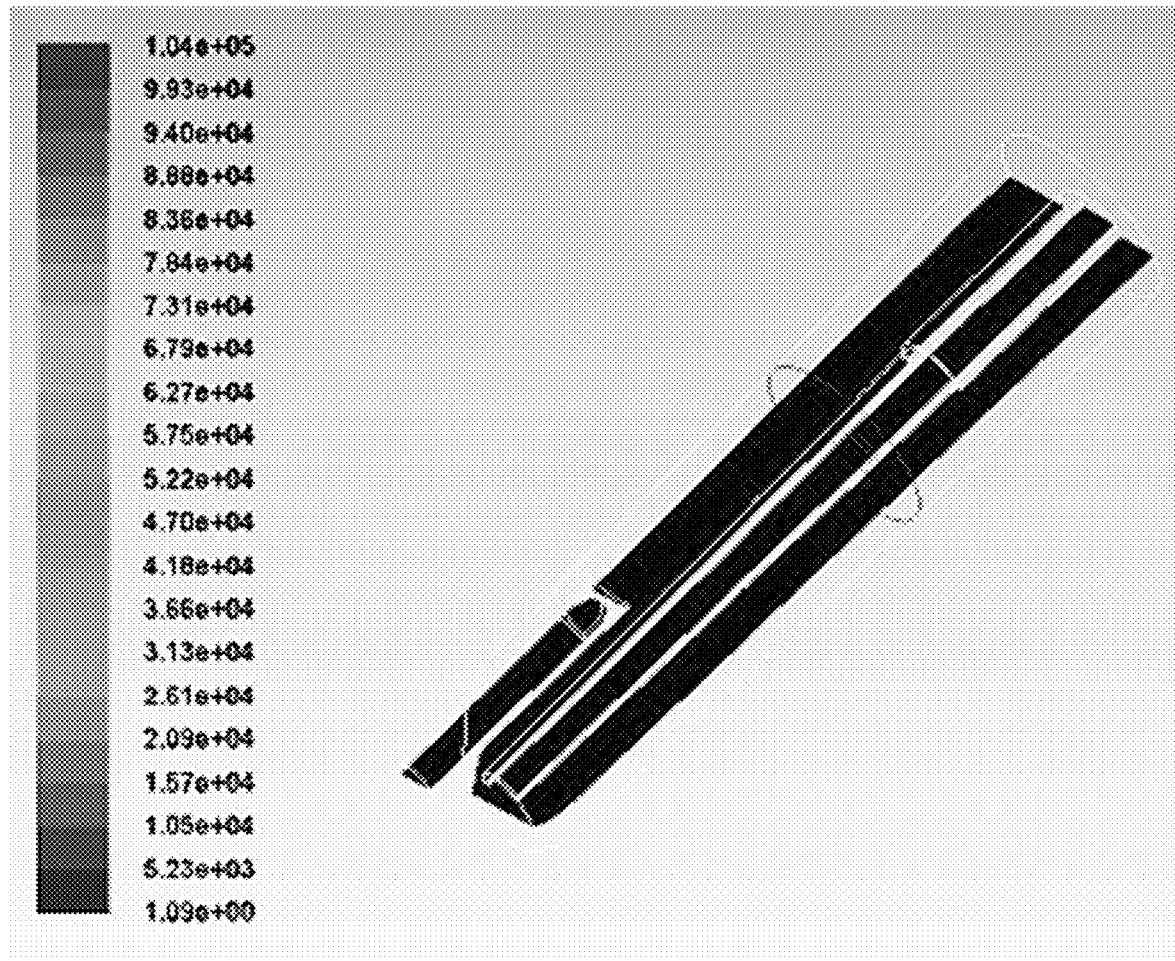
FIGS. 39a-39c show the max shear rate with a 60% filling level and an inlet velocity of 0.288 m/s.
Figure 39B:
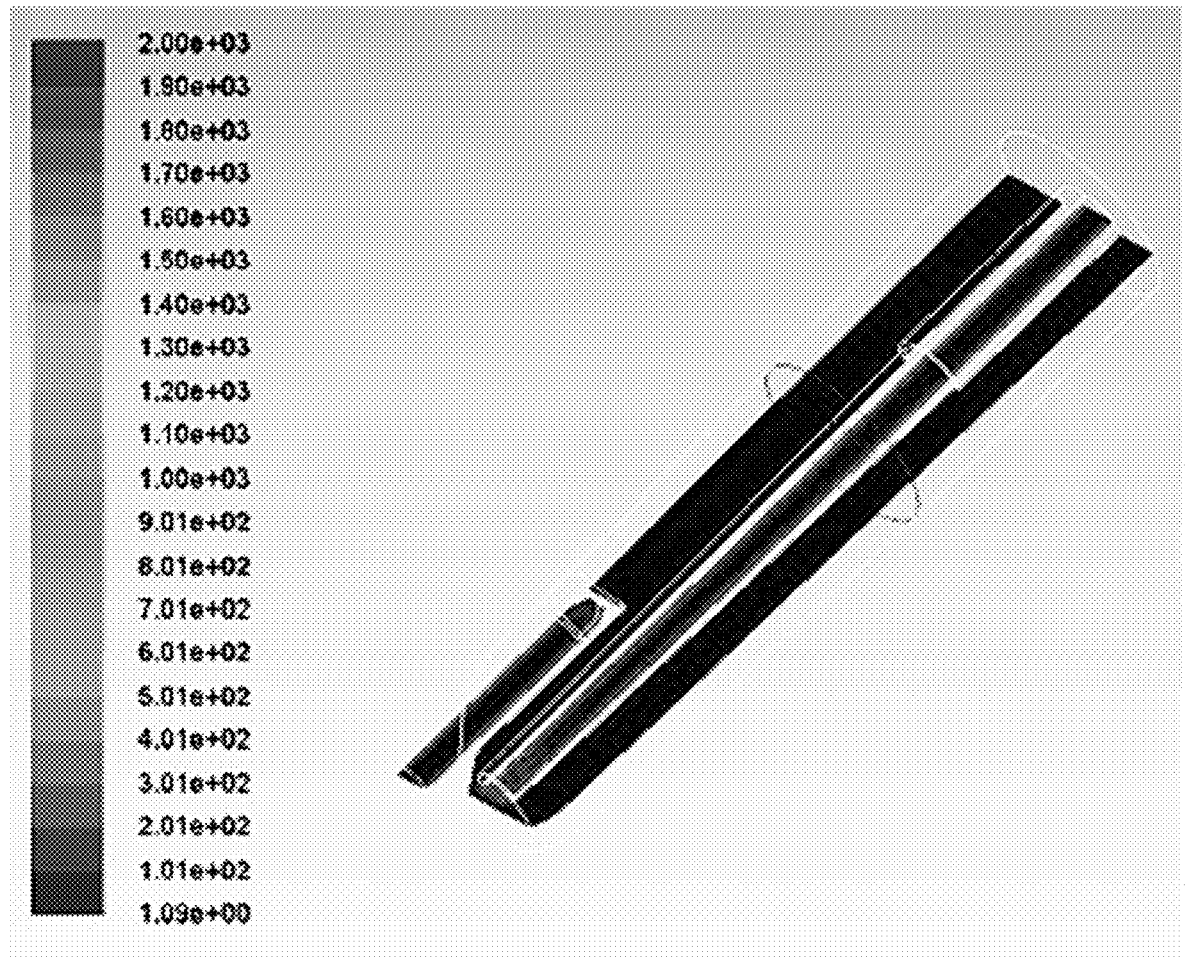
Figure 39C:
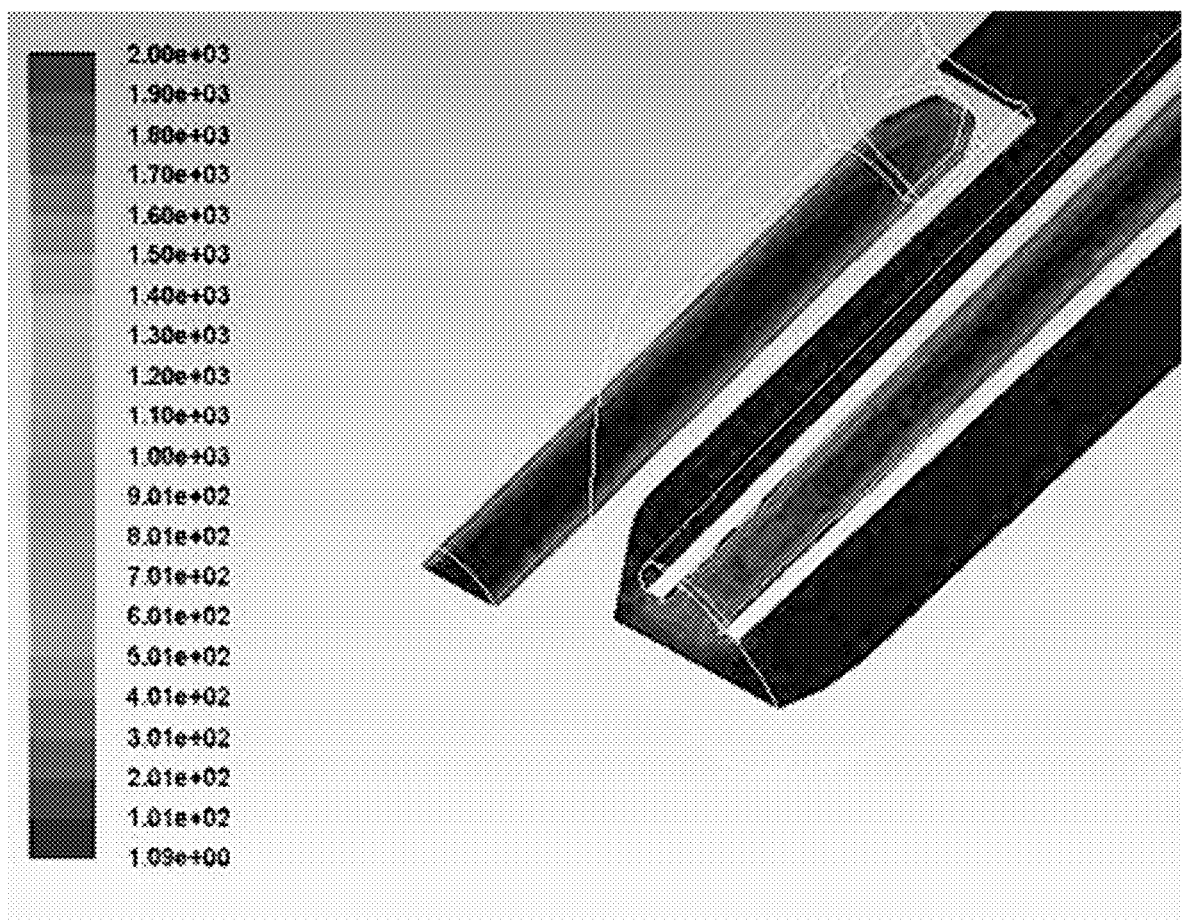

FIG. 39a-c illustrate the max shear rate at a plane of z=0 for the air capture chambers illustrated in FIGS. 9a-b. In FIG. 39a, the threshold shear rate is set at 104,000 1/s or a max shear stress (considering a viscosity of 0.00271 PaS) of 281.8 Pa, less than the threshold in a short term exposure. As shown in FIG. 39a, there are no areas with a shear stress of greater than the 400 Pa for short term exposure. FIG. 39b shows the same chamber with a lower max shear stress setting. As shown in FIG. 39b, the areas with the greatest shear stress are near the inlet and outlet ports. FIG. 39c is a close up of the inlet and outlet areas in FIG. 39b. The legend for FIG. 39a transitions from a shear stress in red at 1.04 e+05 1/s, orange at 9.14e+04 1/s, yellow at 7.05e+04 1/s, green at 4.96e+04 1/s to light blue at 2.87e+04 1/s to a low shear stress shown in blue at 1.09 1/s. The legend for FIGS. 39b-c transitions from a shear stress in red at 2.00e+03 1/s, orange at 1.65e+03 1/s, yellow at 1.35e+03 1/s, green at 9.50e+02 1/s to light blue at 5.50e+02 1/s to a low shear stress shown in blue at 1.09 1/s. As noted, that max shear stress concentrates in the fluid inlet port and outlet port area, with all visible areas of shear stress shown in green. In the fluid inlet port and outlet port areas, blood exposure time is short due to high flow existing. As such, the chambers depicted are safe for blood health in term of the impact of shear stress when used with a 60% filling level and a flow rate of 275 mL/min.

Figure 40:
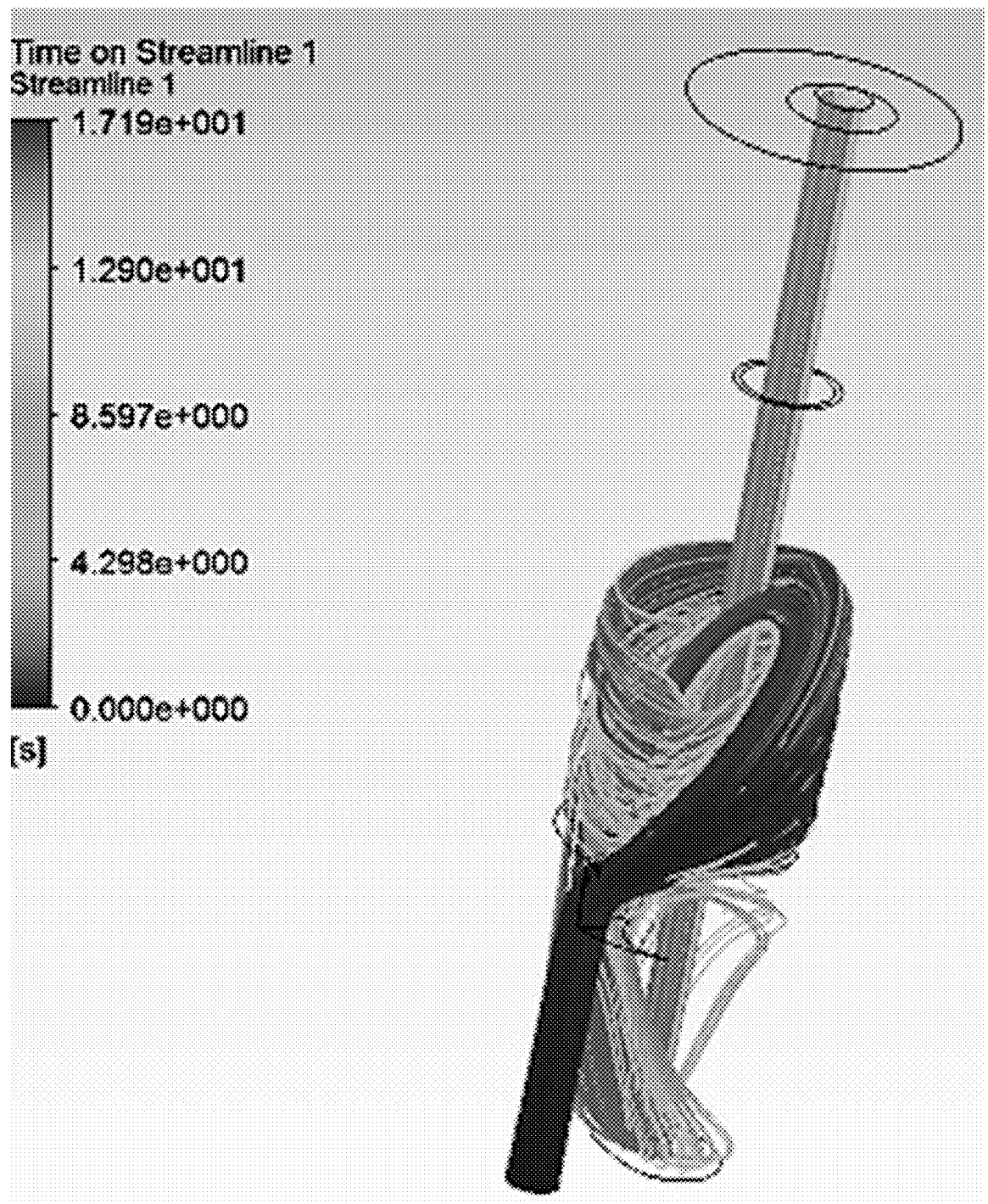
FIG. 40 shows residence time distributions with a 40% filling level and an inlet velocity of 0.104 m/s.

FIG. 40 illustrates residence time distributions at a flow rate of 275 mL/min and a filling level of 60%. As shown in FIG. 40, the maximum residence time for fluid is about 17 seconds.

Experiment 12

Figure 41A:
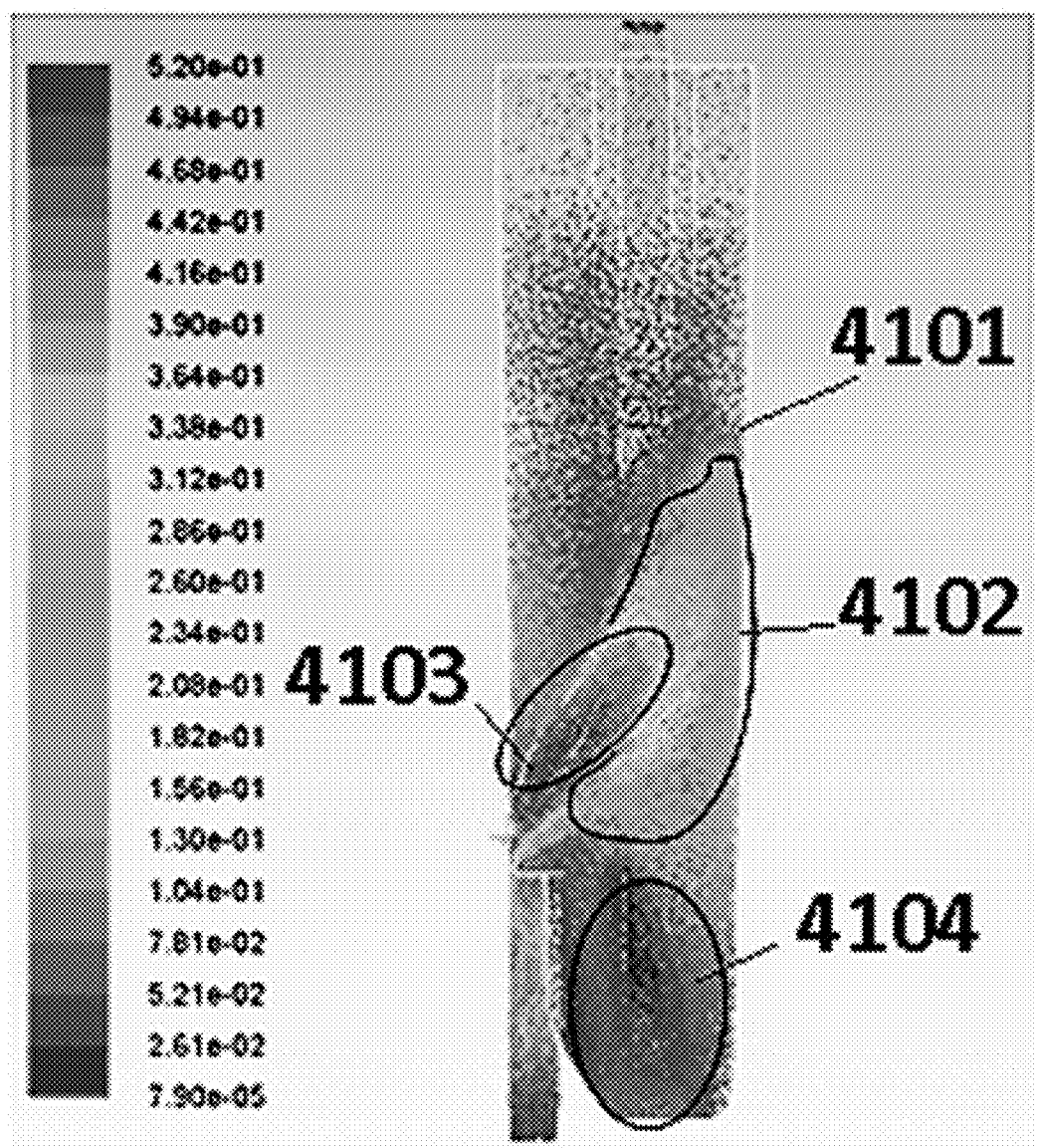
FIGS. 41a-41d show velocity distribution vectors with a 65% filling level and an inlet velocity of 0.52 m/s.
Figure 41B:
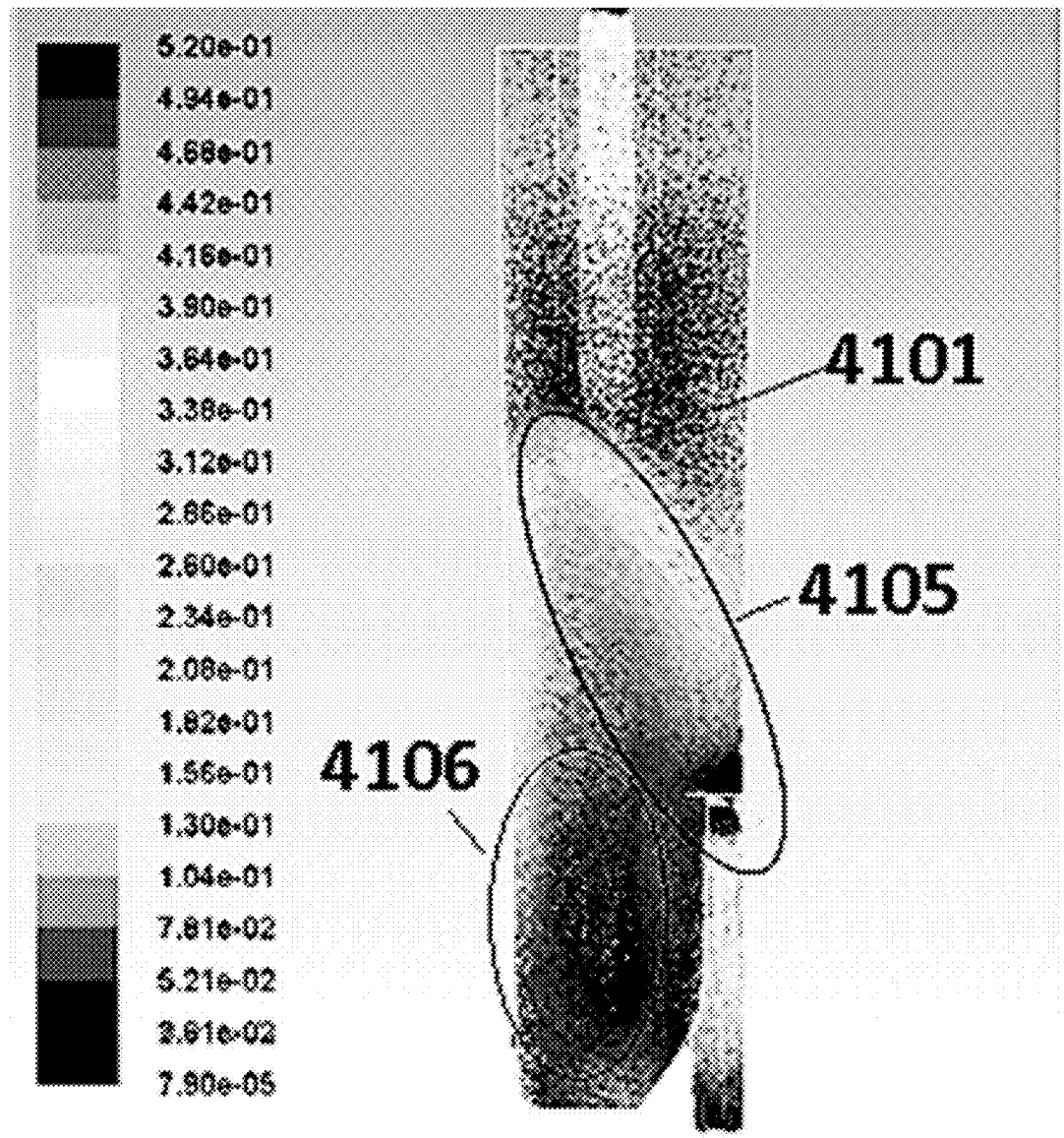
Figure 41C:
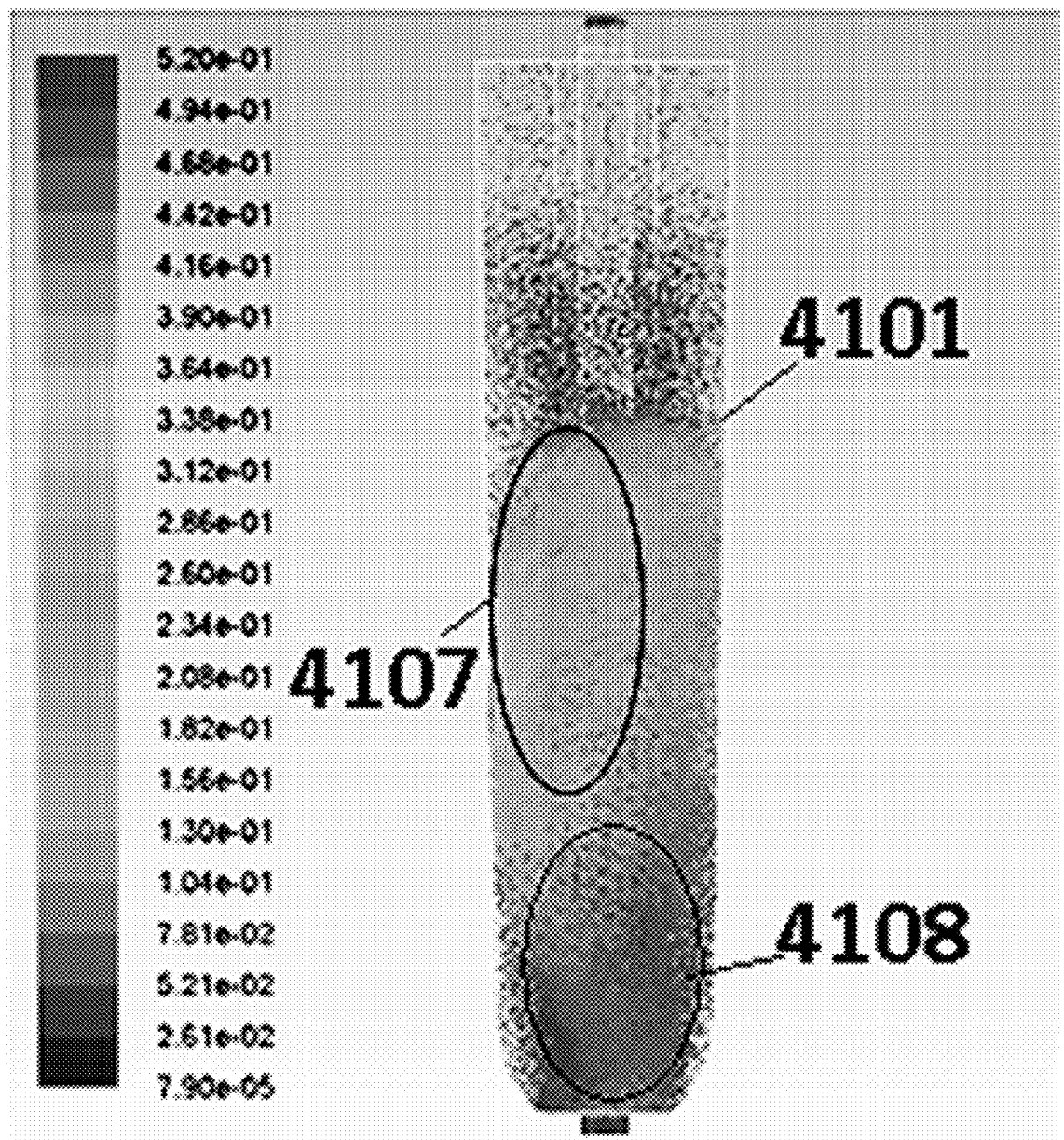
Figure 41D:
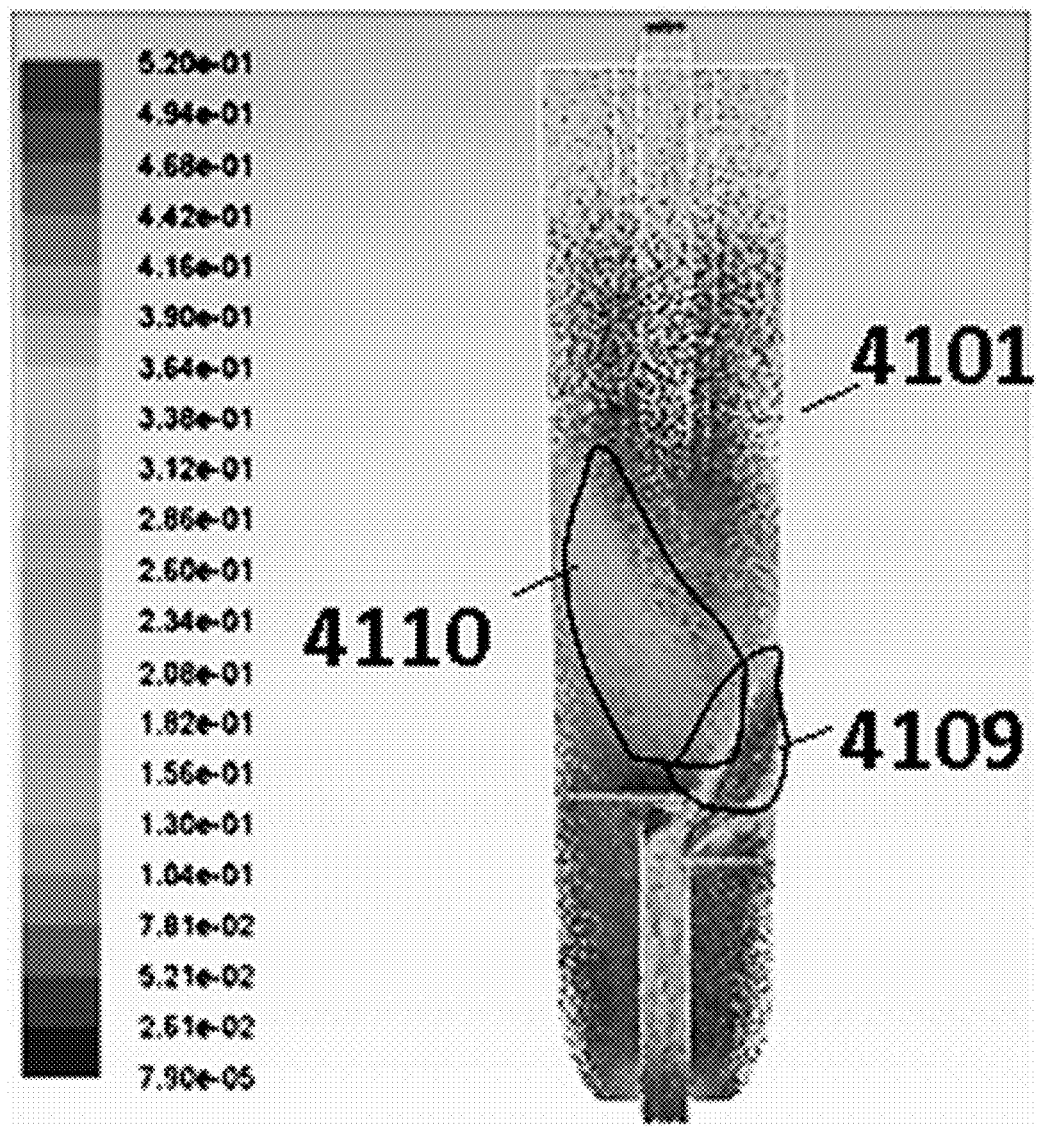

FIG. 41a is a font view of velocity distribution vectors of the arterial air capture chamber shown in FIG. 9 with a 65% filling level and an inlet velocity of 0.52 m/s, or 500 mL/min. FIG. 41b is a back view of the same chamber with the same filling level and inlet velocity. FIG. 41c is a right view of the chamber, and FIG. 41d is a left view of the chamber with the same filling level and inlet velocity. The line labeled as 4101 in each of FIGS. 41a-d is the filling level used in the computational flow diagrams. The legend for FIGS. 41a-d transitions from a high velocity flow in red at 5.20e−01 m/s, orange at 4.03e−01 m/s, yellow at 3.52e−01 m/s, green at 2.47e−01 m/s, to light blue at 1.43e−01 m/s to a low velocity flow shown in blue at 7.90e−05 m/s. In FIG. 41a, the fluid has a high velocity in area 4103 and green area 4102. A lower velocity blue area 4104 exists at the bottom of the air capture chamber. In FIG. 41b, the fluid has a higher velocity in light blue area 4105, and a lower velocity in blue area 4106. In FIG. 41c, the fluid has a higher velocity in green area 4107, and a lower velocity in blue area 4108. In FIG. 41d, the fluid has a high velocity in red area 4109, and a lower velocity in green area 4110. As illustrated in FIGS. 41a-d, there is no transit area between the massive flow area at the outlet of the fluid inlet port and the fluid-air interface. As such, blood can be brought down into the outlet tubing very quickly.

Figure 42A:
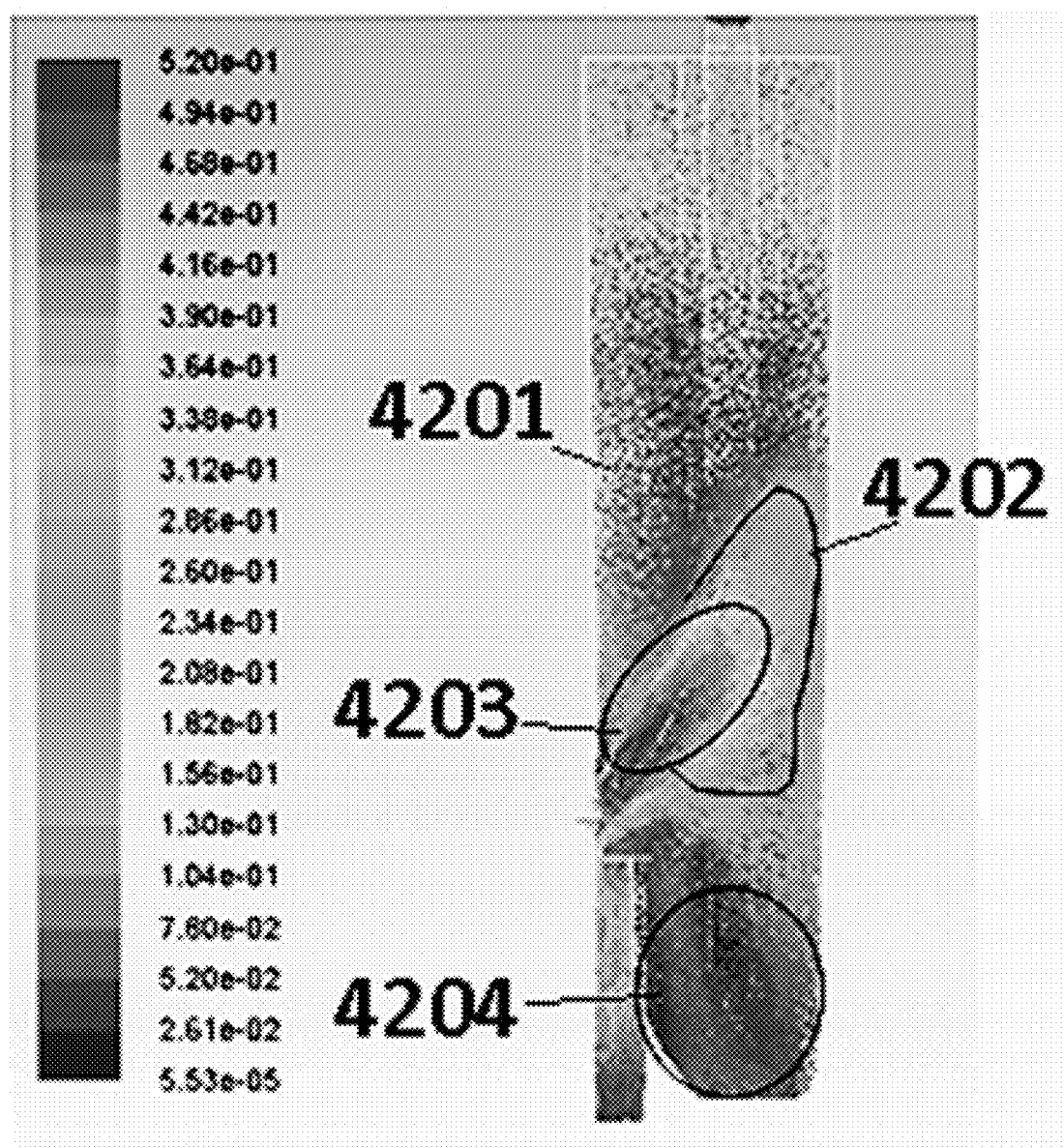
FIGS. 42a-42b show velocity distribution vectors with a 60% filling level and an inlet velocity of 0.52 m/s.
Figure 42B:
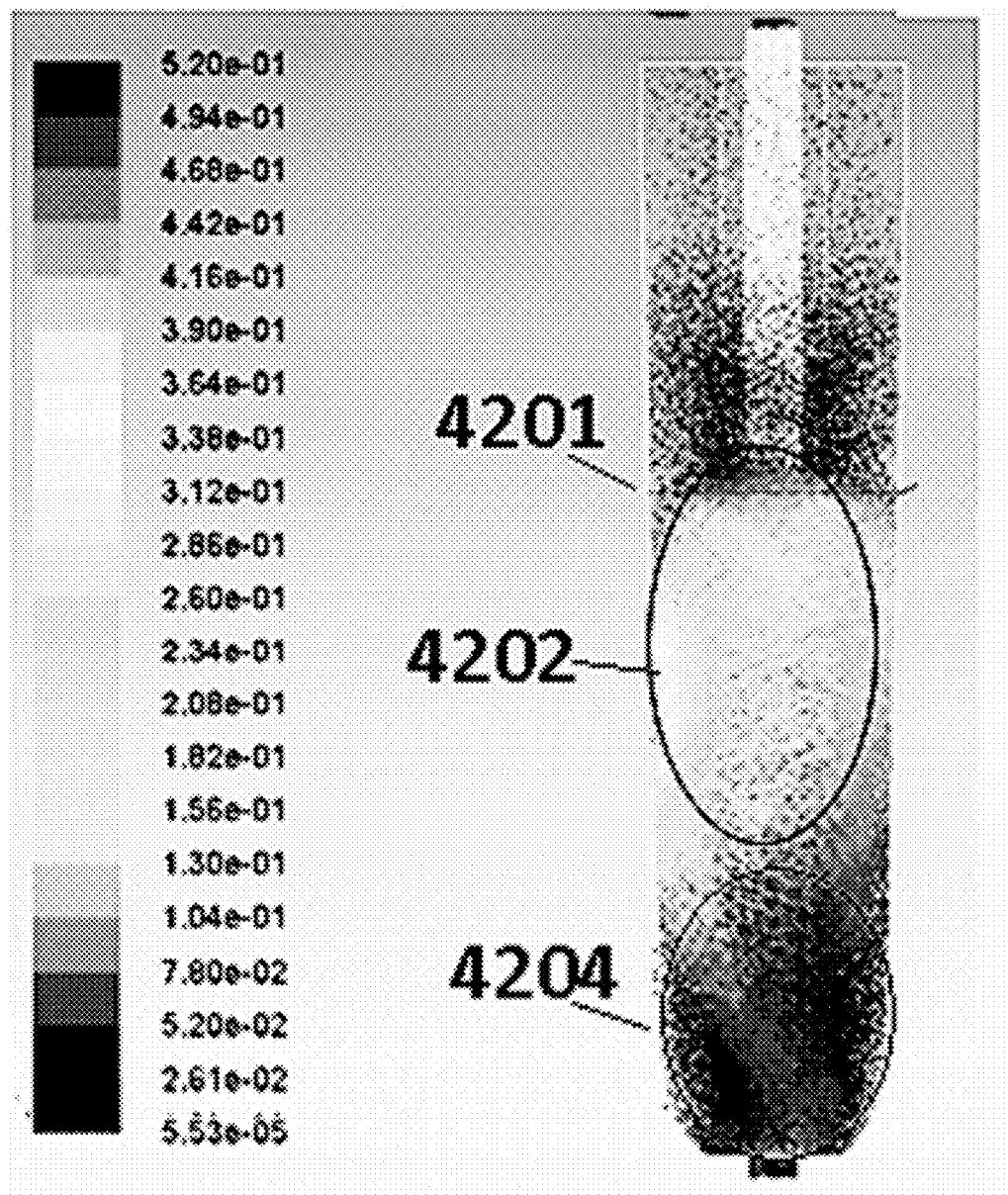

FIGS. 42a and 42b show velocity distribution vectors for the same 500 mL/min inlet flow rate, but with a 60% filling level. The fluid-air interface is shown as line 4201. The legend for FIGS. 42a-b transitions from a high velocity flow in red at 5.20e-01 m/s, orange at 4.29e-01 m/s, yellow at 3.52e-01 m/s, green at 2.47e-01 m/s, to light blue at 1.43e-01 m/s to a low velocity flow shown in blue at 5.53 e-05 m/s. In FIGS. 42a-b, the fluid has a high velocity in red area 4203, and a lower velocity in green area 4202. A lower velocity blue area 4204 exists near the bottom of the air capture chamber. As illustrated in FIGS. 42a and 42b, no transit area exists between the green massive flow area 4202 and the fluid air interface 4201 with a fluid filling level of 60% either. However, as shown in FIG. 42b, the green massive flow area 4202 is over the fluid-air interface 4201 and may cause turbulence. As such, a fluid filling level of less than 60% is not optimal for a flow rate of greater than 500 mL/min. In each of FIGS. 43-48, a filling level of 65% and an inlet flow rate of 500 mL/min are used.

Figure 43A:
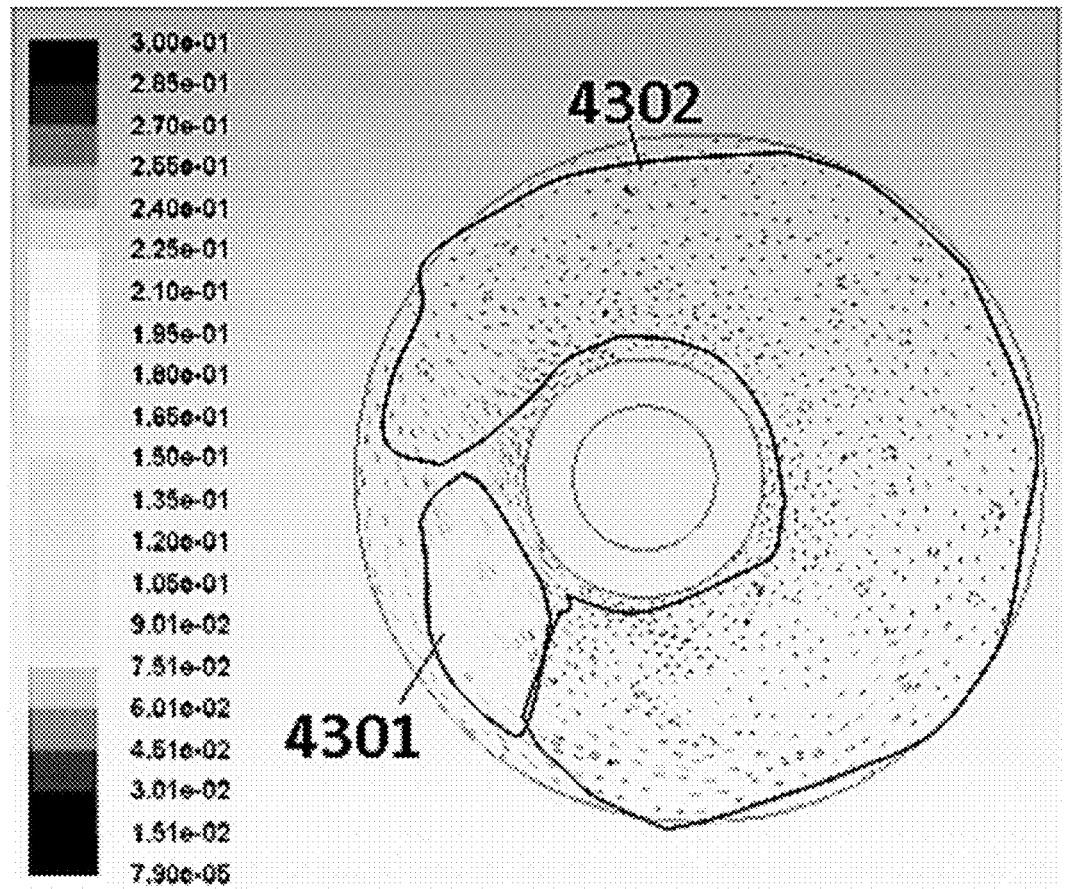
FIGS. 43a-43c show y-section views the velocity distribution vectors with a 65% filling level and an inlet velocity of 0.52 m/s.
Figure 43B:
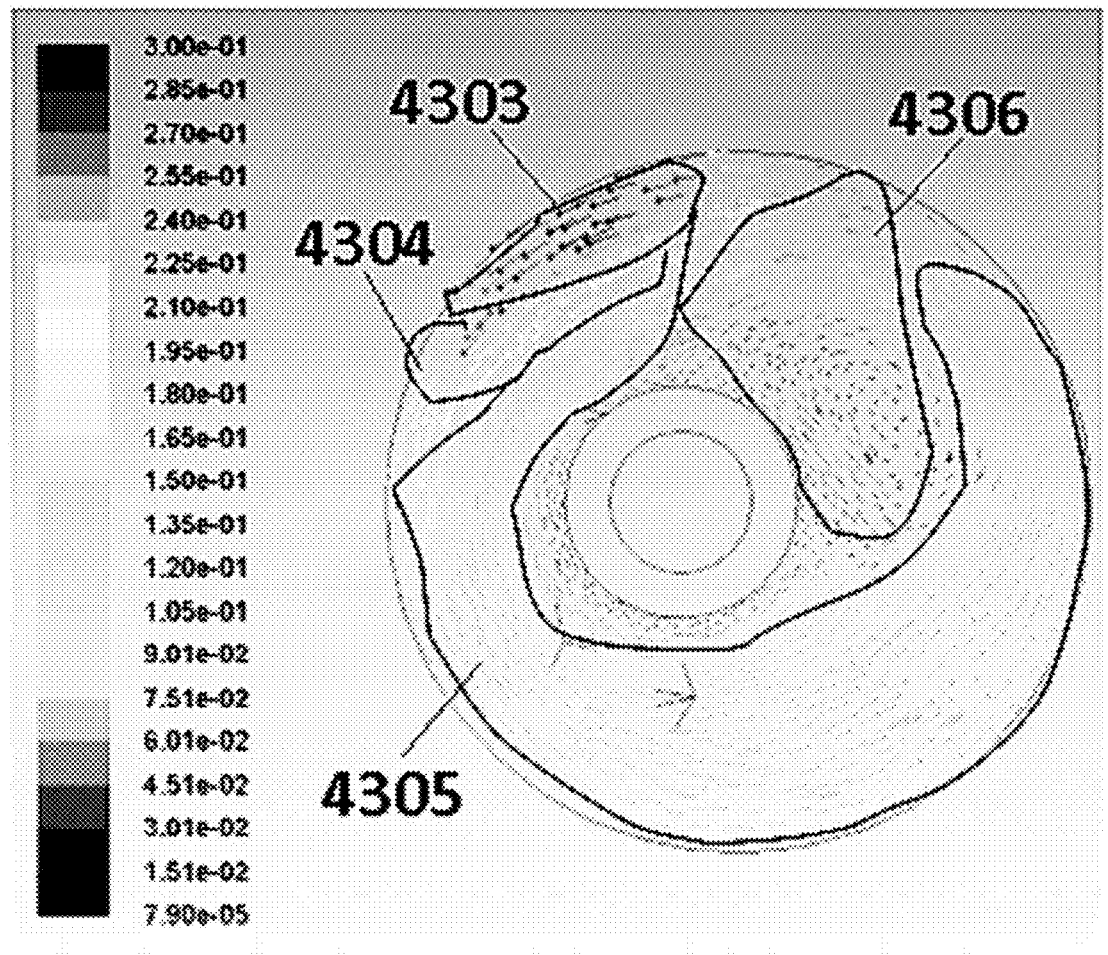
Figure 43C:
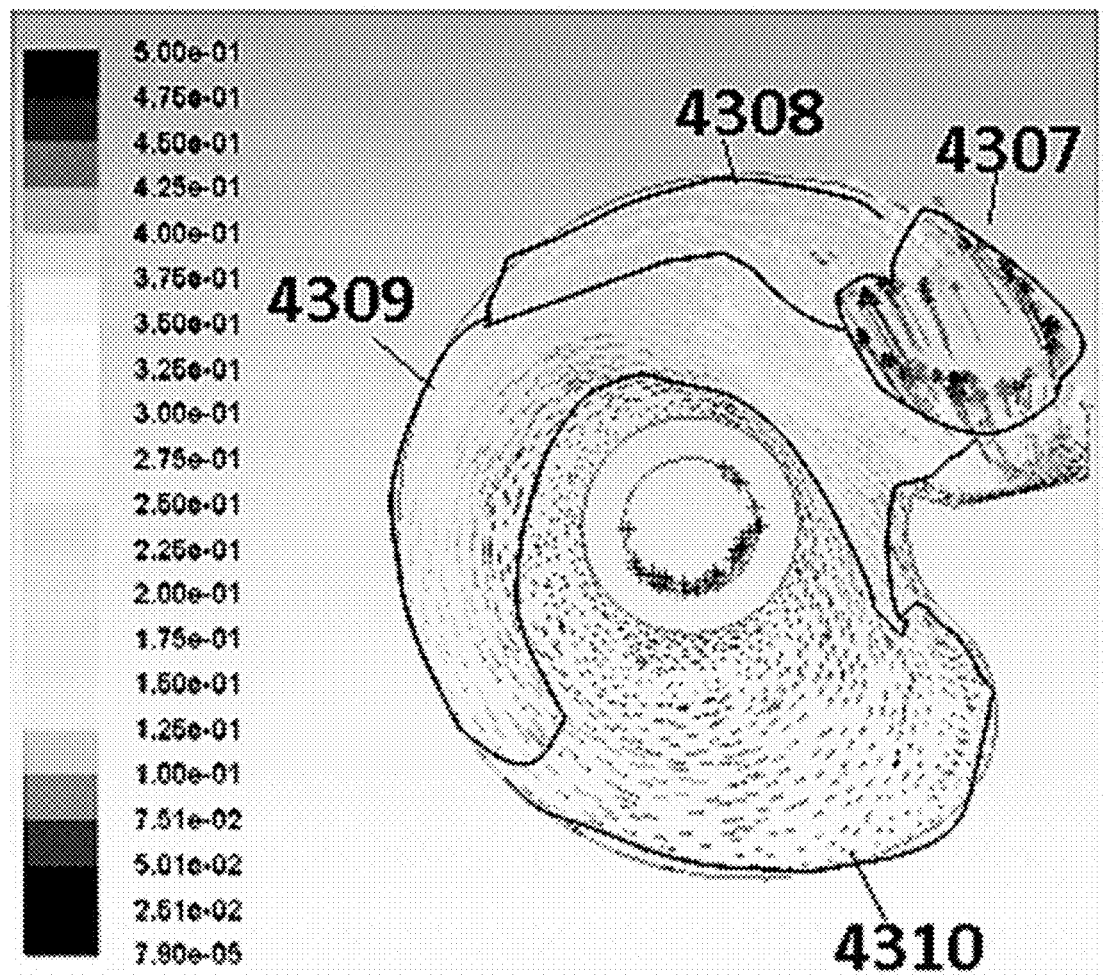

FIGS. 43a-c show velocity distribution vectors at cross sections of the chamber in the y direction. The filling level used for FIGS. 43a-c is 65%, or 0.065 m in a 0.1 m chamber. FIG. 43a is the velocity distribution vectors at a height of y=0.065 m, or the fluid-air interface. FIG. 43b is the velocity distribution vectors at a height of 0.05 m, and FIG. 43c is the velocity distribution vectors at a height of 0.03 m. The legend for FIGS. 43a-b transitions from a high velocity flow in red at 3.00e-01 m/s, orange at 2.29e-01 m/s, yellow at 2.03e-01 m/s, green at 1.42e-01 m/s, to light blue at 8.26e-02 m/s to a low velocity flow shown in blue at 7.90e-05 m/s. The legend for FIG. 43c transitions from a high velocity flow in red at 5.00e-01 m/s, orange at 4.13e-01 m/s, yellow at 3.37e-01 m/s, green at 2.37e-01 m/s, to light blue at 1.37e-01 m/s to a low velocity flow shown in blue at 7.90e-05 m/s. FIG. 43a illustrates light blue area 4301 and blue area 4302. FIG. 43b illustrates red area 4303, yellow area 4304, green area 4305, and blue area 4306. FIG. 43c illustrates red area 4307, green area 4308, light blue area 4309, and blue area 4310. As shown in FIG. 43a, the velocity of the fluid is maintained and shows a strong velocity even within the fluid-air interface area. Further, as shown in each of FIGS. 43a-c, there are no observable stagnant flow areas at any height.

Figure 44A:
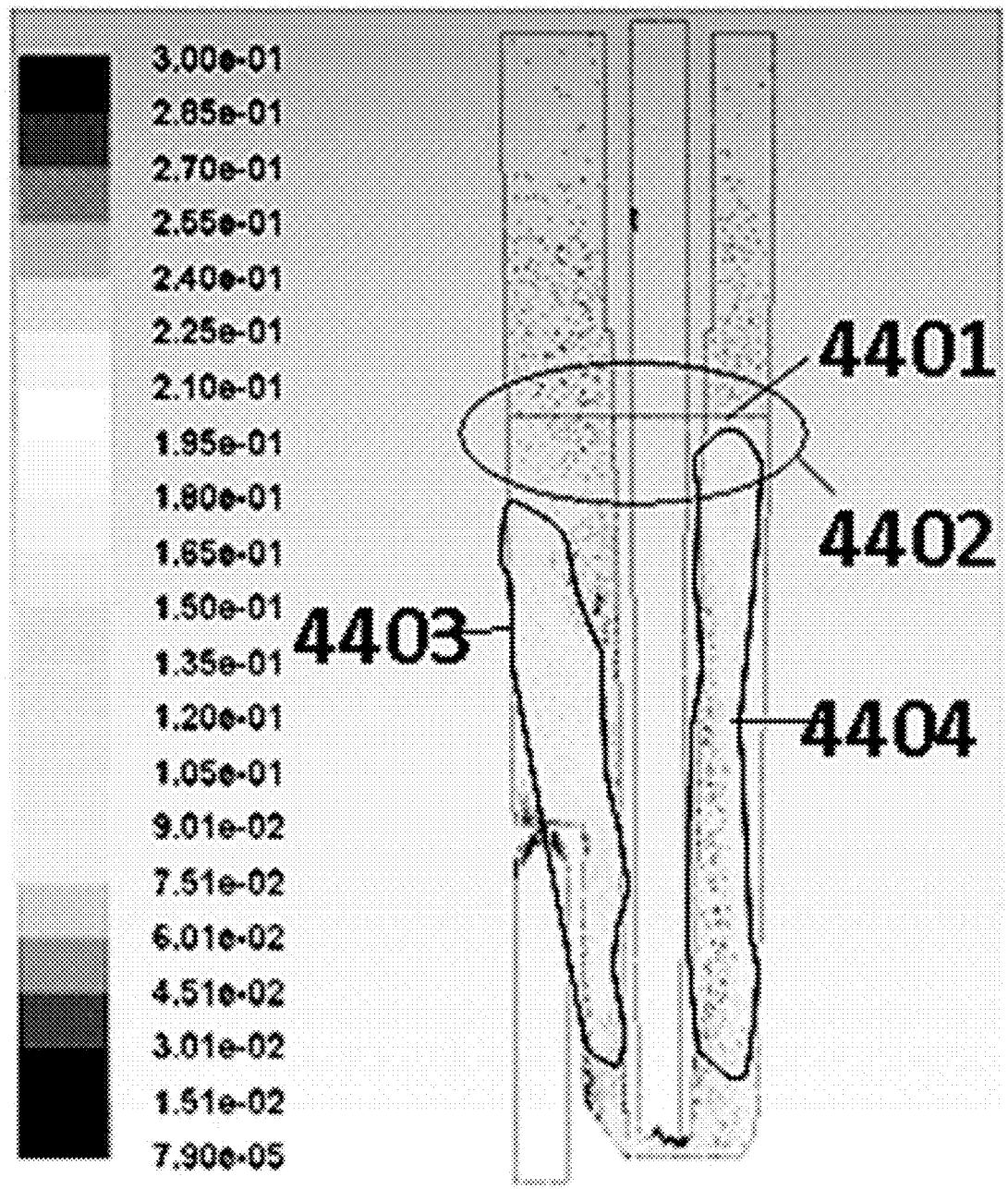
FIGS. 44a-44b show z-section views the velocity distribution vectors with a 65% filling level and an inlet velocity of 0.52 m/s.
Figure 44B:
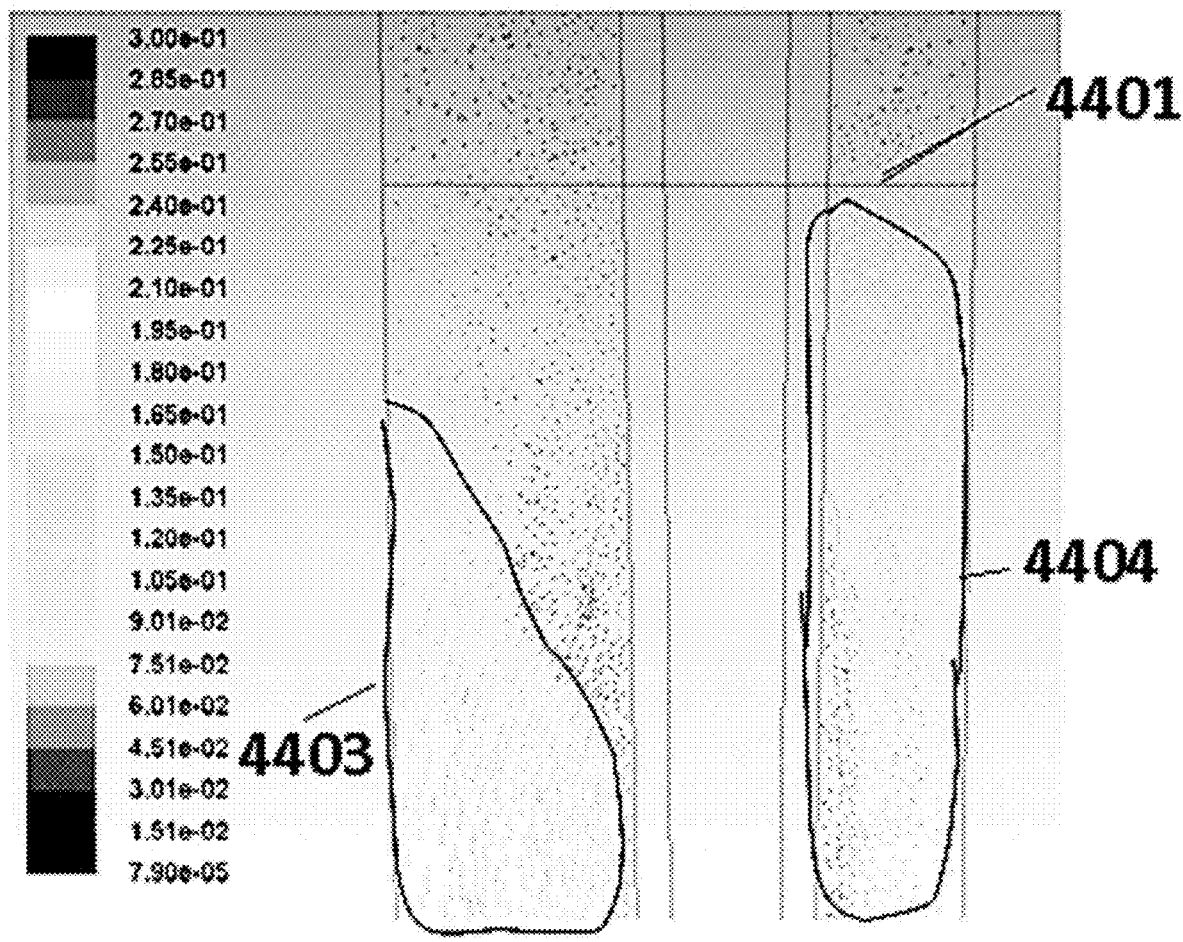

FIG. 44a illustrates velocity distribution vectors in a z-cross section of the chamber within a plane at z=0, or a symmetry plane. The line denoted 4401 is the filling level used in the diagram, and set at 65%. FIG. 44b is a close-up view of the area labeled 4402 in FIG. 44a. The legend for FIGS. 44a-b transitions from a high velocity flow in red at 3.00e-01 m/s, orange at 2.32e-01 m/s, yellow at 2.03e-01 m/s, green at 1.42e-01 m/s, to light blue at 8.26e-02 m/s to a low velocity flow shown in blue at 7.90e-05 m/s. Green areas 4403 and 4404 show a moderate velocity. As illustrated in FIGS. 44a-b, there are no observable stagnant flow areas in the section views.

Figure 45A:
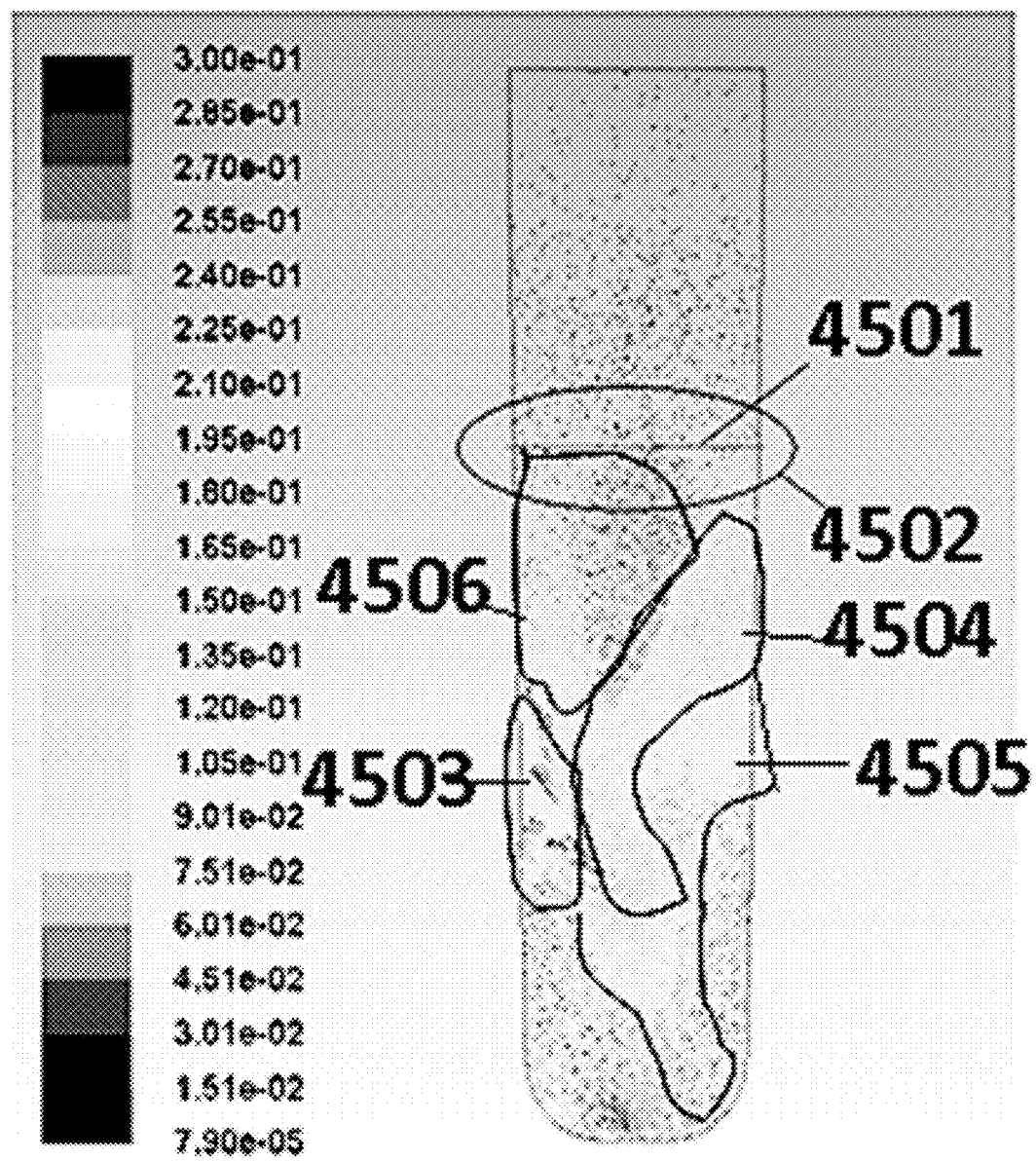
FIGS. 45a-45b show x-section views the velocity distribution vectors with a 65% filling level and an inlet velocity of 0.52 m/s.
Figure 45B:
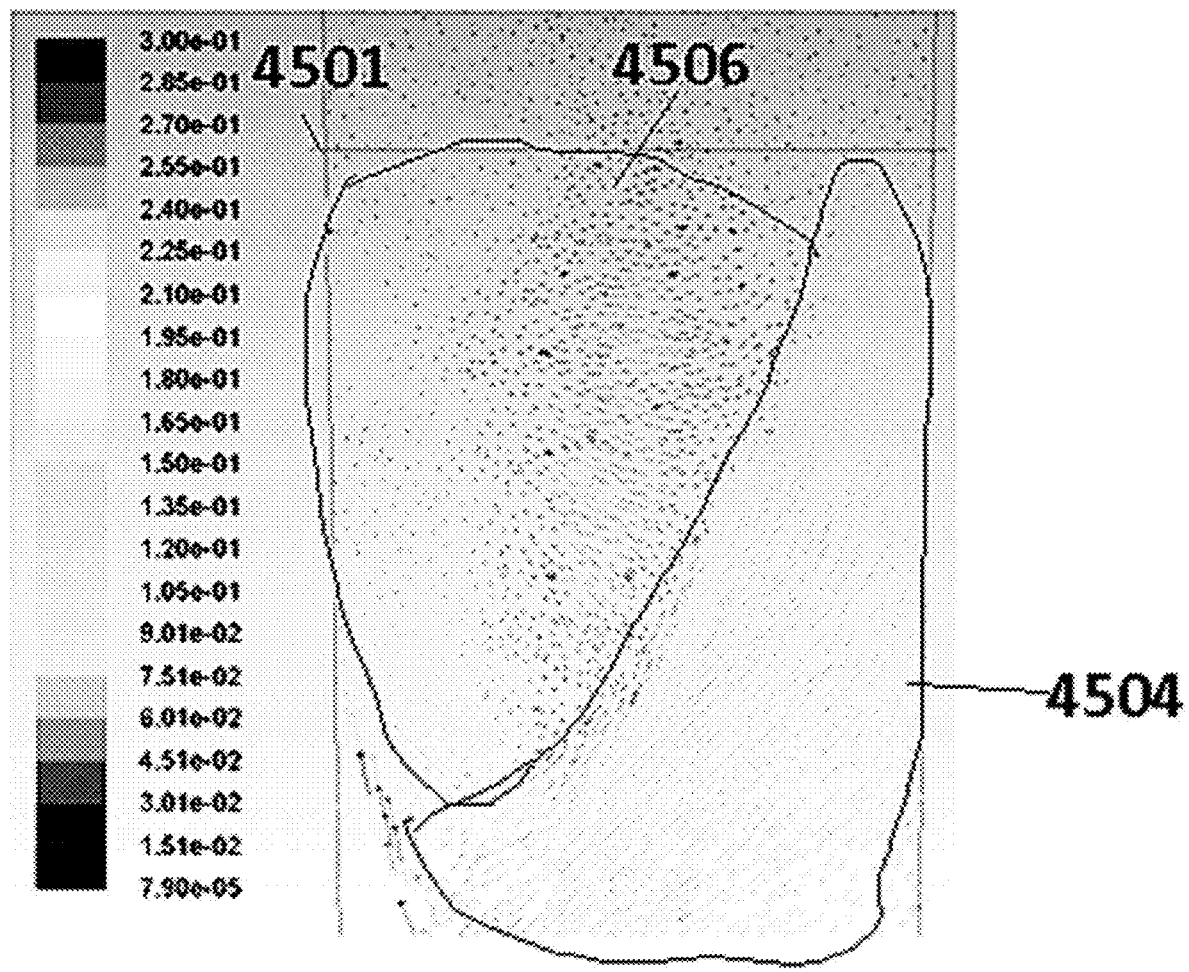

FIG. 45a shows velocity distribution vectors in a cross section of the chamber in the x-direction at x=0. The filling level in FIG. 45 is shown as line 4501. FIG. 45b is a close up view of the area in the circle 4502 of FIG. 45a. The legend for FIGS. 45a-b transitions from a high velocity flow in red at 3.00e-01 m/s, orange at 2.32e-01 m/s, yellow at 2.03e-01 m/s, green at 1.42e-01 m/s, to light blue at 8.26e-02 m/s to a low velocity flow shown in blue at 7.90e-05 m/s. The fluid has a high velocity in red area 4503, lower velocity in green area 4504 and light blue area 4505, and a low velocity in blue area 4506. As illustrated in FIGS. 45a-b, there are no observable stagnant flow areas in the section views.

Figure 46A:
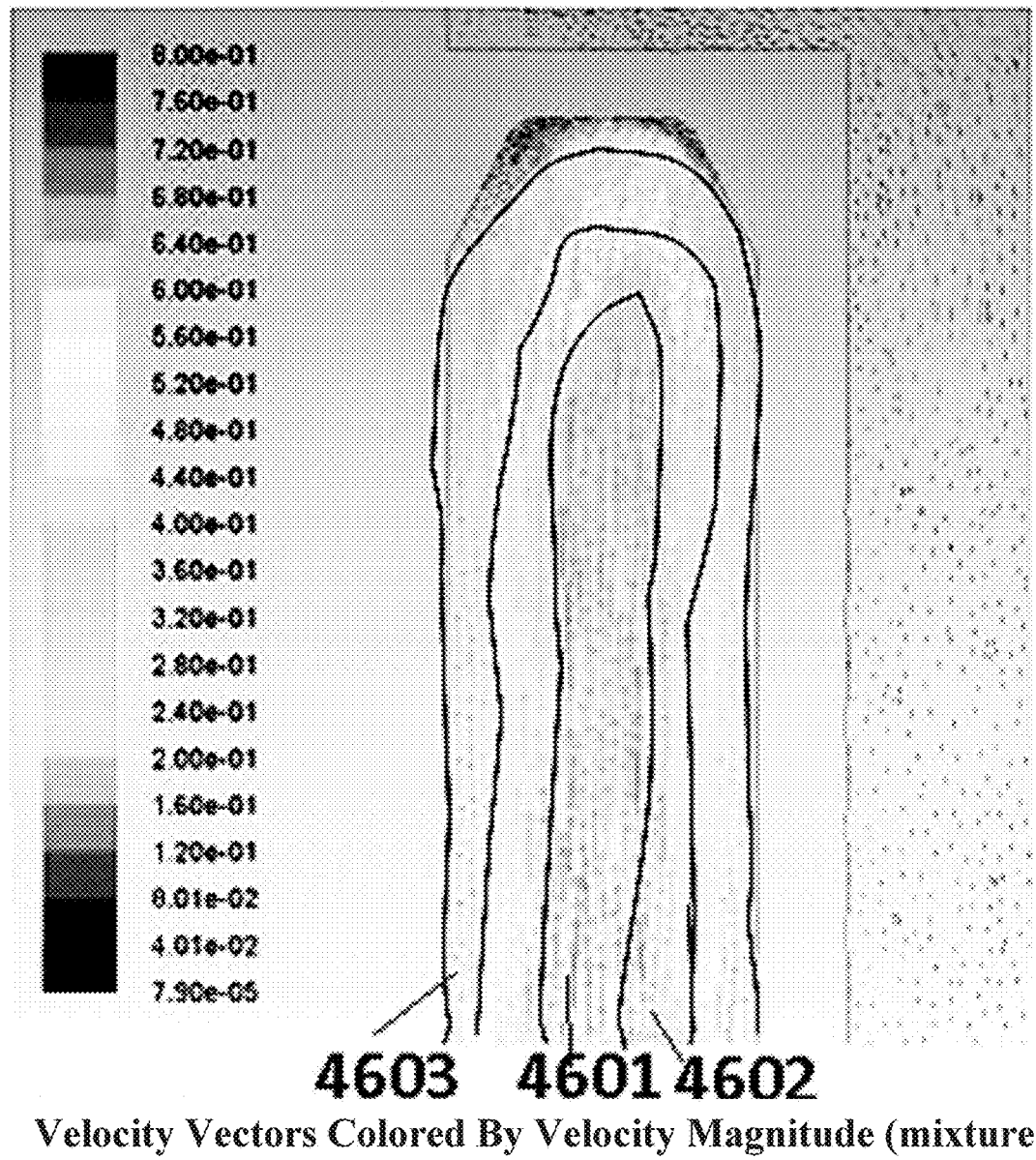
FIGS. 46a-46b show velocity distribution vectors near the inlet and outlet ports with a 65% filling level and an inlet velocity of 0.52 m/s.
Figure 46B:
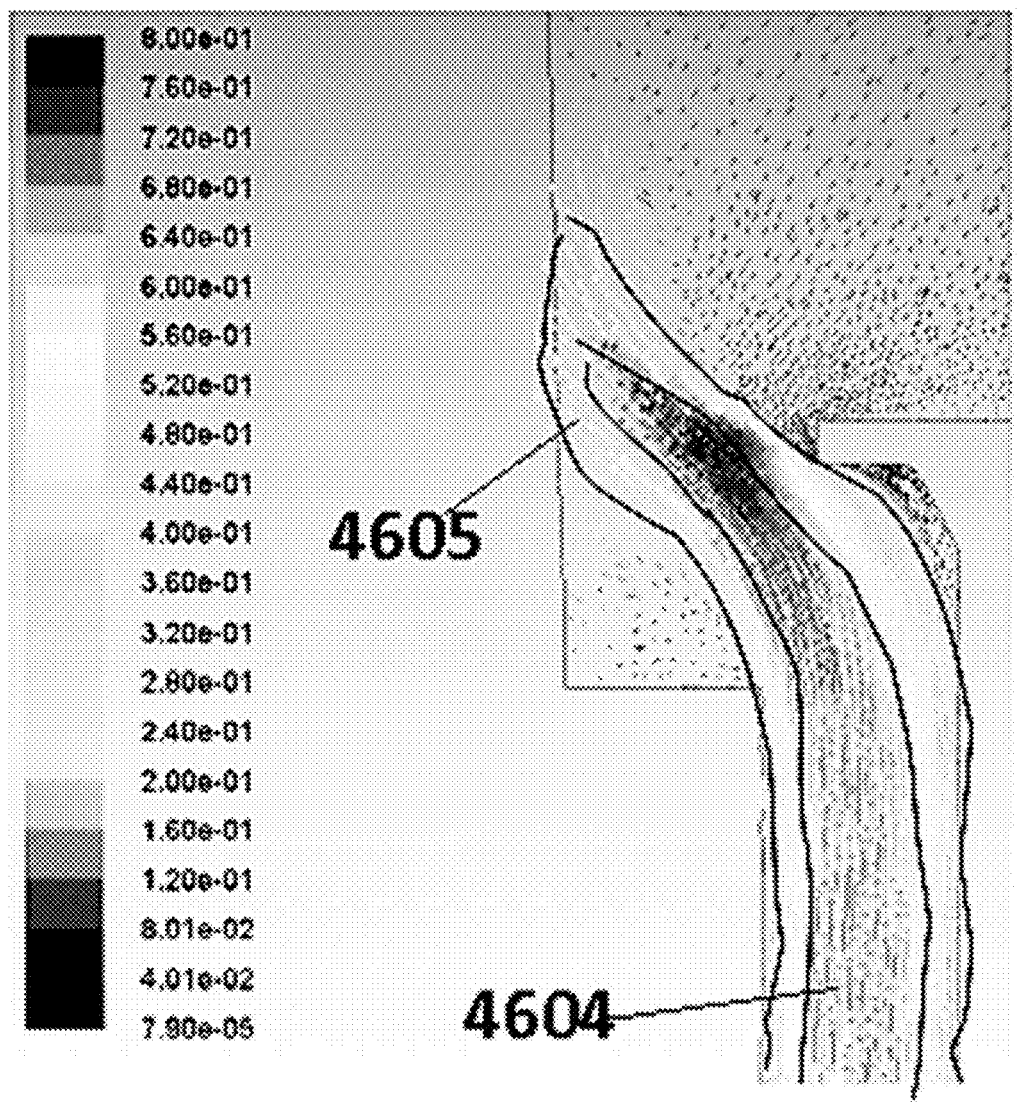

FIG. 46a shows velocity distribution vectors at the fluid inlet from a left-side view, while FIG. 46b shows velocity distribution vectors at the fluid inlet from a right side view. The legend for FIGS. 46a-b transitions from a high velocity flow in red at 8.00e-01 m/s, orange at 6.60e-01 m/s, yellow at 5.40e-01 m/s, green at 3.80e-01 m/s, to light blue at 2.20e-01 m/s to a low velocity flow shown in blue at 7.90e-05 m/s. FIG. 46a illustrates red area 4601, orange area 4602, and green area 4603. FIG. 46b illustrates red area 4604 and green area 4605. As illustrated in FIGS. 46a-b, there are no observable stagnant flow areas at the fluid inlet.

Figure 47:
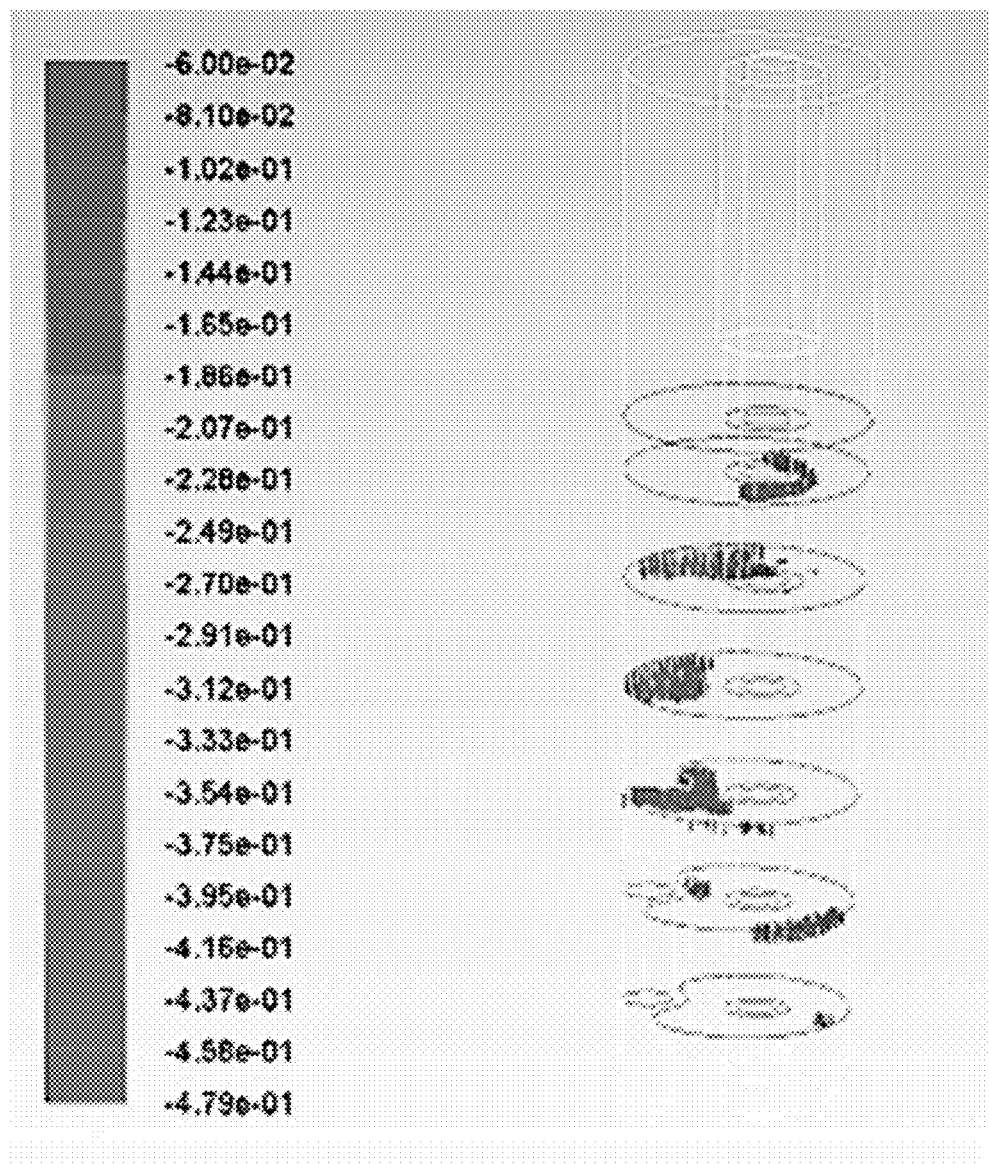
FIG. 47 show shows velocity distribution vectors in the y-direction with a 65% filling level and an inlet velocity of 0.52 m/s.

FIG. 47 shows velocity distribution vectors in the y-direction within multiple section planes with a max velocity scale set at 0.06 m/s. The legend for FIG. 47 transitions from a low velocity flow in red at -6.00 e-02 m/s, orange at -1.54e-01 m/s, yellow at -1.97e-01 m/s, green at -2.80e-01 m/s to light blue at -3.64e-01 m/s to a high velocity flow shown in blue at -4.79e-01 m/s. All visible vectors in FIG. 47 are in red. As illustrated in FIG. 47, some velocity vectors within the chamber body are shown, which means that the velocity in y direction is more than 0.06 m/s. A y-direction velocity of greater than 0.06 m/s means that some bubbles may pass through the fluid outlet.

Figure 48A:
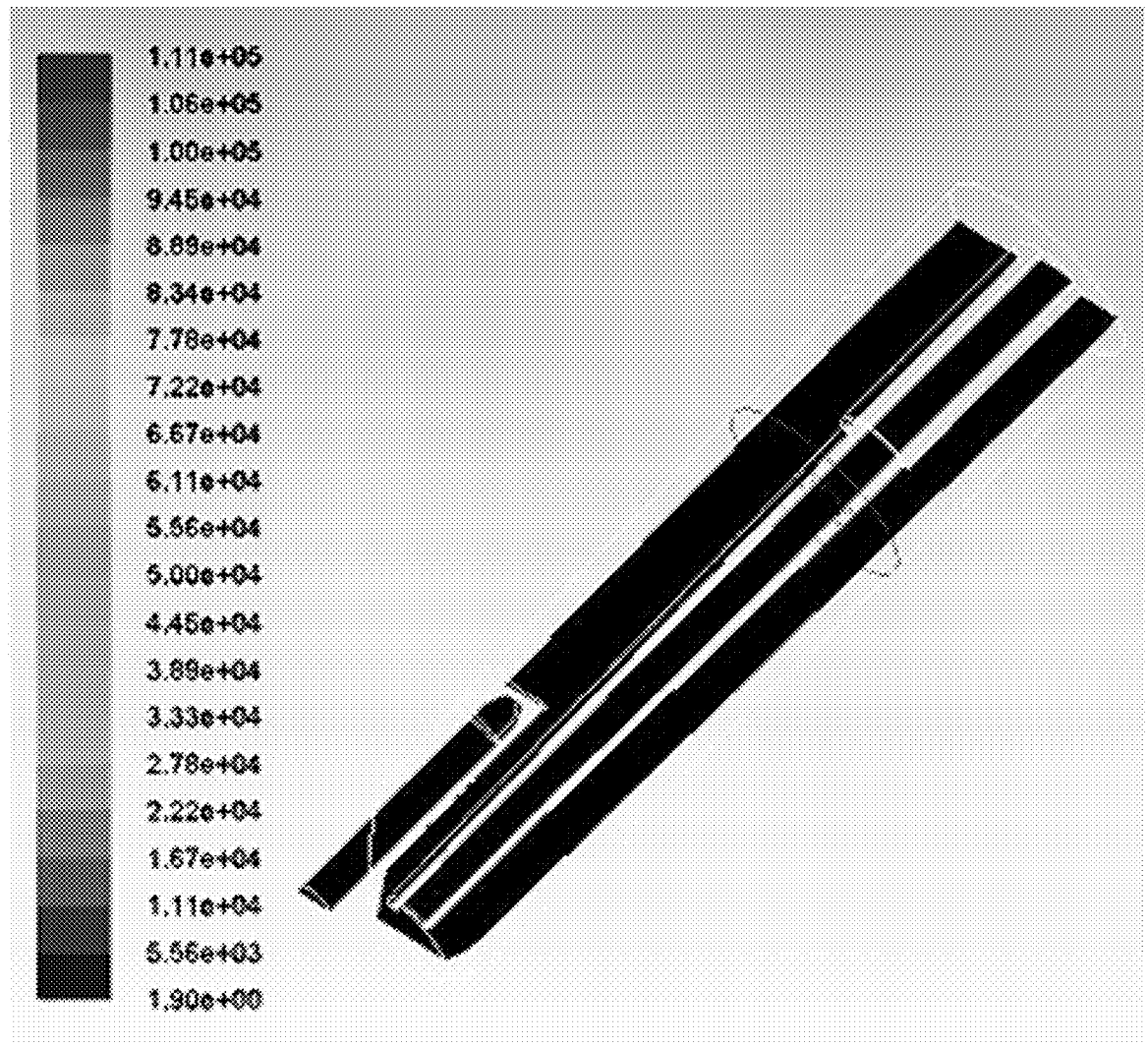
FIGS. 48a-48c show the max shear rate with a 65% filling level and an inlet velocity of 0.52 m/s.
Figure 48B:
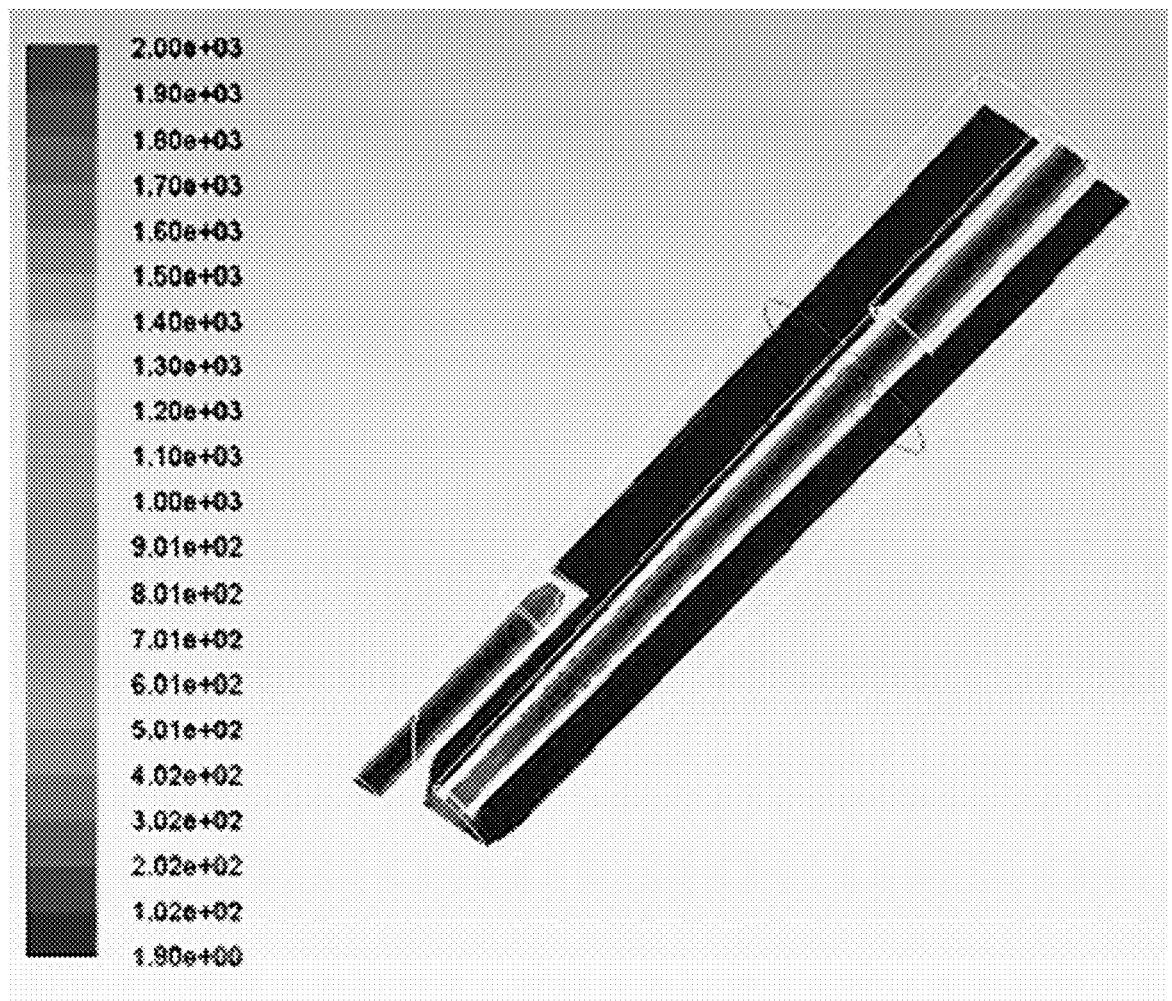
Figure 48C:
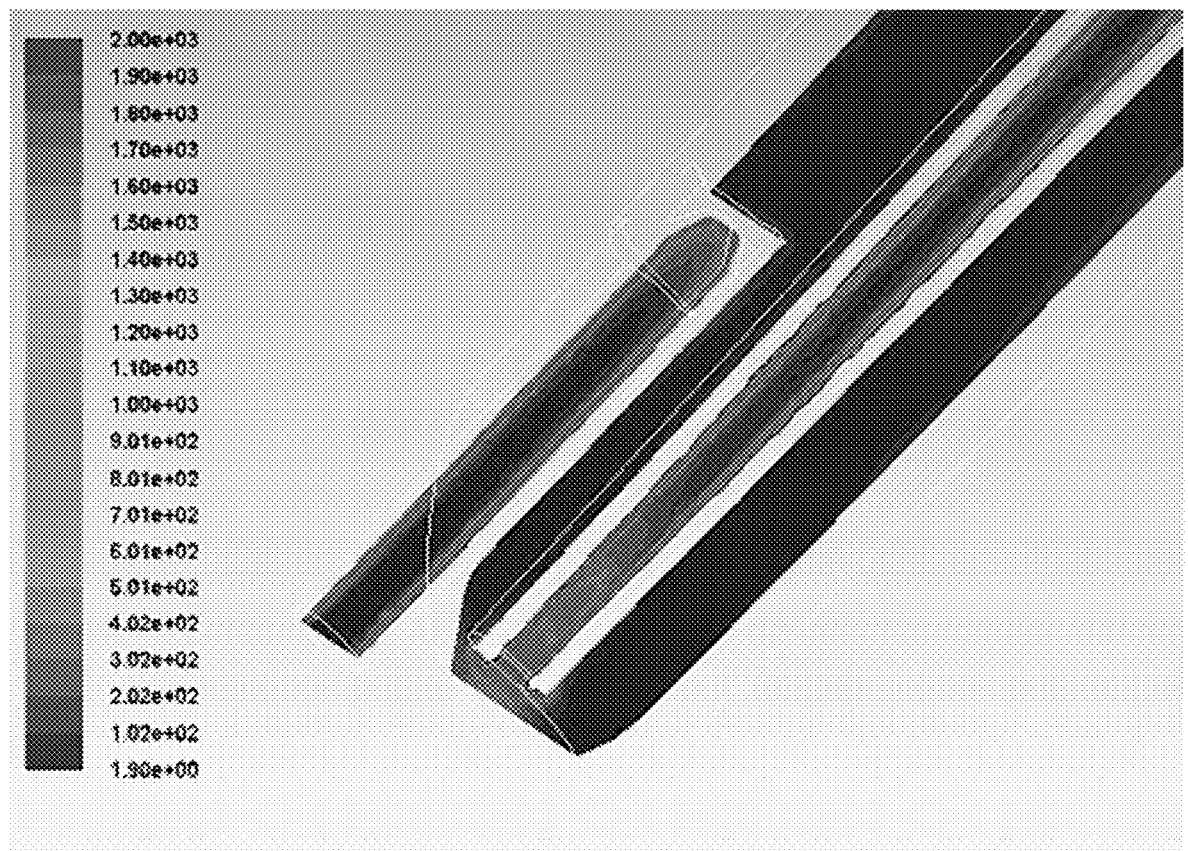

FIG. 48a-c illustrate the max shear rate at a plane of z=0 for the air capture chambers illustrated in FIGS. 9a-b. In FIG. 48a, the threshold shear rate is set at 111,000 1/s or a max shear stress (considering a viscosity of 0.00271 PaS) of 300.8 Pa, less than the threshold in a short term exposure. As shown in FIG. 48a, there are no areas with a shear stress of greater than the 400 Pa for short term exposure. FIG. 48b shows the same chamber with a lower max shear stress setting. As shown in FIG. 48b, the areas with the greatest shear stress are near the inlet and outlet ports. FIG. 48c is a close up of the inlet and outlet areas in FIG. 48b. The legend for FIG. 48a transitions from a shear stress in red at 1.11 e+05 1/s, orange at 9.14e+04 1/s, yellow at 7.50e+04 1/s, green at 5.53e+04 1/s to light blue at 2.06e+04 1/s to a low shear stress shown in blue at 1.09 1/s. The legend for FIGS. 48b-c transitions from a shear stress in red at 2.00e+03 1/s, orange at 1.65e+03 1/s, yellow at 1.35e+03 1/s, green at 9.50e+02 1/s to light blue at 5.50e+02 1/s to a low shear stress shown in blue at 1.09 1/s. As noted, that max shear stress concentrates in the fluid inlet port and outlet port area, with all visible areas of shear stress shown in green. In the fluid inlet port and outlet port areas, blood exposure time is short due to high flow existing. As such, the chambers depicted are safe for blood health in term of the impact of shear stress when used with a 65% filling level and a flow rate of 500 mL/min.

Figure 49:
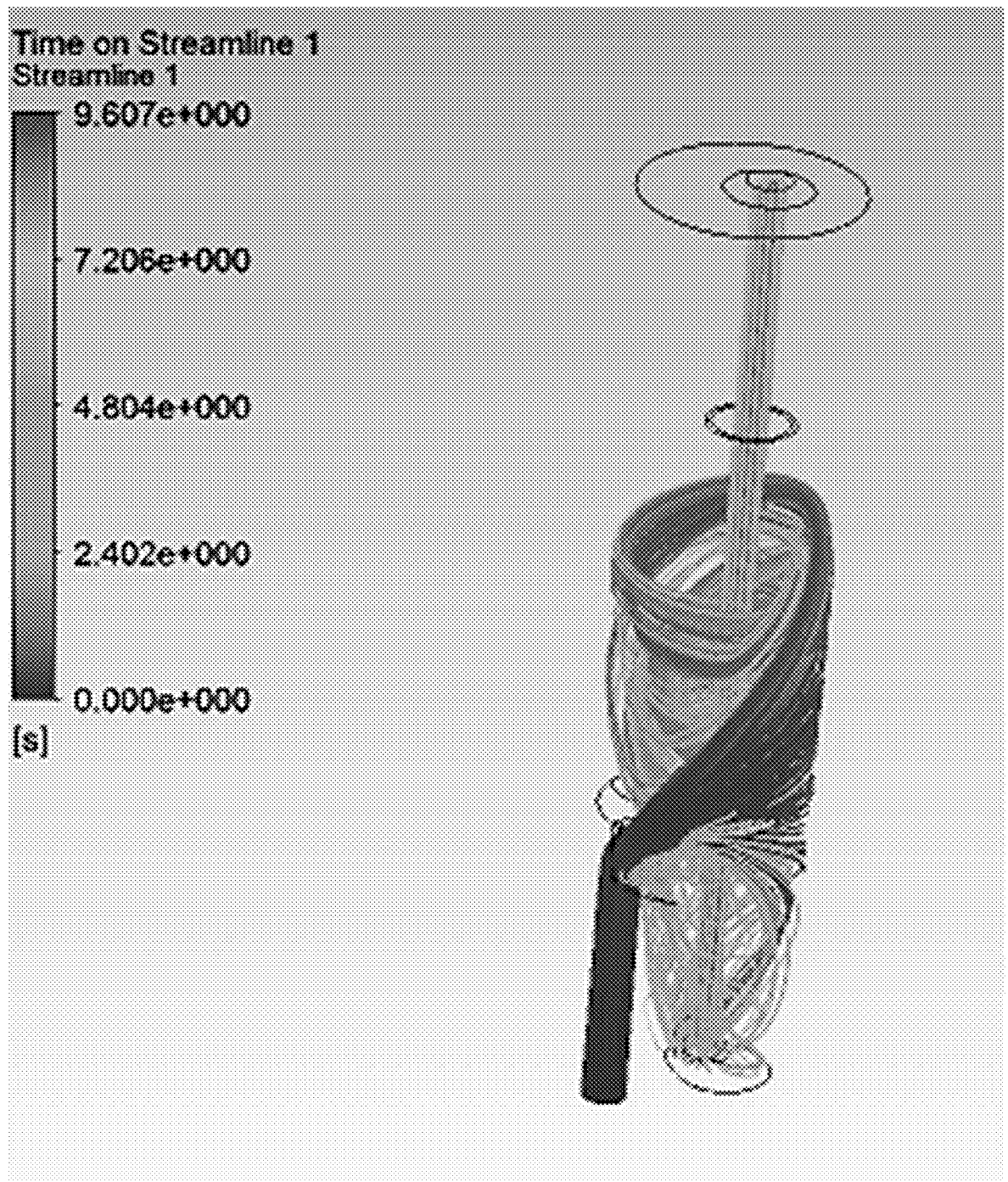
FIG. 49 shows residence time distributions with a 65% filling level and an inlet velocity of 0.52 m/s.

FIG. 49 illustrates residence time distributions at a flow rate of 500 mL/min and a filling level of 65%. As shown in FIG. 49, the maximum residence time for fluid is about 9.6 seconds.

Experiment 13

Figure 50:
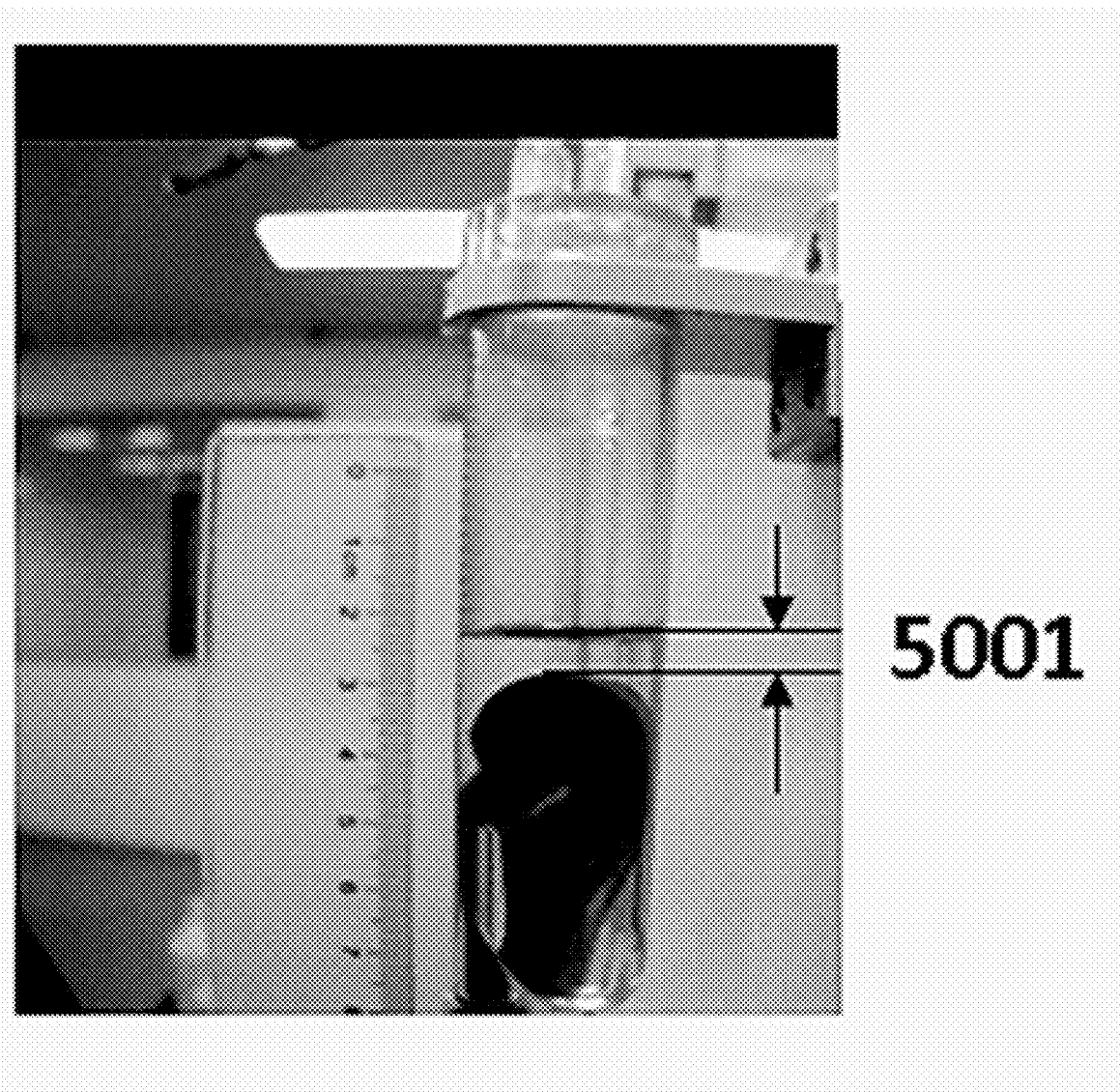
FIG. 50 shows a setup of an experiment to detect the presence of stagnant flow.

In vitro testing of the arterial air capture chambers described was also carried out. In order to determine whether stagnant flow exists at particular combinations of filling levels and flow rates, dye was introduced at set flow rates into the arterial air capture chambers, as shown in FIG. 50. The clear fluid in the area between the dye and the fluid-air interface, labeled as 5001 in FIG. 50 shows that a stagnant flow area exists.

Figure 51A:
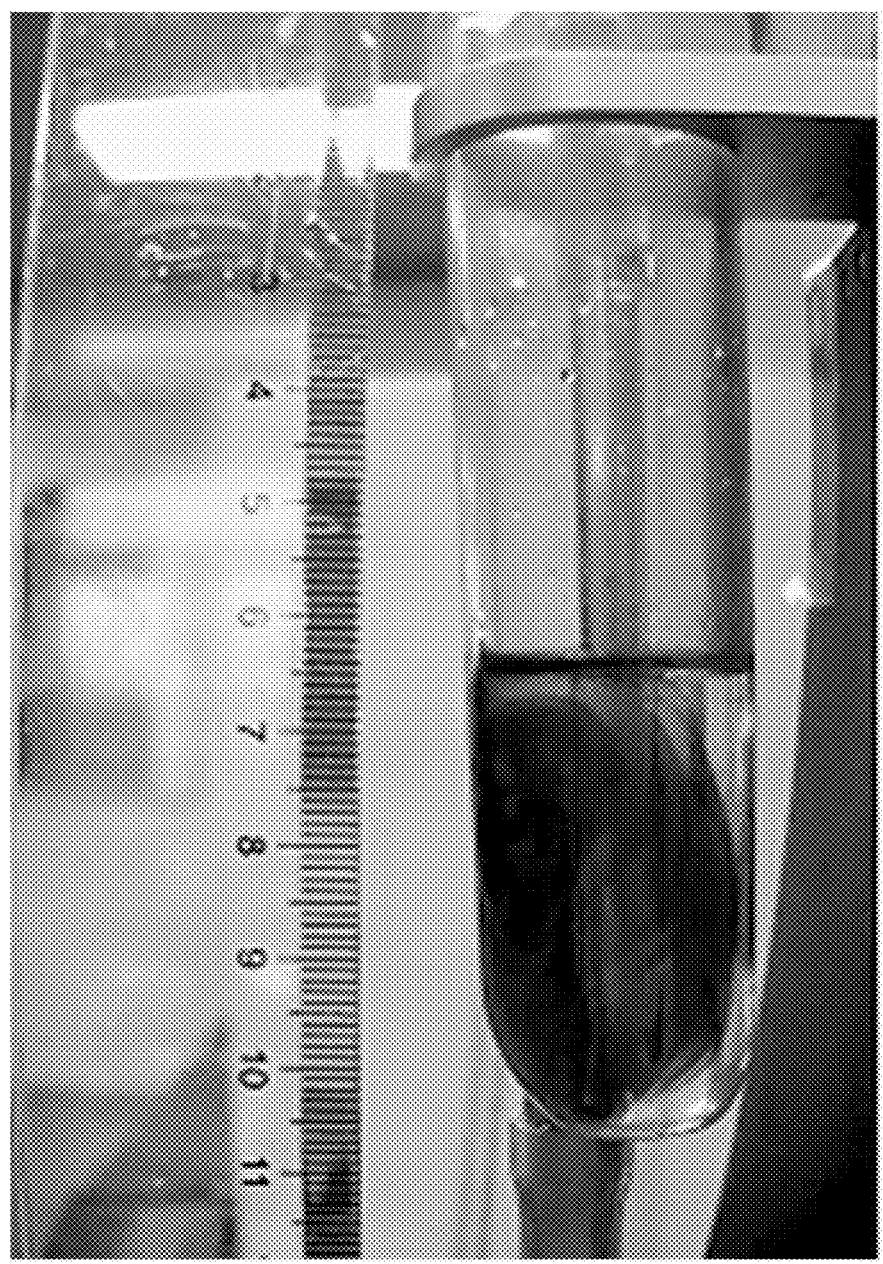
FIGS. 51a-51b shows the presence or absence of stagnant flow as a function of filling level for a flow rate of 50 mL/min.
Figure 51B:
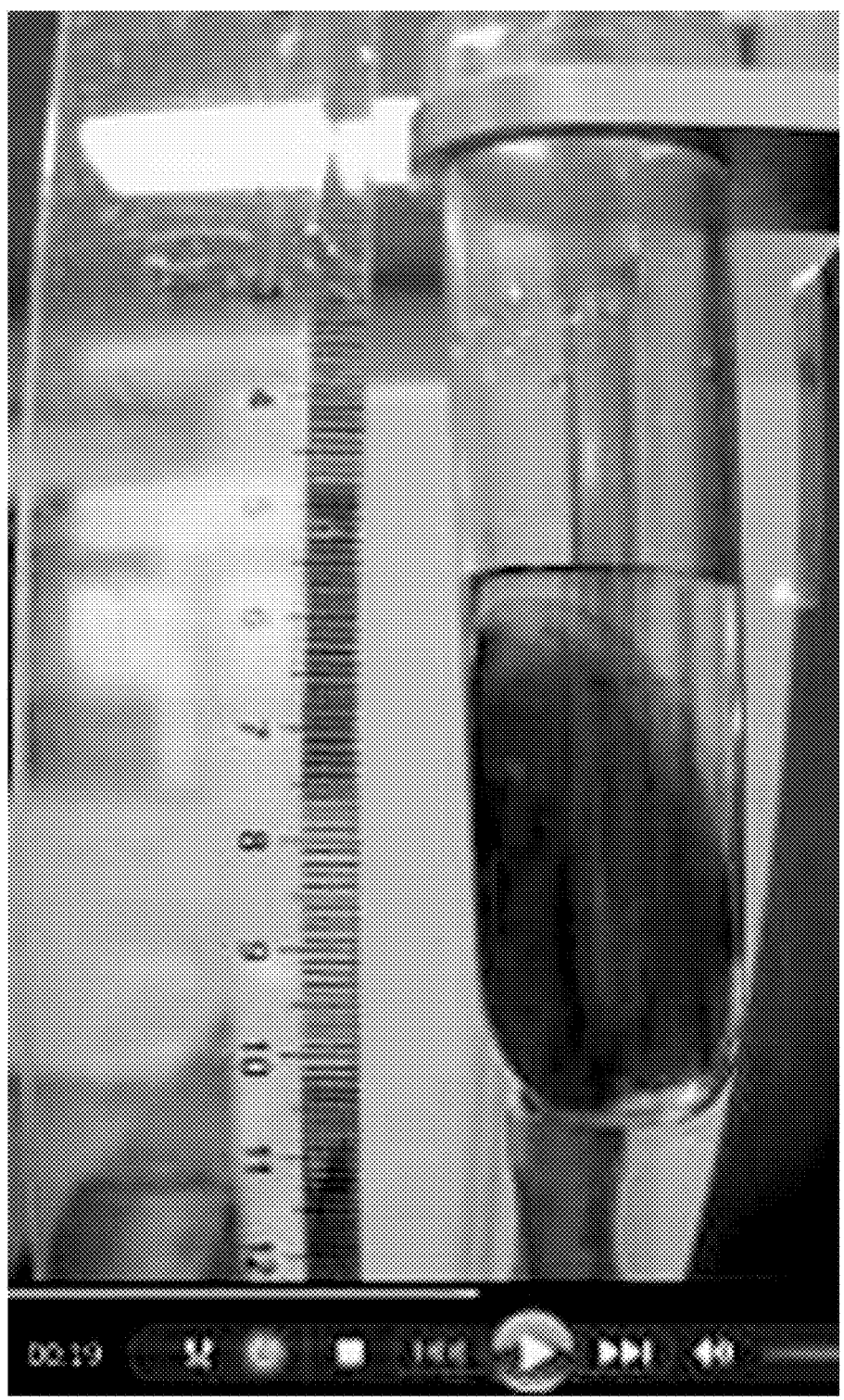

FIG. 51a shows the results of the testing carried out with a filling level of 30% and a flow rate of 50 mL/min. FIG. 51b shows the results of the testing carried out with a filling level of 40% and a flow rate of 50 mL/min. As shown in FIGS. 51a-b, no stagnant flow area exists with a filling level of 30%, but a stagnant flow area exists with a filling level of 40%.

Figure 52A:
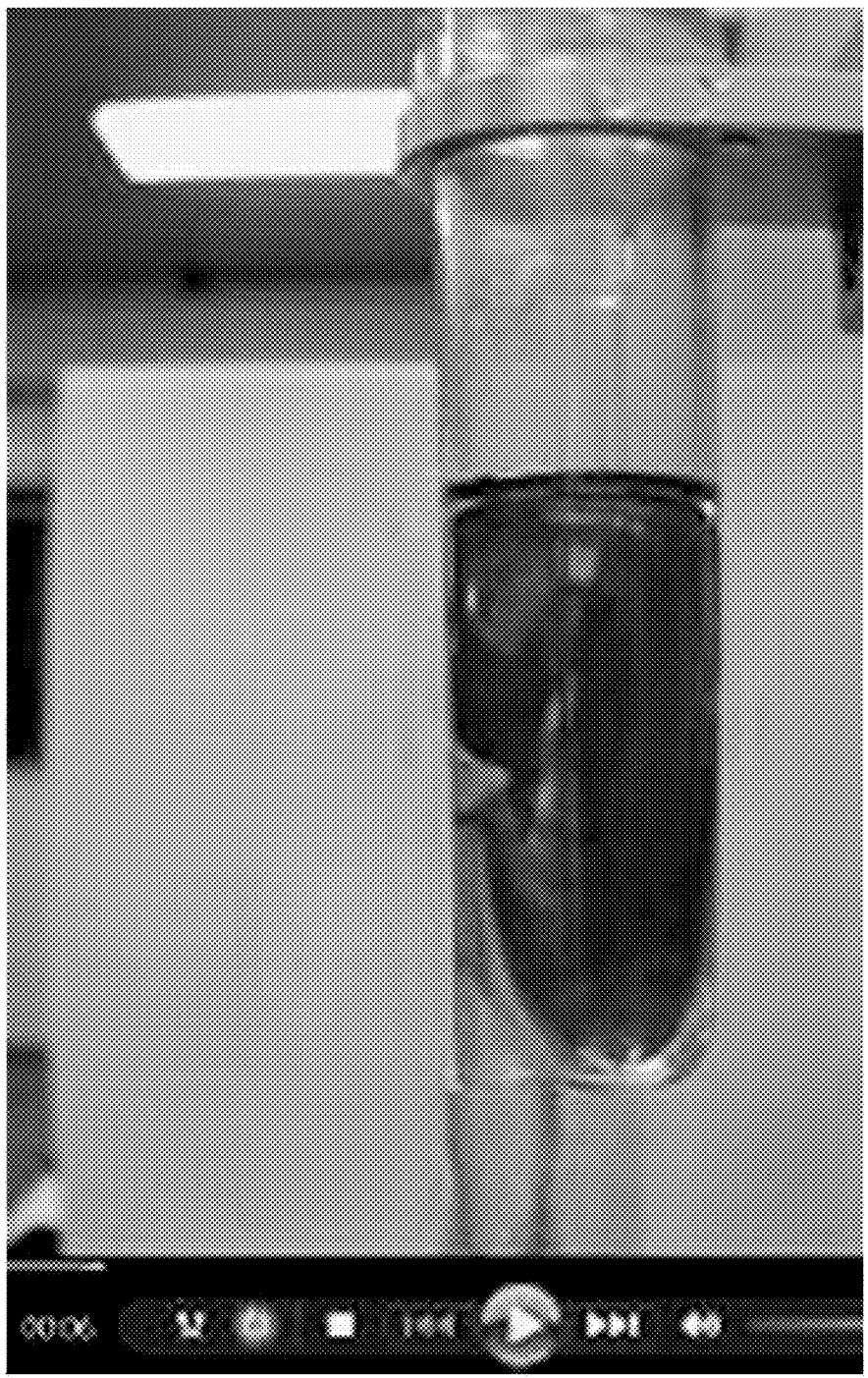
FIGS. 52a-52b shows the presence or absence of stagnant flow as a function of filling level for a flow rate of 100 mL/min.
Figure 52B:
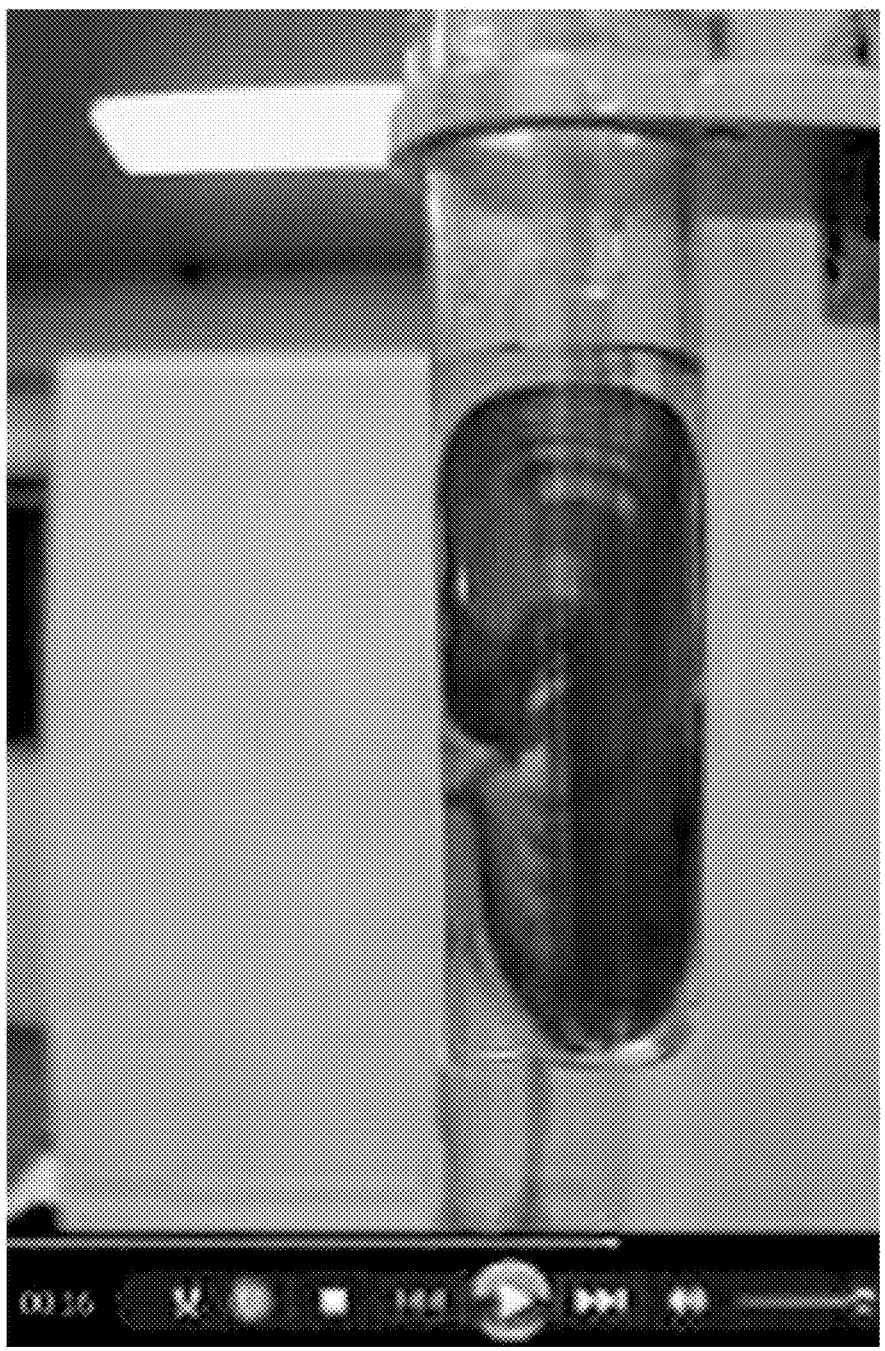

FIG. 52a shows the results of the testing carried out with a filling level of 50% and a flow rate of 100 mL/min. FIG. 52b shows the results of the testing carried out with a filling level of 60% and a flow rate of 100 mL/min. As shown in FIGS. 52a-b, no stagnant flow area exists with a filling level of 50%, but a stagnant flow area exists with a filling level of 60%.

Figure 53A:
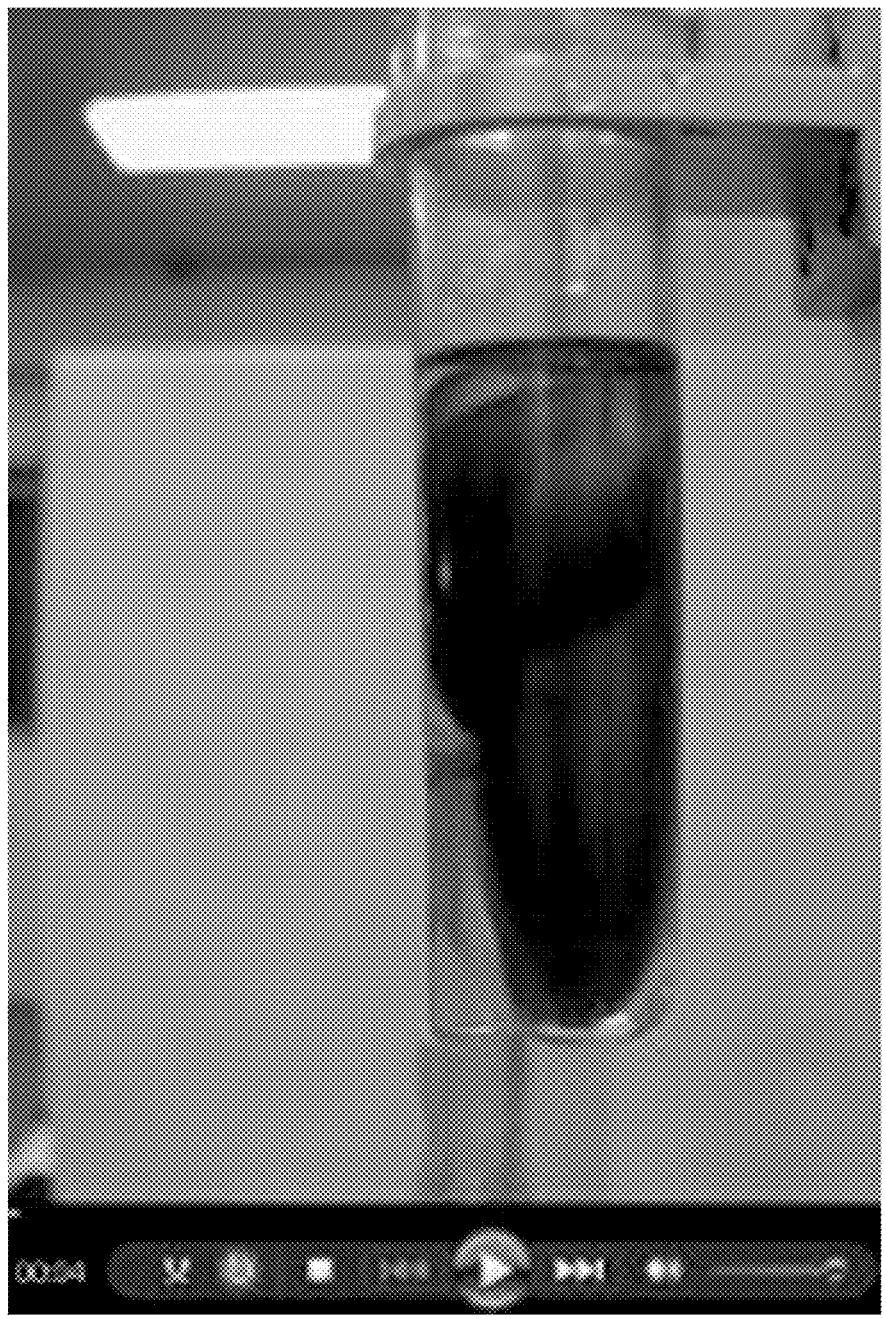
FIGS. 53a-53b shows the presence or absence of stagnant flow as a function of filling level for a flow rate of 275 mL/min.
Figure 53B:
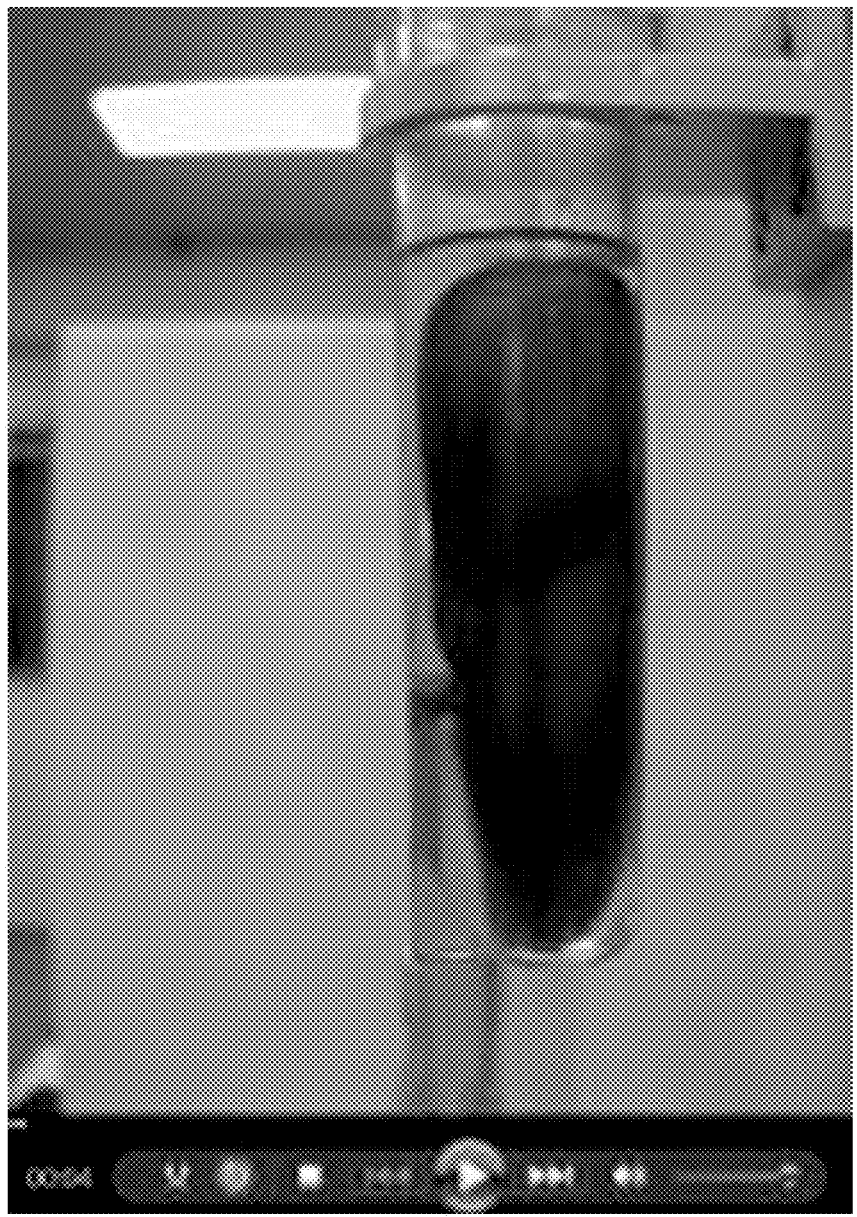

FIG. 53a shows the results of the testing carried out with a filling level of 60% and a flow rate of 275 mL/min. FIG. 53b shows the results of the testing carried out with a filling level of 70% and a flow rate of 275 mL/min. As shown in FIGS. 53a-b, no stagnant flow area exists with a filling level of 60%, but a stagnant flow area exists with a filling level of 70%.

Figure 54A:
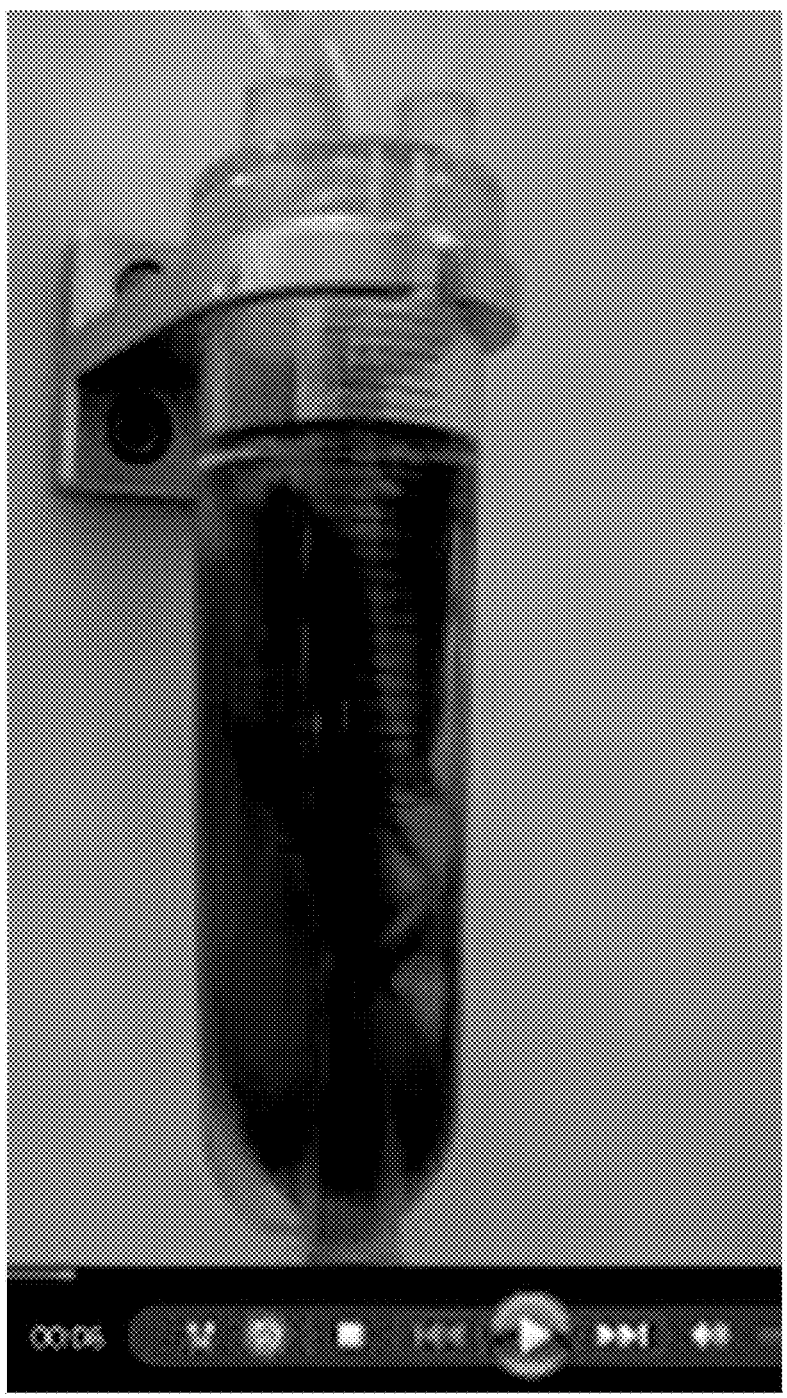
FIGS. 54a-54b shows the presence or absence of stagnant flow as a function of filling level for a flow rate of 500 mL/min.
Figure 54B:
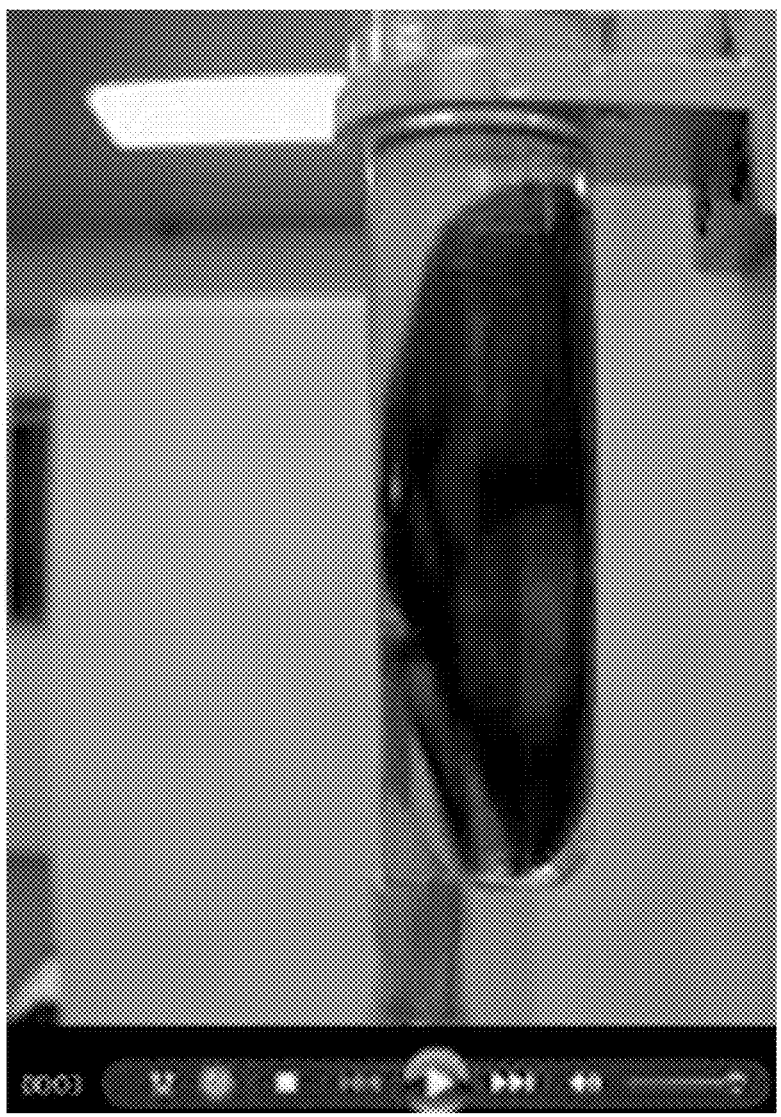

FIG. 54a shows the results of the testing carried out with a filling level of 70% and a flow rate of 500 mL/min. FIG. 54b shows the results of the testing carried out with a filling level of 80% and a flow rate of 500 mL/min. As shown in FIGS. 54a-b, no stagnant flow area exists with a filling level of 70%, but a stagnant flow area exists with a filling level of 80%. The results of the stagnant flow testing are presented in Table 1. Experiments resulting in stagnant flow areas are labeled Y in Table 1, and experiments without stagnant flow areas are labeled N. N/A shows combinations that were not tested.

TABLE 1

Existence of Stagnant Flow for Filling levels and Flow Rates
High Limit of Filling Level For Arterial Chamber*

| Flow rate (ml/min) | Filling Level | | | | | |
|---|---|---|---|---|---|---|
| | 30 | 40% | 50% | 60% | 70% | 80% |
| 50 | N | Y | N/A | N/A | N/A | N/A |
| 100 | N/A | N/A | N | Y | N/A | N/A |
| 275 | N/A | N/A | N/A | N | Y | N/A |
| 500 | N/A | N/A | N/A | N/A | N | Y |

Experiment 14

In order to test the lower limit of the fill level, the experiments were conducted to determine whether a stable fluid-air interface could exist for a given combination of flow rate and filling level. Results of the experiments are summarized in Table 2.

TABLE 2

Existence of Stable Interface for Filling levels and Flow Rates
Low Limit of Filling Level For Arterial Chamber*

| Flow rate (ml/min) | Filling Level | | | |
|---|---|---|---|---|
| | 20% | 30% | 40% | 50% |
| 50 | N | N/A | N/A | N/A |
| 100 | N/A | N | N/A | N/A |
| 275 | N/A | Y | N | N/A |
| 500 | N/A | N/A | Y | N |

In Table 2, a Y denotes an unstable interface, while an N denotes a stable interface. As shown, a stable interface is maintained at a flow rate of 50 mL/min with a 20% filling level; at 100 mL/min with a 30% filling level; at 275 mL/min with a 40% filling level, and at 500 mL/min with a 50% filling level. Unstable interfaces were observed with a flow rate of 275 mL/min and a filling level of 30% as well as a flow rate of 500 mL/min with a filling level of 40%.

One of skill in the art will understand that a specified filling level can be set based on the flow rates, as described. Based on the results observed in Tables 1-2, a specified filling level of between 20-30% can be set for a blood flow rate of 50 mL/min; a specified filling level of between 30-50% can be set for a blood flow rate of 100 mL/min; a specified filling level of between 40-60% can be set for a blood flow rate of 275 mL/min; and a specified filling level of between 50-70% can be set for a blood flow rate of 500 mL/min. Thus, a specified filling level of 50% can be set for any blood flow rate between 100-500 mL/min. In any embodiment, the specified filing level can be set at between 20% to 40% when the blood flow rate is between 50 mL/min and 100 mL/min; between 30% and 60% when the blood flow rate is between 50 mL/min and 200 mL/min; between 30% to 60% when the blood flow rate is between 100 mL/min and 275 mL/min; between 50% and 80% when the blood flow rate is between 200 mL/min and 500 mL/min; between 40% to 90% when the blood flow rate is between 275 mL/min and 500 mL/min; and between 50% to 90% when the blood flow rate is 500 mL/min or greater.

Experiment 15

The residence time of fluid in the arterial air capture chambers was also determined by determining the amount of time for all of the dye to pass through the outlet. Results are summarized in Table 3.

TABLE 3

Residence time for Flow Rates and Filling levels
Residence time

| Flow Rate (ml/min) | Filling level | | | | |
|---|---|---|---|---|---|
| | 30% | 40% | 50% | 60% | 70% |
| 50 | 90 | N/A | N/A | N/A | N/A |
| 100 | 10 | 19 | 37 | 42 | 73* |
| 275 | N/A | 11 | 12 | 15 | 19 |
| 500 | N/A | N/A | 8** | 8 | 10 |

As shown in Table 3, the residence time varied from between 8 seconds for a 60% filling level at 500 mL/min to about 90 seconds for a 30% filling level at 50 mL/min.

Experiment 16

In order to ensure air bubbles can be captured by the arterial air capture chambers, bubble visualization testing was carried out. Bubble flow was visualized at filling level of 70% and flow rate, starting from 500 ml/min, and then 400 ml/min if bubbles were observed to pass through the fluid outlet, and then 300 ml/min. A ruler was used for measuring bubble size. A picture was taken from video, including the ruler, and then was loaded into the Solidworks. Under 2D, the bubble size was calculated, by compared the bubble's dimension and ruler's scale of 1 mm. A few bubbles were passed through the fluid outlet at a flow rate of 500 ml/min, with no bubble passing at 400 ml/min. The bubble size at 500 ml/min was about 0.7 to 0.8 mm diameter (about 0.2-0.3 µL calculated volume), and about 0.88 to 0.9 mm diameter (about 0.4 µL calculated volume) at 400 ml/min. At a 50% filling level, with test flow rates of between 100 and 500 mL/min, no bubbles were observed to pass through the fluid outlet. Similarly, no bubbles passed through the fluid outlet at a flow rate of 50 mL/min and a filling level of 30%.

One skilled in the art will understand that various combinations and/or modifications and variations can be made in the described systems and methods depending upon the specific needs for operation. Moreover features illustrated or described as being part of an aspect of the invention may be used in the aspect of the invention, either alone or in combination.

We claim:

1. An arterial air capture chamber, comprising:
   a chamber body comprising a top portion, a bottom portion, and a side portion extending between the top portion and the bottom portion,
      wherein the chamber body defines a center axis and an interior volume;
   a fluid inlet tube located in the interior volume of the chamber body,
      wherein the fluid inlet tube is further defined by at least the side portion of the chamber body and at least one wall,
      wherein the at least one wall extends upwards from the bottom portion of the chamber body,
   a fluid inlet port,
      wherein the fluid inlet port is located between the top portion of the chamber body and the bottom portion of the chamber body,
   a fluid outlet tube comprising a draw tube downwardly extending from the top portion of the chamber body towards the bottom portion of the chamber body, the draw tube terminating in a beveled opening, the beveled opening opposedly positioned on the draw tube from the center axis of the chamber body relative to the fluid inlet tube,
   wherein the fluid inlet port is positioned higher than the beveled opening of the fluid outlet tube relative the bottom portion of the chamber body to induce a downward flow of fluid in the chamber body.

2. The arterial air capture chamber of claim 1, the fluid inlet tube further comprising a spiral flow-inducing shelf flush to a bottom portion of the outlet of the fluid inlet tube, the spiral flow-inducing shelf downwardly extending to the bottom portion of the chamber body.

3. The arterial air capture chamber of claim 2, wherein the spiral flow-inducing shelf extends between the at least one wall of the fluid inlet tube and an inner wall of the side portion of the chamber body, the spiral flow-inducing shelf configured to smooth fluid flow guided along the inner wall of the side portion in the chamber body.

4. The arterial air capture chamber of claim 3, wherein the fluid inlet tube further comprising an opposing shelf opposedly positioned from the spiral flow-inducing shelf of the outlet and downwardly extending to the bottom portion of the chamber body, the opposing shelf configured to smooth the fluid flow guided along the inner wall of the side portion in the chamber body.

5. The arterial air capture chamber of claim 1, wherein an inner surface of the bottom portion of the chamber body is a curved surface.

6. The arterial air capture chamber of claim 1, wherein the arterial air capture chamber has an inner diameter of between 18 and 30 mm.

7. The arterial air capture chamber of claim 1, wherein a distance between a center axis of the draw tube and the center axis of the chamber body is between 0.1 cm and 0.5 cm.

8. The arterial air capture chamber of claim 1, wherein the chamber body is constructed from a PVC material.

9. The arterial air capture chamber of claim 1, wherein the chamber body is constructed from a polycarbonate material.

10. The arterial air capture chamber of claim 1, further comprising a cap extending over the top portion of the chamber body; wherein the cap comprises a blood outlet port.

11. The arterial air capture chamber of claim 1, wherein the draw tube extends to a height of between 0.1 and 0.5 cm above an inner surface of the bottom portion of the chamber body.

12. An extracorporeal flow path, comprising:
    a dialyzer comprising a blood side of the dialyzer and a dialysate side of the dialyzer;
    a blood inlet fluidly connected to the blood side of the dialyzer and a blood outlet fluidly connected to the blood side of the dialyzer;
    a blood pump; and
    the arterial air capture chamber of claim 1, wherein the arterial air capture chamber is positioned in an arterial blood line fluidly connectable to a patient and to the dialyzer.

13. The extracorporeal flow path of claim 12, wherein the arterial air capture chamber is positioned between the blood pump and the dialyzer.

14. The extracorporeal flow path of claim 12, wherein the arterial air capture chamber is positioned upstream of the blood pump.

15. The extracorporeal flow path of claim 12, further comprising a venous air capture chamber positioned in a venous blood line fluidly connectable to the dialyzer and to a patient.

16. A method of performing hemodialysis, comprising the steps of:
    pumping blood through the extracorporeal flow path of claim 12; and
    pumping dialysate through the dialysate side of the dialyzer;
    wherein the step of pumping blood through the extracorporeal flow path comprises controlling the blood pump to pump the blood at a blood flow rate of between 50 mL/min and 500 mL/min.

17. The method of claim 16, further comprising the step of filling the arterial air capture chamber to a specified filling level; wherein the specified filling level is based on the blood flow rate.

18. The method of claim 17, wherein the specified filling level is between 20% to 40% when the blood flow rate is between 50 mL/min and 100 mL/min; the specified filling level is between 30% and 60% when the blood flow rate is between 50 mL/min and 200 mL/min; the specified filling level is between 30% to 60% when the blood flow rate is between 100 mL/min and 275 mL/min; the specified filling level is between 50% and 80% when the blood flow rate is between 200 mL/min and 500 mL/min; the specified filling level is between 40% to 90% when the blood flow rate is between 275 mL/min and 500 mL/min; and the specified filling level is between 50% to 90% when the blood flow rate is 500 mL/min or greater.

19. The method of claim 17, wherein the blood flow rate is between 100 mL/min and 500 mL/min, and wherein the specified filling level is at least 40%.

20. A method for priming a dialyzer, comprising the steps of:
   pumping physiologically compatible saline through the extracorporeal flow path of claim 12; and
   pumping physiologically compatible saline through the dialysate side of the dialyzer.

* * * * *